(12) United States Patent
Nandakumar

(10) Patent No.: US 10,148,659 B2
(45) Date of Patent: Dec. 4, 2018

(54) AUTHENTICATION SYSTEM AND METHOD

(71) Applicant: TEXTILE COMPUTER SYSTEMS, INC., Tyler, TX (US)

(72) Inventor: Gopal Nandakumar, San Antonio, TX (US)

(73) Assignee: Textile Computer Systems, Inc., Tyler, TX (US)

( * ) Notice: Subject to any disclaimer, the term of this patent is extended or adjusted under 35 U.S.C. 154(b) by 0 days.

(21) Appl. No.: 15/444,564

(22) Filed: Feb. 28, 2017

(65) Prior Publication Data

US 2017/0237739 A1    Aug. 17, 2017

Related U.S. Application Data

(63) Continuation of application No. 14/260,047, filed on Apr. 23, 2014, now Pat. No. 9,584,499, which is a
(Continued)

(51) Int. Cl.
| | |
|---|---|
| *G06Q 20/24* | (2012.01) |
| *G06Q 20/34* | (2012.01) |
| *G06Q 20/38* | (2012.01) |
| *G06Q 20/40* | (2012.01) |
| *H04L 29/06* | (2006.01) |
| *G06F 21/36* | (2013.01) |
| *G06F 21/40* | (2013.01) |
| *G06F 21/30* | (2013.01) |

(52) U.S. Cl.
CPC .............. *H04L 63/10* (2013.01); *G06F 21/36* (2013.01); *G06F 21/40* (2013.01); *G06Q 20/383* (2013.01); *G06Q 20/4014* (2013.01); *H04L 63/0407* (2013.01); *H04L 63/08* (2013.01); *H04L 63/083* (2013.01); *G06F 21/30* (2013.01); *G06F 2221/2103* (2013.01); *G06Q 20/24* (2013.01); *G06Q 20/34* (2013.01)

(58) Field of Classification Search
CPC .... G06Q 20/383; G06Q 20/385; H04L 63/04; H04L 63/0407; H04L 63/0421; H04L 9/32
See application file for complete search history.

(56) References Cited

U.S. PATENT DOCUMENTS

| | | |
|---|---|---|
| 5,883,810 A | 3/1999 | Franklin et al. |
| 7,051,002 B2 | 5/2006 | Keresman et al. |
| | (Continued) | |

*Primary Examiner* — Daniel B Potratz
(74) *Attorney, Agent, or Firm* — Gunn, Lee & Cave, PC

(57) ABSTRACT

An authentication system for authenticating the identity of a requester of access by an unauthorized service client to a secured resource. The system has a messaging gateway having a first set of instructions operable to receive from a requester purporting to be an authorized user of a secured resource a request for limited access to the secured resource by an unauthorized service client for a particular transaction; a server having a second set of instructions operable to determine a key string known to both the secured resource and the authorized user the requestor purports to be, the key string being adapted to provide a basis for authenticating the identity of the requester as the authorized account holder; and a service user interface having a third set of instructions embodied in a computer readable medium operable to receive transaction specific information input into the request by the unauthorized service client.

16 Claims, 94 Drawing Sheets

Related U.S. Application Data continuation of application No. PCT/US2012/059724, filed on Oct. 11, 2012, which is a continuation of application No. 13/279,287, filed on Oct. 23, 2011, now abandoned, and a continuation of application No. 13/279,288, filed on Oct. 23, 2011, now abandoned, and a continuation of application No. 13/279,289, filed on Oct. 23, 2011, now Pat. No. 8,566,957, and a continuation of application No. 13/279,290, filed on Oct. 23, 2011, now abandoned, and a continuation of application No. 13/279,292, filed on Oct. 23, 2011, now Pat. No. 8,505,079, and a continuation of application No. 13/279,293, filed on Oct. 23, 2011, now Pat. No. 8,533,802, and a continuation of application No. 13/279,295, filed on Oct. 23, 2011, now Pat. No. 8,800,014, and a continuation of application No. 13/279,296, filed on Oct. 23, 2011, now Pat. No. 8,695,071, and a continuation of application No. 13/279,297, filed on Oct. 23, 2011, now abandoned, and a continuation of application No. 13/279,294, filed on Oct. 23, 2011, now Pat. No. 8,713,656.

(56) References Cited

U.S. PATENT DOCUMENTS

| | | |
|---|---|---|
| 7,140,036 B2 | 11/2006 | Bhagavatula et al. |
| 7,461,028 B2 | 12/2008 | Wronski et al. |
| 7,657,489 B2 | 2/2010 | Stambaugh |
| 7,693,798 B2 * | 4/2010 | Anderson ........ G06K 19/06196 235/380 |
| 8,396,747 B2 * | 3/2013 | Bachenheimer ....... G06Q 20/02 705/16 |
| 2003/0194989 A1 * | 10/2003 | Guion .................... G06Q 20/04 455/406 |
| 2006/0173794 A1 | 8/2006 | Sellars et al. |
| 2006/0235795 A1 | 10/2006 | Johnson et al. |
| 2009/0259588 A1 | 10/2009 | Lindsay |
| 2009/0292642 A1 * | 11/2009 | Han ....................... G06Q 20/12 705/71 |
| 2010/0153273 A1 * | 6/2010 | Sellars .................. G06Q 20/02 705/67 |
| 2010/0241571 A1 * | 9/2010 | McDonald ............ G06Q 20/12 705/74 |

* cited by examiner

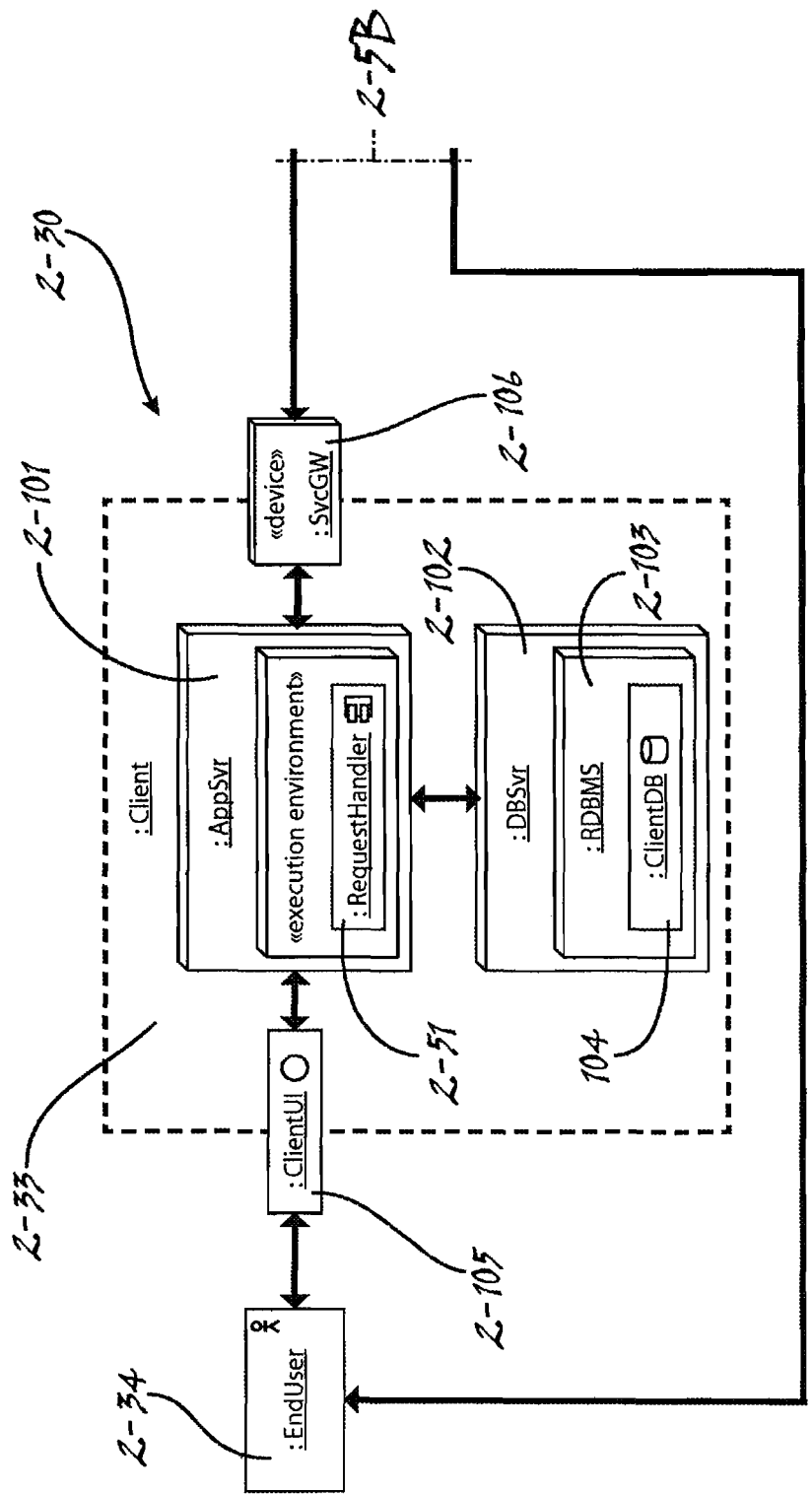
Figure Z-5A

AUTHENTICATION SYSTEM AND METHOD

CROSS REFERENCES TO RELATED APPLICATIONS

This continuation application claims the benefit of and priority to U.S. application Ser. No. 14/260,047, filed Apr. 23, 2014 (now U.S. Pat. No. 9,584,499), which is a continuation of PCT Application No. PCT/US12/59724 filed Oct. 11, 2012, which is an international application that claims the benefit of and priority to each of the applications listed below:

(1) U.S. application Ser. No. 13/279,287, filed Oct. 23, 2011 and entitled "Authentication System";

(2) U.S. application Ser. No. 13/279,288, filed Oct. 23, 2011 and entitled "Authentication System";

(3) U.S. application Ser. No. 13/279,289, filed Oct. 23, 2011 and entitled "Authentication System";

(4) U.S. application Ser. No. 13/279,290, filed Oct. 23, 2011 and entitled "Authentication System";

(5) U.S. application Ser. No. 13/279,292, filed Oct. 23, 2011 and entitled "Authentication System and Related Method";

(6) U.S. application Ser. No. 13/279,293, filed Oct. 23, 2011 and entitled "Authentication System and Related Method";

(7) U.S. application Ser. No. 13/279,294, filed Oct. 23, 2011 and entitled "Authentication Method";

(8) U.S. application Ser. No. 13/279,295, filed Oct. 23, 2011 and entitled "Authentication Method";

(9) U.S. application Ser. No. 13/279,296, filed Oct. 23, 2011 and entitled "Authentication Method"; and

(10) U.S. application Ser. No. 13/279,297, filed Oct. 23, 2011 and entitled "Authentication Method."

Each of the applications identified above is incorporated by reference herein.

FIELD OF THE INVENTION

The present invention relates to security protocols for use in securing and/or restricting access to personal or other confidential information, physical locations and the like. More particularly, the invention relates to a system whereby the identity of a person, entity, device or the like attempting to gain access to a secured resource may be securely authenticated.

BACKGROUND OF THE INVENTION

The protection of personal information and/or other secured resources, such as, for example, credit data, medical history, financial account information, secured physical locations and the like is of ever increasing concern to businesses and individuals alike. To be sure, each passing day reveals more sophisticated attacks by those who would gain unauthorized access to such resources absent the constant vigilance of those charged with the protection of such resources. To this end, the various security protocols employed for the protection of such resources almost universally include some means for authenticating the identity of a person, entity, device or the like attempting to gain access to a secured resource.

More often than not the critical authentication is carried out by the age old process of providing a privately held password, personal identification number or the like in connection with some generally publicly-known identifier for the person, entity, device or the like attempting to gain access to the secured resource. Unfortunately, however, this protocol is dogged by vulnerability to interception through spoofing, eavesdropping, and countless other techniques through which a password, personal identification number or the like may become known to an attacker. Additionally, it is common to find that a single person, entity, device or the like uses the same password, personal identification number or the like in connection with gaining access to multiple secured resources. In such case, a security breach in connection with a single secured resource may jeopardize the security of all other secured resources.

Given the fundamentally flawed state of the art with respect to password-type protection, it is therefore the overriding object of the present invention to improve over the prior art by providing a system by which authentication may be more securely conducted. Additionally, it is an object of the present invention to provide such a system that is robust in specific implementation and readily usable by any manner of person, entity, device or the like. Finally, it is an object of the present invention to provide such a system that is economical in implementation and therefore readily accessible to virtually any application.

SUMMARY OF THE INVENTION

In accordance with the foregoing objects, an embodiment of the present invention generally comprises a means for receiving from a requester purporting to be an authorized user of a secured resource a request for access to the secured resource; means for generating and communicating to the purported authorized user a challenge string adapted to provide a basis for authenticating the identity of the requester; a means for receiving a response string corresponding to the challenge string; and a means for evaluating the response string to authenticate the identity of the requester.

Another embodiment of the present invention generally comprises a means for receiving from a service client (such as, for example, a retail store, a service station, an on-line service provider or merchandiser, a healthcare provider, a medical insurer, an information consumer or the like) a request for access to a secured resource, where the request for access was previously submitted to the service client by a requester purporting to be an authorized user of said secured resource; means for generating and communicating to the purported authorized user a challenge string adapted to provide a basis for authenticating the identity of the requester; a means for receiving from the service client a response string corresponding to the challenge string; and a means for evaluating the response string to authenticate the identity of the requester.

Yet another embodiment of the present invention generally comprises a means for receiving from a service client (such as, for example, a retail store, a service station, an on-line service provider or merchandiser, a healthcare provider, a medical insurer, an information consumer or the like) a request for access to a secured resource, where the request for access was previously submitted to the service client by a requester purporting to be an authorized user of the secured resource; means for generating and communicating to the purported authorized user a challenge string adapted to provide a basis for authenticating the identity of the requester; a means for receiving from the service client a response string corresponding to the challenge string; and a means for evaluating the response string to authenticate the identity of the requester. In a critical aspect of the present invention, the secured resource will have a common identifier by which it may be generally identified outside of the authentication system, but the request for access will lack sufficient information content for the service client to be able to determine the common identifier.

Still another embodiment of the present invention generally comprises a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for generating and communicating to the purported authorized user a challenge string adapted to provide a basis for authenticating the identity of the requester; a means for receiving a response string corresponding to the challenge string; and a means for evaluating the response string to authenticate the identity of the requester.

Yet another embodiment of the present invention generally comprises a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for determining a key string adapted to provide a basis for authenticating the identity of the requester; a means for receiving an authentication credential associated with the request for access; and a means for evaluating the authentication credential to authenticate the identity of the requester.

Still another embodiment of the present invention generally comprises a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for generating and communicating to the purported authorized user a key string adapted to provide a basis for authenticating the identity of the requester; a means for receiving an authentication credential associated with the request for access; and a means for evaluating the authentication credential to authenticate the identity of the requester.

Yet another embodiment of the present invention generally comprises the steps of receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; generating and communicating to the purported authorized user a challenge string adapted to provide a basis for authenticating the identity of the requester; receiving a response string corresponding to the challenge string; and evaluating the response string to authenticate the identity of the requester.

Another embodiment of the present invention generally comprises the steps of receiving from a service client (such as, for example, a retail store, a service station, an on-line service provider or merchandiser, a healthcare provider, a medical insurer, an information consumer or the like) a request for access to a secured resource, where the request for access was previously submitted to the service client by a requester purporting to be an authorized user of the secured resource; generating and communicating to the purported authorized user a challenge string adapted to provide a basis for authenticating the identity of the requester; receiving from the service client a response string corresponding to the challenge string; and evaluating the response string to authenticate the identity of the requester. In a critical aspect of the present invention, the secured resource will have a common identifier by which it may be generally identified outside of the authentication system, but the request for access will lack sufficient information content for the service client to be able to determine the common identifier.

Still another embodiment generally comprises the steps of receiving from a service client (such as, for example, a retail store, a service station, an on-line service provider or merchandiser, a healthcare provider, a medical insurer, an information consumer or the like) a request for access to a secured resource, where the request for access was previously submitted to the service client by a requester purporting to be an authorized user of the secured resource; generating and communicating to the purported authorized user a challenge string adapted to provide a basis for authenticating the identity of the requester; receiving from the service client a response string corresponding to the challenge string; and evaluating the response string to authenticate the identity of the requester.

Another embodiment comprises the steps of receiving from a requester purporting to be an authorized user of a secured resource a request for access to the secured resource; generating and communicating to the purported authorized user a challenge string adapted to provide a basis for authenticating the identity of the requester; receiving a response string corresponding to the challenge string; and evaluating the response string to authenticate the identity of the requester.

BRIEF DESCRIPTION OF THE DRAWINGS

FIG. 2-1 shows, in an overview use case diagram, the various basic functionality implemented in the preferred embodiment of the authentication system and method of the present invention;

FIG. 2-2 shows, in a flowchart, an overview of the various steps generally taken in making a request for access to a secured resource in accordance with the present invention;

FIG. 2-3 shows, in a flowchart, an overview of the various steps generally taken in validating the purported access right of a user requesting access to a secured resource in accordance with the present invention;

FIG. 2-4 shows, in an overview sequence diagram, various interactions as generally take place during the operation of the authentication system and method of the present invention; FIG. 2-5 shows, in a deployment diagram comprising FIGS. 2-5A and 2-5B, an exemplary hardware and software implementation of the authentication system and method of the present invention, and wherein:

FIG. 2-5A, in particular, shows a service client and the various elements generally associated and/or typically collocated with a service client, and FIG. 2-5B, in particular, shows a service provider and the various elements generally associated and/or typically collocated with a service provider;

FIG. 2-6 shows, in a deployment diagram, various details of a representative web interface implementation of a user interface for use in connection with the exemplary hardware and software implementation of FIG. 2-5;

FIG. 2-7 shows, in an elevational representation, various details of a representative terminal device interface implementation of a user interface for use in connection with the exemplary hardware and software implementation of FIG. 2-5 such as may, in particular, be provided in connection with a service client implementing functionality of the present invention;

FIG. 2-8 shows, in a class diagram, a high level schema for a representative user database as may be implemented in connection with the exemplary hardware and software implementation of FIG. 2-5;

FIG. 2-9 shows, in a class diagram, a high level schema for a representative transaction database as may be implemented in connection with the exemplary hardware and software implementation of FIG. 2-5;

FIG. 2-10 shows, in a screen representation of a web browsing application, a first exemplary implementation of an order completion page from a website showing, in particular, various details of the manner for making in accordance with the present invention a request for access to a secured resource;

FIG. 2-11 shows, in a top plan representation of a mobile telecommunications device screen, a first example of a challenge message such as may be implemented in accordance with the present invention;

FIG. 2-12 shows, in a top plan representation of a mobile telecommunications device screen, a second example of a challenge message such as may be implemented in accordance with the present invention showing, in particular, extended functionality for use in detecting a spoofing type deception;

FIG. 2-13 shows, in a top plan representation of a mobile telecommunications device screen, a third example of a challenge message such as may be implemented in accordance with the present invention showing, in particular, extended functionality for accommodating constraints imposed by the available means for submitting of an authentication credential for purposes of validating the purported access right of a user requesting access to a secured resource in accordance with the present invention;

FIG. 2-14 shows, in a screen representation of a web browsing application, a first exemplary implementation of a payment confirmation page from a website showing, in particular, various details of the manner for submitting of an authentication credential for purposes of validating the purported access right of a user requesting access to a secured resource in accordance with the present invention;

FIG. 2-15 shows, in a screen representation of a web browsing application, a second exemplary implementation of a payment confirmation page from a website showing, in particular, various details of the manner for submitting of an authentication credential for purposes of validating the purported access right of a user requesting access to a secured resource in accordance with the present invention;

FIG. 2-16 shows, in a screen representation of a web browsing application, an exemplary implementation of a preliminary payment confirmation page from a website showing, in particular, various details of at least one method for accessing a further payment confirmation page;

FIG. 2-17 shows, in a screen representation of a web browsing application, a third exemplary implementation of a payment confirmation page from a website showing, in particular, various details of a first implementation of extended functionality for use in detecting a spoofing type deception;

FIG. 2-18 shows, in a screen representation of a web browsing application, the implementation of the payment confirmation page of FIG. 2-17 showing, in particular, various additional details of the implemented extended functionality for use in detecting a spoofing type deception; and FIG. 2-19 shows, in a screen representation of a web browsing application, a fourth exemplary implementation of a payment confirmation page from a website showing, in particular, various details of second implementation of extended functionality for use in detecting a spoofing type deception.

FIG. 3-1 shows, in an overview use case diagram, the various basic functionality implemented in the preferred embodiment of the authentication system and method of the present invention;

FIG. 3-2 shows, in a flowchart, an overview of the various steps generally taken in making a request for access to a secured resource in accordance with the present invention;

FIG. 3-3 shows, in a flowchart, an overview of the various steps generally taken in validating the purported access right of a user requesting access to a secured resource in accordance with the present invention;

FIG. 3-4 shows, in an overview sequence diagram, various interactions as generally take place during the operation of the authentication system and method of the present invention;

FIGS. 3-5A and 3-5B show, in a deployment diagram, an exemplary hardware and software implementation of the authentication system and method of the present invention, and wherein FIG. 3-5A, in particular, shows a service client and the various elements generally associated and/or typically collocated with a service client, and FIG. 3-5B, in particular, shows a service provider and the various elements generally associated and/or typically collocated with a service provider;

FIG. 3-6 shows, in a deployment diagram, various details of a representative web interface implementation of a user interface for use in connection with the exemplary hardware and software implementation of FIGS. 3-5A and 3-5B;

FIG. 3-7 shows, in an elevational representation, various details of a representative terminal device interface implementation of a user interface for use in connection with the exemplary hardware and software implementation of FIGS. 3-5A and 3-5B such as may, in particular, be provided in connection with a service client implementing functionality of the present invention;

FIG. 3-8 shows, in a class diagram, a high level schema for a representative user database as may be implemented in connection with the exemplary hardware and software implementation of FIGS. 3-5A and 3-5B;

FIG. 3-9 shows, in a class diagram, a high level schema for a representative transaction database as may be implemented in connection with the exemplary hardware and software implementation of FIGS. 3-5A and 3-5B;

FIG. 3-10 shows, in a screen representation of a web browsing application, a first exemplary implementation of an order completion page from a website showing, in particular, various details of the manner for making in accordance with the present invention a request for access to a secured resource;

FIG. 3-11 shows, in a screen representation of a web browsing application, a second exemplary implementation of an order completion page from a website showing, in particular, various details of the manner for making in accordance with the present invention a request for access to a secured resource;

FIG. 3-12 shows, in a screen representation of a web browsing application, a third exemplary implementation of an order completion page from a website showing, in particular, various details of the manner for making in accordance with the present invention a request for access to a secured resource including additional information in response to an inquiry from the service provider;

FIG. 3-13 shows, in a top plan representation of a mobile telecommunications device screen, a first example of a challenge message such as may be implemented in accordance with the present invention;

FIG. 3-14 shows, in a top plan representation of a mobile telecommunications device screen, a second example of a challenge message such as may be implemented in accordance with the present invention showing, in particular, extended functionality for use in detecting a spoofing type deception;

FIG. 3-15 shows, in a top plan representation of a mobile telecommunications device screen, a third example of a challenge message such as may be implemented in accordance with the present invention showing, in particular, extended functionality for use in determining the identity of a particular secured resource for which a user requests access;

FIG. 3-16 shows, in a top plan representation of a mobile telecommunications device screen, a fourth example of a challenge message such as may be implemented in accordance with the present invention showing, in particular, extended functionality for accommodating constraints imposed by the available means for submitting of an authentication credential for purposes of validating the purported access right of a user requesting access to a secured resource in accordance with the present invention;

FIG. 3-17 shows, in a screen representation of a web browsing application, a first exemplary implementation of a payment confirmation page from a website showing, in particular, various details of the manner for submitting of an authentication credential for purposes of validating the purported access right of a user requesting access to a secured resource in accordance with the present invention;

FIG. 3-18 shows, in a screen representation of a web browsing application, a second exemplary implementation of a payment confirmation page from a website showing, in particular, various details of the manner for submitting of an authentication credential for purposes of validating the purported access right of a user requesting access to a secured resource in accordance with the present invention;

FIG. 3-19 shows, in a screen representation of a web browsing application, an exemplary implementation of a preliminary payment confirmation page from a website showing, in particular, various details of at least one method for accessing a further payment confirmation page;

FIG. 3-20 shows, in a screen representation of a web browsing application, a third exemplary implementation of a payment confirmation page from a website showing, in particular, various details of a first implementation of extended functionality for use in detecting a spoofing type deception;

FIG. 3-21 shows, in a screen representation of a web browsing application, the implementation of the payment confirmation page of FIG. 3-20 showing, in particular, various additional details of the implemented extended functionality for use in detecting a spoofing type deception; and FIG. 3-22 shows, in a screen representation of a web browsing application, a fourth exemplary implementation of a payment confirmation page from a website showing, in particular, various details of second implementation of extended functionality for use in detecting a spoofing type deception.

FIG. 4-1 shows, in an overview use case diagram, the various basic functionality implemented in the preferred embodiment of the authentication system and method of the present invention;

FIG. 4-2 shows, in a flowchart, an overview of the various steps generally taken in making a request for access to a secured resource in accordance with the present invention;

FIG. 4-3 shows, in a flowchart, an overview of the various steps generally taken in validating the purported access right of a user requesting access to a secured resource in accordance with the present invention;

FIG. 4-4 shows, in an overview sequence diagram, various interactions as generally take place during the operation of the authentication system and method of the present invention;

FIG. 4-5 shows, in a deployment diagram, an exemplary hardware and software implementation of the authentication system and method of the present invention;

FIG. 4-6 shows, in a deployment diagram, various details of at least one particular implementation of a user interface for use in connection with the exemplary hardware and software implementation of FIG. 4-5;

FIG. 4-7 shows, in a class diagram, a high level schema for a representative user database as may be implemented in connection with the exemplary hardware and software implementation of FIG. 4-5;

FIG. 4-8 shows, in a class diagram, a high level schema for a representative transaction database as may be implemented in connection with the exemplary hardware and software implementation of FIG. 4-5;

FIG. 4-9 shows, in an elevational representation, a representative terminal device such as may be provided in connection with a service client implementing functionality of the present invention and showing, in particular, representative means for identifying the service client as well as means for communicating an authentication credential to the service client as implemented in connection with a point-of-sale, fueling station, automatic teller machine or like terminal device;

FIG. 4-10 shows, a top plan representation of a guest check, particularly showing representative means for identifying the service client as implemented in connection with a document;

FIG. 4-11 shows, in a screen representation of a web browsing application, representative means for identifying the service client as implemented in connection with an on-line application;

FIG. 4-12 shows, in a top plan representation of a mobile telecommunications device screen, an example of a request message such as may be utilized in accordance with the present invention;

FIG. 4-13 shows, in a top plan representation of a mobile telecommunications device screen, an example of an inquiry message such as may be implemented in accordance with the present invention;

FIG. 4-14 shows, in a screen representation of an electronic mail application, a further example of a request message such as may be utilized in accordance with the present invention;

FIG. 4-15 shows, in a screen representation of a web browsing application, an exemplary implementation of an interactive generation of a request message in accordance with the present invention;

FIG. 4-16 shows, in a top plan representation of a mobile telecommunications device screen, a further exemplary implementation of an interactive generation of a request message in accordance with the present invention;

FIG. 4-17 shows, in a top plan representation of a mobile telecommunications device screen, an example of a challenge message such as may be implemented in accordance with the present invention;

FIG. 4-18 shows, in a top plan representation of a mobile telecommunications device screen, a further example of a challenge message such as may be implemented in accordance with the present invention; and FIG. 4-19 shows, in a top plan representation of a mobile telecommunications device screen, a still further example of a challenge message such as may be implemented in accordance with the present invention showing, in particular, one exemplary means for determining a particular resource for access by an end user.

FIG. 5-1 shows, in an overview use case diagram, the various basic functionality implemented in the preferred embodiment of the authentication system and method of the present invention;

FIG. 5-2 shows, in a flowchart, an overview of the various steps generally taken in making a request for access to a secured resource in accordance with the present invention;

FIG. 5-3 shows, in a flowchart, an overview of the various steps generally taken in validating the purported access right of a user requesting access to a secured resource in accordance with the present invention;

FIG. 5-4 shows, in an overview sequence diagram, various interactions as generally take place during the operation of the authentication system and method of the present invention;

FIG. 5-5 shows, in a deployment diagram, an exemplary hardware and software implementation of the authentication system and method of the present invention;

FIG. 5-6 shows, in a deployment diagram, various details of at least one particular implementation of a user interface for use in connection with the exemplary hardware and software implementation of FIG. 5-5;

FIG. 5-7 shows, in a class diagram, a high level schema for a representative user database as may be implemented in connection with the exemplary hardware and software implementation of FIG. 5-5;

FIG. 5-8 shows, in a class diagram, a high level schema for a representative transaction database as may be implemented in connection with the exemplary hardware and software implementation of FIG. 5-5;

FIG. 5-9 shows, in an elevational representation, a representative terminal device such as may be provided in connection with a service client implementing functionality of the present invention and showing, in particular, representative means for identifying the service client as well as means for communicating an authentication credential to the service client as implemented in connection with a point-of-sale, fueling station, automatic teller machine or like terminal device;

FIG. 5-10 shows, a top plan representation of a guest check, particularly showing representative means for identifying the service client as implemented in connection with a document;

FIG. 5-11 shows, in a screen representation of a web browsing application, representative means for identifying the service client as implemented in connection with an on-line application;

FIG. 5-12 shows, in a top plan representation of a mobile telecommunications device screen, an example of a request message such as may be utilized in accordance with the present invention;

FIG. 5-13 shows, in a top plan representation of a mobile telecommunications device screen, an example of an inquiry message such as may be implemented in accordance with the present invention;

FIG. 5-14 shows, in a screen representation of an electronic mail application, a further example of a request message such as may be utilized in accordance with the present invention;

FIG. 5-15 shows, in a screen representation of a web browsing application, an exemplary implementation of an interactive generation of a request message in accordance with the present invention;

FIG. 5-16 shows, in a top plan representation of a mobile telecommunications device screen, a further exemplary implementation of an interactive generation of a request message in accordance with the present invention; and FIG. 5-17 shows, in a top plan representation of a mobile telecommunications device screen, an example of a confirmation message such as may be implemented in accordance with the present invention.

FIG. 6-1 shows, in an overview use case diagram, the various basic functionality implemented in the preferred embodiment of the authentication system and method of the present invention;

FIG. 6-2 shows, in a flowchart, an overview of the various steps generally taken in making a request for access to a secured resource in accordance with the present invention;

FIG. 6-3 shows, in a flowchart, an overview of the various steps generally taken in validating the purported access right of a user requesting access to a secured resource in accordance with the present invention;

FIG. 6-4 shows, in an overview sequence diagram, various interactions as generally take place during the operation of the authentication system and method of the present invention;

FIG. 6-5 shows, in a deployment diagram, an exemplary hardware and software implementation of the authentication system and method of the present invention;

FIG. 6-6 shows, in a deployment diagram, various details of at least one particular implementation of a user interface for use in connection with the exemplary hardware and software implementation of FIG. 6-5;

FIG. 6-7 shows, in a class diagram, a high level schema for a representative user database as may be implemented in connection with the exemplary hardware and software implementation of FIG. 6-5;

FIG. 6-8 shows, in a class diagram, a high level schema for a representative transaction database as may be implemented in connection with the exemplary hardware and software implementation of FIG. 6-5;

FIG. 6-9 shows, in an elevational representation, a representative terminal device such as may be provided in connection with a service client implementing functionality of the present invention and showing, in particular, representative means for identifying the service client as well as means for communicating an authentication credential to the service client as implemented in connection with a point-of-sale, fueling station, automatic teller machine or like terminal device;

FIG. 6-10 shows, a top plan representation of a guest check, particularly showing representative means for identifying the service client as implemented in connection with a document;

FIG. 6-11 shows, in a screen representation of a web browsing application, representative means for identifying the service client as implemented in connection with an on-line application;

FIG. 6-12 shows, in a top plan representation of a mobile telecommunications device screen, an example of a request message such as may be utilized in accordance with the present invention;

FIG. 6-13 shows, in a top plan representation of a mobile telecommunications device screen, an example of an inquiry message such as may be implemented in accordance with the present invention;

FIG. 6-14 shows, in a screen representation of an electronic mail application, a further example of a request message such as may be utilized in accordance with the present invention;

FIG. 6-15 shows, in a screen representation of a web browsing application, an exemplary implementation of an interactive generation of a request message in accordance with the present invention;

FIG. 6-16 shows, in a top plan representation of a mobile telecommunications device screen, a further exemplary implementation of an interactive generation of a request message in accordance with the present invention;

FIG. 6-17 shows, in a top plan representation of a mobile telecommunications device screen, an example of a key string message such as may be implemented in accordance with the present invention; and FIG. 6-18 shows, in a top plan representation of a mobile telecommunications device screen, a further example of a key string message such as may be implemented in accordance with the present invention showing, in particular, one exemplary means for determining a particular resource for access by an end user.

DETAILED DESCRIPTION OF VARIOUS EMBODIMENTS

Although those of ordinary skill in the art will readily recognize many alternative embodiments, especially in light of the illustrations provided herein, this detailed description is exemplary of the preferred embodiment of the present invention, the scope of which is limited only by the claims appended hereto.

First Described Embodiment

Figure 1:
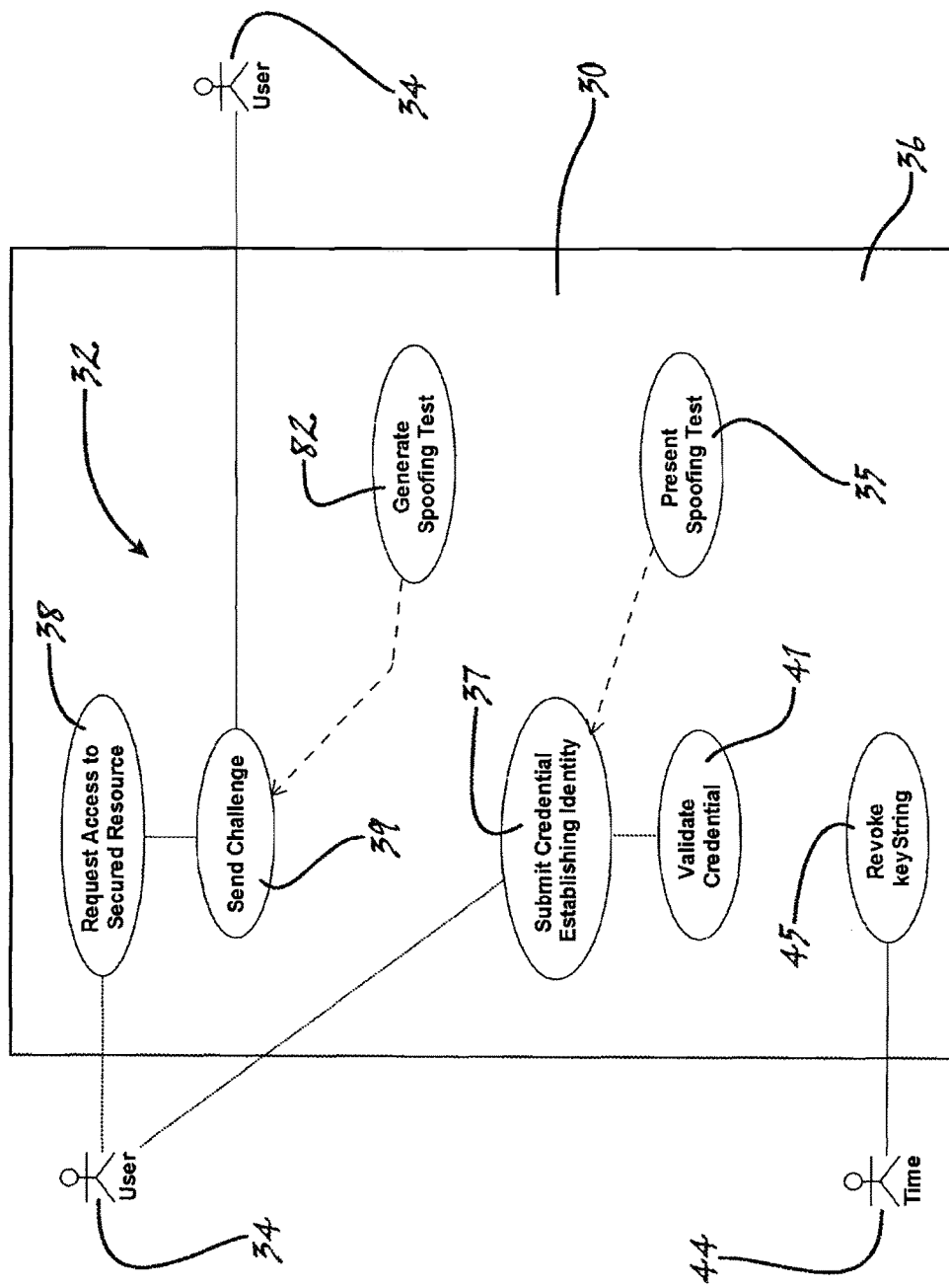
FIG. 1 shows, in an overview use case diagram, the various basic functionality implemented in the preferred embodiment of the authentication system and method of the present invention.

Referring now to the figures, and to FIG. 1 in particular, the authentication system 30 of the present invention is shown to generally comprise an operative combination of a plurality of service provider implemented use cases 32. In particular, the service provider 36 of the present invention will generally provide for an end user actor 34 a means 38 for requesting access to a secured resource and, additionally, a means 37 for submitting an authentication credential for use in validating the purported access right of the end user actor 34.

Additionally, as also particularly shown in FIG. 1, the service provider 36 of the present invention will generally provide responsive to submission by an end user actor 34 of a request for access to a secured resource a means 39 for generating and sending to an end user actor 34 a challenge message 94 designed to enable only the intended end user actor 34 to determine the content of a transient authentication credential. Still further, the service provider 36 of the present invention will generally provide responsive to submission by an end user actor 34 of an authentication credential a means 41 for validating the authentication credential.

In an extension of the present invention particularly useful in implementations comprising an Internet website-based or other user interface 105 generally susceptible to spoofing type deceptions, the service provider 36 may in combination with the means 37 for submitting an authentication credential also be adapted to provide for the end user actor 34 a means 35 for detecting the existence of a spoofing type deception. In implementation of such an extension of the present invention, the service provider 36 may in combination with the means 39 for generating and sending to an end user actor 34 a challenge message 94 also be adapted to provide a means 82 for generating content for use in the means for detecting the existence of a spoofing type deception and to provide such content to the end user actor 34.

Finally, it is noted that time 44 as an actor may be accommodated as desired in any particular implementation wherein the service provider 36 is also provided with means 45 responsive to the passage of time for revoking or otherwise invalidating an authentication credential such that an authentication credential otherwise correctly determined by an end user actor 34 in response to a service provider generated challenge message 94 may as a result of the passage of time be deemed to be incorrect, thereby resulting in a validation failure upon application of the means 45 for validating the authentication credential.

Figure 2:
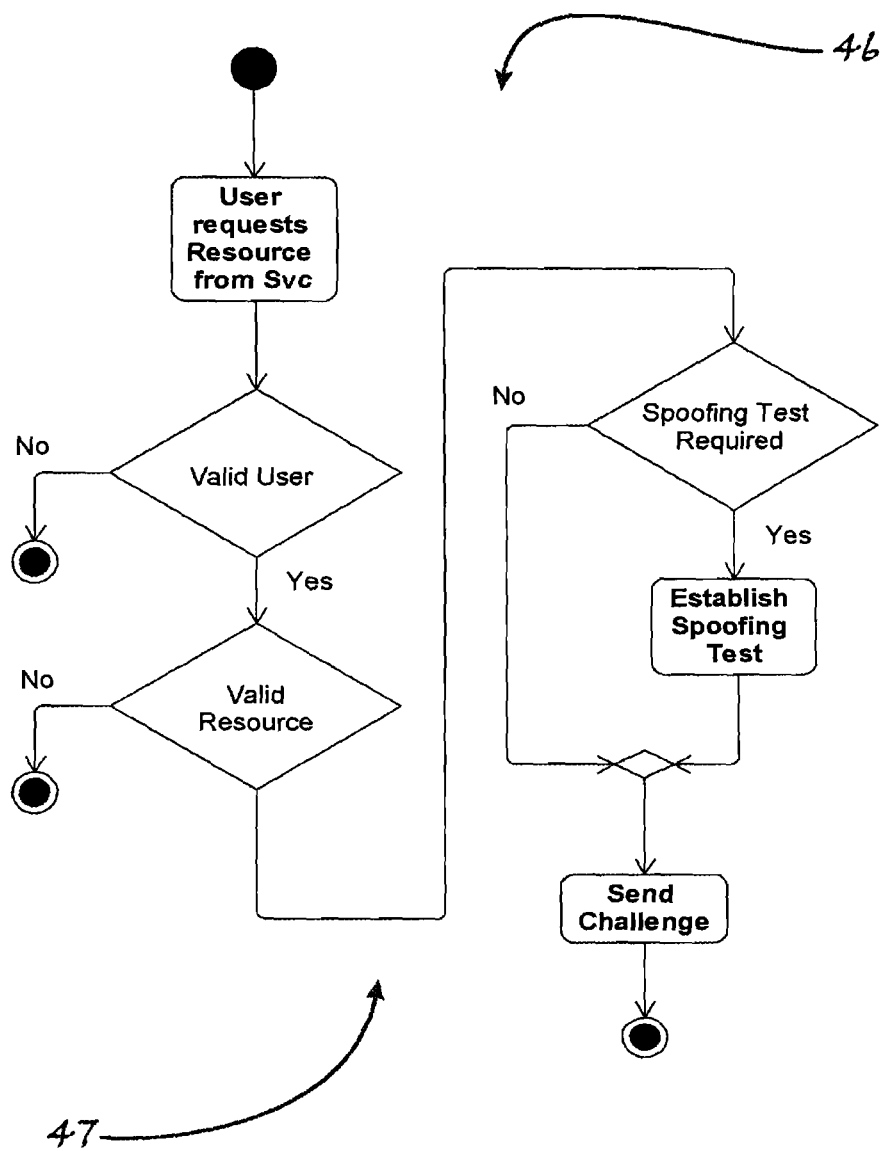
FIG. 2 shows, in a flowchart, an overview of the various steps generally taken in making a request for access to a secured resource in accordance with the present invention.
Figures 1, 2:
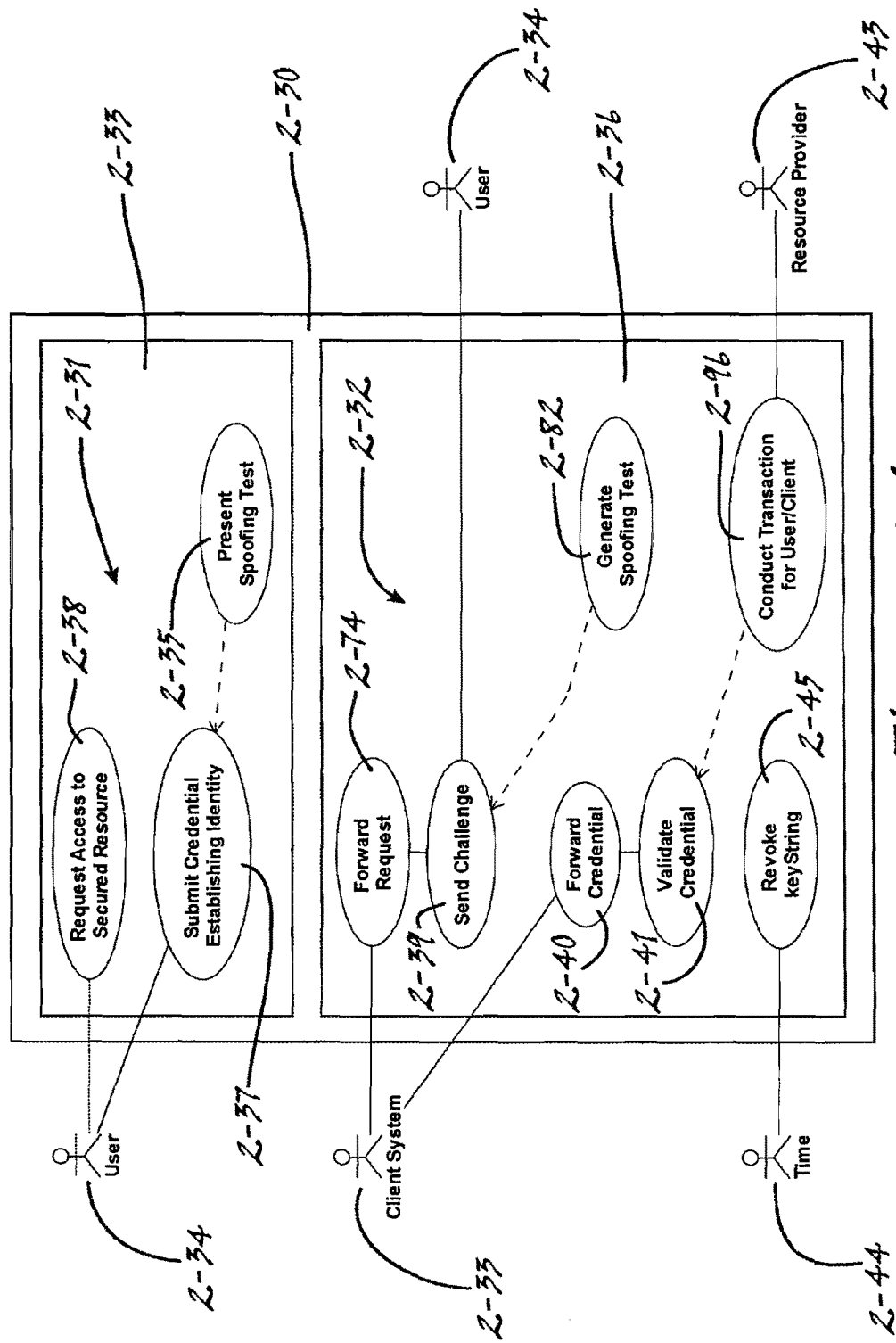
Figure 2:
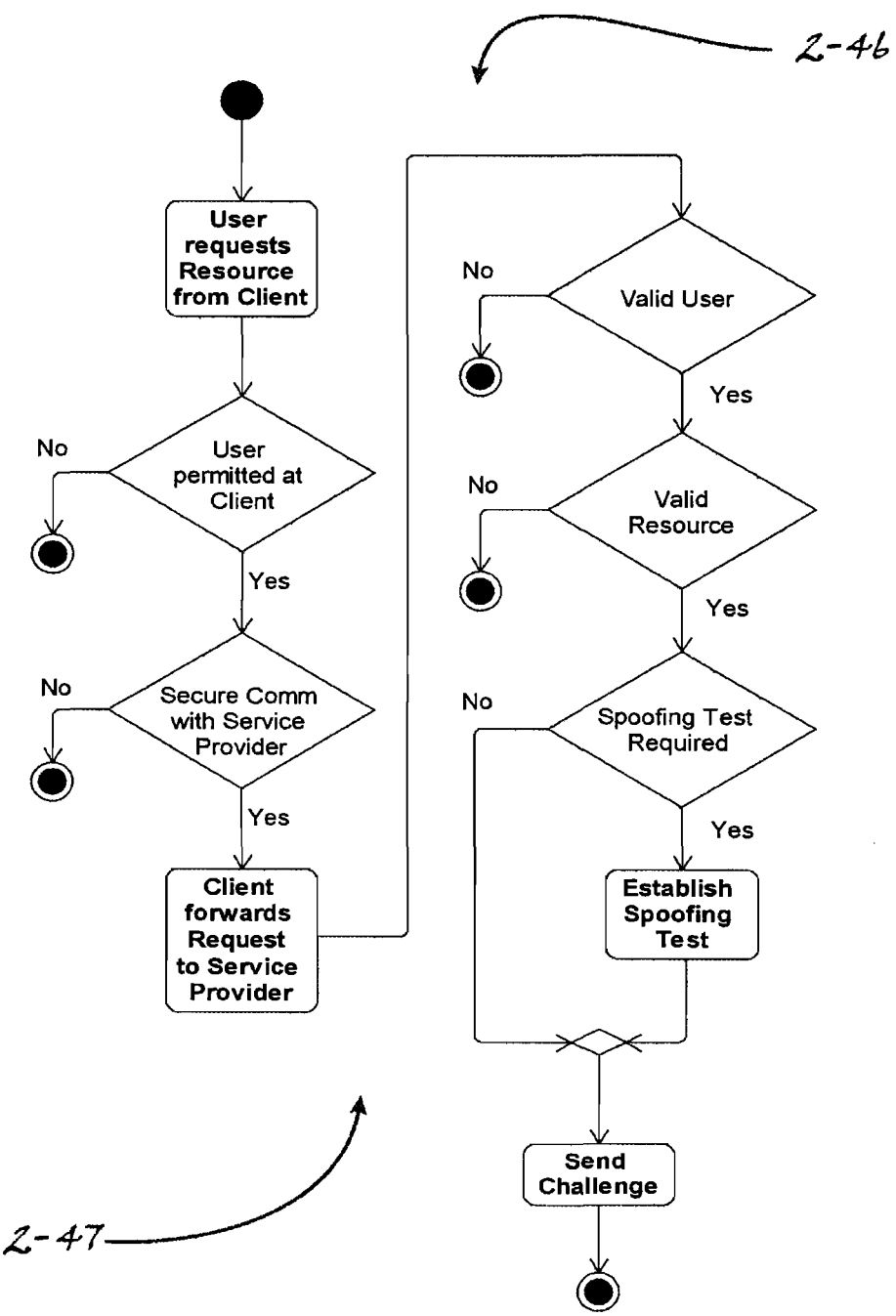
Figures 2, 3:
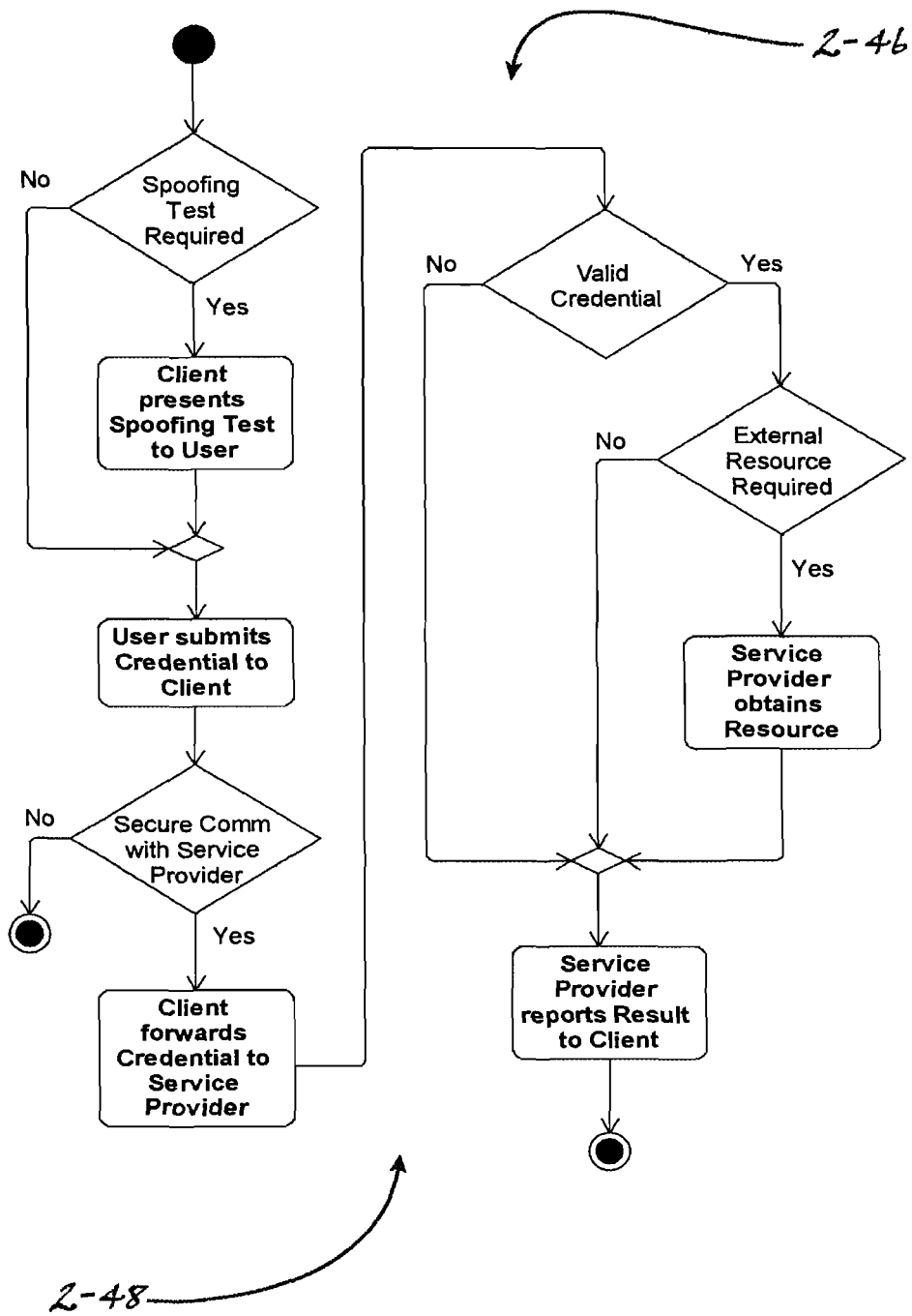
FIG. 3 shows, in a flowchart, an overview of the various steps generally taken in validating the purported access right of a user requesting access to a secured resource in accordance with the present invention.
Figures 2, 3, 4:
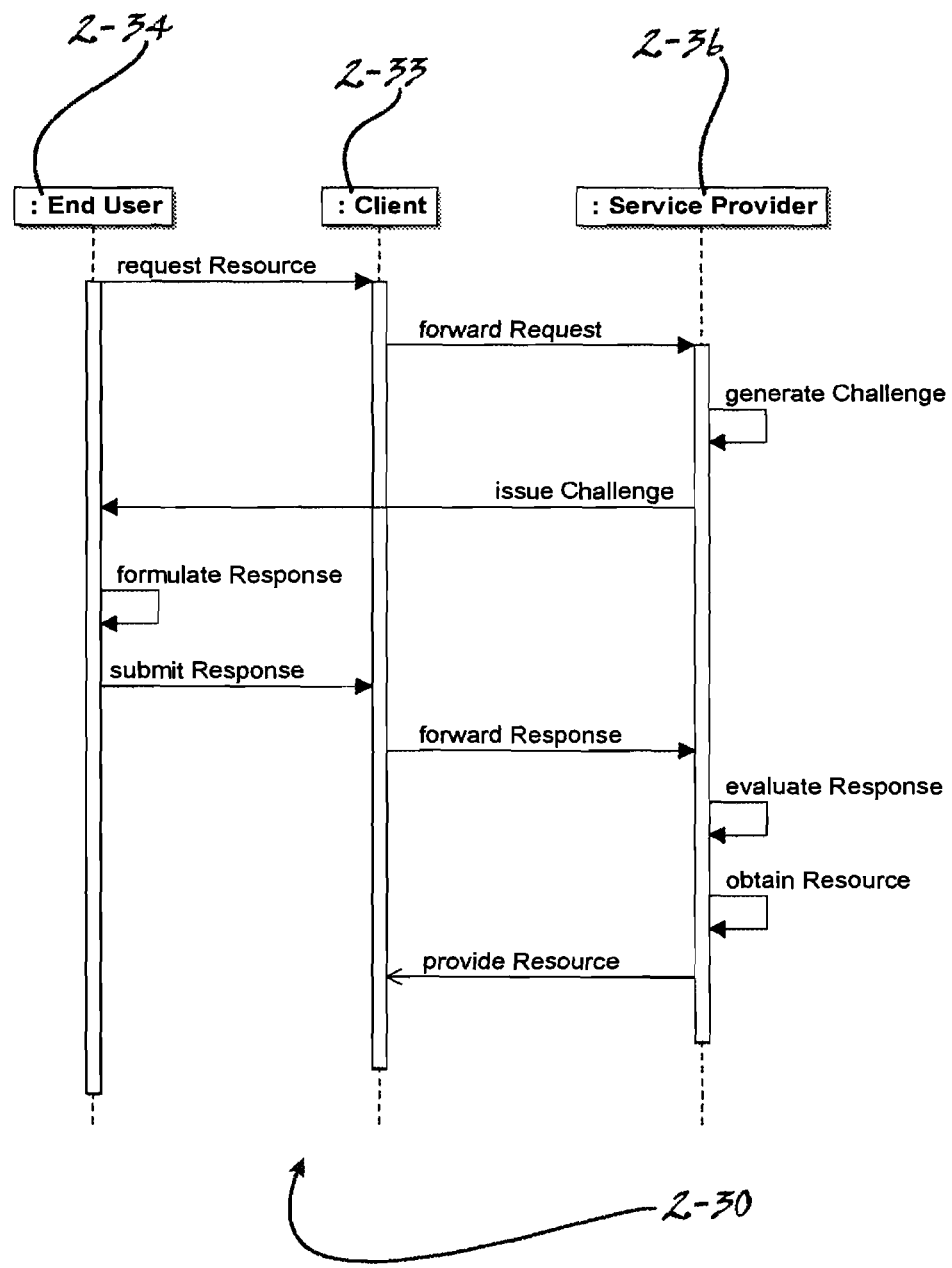
FIG. 4 shows, in an overview sequence diagram, various interactions as generally take place during the operation of the authentication system and method of the present invention.

Referring now then to FIG. 2 through FIG. 4 in particular, the authentication method 46 of the present invention as operative upon the described authentication system 30 is shown to generally comprise various series of interactions, as broadly set out in FIG. 4, wherein the interactions may be generally categorized as steps 47 implicated in requesting access to a secured resource, as broadly set out in FIG. 2, and steps 48 implicated in validating the purported access right of the user requesting access to the secured resource, as broadly set out in FIG. 3.

As particularly shown in FIG. 2 and FIG. 4, the authentication method 46 of the present invention generally begins with an end user 34 submitting or otherwise making through an access controller 51, firewall or like access control point a request for access to a secured resource, which end user submitted request is then forwarded by the access controller 51 to an authenticator 52. Although generally considered to be an optional feature of the present invention, it is noted that prior to forwarding the end user submitted request to the authenticator 52 the access controller 51 may, if desired, first determine whether the end user 34 making the request is authorized or otherwise permitted to make such use of the authentication system 30. If in an implementation of this feature it is determined that the end user 34 is not authorized or otherwise permitted to make the attempted use of the authentication system 30 the instigated process 47 will generally terminate whereas if it is determined that the end user 34 is authorized or otherwise permitted to make the attempted use of the authentication system 30 the process 47 will generally continue.

In any case, once an end user submitted request is forwarded by the access controller 51 to the authenticator 52 the remaining processing of the request is conducted by the authenticator 52. In particular, it is noted that in an important aspect of the present invention the authenticator 52 must be able to evaluate the end user submitted request to determine the specific identity of the resource for which the request is made. To this end, as will be better understood further herein, the forwarded request preferably comprises at least the common identifier for the resource. In any case, if the available information is insufficient for the authenticator 52 to positively determine the identity of the resource for which the end user 34 has requested access, the process 47 will generally terminate, whereas if the available information is sufficient for the authenticator 52 to positively determine the identity of the resource for which the end user 34 has requested access the process 47 will generally continue.

In the final steps for processing 47 an end user submitted request for access to a secured resource, the authenticator 52 generates a challenge message 94 designed to enable only an authorized end user 34 to determine the content of a transient authentication credential and, thereafter, issues the challenge message 94 to the end user 34. In connection with the step of generating the challenge message 94, however, and as a predicate to the step of issuing the challenge message 94, an authenticator 52 implemented as part of an authentication system 30 that also comprises a means 35 for detecting the existence of a spoofing type deception must be adapted to determine whether under the circumstances of the particular in process request for access to a secured resource such a means 35 for detecting the existence of a spoofing type deception should be deployed. If in such an implementation it is determined that no test for detecting the existence of a spoofing type deception need be established the challenge message 94 is issued without more, whereas if it is determined that a test for detecting the existence of a spoofing type deception should be deployed, the authenticator 52 will establish the parameters of an appropriate test and include the established parameters in connection with or as part of the issued challenge.

With the challenge message 94 issued by the service provider 36 to the end user 34, the end user 34 then formulates a response to the challenge based upon information generally known only to the end user 34 and the authenticator 52. Once the end user 34 has formulated a response to the challenge, and assuming that the end user 34 desires to continue the in-process transaction, the end user 34 will submit the formulated response to the access controller 51 as an authentication credential.

Referring now then to FIG. 3 and FIG. 4 in particular, validation 48 of the purported access right of the user requesting access to a secured resource is shown to generally begin with the submission by the end user 34 through the access controller 51 of an authentication credential to be forwarded by the access controller 51 to the authenticator 52, which authentication credential has been previously formulated by the end user 34 in response to issuance by the authenticator 52 of a challenge message 94. As shown in FIG. 3, however, in an implementation of an authentication system 30 that comprises a means 35 for detecting the existence of a spoofing type deception, the access controller 51 will prior to allowing submission by the end user 34 of an authentication credential first determine whether under the circumstances of the particular request in process for access to a secured resource such a means 35 for detecting the existence of a spoofing type deception should be deployed. If in such an implementation it is determined by the access controller 51 that no test for detecting the existence of a spoofing type deception need be established, the end user 34 is allowed by the access controller 51 to submit the authentication credential without more, whereas if it is determined by the access controller 51 that a test for detecting the existence of a spoofing type deception should be deployed, the access controller 51 will present to the end user 34 an appropriate test for detecting the existence of a spoofing type deception, wherein the presented test is constructed by the access controller 51 using the test parameters as previously established and provided by the authenticator 52.

In any case, upon successful forwarding by the access controller 51 to the authenticator 52 of the end user submitted authentication credential, the authenticator 52 proceeds to validate the responsive authentication credential by comparing the authentication credential against a key string. As will be appreciated by those of ordinary skill in the art in light of this exemplary description, the key string will prior to or at the time of validation be determined by the authenticator 52 utilizing knowledge of the previously discussed information generally known only to the end user 34 and the authenticator 52 to formulate the key string as the known correct response to at least a portion of the previously issued challenge message 94 (the "primary challenge"). In addition to comparison of the authentication credential to a known key string, however, it is noted that in an authentication system 30 utilizing time 44 as an actor in order to provide a timeout for the validity of an outstanding challenge message 94, the authenticator 52 will be programmed or otherwise adapted to determine as part of the validation step whether as a result of the passage of time the authentication credential should be deemed to be incorrect. In any case, if the authentication credential is found or otherwise deemed to be incorrect, the authenticator 52 will report the incorrect finding to the access controller 51 and the end user 34 will be blocked by the access controller 51 from access to the requested secured resource. If, on the other hand, the authentication credential is found to be correct the authenticator 52 will report the correct finding to the access controller 51 and the access controller 51 will provide the requested access to the end user 34.

With the foregoing broad overview of the general structure and function of the authentication system 30 of the present invention in mind, it is now noted that in accordance with the present invention an end user 34 may comprise any person or machine requiring, in connection with some other use, access or other relationship with a service provider 36, access to a secured resource for which the service provider 36 controls access. By way of simple example, the resource may comprise password protected information (a secured resource) maintained in a computer system under the control of the service provider 36 and to which a human end user 34 desires access. In a critical aspect of all implementations of the present invention, however, the actual password or other information known by the end user 34 and the service provider 36 and through which the authenticator 52 is capable of authenticating the access right of the end user 34 is strictly prohibited from submission through the user interface 105 in connection with the making of a request or submission of an authentication credential.

With this in mind, the end user 34 may, for example and without limitation, be a patient wishing to access medical information (a secured resource) held by a caregiver or an insurance carrier (a service provider 36); or may be the holder of a credit card account, banking account, automated teller machine ("ATM") card and/or card or the like (a secured resource) wishing to authorize a credit card processor, financial institution or the like to complete a transaction; or may be a credit applicant or other holder of an information product wishing to access a credit score or other information (a secured resource) maintained by a credit bureau or other information provider (a service provider 36); or may be the holder of an on-line service account protected by a password (a secured resource) and wherein the on-line account is under the control of the service provider 36.

Figures 2, 3, 4, 5, 5B:
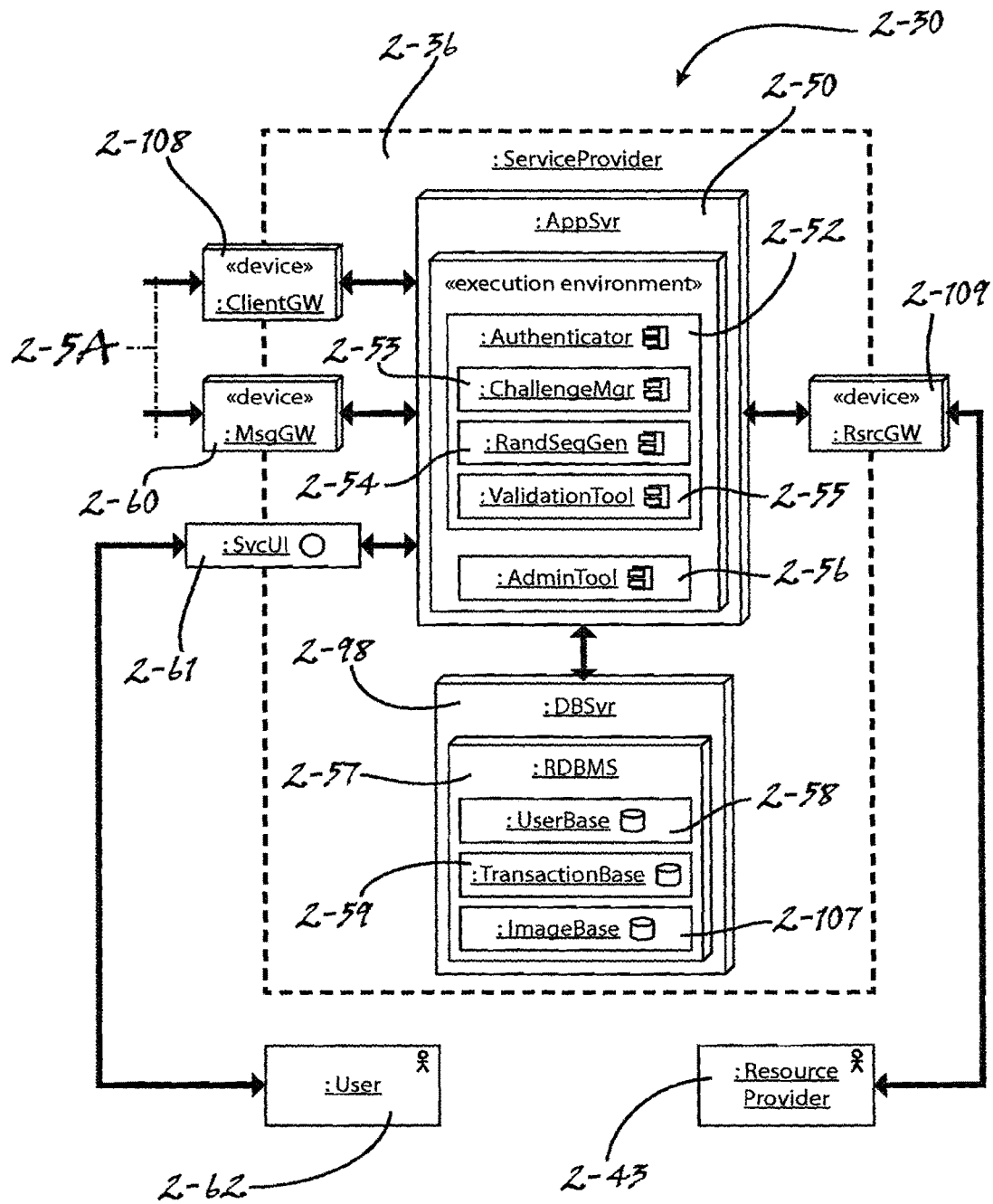

In any case, in order to better describe the critical and other aspects of the present invention reference is now made to the deployment diagram of FIG. 5, wherein there is shown the various elements of an exemplary hardware and software based implementation of an authentication system 30 constructed in accordance with the teachings of the present invention. Before continuing, however, it is noted that while the implementation depicted in FIG. 5 is exemplary of the authentication system 30 of the present invention, it is in no manner meant to be all encompassing or otherwise limiting of the wide range of implementations as are possible.

In addition, it is noted that while some elements are in FIG. 5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 5, a service provider 36 (such as, for example, may comprise a specialized provider of the authentication services of the present invention; a provider of other products or services having need of authentication services, such as, for example, a credit card processor or financial institution or an alarm monitoring company; a retail store, service station, on-line service provider or merchandiser or other business; a healthcare or medical insurance provider; an automated teller machine provider; or the like) has associated therewith one or more application servers 50 or database servers 98 upon which may be hosted software functionality necessary to operation within the framework of the present invention in addition to the unrelated operations of the service provider 36. In particular, an application server 50 may host an access controller 51, firewall or other access control point to process and/or otherwise handle requests and submissions from an end user 34 as well as to produce output for the end user 34 as may be necessary in the operation of the present invention. Additionally, the application server 50 may host an authenticator 52 adapted to handle or otherwise control all aspects of the authentication process within the realm of responsibility of the authentication system 30, including receiving authentication requests, storing and/or retrieving data pertinent to the processing of such requests, directing the generation and sending of challenge messages 94, and directing the 20 validation of authentication credentials submitted in response to challenge messages 94 and actions taken based upon the results of such validations. In order to improve efficiency, the authenticator component 52 may comprise one or more further specialized components such as, for example, a challenge manager 53 adapted to facilitate creation and transmission of challenge messages 94, a random sequence generator 54 as may be useful in the highly specialized task of creating random sequences which, as will be better understood further herein, are an integral feature of the present invention, and a validation tool 55 adapted to conduct the specialized task of comparing received authentication credentials with known key strings. Additionally, the application server 50 may also host an administration tool 56 through which various aspects of the setup, maintenance and operation of the hardware and software systems of the authentication system 30 may be managed.

In order to efficiently manage and handle the large quantity of data that may typically be stored in connection with an implementation of the present invention, one or more dedicated database servers 98 hosting database management systems 57 are generally desired. As shown in FIG. 5, a typical database management system 57 may include a user database 58 for storing a wide variety of generally user centric data as may be required in the operation of the present invention, a transaction database 59 for storing data generally associated with the conduct of individual transactions and an image database 107, which, as will be better understood further herein, is particularly adapted for storing data associated with implementation of the means 35 for detecting the existence of a spoofing type deception. Although those of ordinary skill in the art will recognize that virtually unlimited alternatives are possible, FIG. 8 shows a very high level but generally representative schema for a user database 58 and FIG. 9 shows a very high level but also generally representative schema for a transaction database 59, each of which will be described in greater detail further herein in connection with an exemplary description of the conduct of a typical transaction.

Additionally, a preferably unified messaging gateway 60 is provided for use in issuing challenge messages 94 through various communication channels to end users 34. As will be appreciated by those of ordinary skill in the art, such a unified messaging gateway 60 may be utilized to transmit a generated challenge message 94 in any of a plurality of message formats (such as, for example, as a short messaging service (SMS) message, a standard text message, an electronic mail message, a synthesized voice message, an alphanumeric page or the like) over any of a plurality of communication channels (such as, for example, an SMS or other text channel, a simple mail transport protocol (SMTP) channel, a plain old telephone system (POTS) channel, a paging network or private broadcast channel or the like) to be received by any of a plurality of user devices (such as, for example, a mobile or landline telephone, a smart phone, an electronic mail client, a personal data assistant (PDA), a numeric or digital pager or the like). Still further, a user interface 105 is provided and adapted to provide input from all manner of users 62, including administrative users and end users 34, to the hardware and/or software systems of the service provider 36 and to provide output from these systems to the various users 62. As will be appreciated by those of ordinary skill in the art, the user interface 105 enables the various users 62 to maintain and/or otherwise manage the data stored in the user database 58 as may be appropriate as well as to generally manage and maintain the implemented authentication system 30 in addition to providing, in accordance with the present invention, a point of access for the end user 34.

Figures 2, 3, 4, 5, 6:
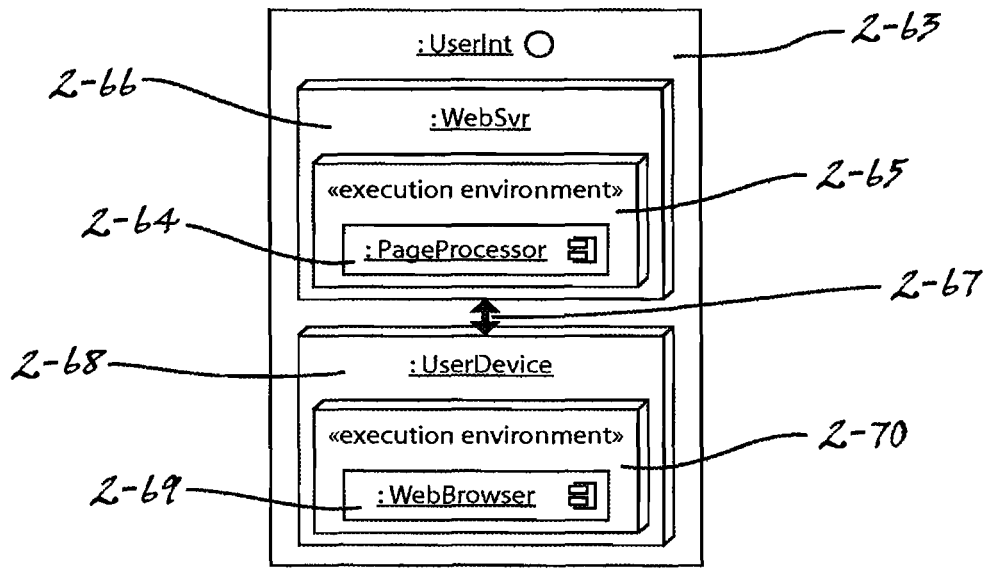
FIG. 5 shows, in a deployment diagram, an exemplary hardware and software implementation of the authentication system and method of the present invention.
FIG. 6 shows, in a deployment diagram, various details of a representative web interface implementation of a user interface for use in connection with the exemplary hardware and software implementation of FIG. 5.
Figures 2, 3, 4, 5, 6, 7:
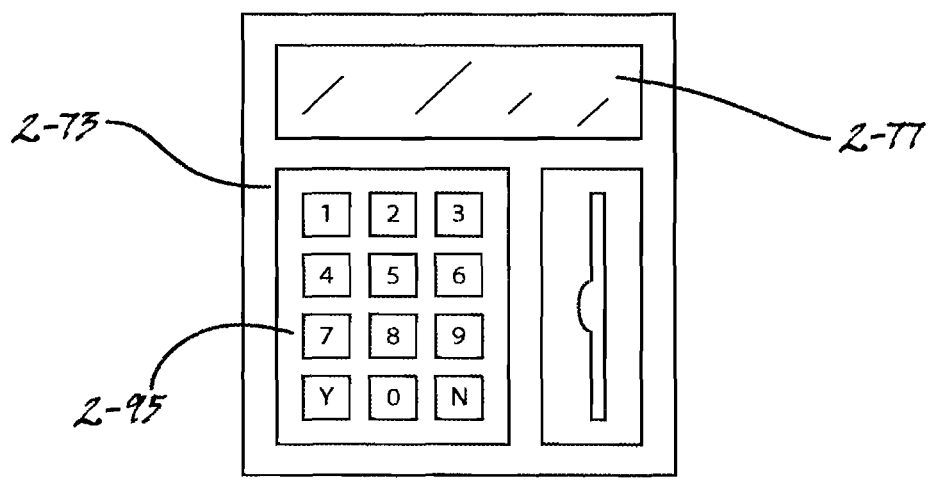
FIG. 7 shows, in an elevational representation, various details of a representative terminal device interface implementation of a user interface for use in connection with the exemplary hardware and software implementation of FIG. 5 such as may, in particular, be provided in connection with a service client implementing functionality of the present invention.
Figures 2, 3, 4, 5, 6, 7, 8:
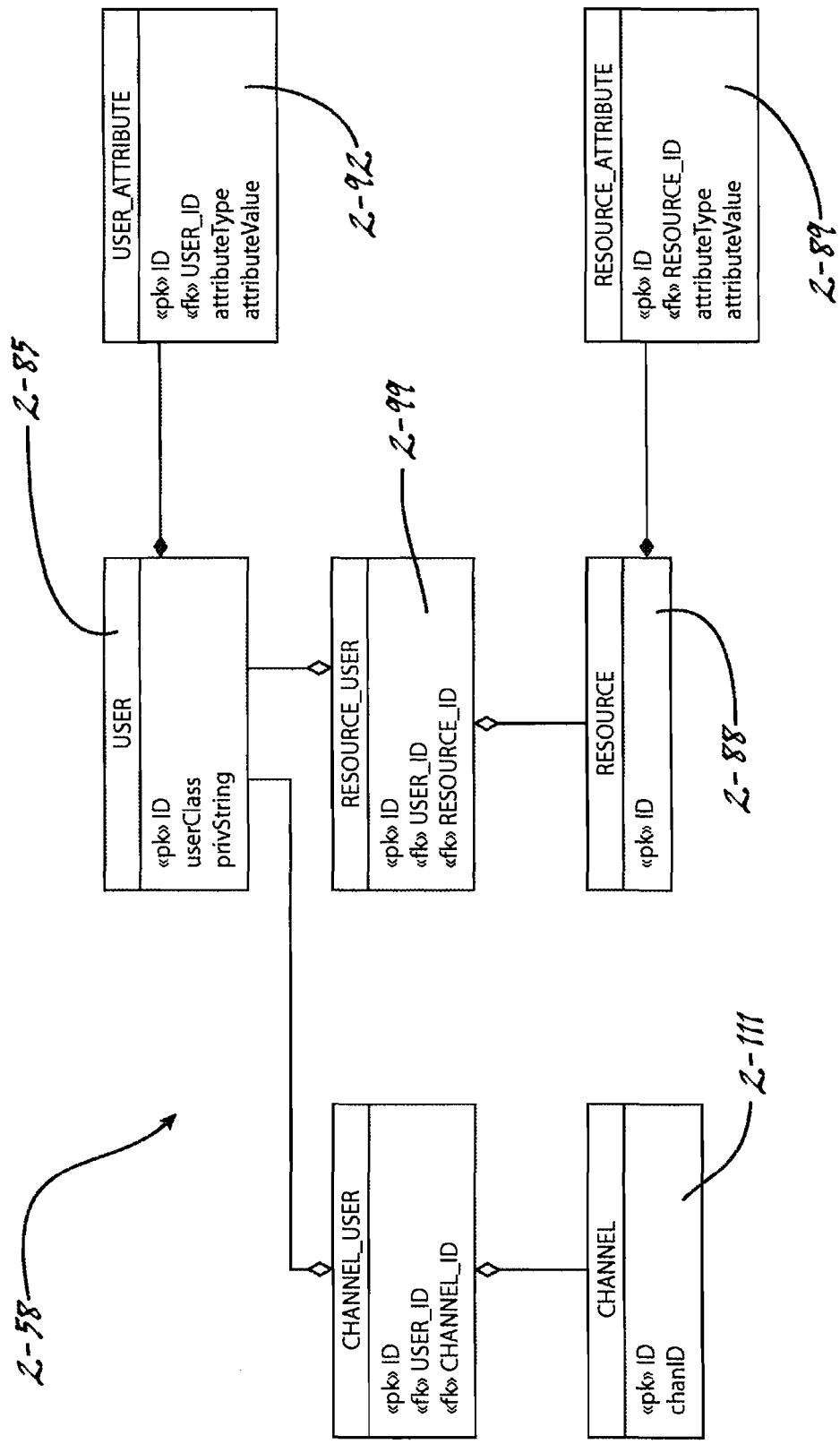
FIG. 8 shows, in a class diagram, a high level schema for a representative user database as may be implemented in connection with the exemplary hardware and software implementation of FIG. 5.
Figures 2, 3, 4, 5, 6, 7, 8, 9:
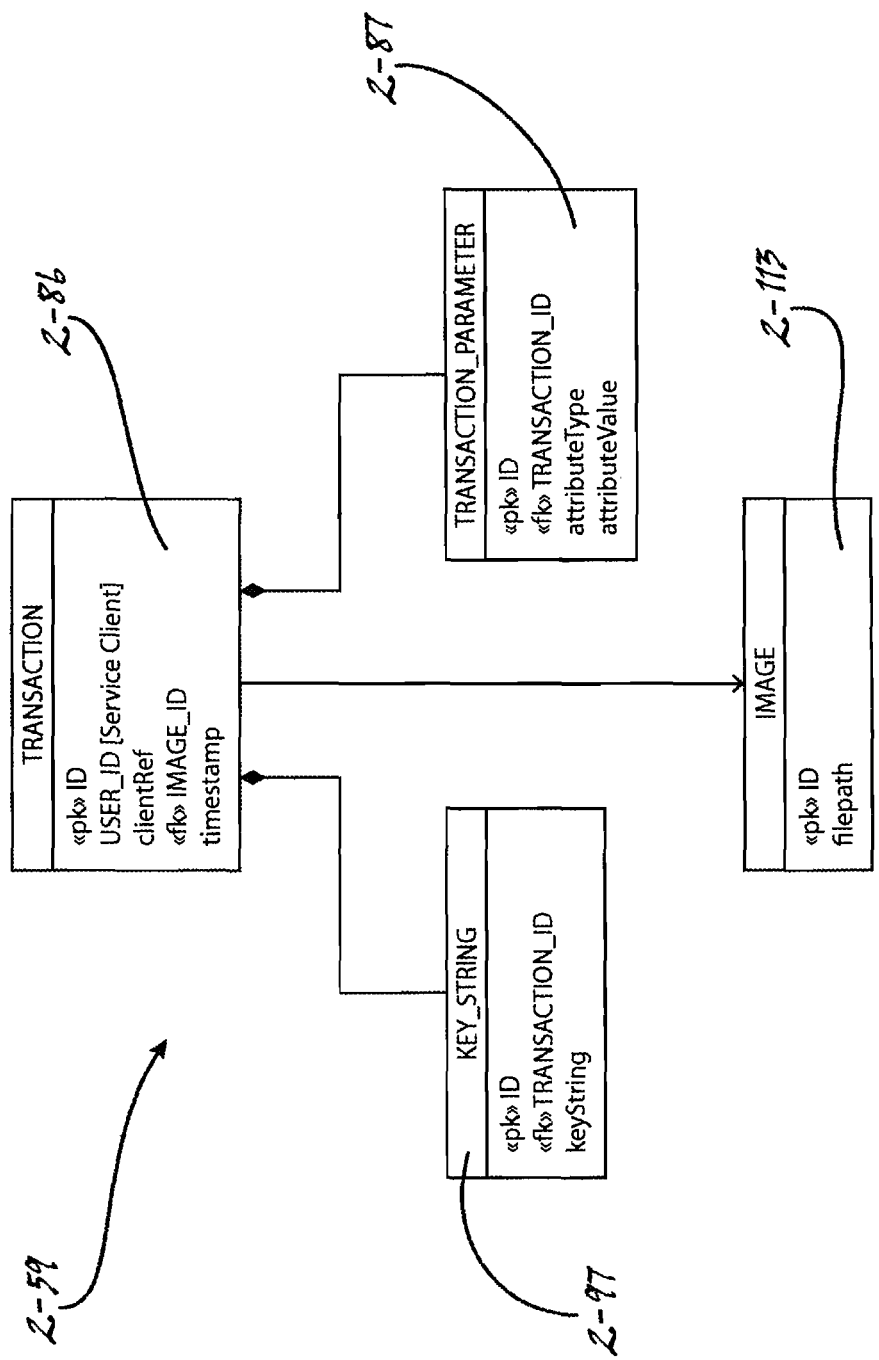
FIG. 9 shows, in a class diagram, a high level schema for a representative transaction database as may be implemented in connection with the exemplary hardware and software implementation of FIG. 5.

As exemplified by FIG. 6 and FIG. 7, the user interface 105 may take a wide variety of forms depending upon the circumstances of any particular implementation. For example, as shown in FIG. 6, a typical user interface may be implemented as a web interface 63 wherein there may be provided a page processor 64 hosted on an appropriate execution environment 65 installed on a dedicated web server 66 in Internet communication 67 with a user device 68, such as, for example, a personal computer, a smart phone, other mobile device 78 or the like, and on which is installed and/or hosted a web browser running 69 in a provided execution environment 70. On the other hand, as shown in FIG. 7, a user interface 105 may comprise a more dedicated and integrated arrangement such as the depicted point-of-sale ("POS"), fueling station or automated teller machine ("ATM") terminal device 73 comprising as input modalities a keypad 95 and a card reader and comprising as an output modality a visual display such as the depicted screen 77. Additionally, those of ordinary skill in the art will recognize that in addition to the depicted implementations, the user interface 105 may comprise a network interface such as may be utilized by a customer service representative (considered herein as an end user 34 acting through the representative), a telephone auto attendant, which may implement a DTMF decoder, speech recognition engine, TDD/TTY decoder or the like; or virtually any other combination of input modalities (including barcode readers or scanners, keyboards, keypads, card and/or magnetic stripe readers, pointing devices, microphones and the like) and output modalities (including visual displays such as computer or other device monitors or screens, audio output devices such as headphones or other speakers, tactile output devices such as may be adapted for the visually impaired and the like).

Continuing then with the example generally described with respect to FIG. 5, further details of the implementation are now described by way of the following detailed description of a possible use of the implementation for conducting a retail purchase transaction, which, for purposes of this present example, shall be taken as completion of a purchase at an on-line retailer (the service provider 36) by a consumer (the end user 34) having available for payment a merchant or store credit card (secured resource) for which a Card Verification ("CV") or like code must be provided as a condition precedent to authorization of a credit card charge. To complete the transaction, the consumer will indicate a desire to make a credit card payment to the on-line retailer by using a web browser 69 to submit a request through an access controller 51 which will then forward the consumer's request (which will generally include the credit card number) to the authenticator 52 for determination of whether the identified credit card is a valid secured resource connected with the authentication system 30, for authentication of the consumer's right of access to the identified credit card and for completing the payment transaction. In accordance with a critical aspect of the present invention, however, the CV or like code required under the present example for authorization of the transaction must not be provided through the user interface 105 (in this case, a web interface 63).

To begin the process, then, the consumer (end user 34) will use his or her web browser 69 to first navigate to the URL of an order completion webpage 75 for the on-line retailer (service provider 36). As is otherwise conventional, the consumer's web browser 69 will send a page request to the on-line retailer's web server 66 where a hosted page processor 64 will create and send back to the consumer's web browser 69 the requested "order completion" webpage 75, making use, if required, of the on-line retailer's database management system 57 to retrieve stored information pertaining to the consumer, the transaction or the like.

Figures 2, 3, 4, 5, 6, 7, 8, 9, 10:
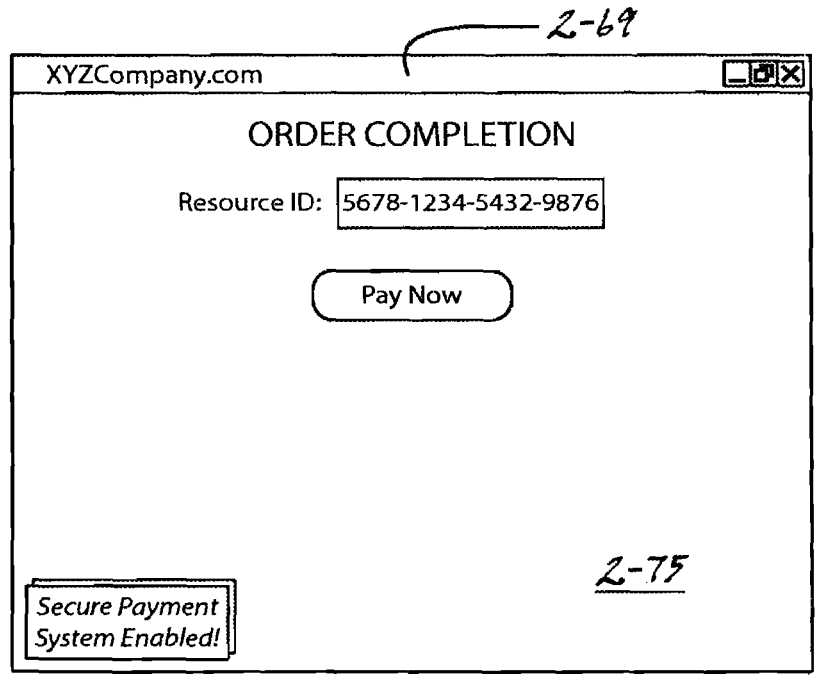
FIG. 10 shows, in a screen representation of a web browsing application, a first exemplary implementation of an order completion page from a website showing, in particular, various details of the manner for making in accordance with the present invention a request for access to a secured resource.

As shown in FIG. 10, the requested page 75 may simply comprise a simple form through which the consumer may input information indicative of the nature of the consumer's request for access to a secured resource. In this case, the consumer enters the credit card number (the common identifier for the secured resource) for the merchant or store credit card for which he or she requests use (access) and then selects the depicted "pay now" button. With the data entered as shown, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's request to the access controller 51 hosted on the on-line retailer's application server 50.

At this point, in an optional feature of the present invention, the on-line retailer may choose to verify that the tentatively identified consumer presenting the credit card is permitted to make use of the on-line retailer's services for the requested purposes. For example, it may be that the on-line retailer requires registration prior to use of the authentication system 30 and method 46 of the present invention which, it is noted, may be utilized in a completely anonymous fashion to conduct extraordinarily secure financial and other transactions. If so, the access controller 51 may access the user table 85 of the user database 58 or any other accessible data store to determine that the tentatively identified consumer is a valid end user 34.

In any case, the access controller 51 will generally continue by creating a transaction reference for the transaction and assembling any other necessary parameters, such as payment amount. As will be appreciated by those of ordinary skill in the art, under many circumstances a service provider 36 will have available all or virtually all information necessary for submitting (on behalf of an end user 34) a request for access to a secured resource without need for the end user 34 to enter additional data. For example, in a case where the consumer is otherwise "logged in" to the on-line retailer's website and the on-line retailer has previously stored the consumer's credit card number the consumer need only indicate that he or she wishes to "pay now" in order to make complete use of the facilities of the present invention.

In any case, once assembled, the consumer's request is forwarded by the access controller 51 to the authenticator 52 which will generally first undertake to determine whether the credit card for which the end user 34 has requested access is recognized at the service provider 36. To this end, the authenticator 52 may access the user database 58, as generally shown in FIG. 8, to determine whether the provided credit card number can be located in the resource table 88 of the user database 58. If not, the authentication process 46 may be terminated with or without notice to the end user 34 or an appropriately updated webpage 75 may be generated to prompt the end user 34 for correction of the unrecognized identifying information and resubmission of the request. If, on the other hand, the provided credit card number is recognized the authenticator 52 will proceed to establish a new transaction record in the transaction table 86 of the transaction database 59, as generally shown in FIG. 9. As will be appreciated by those of ordinary skill in the art, the previously created transaction reference may be used as the TRANSACTION_ID for the newly created record or, if no transaction reference was previously created the TRANSACTION_ID now created for the new transaction record may be considered the transaction reference for the transaction. In any case, transaction parameter records may then be created in the transaction parameter table 87 of the transaction database 59 in order to collect and store information pertinent to the continued processing of the transaction such as, for example, the unique RESOURCE_ID by which the identified credit card is known in the user database 58, the amount of the requested payment or the like. Still further, the unique USER_ID by which the tentatively identified consumer is known in the user database 58, as may be determined (if not provided as part of the forwarded request) with reference through the resource use table 99 to the user table 85 of the user database 58, should also be stored in the transaction parameter table 87 of the transaction database 59.

With the end user 34 and the resource for which the end user 34 requests access both identified and logged to the transaction database 59, the authenticator 52 next undertakes to direct the generation of an appropriate challenge message 94, the response to which may be used to positively authenticate the identity of the presently tentatively identified end user 34. In order to best understand the challenge and response protocols of the present invention, however, it is instructive to expressly define a number of terms. To that end, a "string" shall for purposes of the present invention be expressly defined to mean "an ordered sequence of any subset of symbols selected from a set of symbols wherein each symbol forming the set may be represented in both a format that may be perceived by an end user 34 and a format that may be recognized by software or hardware," e.g. the set of all alphabetic and numeric characters in the English language, each of which, of course, may be presented in written or audible form for perception by an end user 34 and also may be encoded as binary data for recognition by software or hardware. A "null character" shall for purposes of the present invention be expressly defined as "a specially designated symbol intended to indicate the absence from a sequence of a single symbol," e.g. a box with an X character, as shown in the drawings forming a part of this specification, any symbol (such as a particular number, particular letter, an asterisk, an underscore or the like) designated at implementation to be defined as being a null character or a blank space. "Random" as applied to the characterization of a string shall for purposes of the present invention be expressly defined to mean that the symbols of the string are arranged in an order that is not readily predictable.

In accordance then with the authentication system 30 and method 46 of the present invention, the primary challenge is generated to include a random string comprising a plurality of symbols wherein at least one of the symbols of the string is a null character, such a random string being referred to herein as a challenge string 49. Additionally, each end user 34 (and, if desired, any administrative user) will have stored in the user table 85 of the user database 58 a private string, which is a user selected or assigned (depending on implementation preferences) string comprising symbols of the same set as used for generating the challenge string 49 but most preferably excluding use of the null character. A private string is generally only known to the user with which it is associated and the service provider 36 and, in a critical aspect of the present invention, a private string is never required to be openly passed through the user interface 105. In any case, as will be better understood further herein, a user will formulate a response to a challenge string 49 by using the symbols of the user's private string to replace the null character or characters of the challenge string 49 to formulate a response string. In this manner, the response string may be passed through the user interface 105 without risk of interception of the private string and, accordingly, a system of readily established single use "passwords" is presented. Additionally, as also will be better understood further herein, the authentication system 30 and method 46 of the present invention may be implemented such that the protocol for creating a response string from a challenge string 49 is standardized in advance or, in the alternative, instructions 93 may be provided with the challenge message 94 or inferred from the manner of delivery of the challenge or circumstances of the use. For example, the user may be directed to formulate the response string using only numbers of the private string or may assume that only numbers should be used when entering the response string into a limited keypad 95 such as depicted in FIG. 7. Further, instructions 93 may be given to use every second or third symbol of the private string, to begin with a certain symbol of the private string, to take symbols from the private string in reverse order, or any combination of these and similar instructions 93. Still further, the user may be instructed as standard procedure or by challenge message 94 to 20 repeat usage of certain symbols of the private string or the entire private string in order to respond to a challenge string 49 with more null characters than symbols available in the user's private string and/or simply as a matter of choice by the service provider 36.

Returning then to the example use of the authentication system 30 of the present invention it is noted that in the most preferred embodiment of the present invention prior to directing the generation of a challenge message 94 the authenticator 52 evaluates all available information that may impact the ability of an end user 34 to readily receive a particular challenge message 94 and/or to readily respond to a particular challenge message 94 and, additionally, determines whether any special security requirements may exist for access to the particular resource. In particular, the authenticator 52 will preferably obtain from the channel table 111 of the user database 58 channel data indicating the type of communication channel that will be utilized to transmit the challenge message 94. Additionally, the user attribute table 92 of the user database 58 may indicate whether the end user 34 suffers any disability that would impact the manner of response and/or the resource attribute table 89 of the user database 58 may indicate any special resource dictated security requirements, such as minimum length or desired complexity for a response string. Additionally, the authenticator 52 may also consider any limitations of the user interface 105, such as being limited to entry of numeric characters only. In any case, the authenticator 52 will determine the characteristics that should be exhibited by the challenge string 49, including the manner of issuance, and will then instruct the challenge manager 53 to initiate issuance of a challenge message 94.

At this point it is noted that in accordance with an extension of the present invention, the primary challenge (comprising the challenge string 49 and any necessary response instructions 93) may be supplemented with the provision of a test designed to detect the existence of a spoofing type deception. In particular, the present invention contemplates the use of a dynamically selected image 112 for the conduct of this test. Although the particular conduct of this test will be described in greater detail further herein, it should at this time be noted that in an implementation wherein such a test will be required the challenge manager 53 will generally at this point in the process obtain from the image database 107 image data identifying the selected image 112 and its location on a fileserver and will store the obtained image data in the image table 113 of the transaction database 59. In any case, the challenge manager 53 will continue to by obtaining from the random sequence generator 54 a challenge string 49 generated to meet the requirements established and communicated by the authenticator 52. With the challenge string 49 generated and any image data obtained, the challenge manager 53 will proceed to construct the challenge message 94 which will at least comprise the challenge string 49, any special response instructions 93 and a copy of the image file if required. With the challenge message 94 assembled, the challenge manager 53 queues the challenge message 94 by providing the messaging gateway 60 with the challenge message 94, the type of communication channel to be utilized and the CHANNEL_ID for the channel. For example, if the challenge message 94 is to be sent by SMS text message 79, the challenge manager 53 will inform the messaging gateway 60 that the challenge message 94 is to be transmitted by SMS text message 79 and will provide the messaging gateway 60 with a telephone number for a SMS text capable user device.

At this juncture it is noted that it is considered critical to the present invention that the challenge message 94 be transmitted through a discrete channel, which is herein defined as being a communication channel not readily identifiable by information submitted by an end user 34 in making a request for access to a secured resource. For example, if the end user 34 chooses to utilize his or her electronic mail address as a user or resource identification, the schema for the user database 58 and/or the authenticator 52 should ensure that the challenge message 94 is not transmitted by electronic mail to the same electronic mail address. Likewise, an end user 34 requesting access to a secured resource using his or her mobile telephone number as an identifier will not be able to receive a challenge message 94 by SMS or standard text message 79 or synthesized voice call to the same mobile telephone number. That said, however, it is noted that the schema as depicted in FIG. 8 contemplates that a single user may have more than one possible message channels assigned. As a result, a channel may be discrete for some requests, but not for others depending upon the information provided by the end user 34 in making a particular request.

Figures 2, 3, 4, 5, 6, 7, 8, 9, 10, 11, 12, 13, 14:
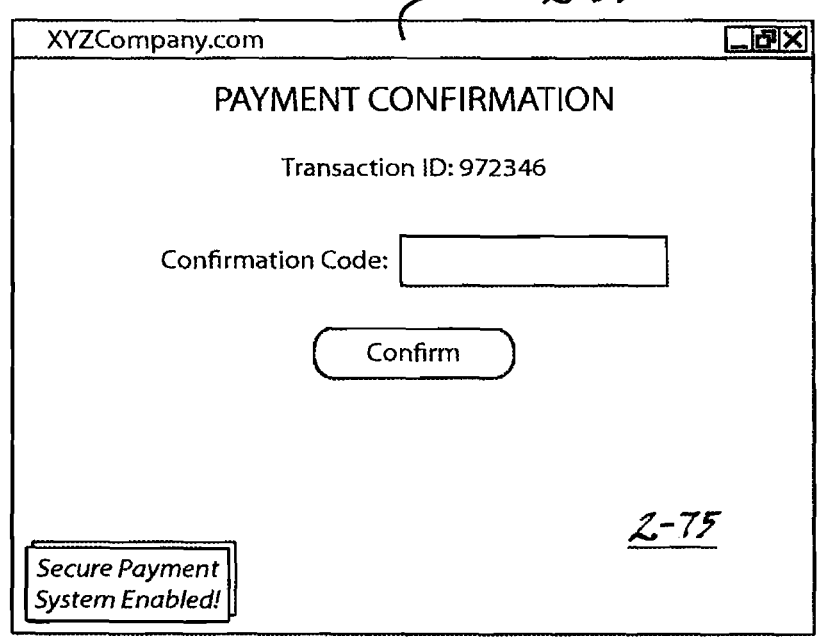
FIG. 11 shows, in a top plan representation of a mobile telecommunications device screen, a first example of a challenge message such as may be implemented in accordance with the present invention.
FIG. 12 shows, in a top plan representation of a mobile telecommunications device screen, a second example of a challenge message such as may be implemented in accordance with the present invention showing, in particular, extended functionality for use in detecting a spoofing type deception.
FIG. 13 shows, in a top plan representation of a mobile telecommunications device screen, a third example of a challenge message such as may be implemented in accordance with the present invention showing, in particular, extended functionality for accommodating constraints imposed by the available means for submitting of an authentication credential for purposes of validating the purported access right of a user requesting access to a secured resource in accordance with the present invention.
FIG. 14 shows, in a screen representation of a web browsing application, a first exemplary implementation of a payment confirmation page from a website showing, in particular, various details of the manner for submitting of an authentication credential for purposes of validating the purported access right of a user requesting access to a secured resource in accordance with the present invention.
Figures 2, 3, 4, 5, 6, 7, 8, 9, 10, 11:
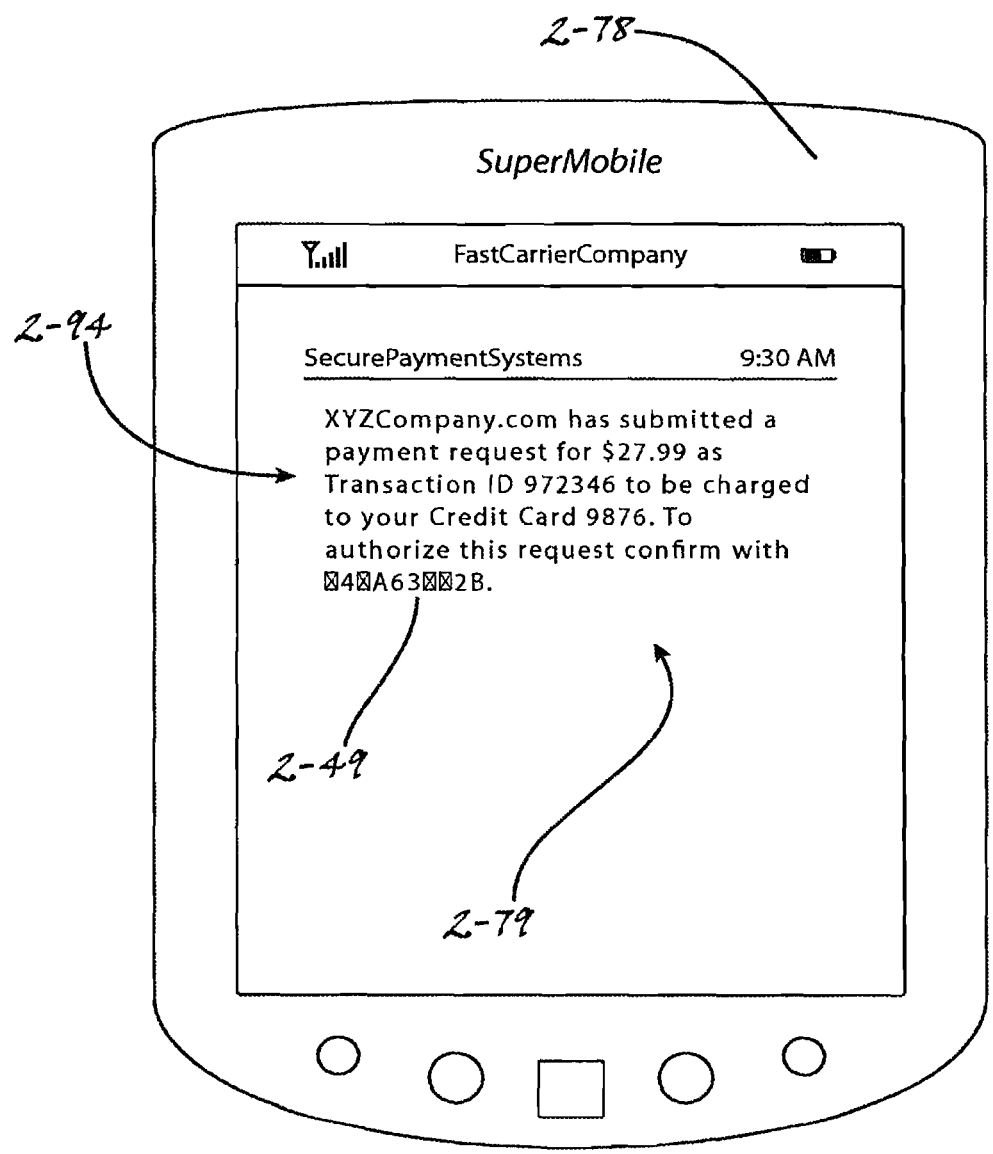
Figures 2, 3, 4, 5, 6, 7, 8, 9, 10, 11, 12:
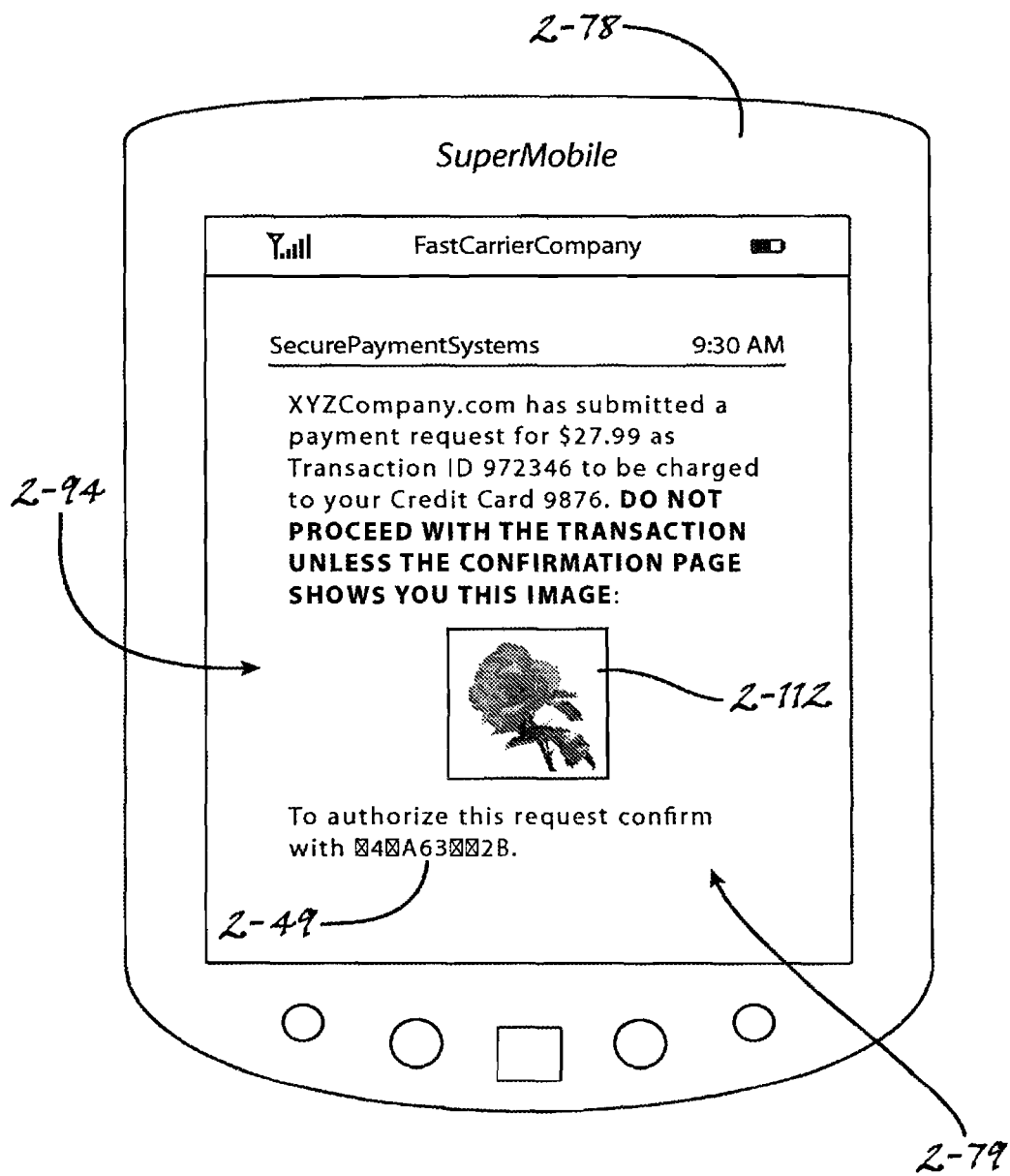
Figures 2, 3, 4, 5, 6, 7, 8, 9, 10, 11, 12, 13:
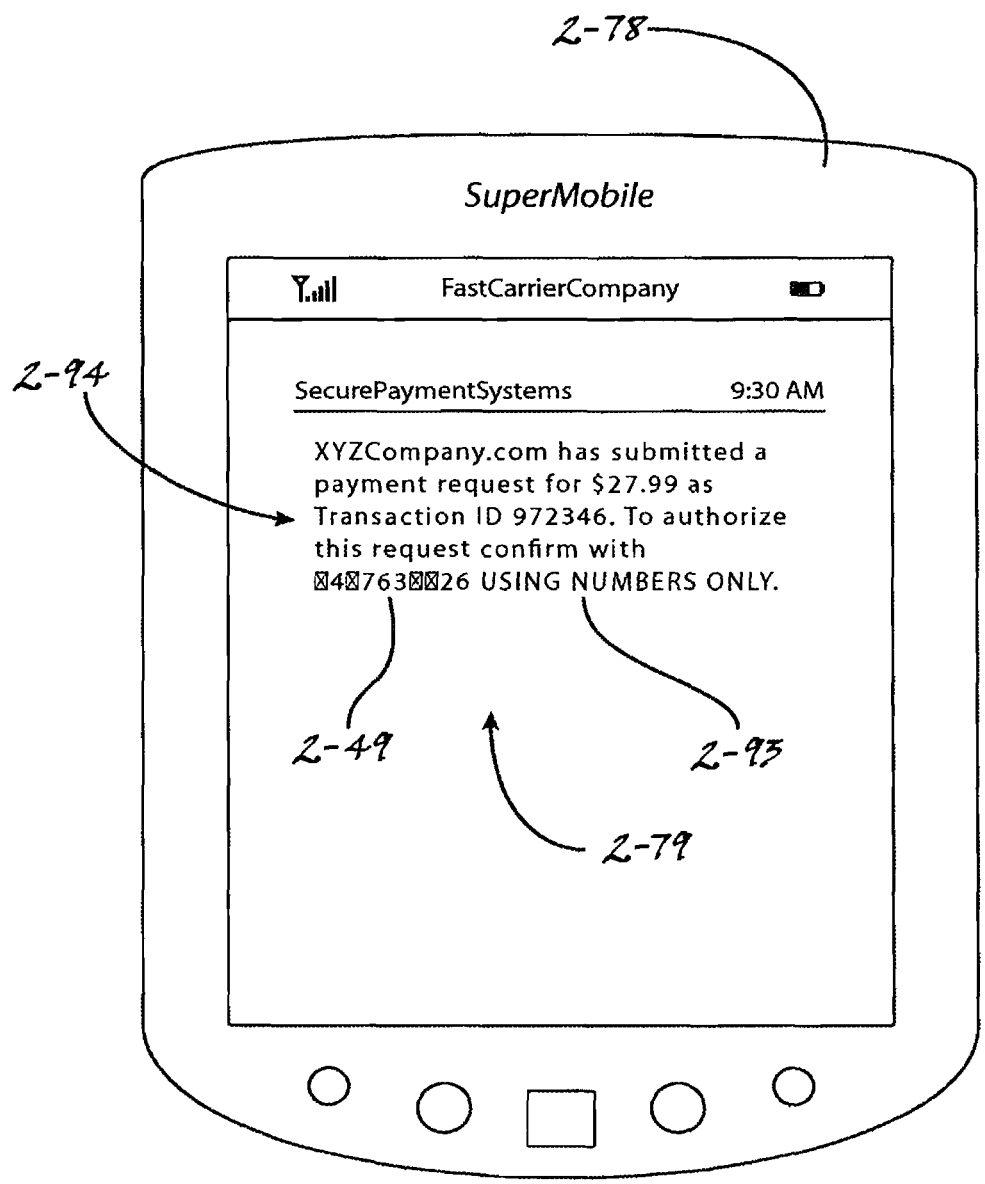

Referring to FIG. 11 in particular, there is shown a typical simple challenge message 94 as may be transmitted to an end user 34 through an SMS text enable smart phone or like mobile device 78. Following with the presented example, it is noted that in an optional but useful feature of the present invention the challenge message 94 may also include information helpful to the consumer in making a response. For example, the challenge message 94 depicted in FIG. 13 includes the name of the on-line service provider, the purchase amount for which the user requests access to his or her secured resource and also the client reference used by the on-line service provider.

Finally, the authenticator 52 obtains the consumer's private string from the user table 85 of the user database 58, as shown in FIG. 8, and then submits the challenge string 49 (along with any special instructions 93) and the private string to the validation tool 55, which in turn determines the correct response string. The determined correct response string is then assigned as the key string for the transaction and stored in the key string table 97 of the transaction database 59. At this time, a timestamp may also be entered into the transaction table 86 of the transaction database 59 in order to provide a reference by which may be calculated a timeout event for the validity of the key string (response string submitted as an authentication credential).

Before turning the example to detailed discussion of the steps 48 implicated in validating the purported access right of the user requesting access to the secured resource, however, attention is directed to FIG. 12 and FIG. 13, each of which depict some variation of possible challenge messages 94 and/or additional detail regarding the presentation to the consumer of an image 112 for use in detecting a possible spoofing type deception. In FIG. 12, in particular, an image 112 is shown as being presented with the challenge string 49 as part of the challenge message 94. As indicated by the example instruction text included with or as part of the challenge message 94, the consumer is directed to look for a corresponding image to be displayed on the website of the on-line retail store and to not enter a response string unless the correct image is observed. FIG. 13, on the other hand, shows in particular one simple example of the many previously discussed possibilities for providing special instructions 93 in connection with the issuance of a challenge message 94. In the depicted case, the consumer is directed to respond to the challenge string 49 using only numbers from his or her private string. As will be appreciated by those of ordinary skill in the art, this instruction 93 will be particularly beneficial when it is known that the consumer will be forced to enter the response string through a limited input modality such as, for example, the simple keypad 95 depicted in FIG. 7.

Figures 2, 3, 4, 5, 6, 7, 8, 9, 10, 11, 12, 13, 14, 15:
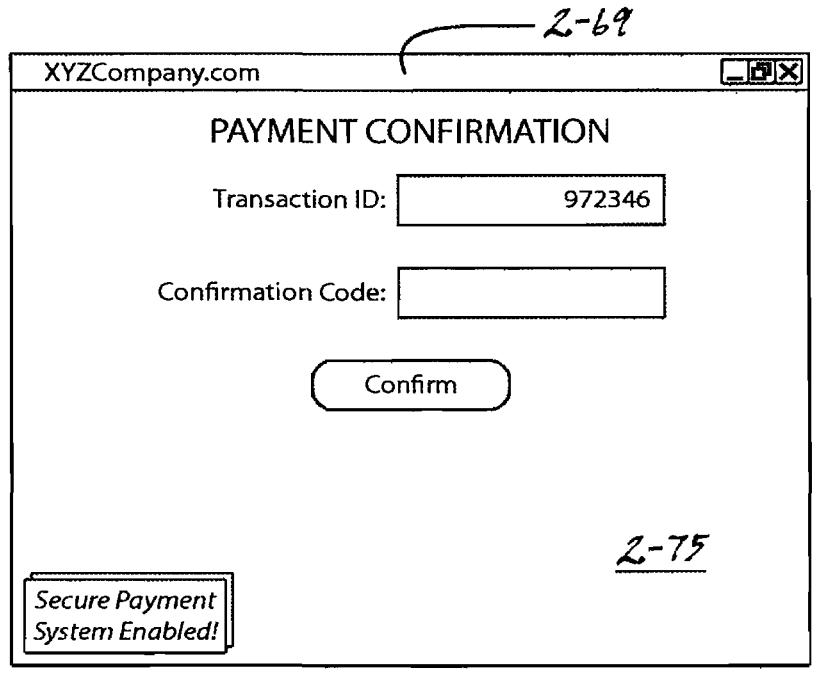
FIG. 15 shows, in a screen representation of a web browsing application, a second exemplary implementation of a payment confirmation page from a website showing, in particular, various details of the manner for submitting of an authentication credential for purposes of validating the purported access right of a user requesting access to a secured resource in accordance with the present invention.

Turning the example now to detailed discussion of the steps implicated in validating the purported access right of the user requesting access to the secured resource, it is first noted that an end user 34 of the present invention will necessarily formulate a response string corresponding to a challenge string 49 outside of the hardware and/or software provided as part of the authentication system 30 of the present invention. That said, the validation steps begin with the consumer using his or her web browser 69 to first navigate to the URL of a payment confirmation webpage 75 for the on-line retailer (the service provider 36). As is otherwise conventional, the consumer's web browser 69 will send a page request to the on-line retailer's web server 66 where a hosted page processor 64 will create and send back to the consumer's web browser 69 the requested "payment confirmation" webpage 75, making use of the on-line retailer's database management system 57 to retrieve stored information pertaining to the consumer, the transaction or the like. As shown in FIG. 14, the requested page 75 may simply comprise a simple form through which the consumer may input his or her formulated response string and then select the depicted "confirm" button. As will be appreciated by those of ordinary skill in the art, this simple example assumes that the consumer has remained on the website of the on-line retailer such that the transaction reference remains known to the page processor 64 and also that no test designed to detect the existence of a spoofing type deception will be presented. Similarly, the requested page 75 as depicted in FIG. 15 also assumes that no test designed to detect the existence of a spoofing type deception will be presented, but contemplates that the consumer may have left and returned to the website for completion of the purchase transaction. As will be appreciated by those of ordinary skill in the art in light of this exemplary description, the depictions of FIG. 14 and FIG. 15 may be appropriate for responding to the challenge as depicted in FIG. 11. For purposes of this continuing example, it shall be assumed that the consumer's private string is 2F46DAH525. As a result, the correct response string for the challenge string 49 of FIG. 11 would be 24FA63462B, which would be entered by the consumer. With the response string entered, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the access controller 51 hosted on the on-line retailer's application server 50.

Figures 2, 3, 4, 5, 6, 7, 8, 9, 10, 11, 12, 13, 14, 15, 16:
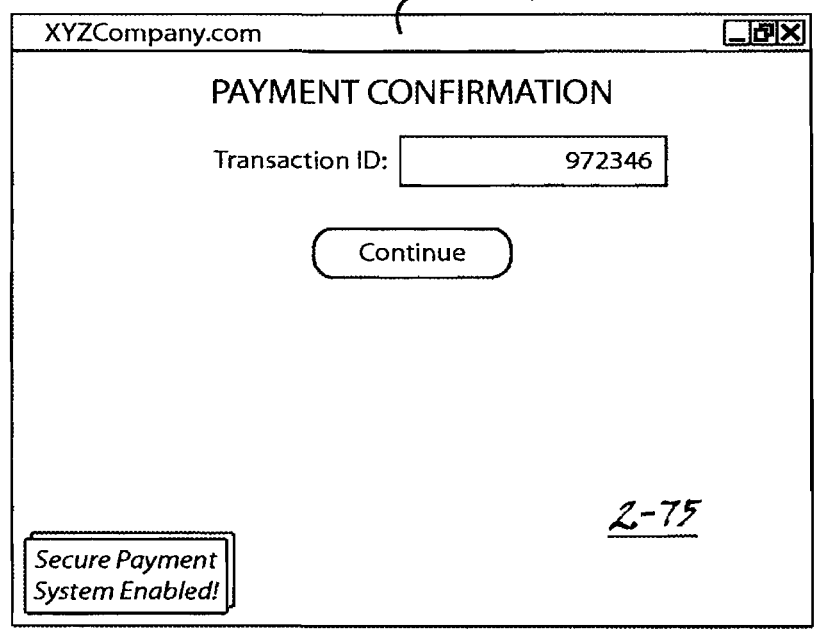
FIG. 16 shows, in a screen representation of a web browsing application, an exemplary implementation of a preliminary payment confirmation page from a website showing, in particular, various details of at least one method for accessing a further payment confirmation page.

As shown in FIG. 16, however, the requested page 75 may comprise a slightly more complex form through which the consumer may be required to enter the transaction reference for the transaction although, as shown in FIG. 16, the transaction reference data may be pre-populated if the consumer has not left the website. As will be appreciated by those of ordinary skill in the art, this form contemplates that the consumer may want to address a different transaction than presently being handled by the webpage 75 or that the consumer has left and returned to the website for completion of the purchase transaction. Additionally, this exemplary form contemplates that a test designed to detect the existence of a spoofing type deception may or may not be presented. In any case, once the consumer is satisfied that the desired transaction reference is shown the consumer will then select the depicted "continue" button, whereafter the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the access controller 51 hosted on the on-line retailer's application server 50. Once received by the access controller 51, the client reference will be utilized to retrieve the stored request data from the transaction database 59 and the access controller 51 will determine whether a test designed to detect the existence of a spoofing type deception should be presented. If not, the access controller 51 will so inform the page processor 64 which, in turn, may then update or otherwise create and send back to the consumer's web browser 69 a "payment confirmation" webpage 75 like that of FIG. 14, whereafter the consumer continues as previously discussed.

Figures 2, 3, 4, 5, 6, 7, 8, 9, 10, 11, 12, 13, 14, 15, 16, 17:
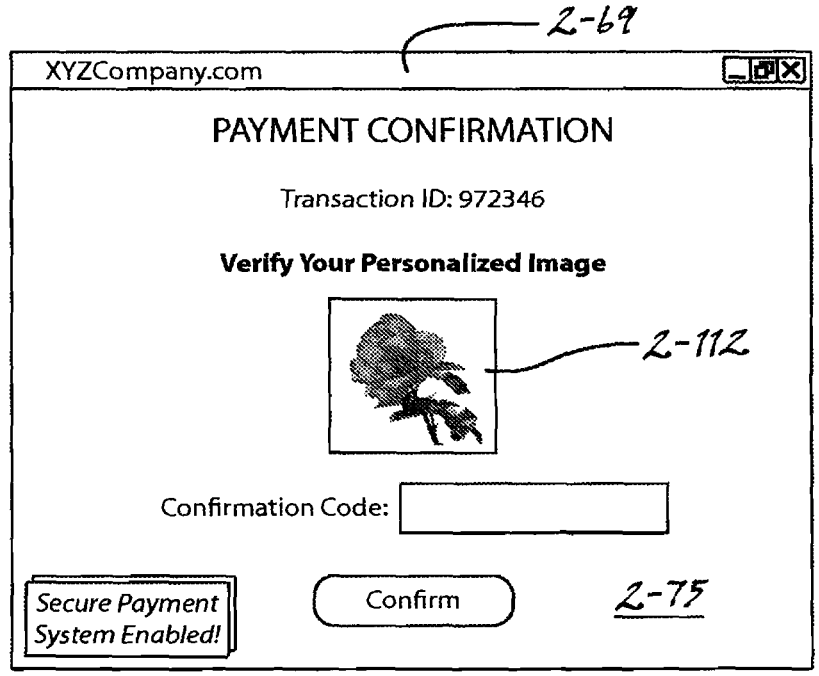
FIG. 17 shows, in a screen representation of a web browsing application, a third exemplary implementation of a payment confirmation page from a website showing, in particular, various details of a first implementation of extended functionality for use in detecting a spoofing type deception.

If, on the other hand, the access controller 51 determines that a test designed to detect the existence of a spoofing type deception should be presented the request handler 51 will retrieve from the image table 113 of the transaction database 59 the previously stored image data associated by the transaction reference with the present transaction. As previously noted, the challenge manager 53 will have previously sent to the consumer, as part of a challenge message 94, an image file. Rather than utilizing an actually image file at this stage, however, the preferred implementation of the test comprises the access controller 51 retrieving the file location for a copy of the image matching the image file transmitted as part of the challenge message 94 and which file location (external web address) has preferably been made temporary on a publicly accessible fileserver associated with the service provider 36. The page processor 64 will then create a page 75 such as depicted in FIG. 17, wherein the webpage 75 presents the image 112 by linking to the external web address (the temporary file location) at which the image 112 is hosted. As will be appreciated by those of ordinary skill in the art in light of this exemplary description, the depiction of FIG. 17 may be appropriate for responding to the challenge as depicted in FIG. 12. Assuming still that the consumer's private string is 2F46DAH525, the correct response string for the challenge string 49 of FIG. 12 would again be 24FA63462B, which would be entered by the consumer.

Figures 2, 3, 4, 5, 6, 7, 8, 9, 10, 11, 12, 13, 14, 15, 16, 17, 18:
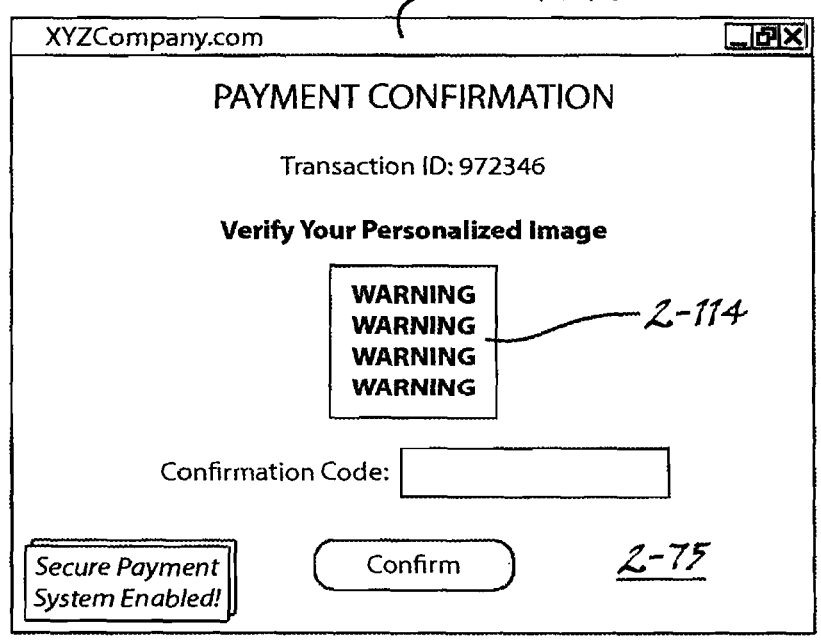
FIG. 18 shows, in a screen representation of a web browsing application, the implementation of the payment confirmation page of FIG. 17 showing, in particular, various additional details of the implemented extended functionality for use in detecting a spoofing type deception.

As previously discussed, the preferred implementation of the test designed to detect the existence of a spoofing type deception comprises providing a web link pointing to a copy of the image file on a fileserver associated with the service provider 36, which file location may then be made temporary. By making the file location temporary, the file can be removed or restricted and/or replaced with a warning image once accessed through the web link. In this manner, if the consumer has accidently navigated to a spoofed website conducting a man-in-the-middle type deception in particular, the bad actor will in the course of accessing the true on-line retailer's website access the image link. In the unlikely case that the bad actor is able to retrieve and replicate the link for presentation to the consumer, however, the image 112 will have been removed or replaced by the time that the consumer links to the web address for the image. In this case, as shown in FIG. 18, the consumer will see the bad actor generated webpage with the prominently displayed warning image 114.

Figures 2, 3, 4, 5, 6, 7, 8, 9, 10, 11, 12, 13, 14, 15, 16, 17, 18, 19:
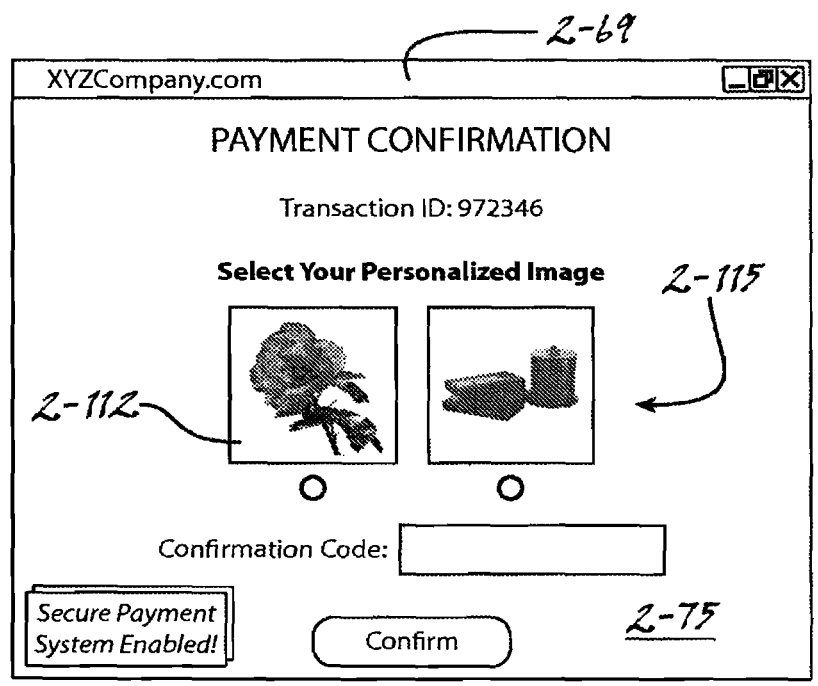
FIG. 19 shows, in a screen representation of a web browsing application, a fourth exemplary implementation of a payment confirmation page from a website showing, in particular, various details of second implementation of extended functionality for use in detecting a spoofing type deception.
Figure 3:
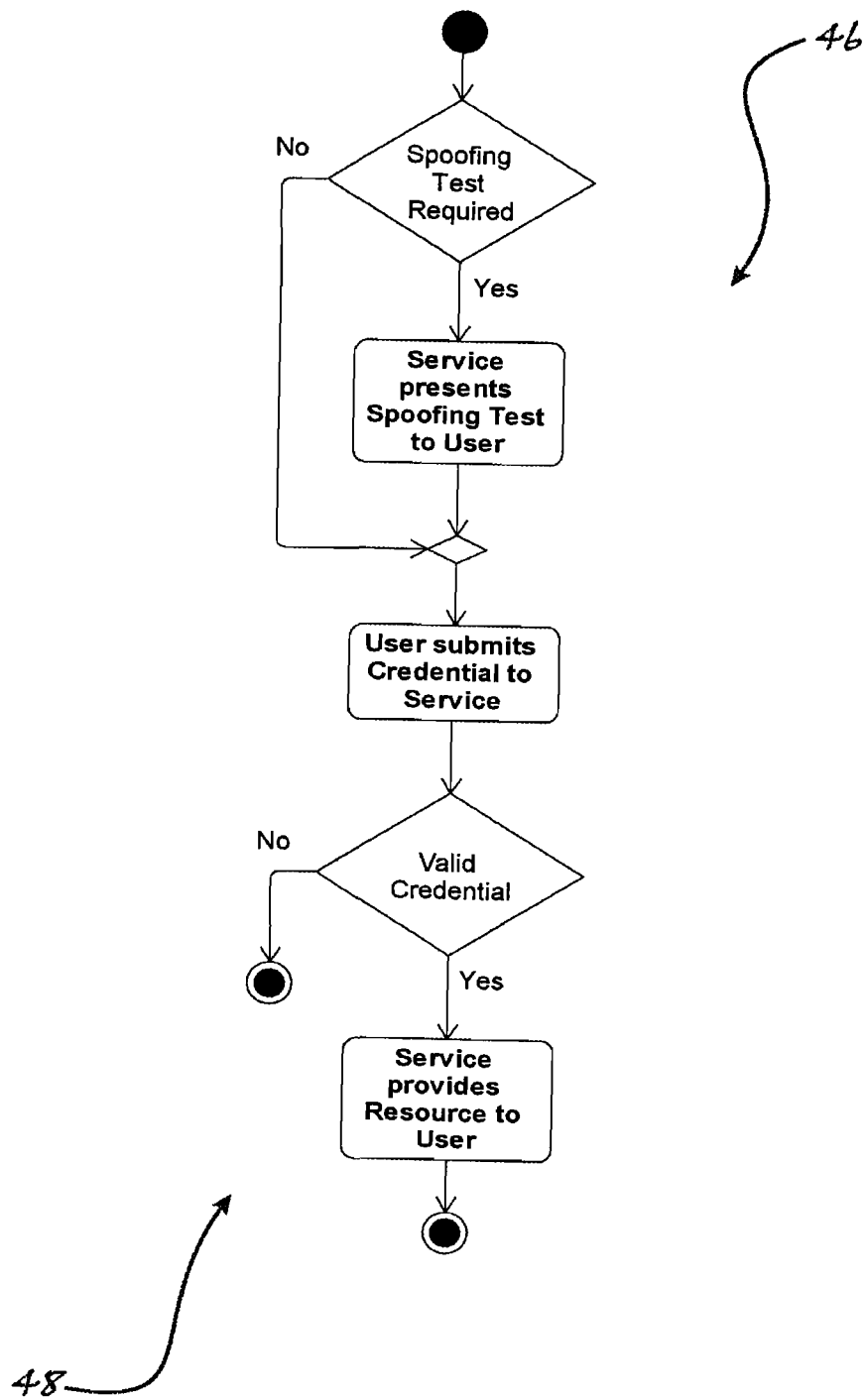
Figures 1, 3:
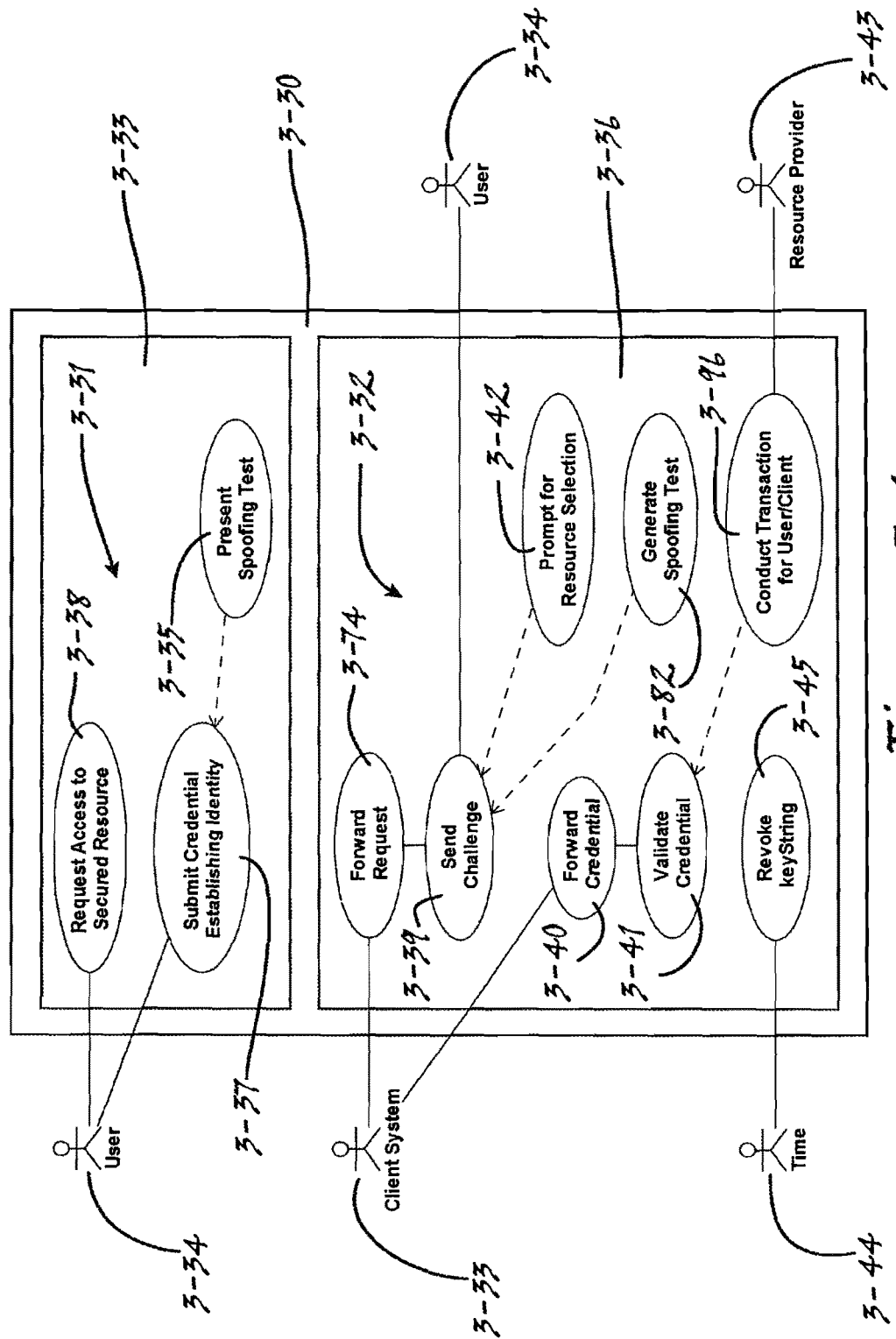
Figures 2, 3:
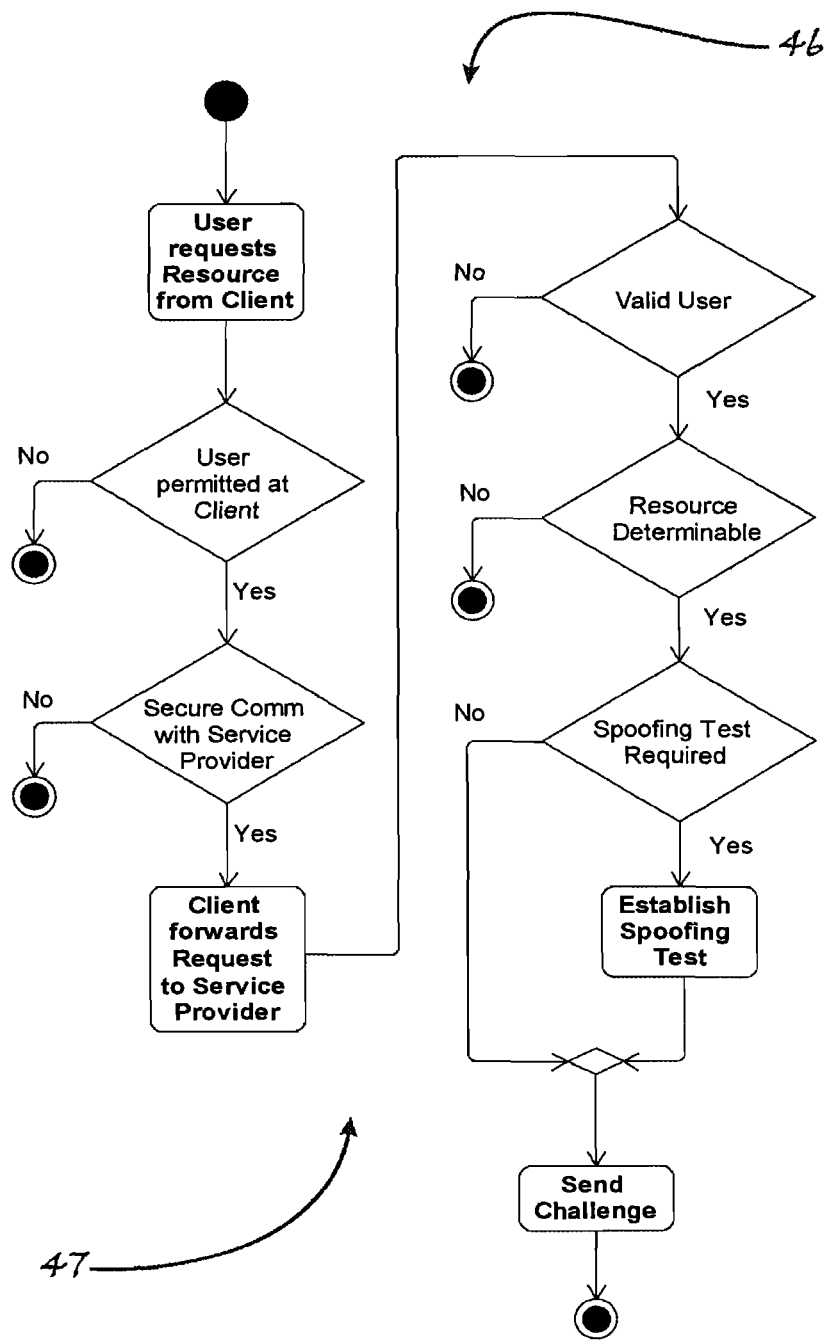
Figure 3:
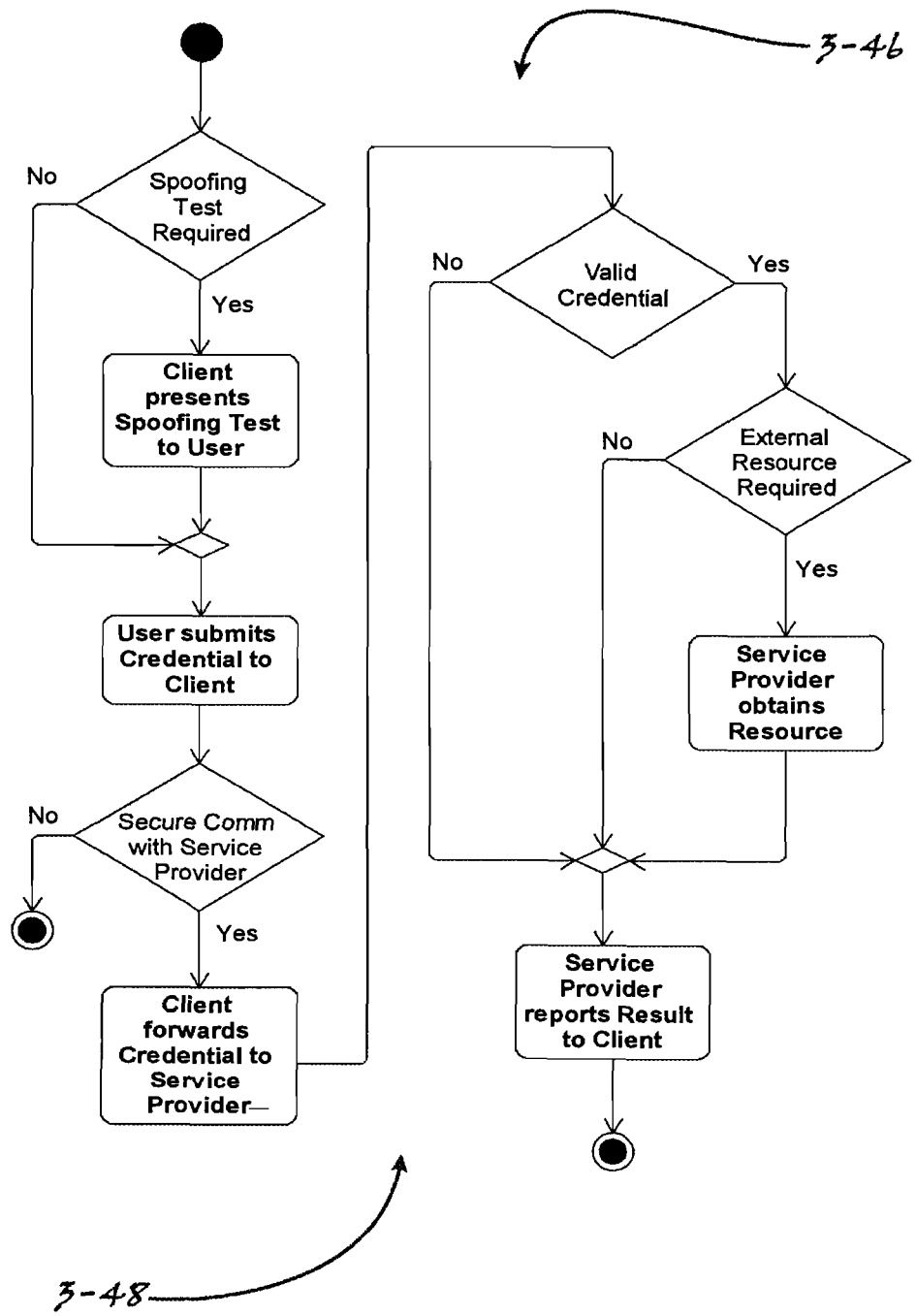
Figures 3, 4:
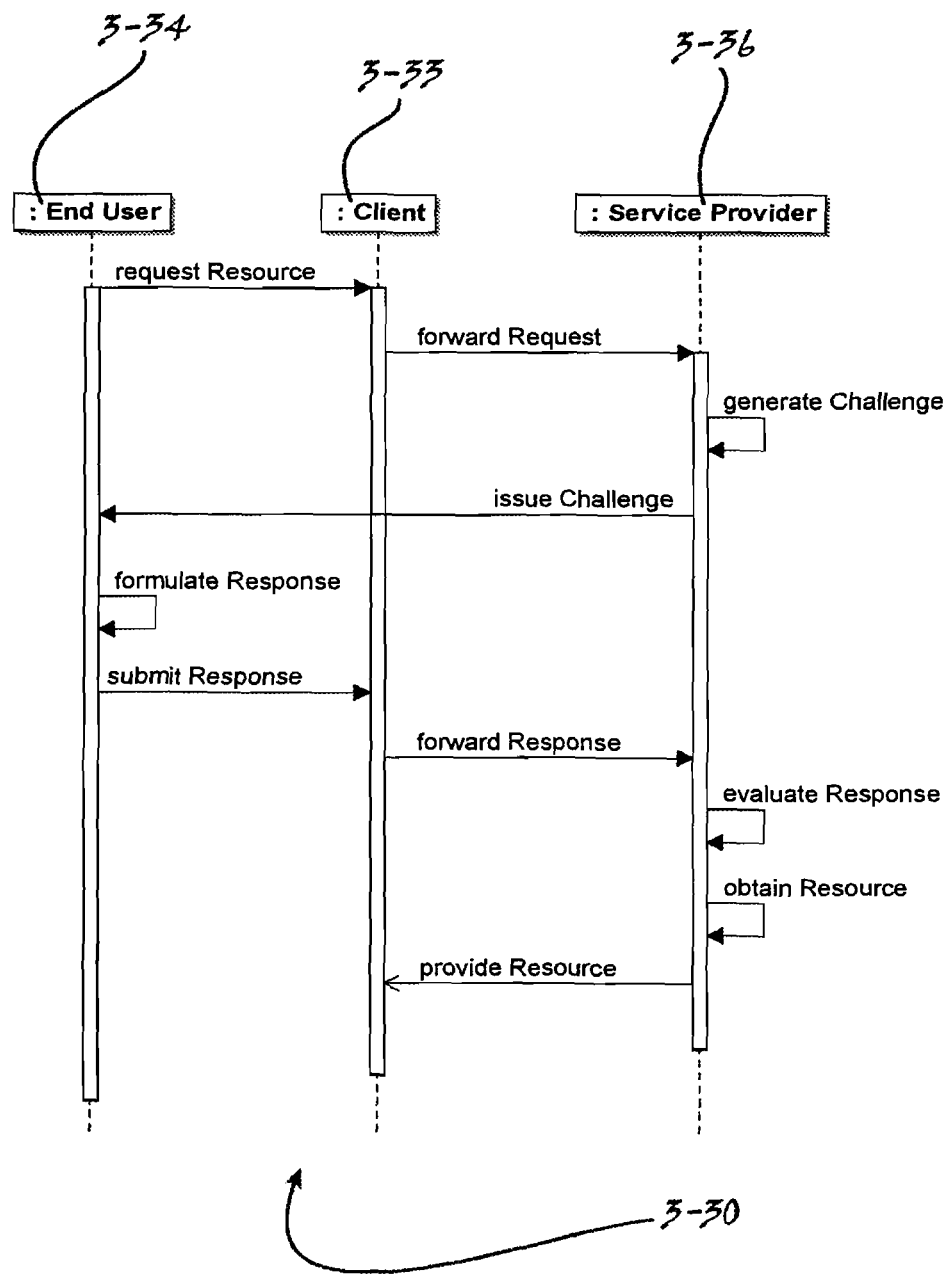
Figures 3, 4, 5, 5A:
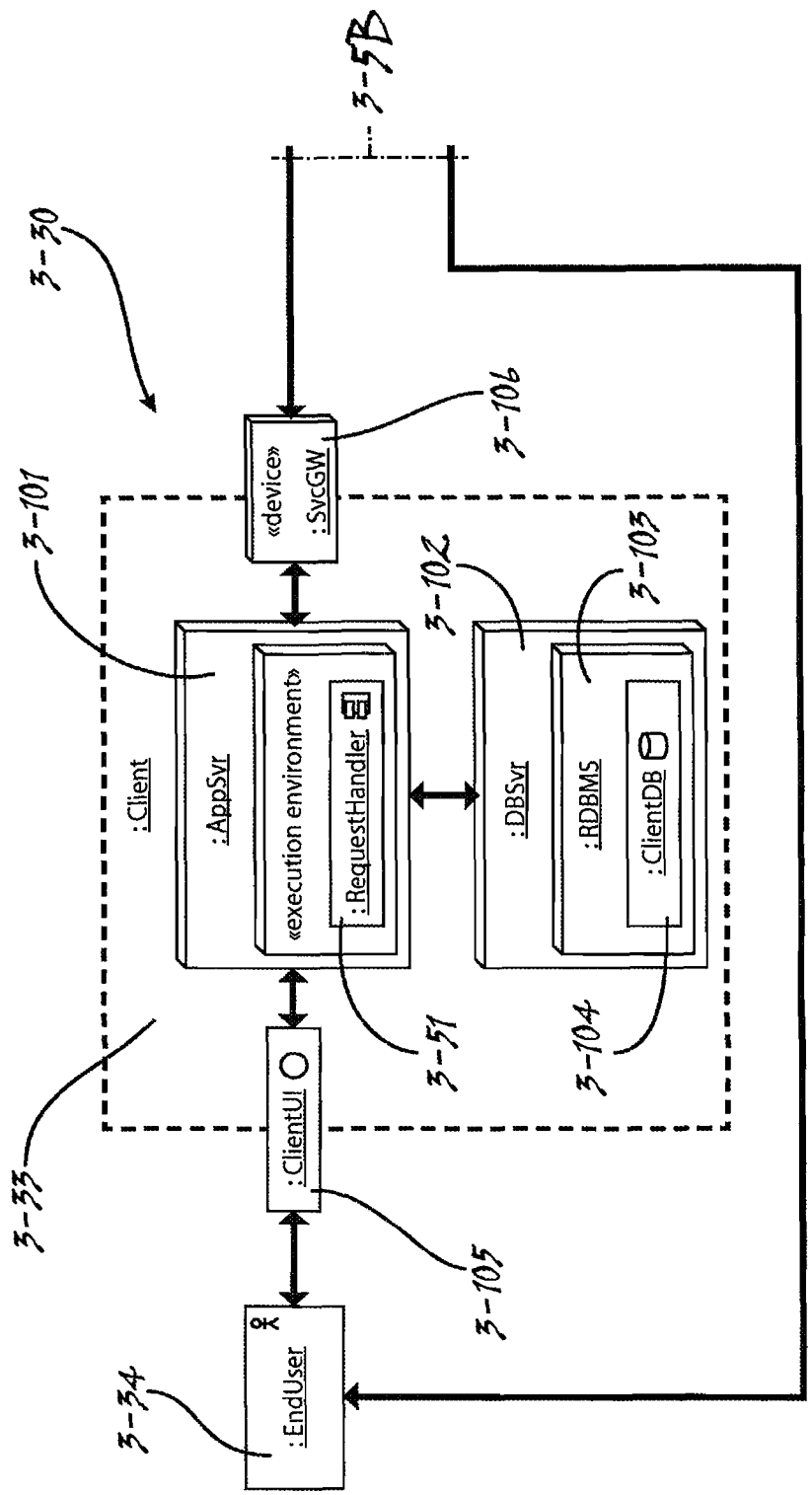
Figures 3, 4, 5, 5B:
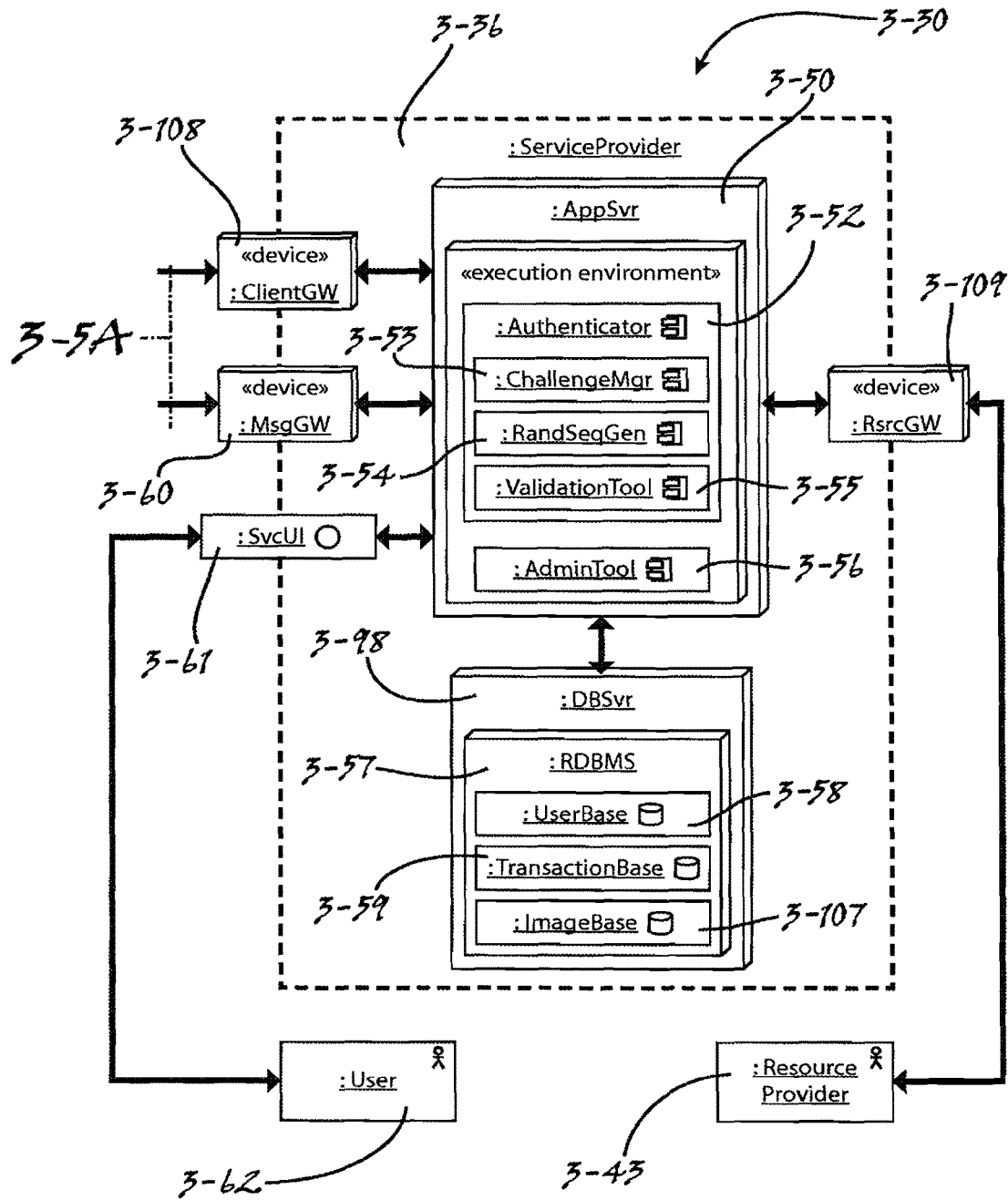
Figures 3, 4, 5, 6:
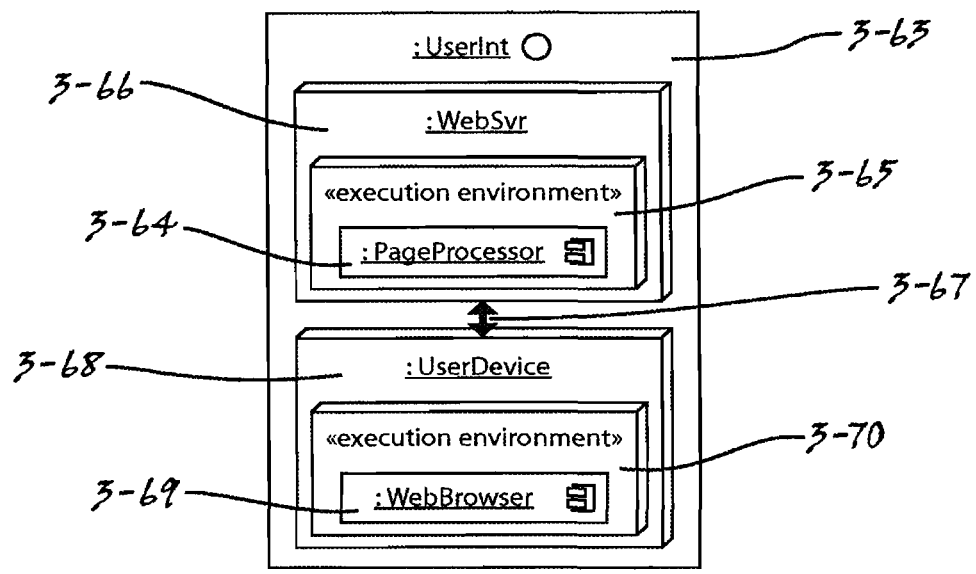
Figures 3, 4, 5, 6, 7:
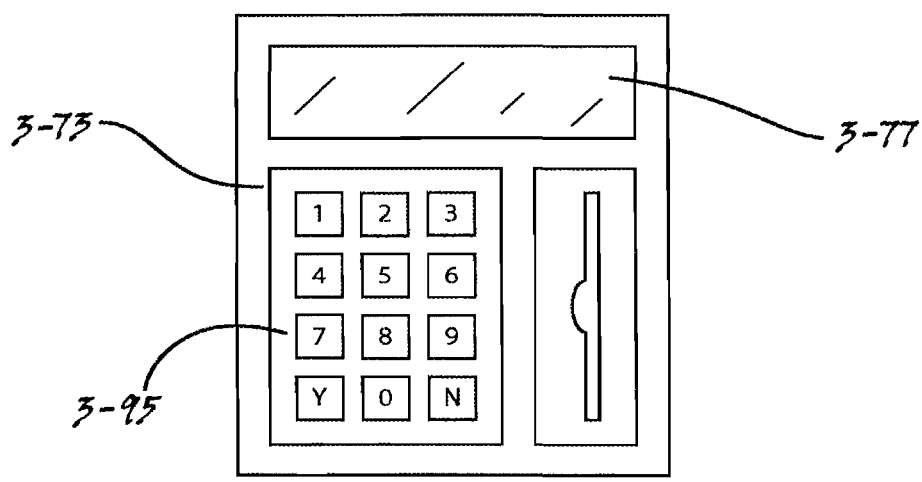
Figures 3, 4, 5, 6, 7, 8:
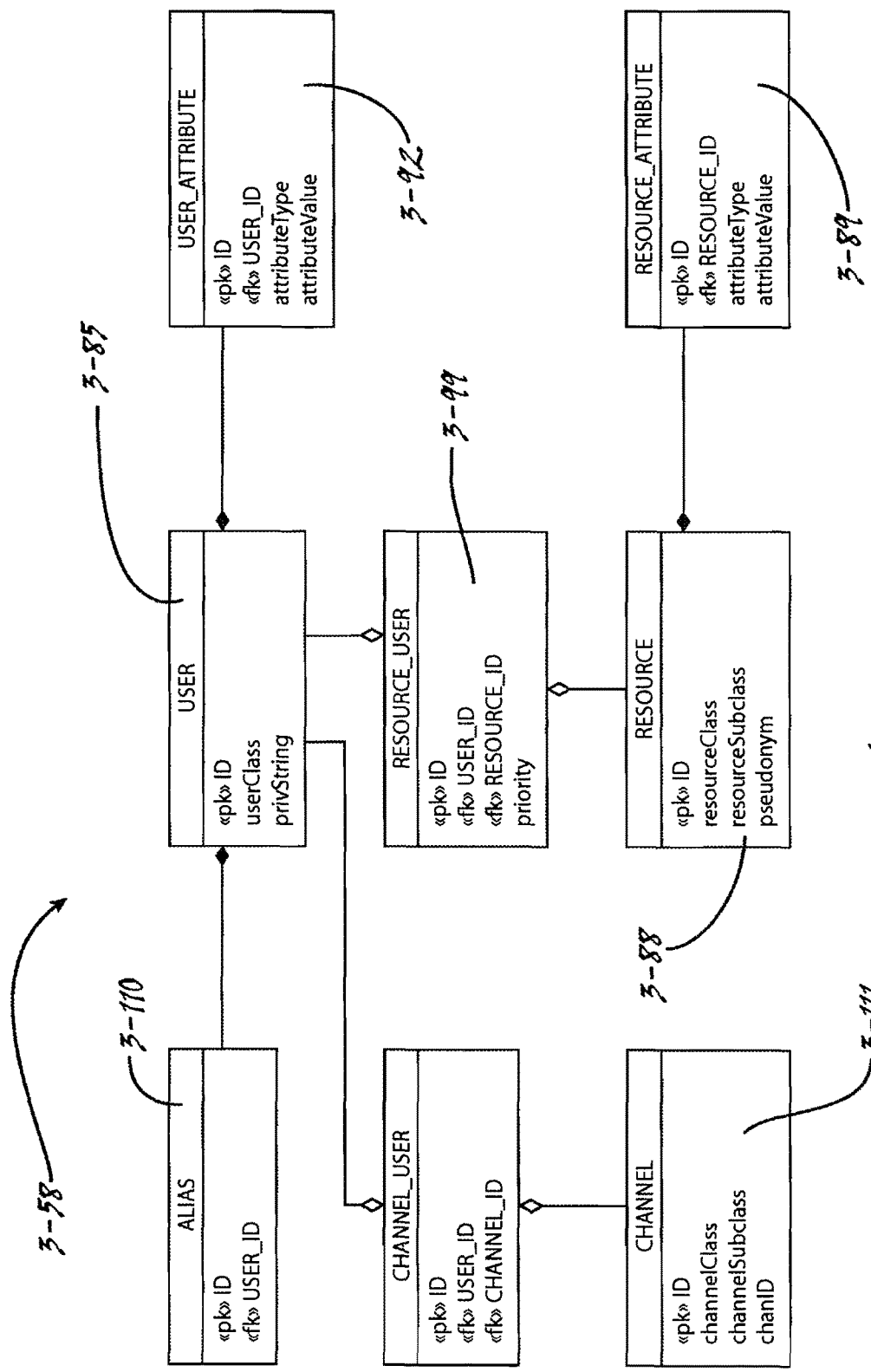
Figures 3, 4, 5, 6, 7, 8, 9:
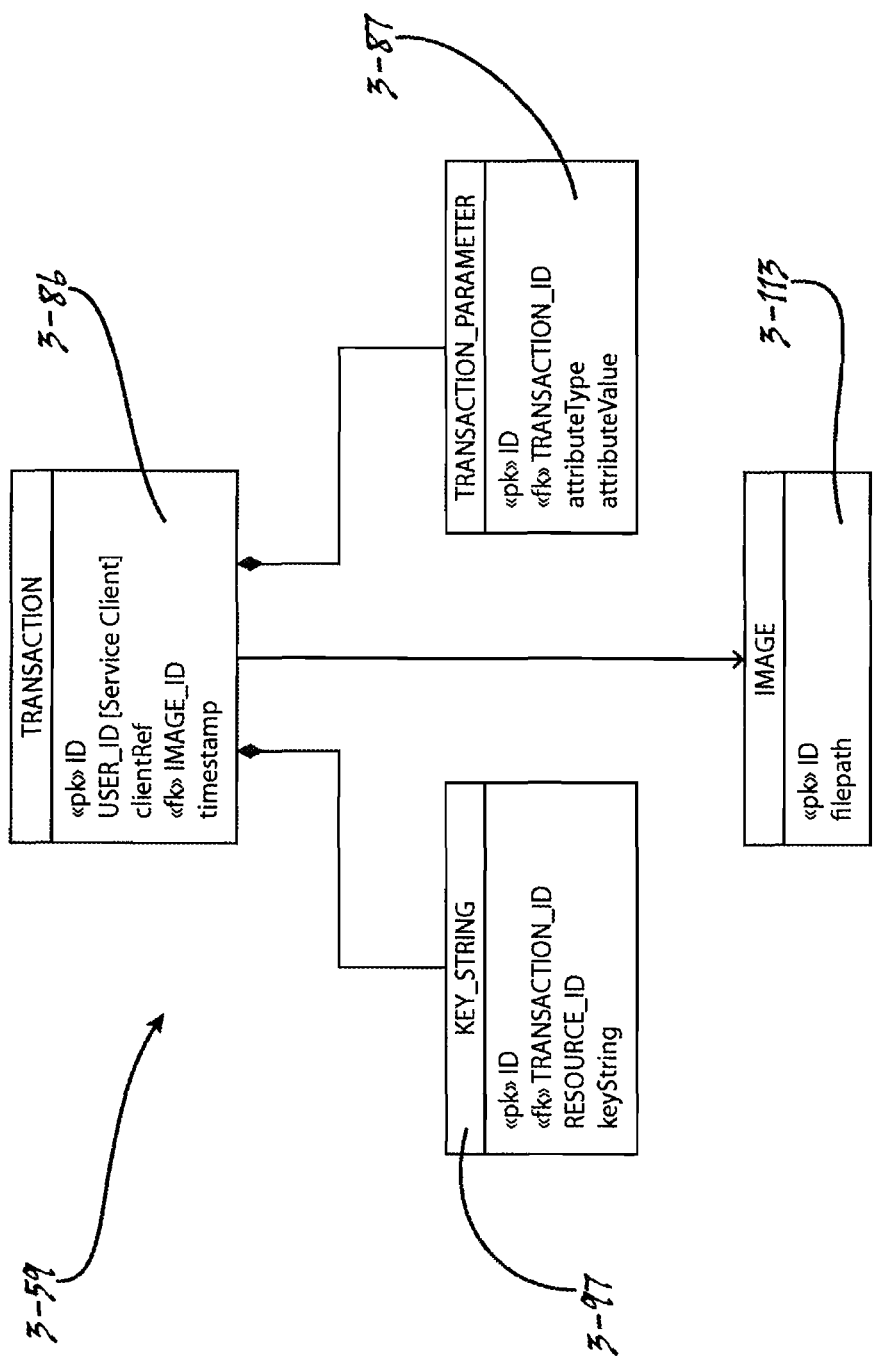
Figures 3, 4, 5, 6, 7, 8, 9, 10:
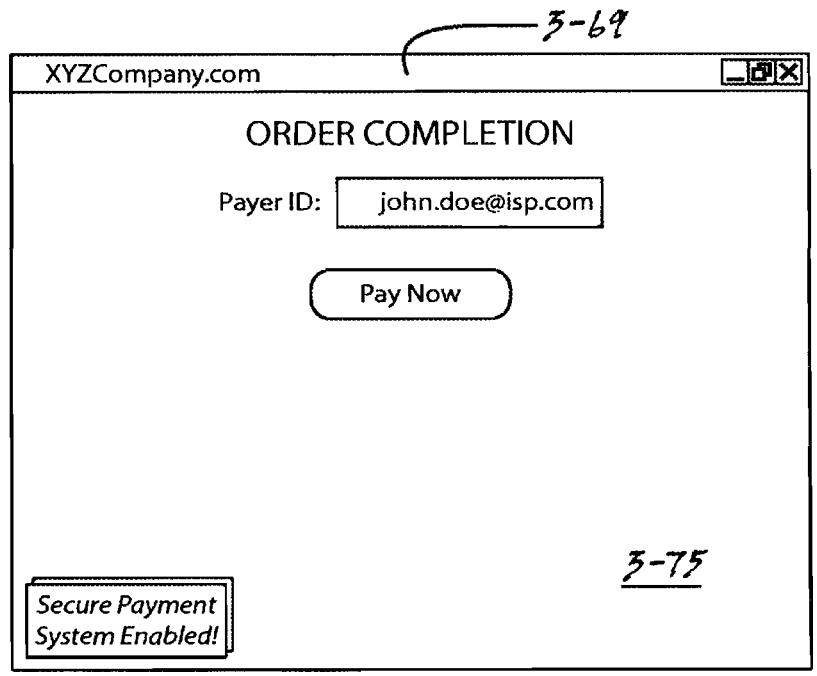
Figures 3, 4, 5, 6, 7, 8, 9, 10, 11:
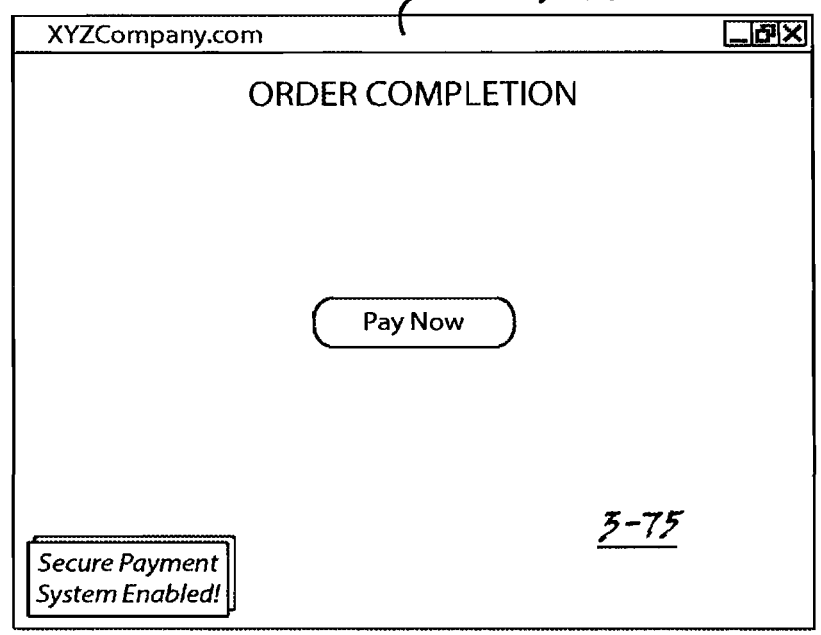
Figures 3, 4, 5, 6, 7, 8, 9, 10, 11, 12:
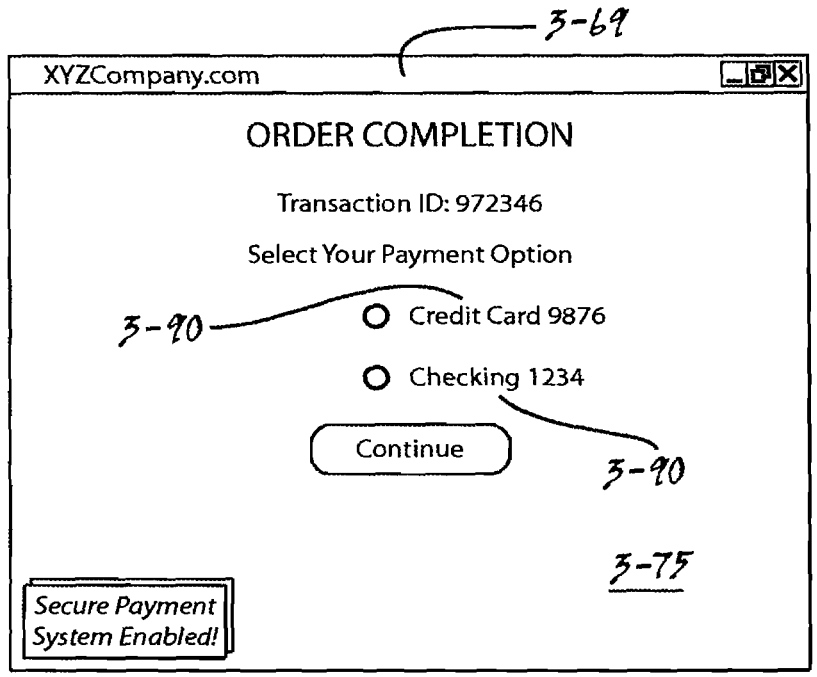
Figures 3, 4, 5, 6, 7, 8, 9, 10, 11, 12, 13, 14, 15, 16, 17:
Figures 3, 4, 5, 6, 7, 8, 9, 10, 11, 12, 13:
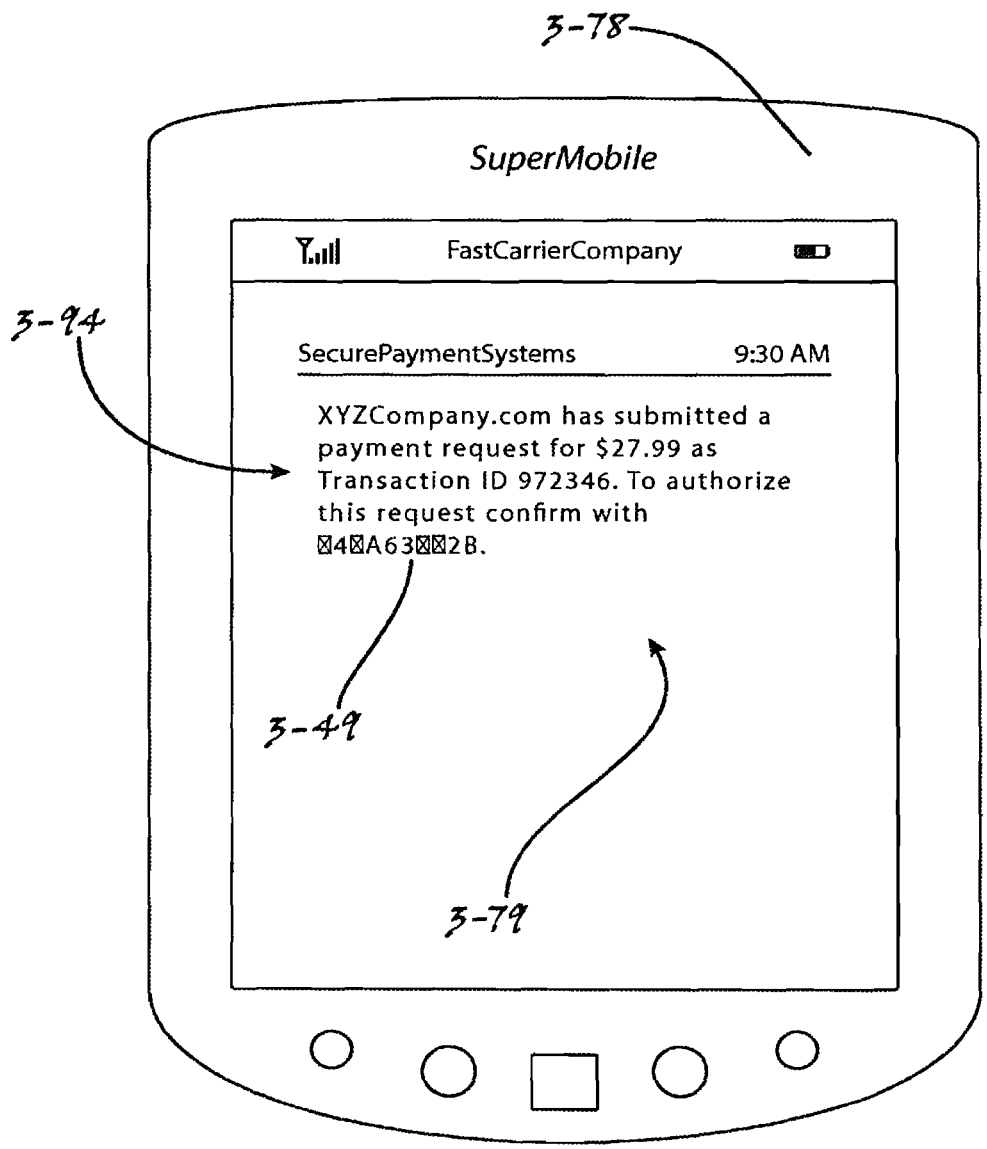
Figures 3, 4, 5, 6, 7, 8, 9, 10, 11, 12, 13, 14:
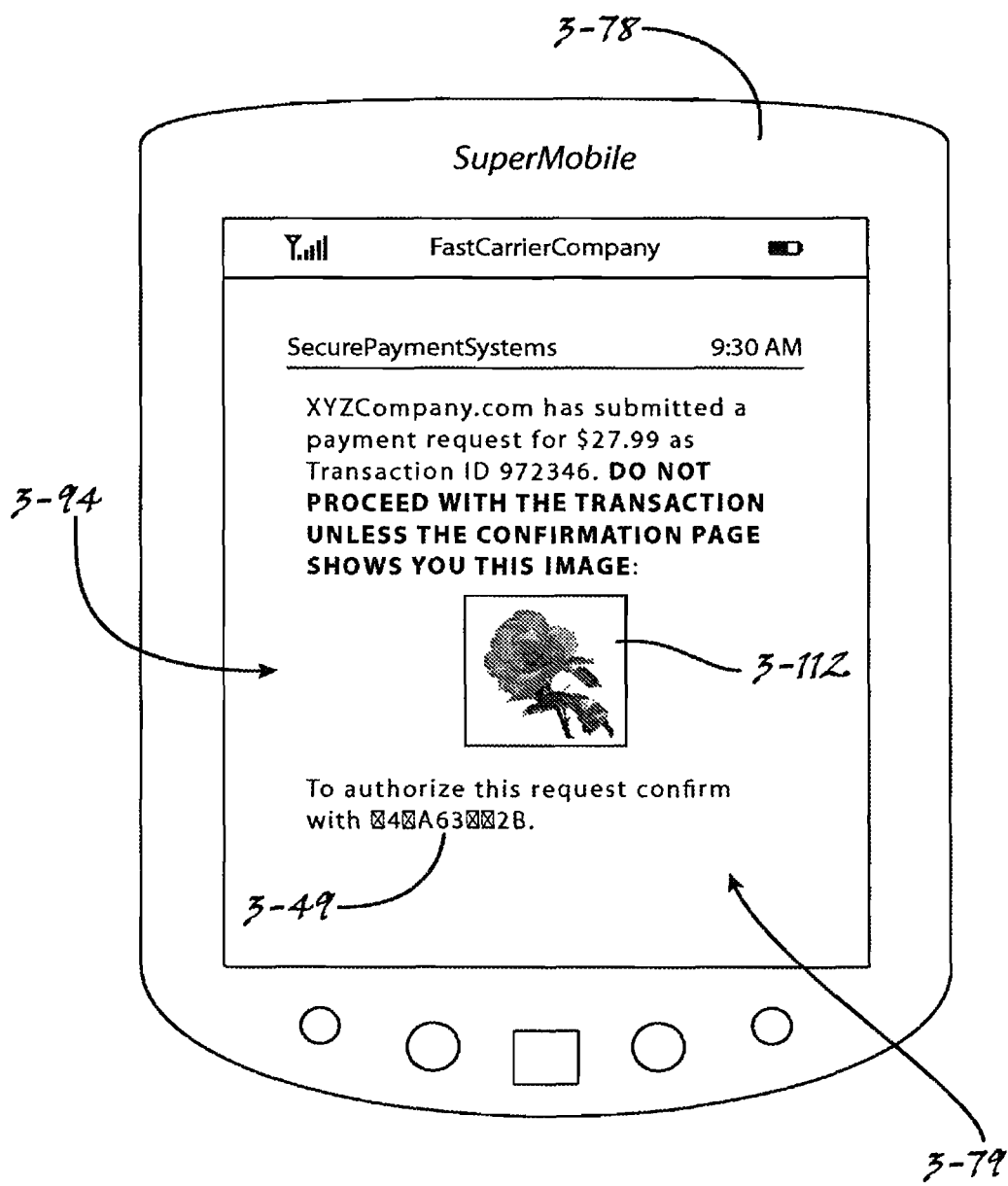
Figures 3, 4, 5, 6, 7, 8, 9, 10, 11, 12, 13, 14, 15:
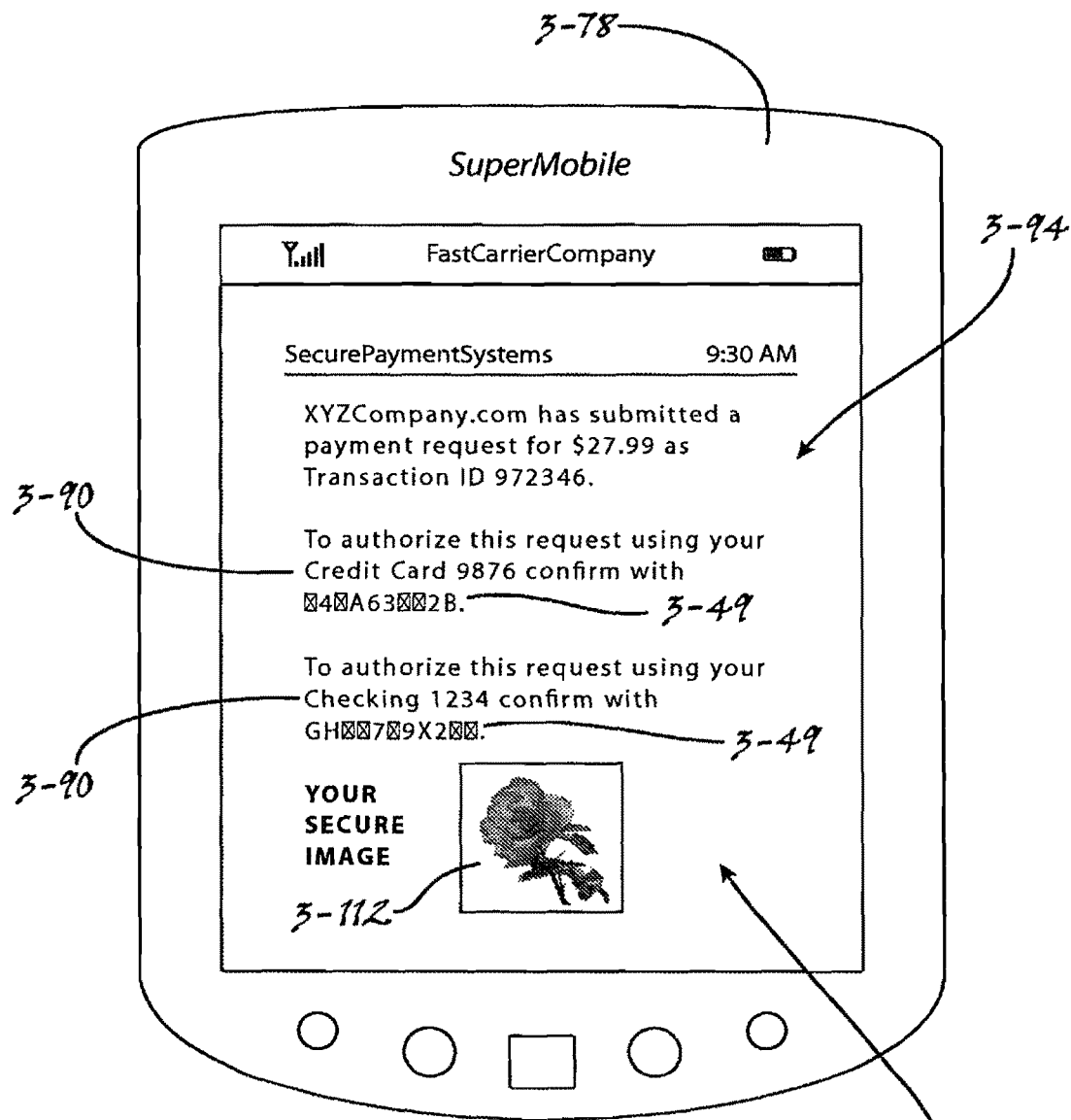
Figures 3, 4, 5, 6, 7, 8, 9, 10, 11, 12, 13, 14, 15, 16:
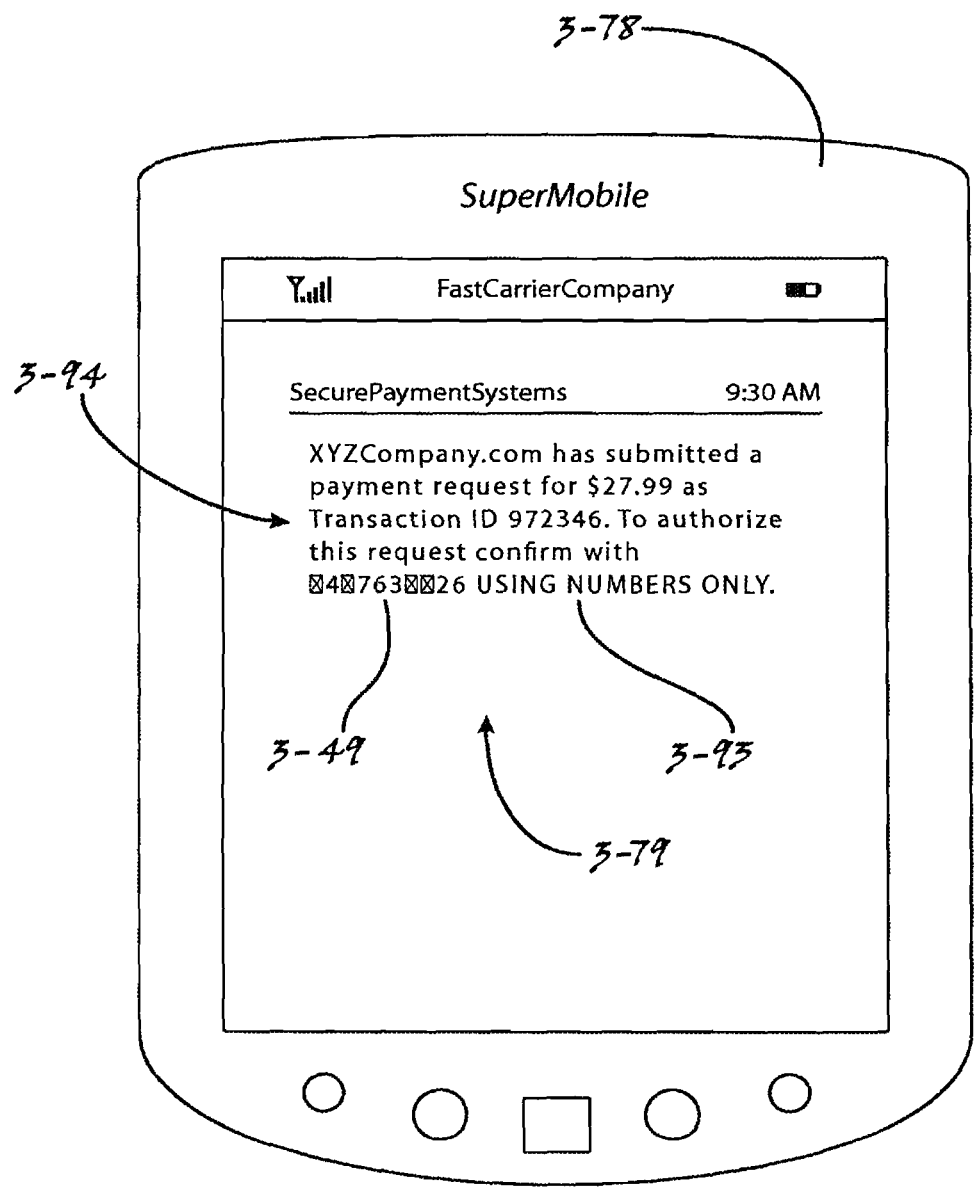
Figures 3, 4, 5, 6, 7, 8, 9, 10, 11, 12, 13, 14, 15, 16, 17, 18:
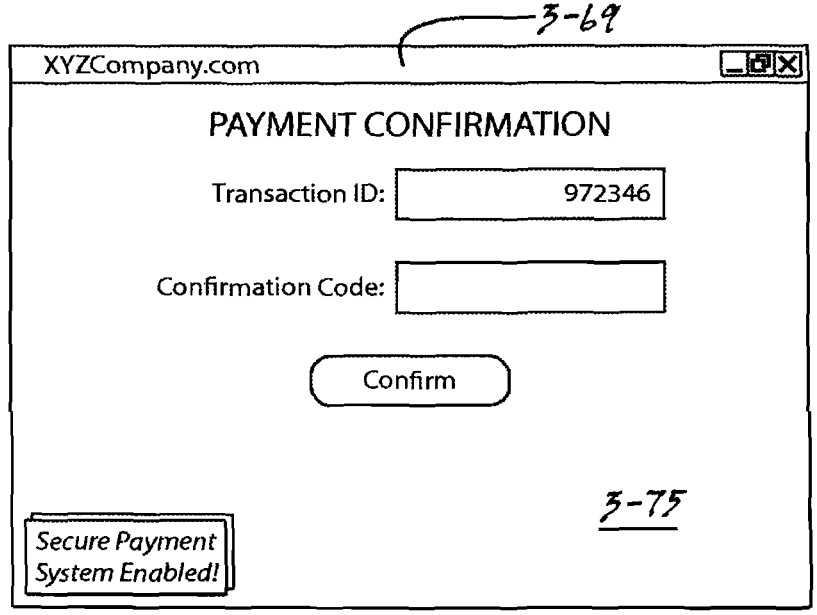
Figures 3, 4, 5, 6, 7, 8, 9, 10, 11, 12, 13, 14, 15, 16, 17, 18, 19:
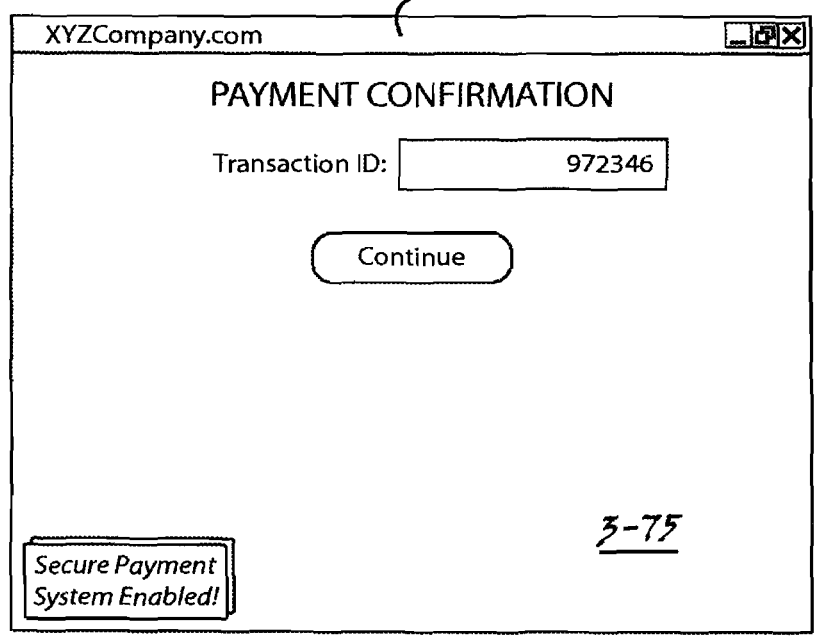
Figures 3, 4, 5, 6, 7, 8, 9, 10, 11, 12, 13, 14, 15, 16, 17, 18, 19, 20:
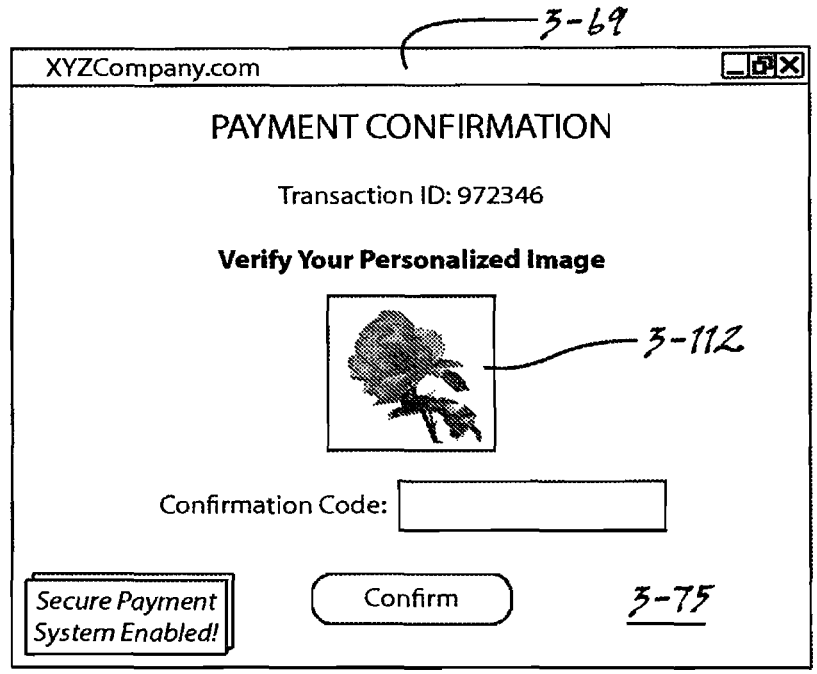
Figures 3, 4, 5, 6, 7, 8, 9, 10, 11, 12, 13, 14, 15, 16, 17, 18, 19, 20, 21:
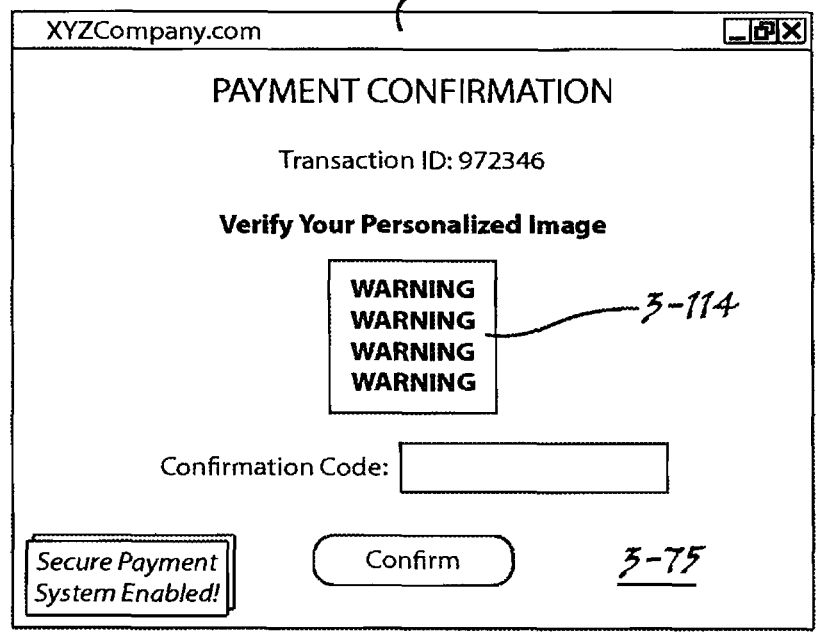
Figures 3, 4, 5, 6, 7, 8, 9, 10, 11, 12, 13, 14, 15, 16, 17, 18, 19, 20, 21, 22:
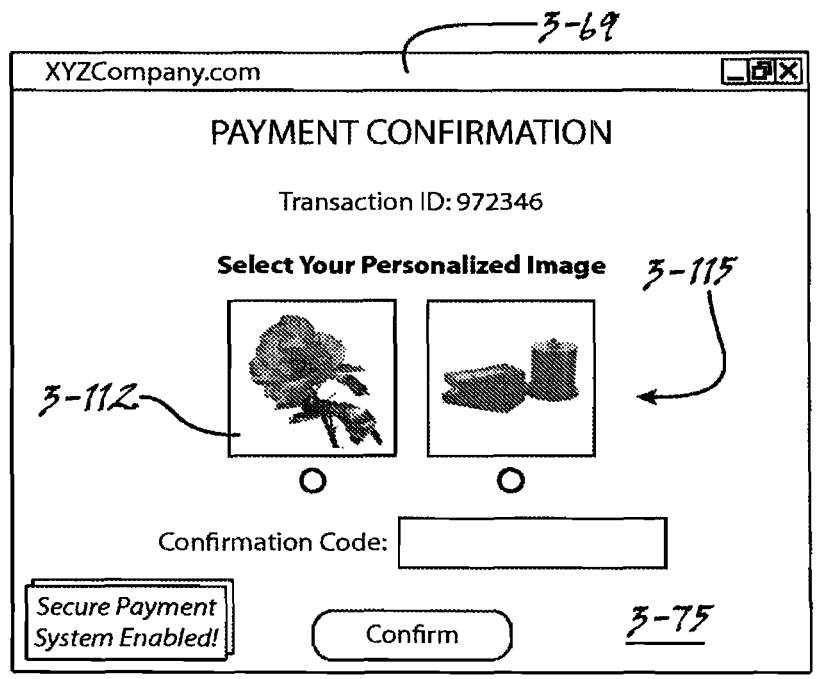
Figure 4:
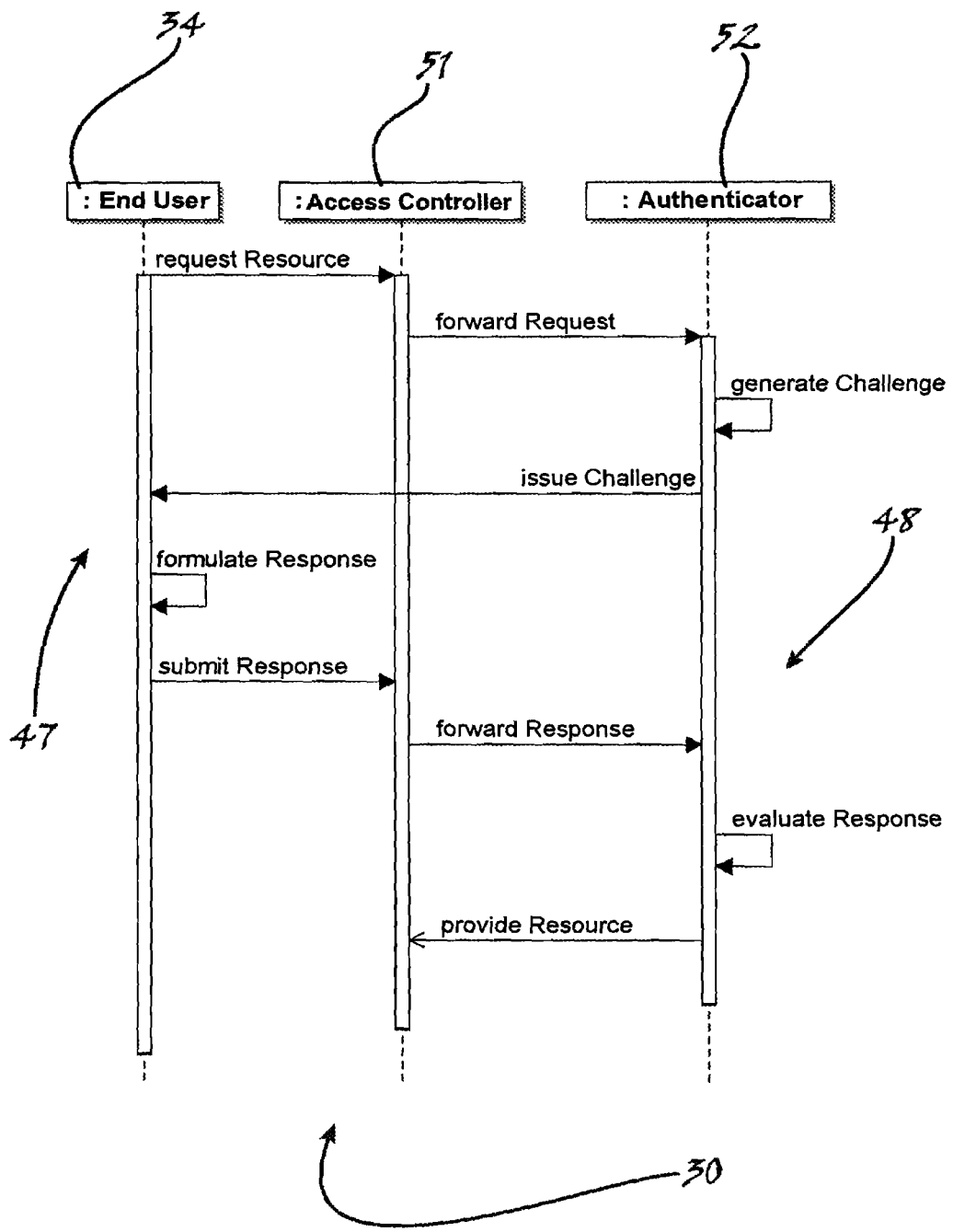
Figures 1, 4:
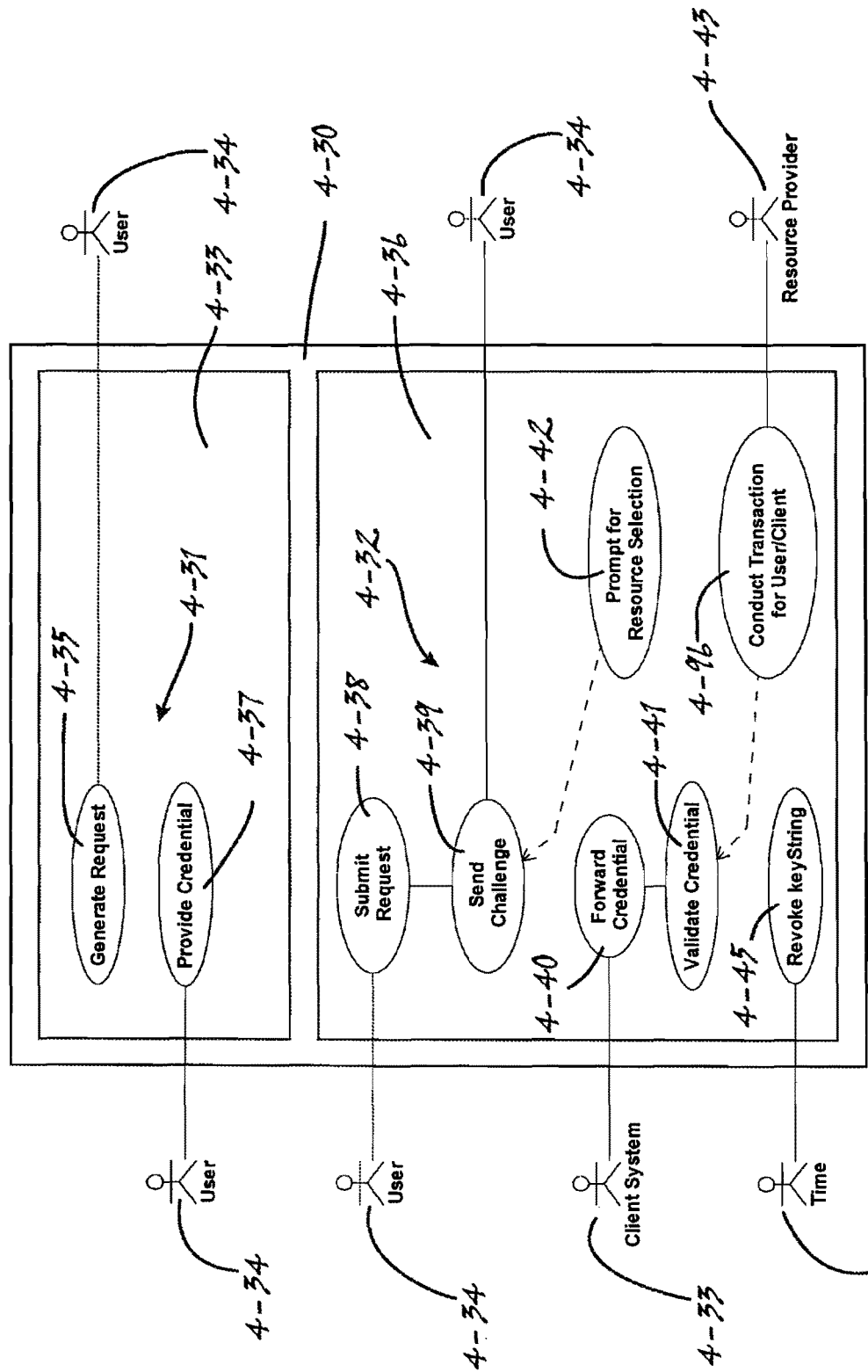
Figures 2, 4:
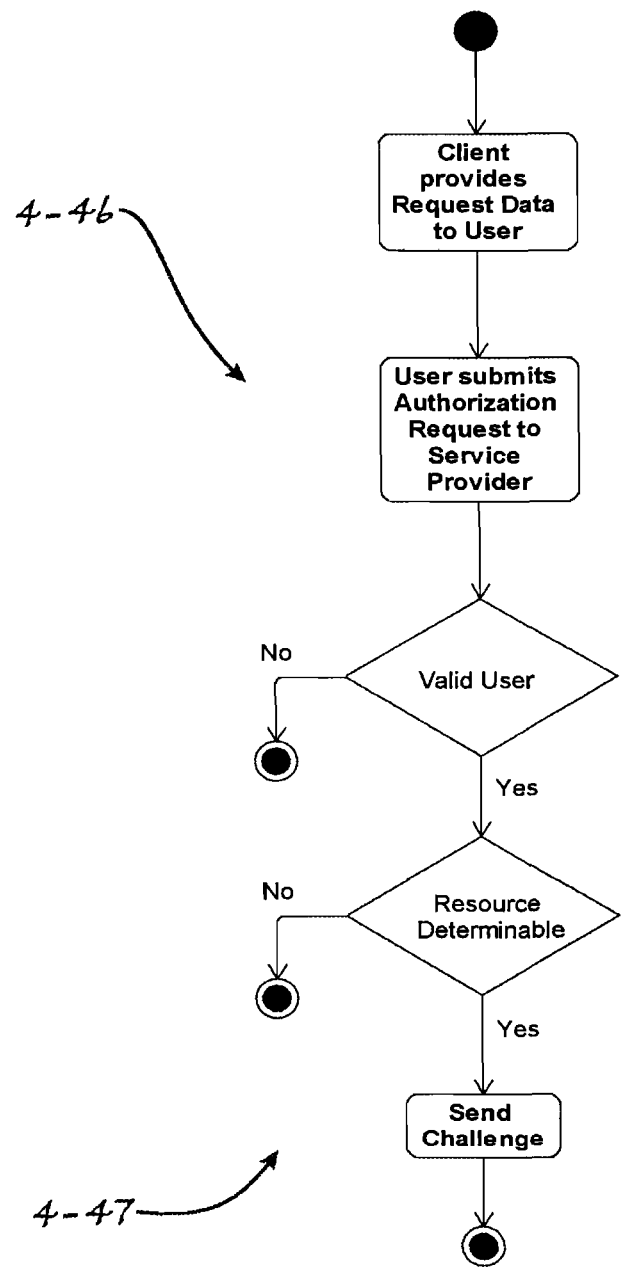
Figures 3, 4:
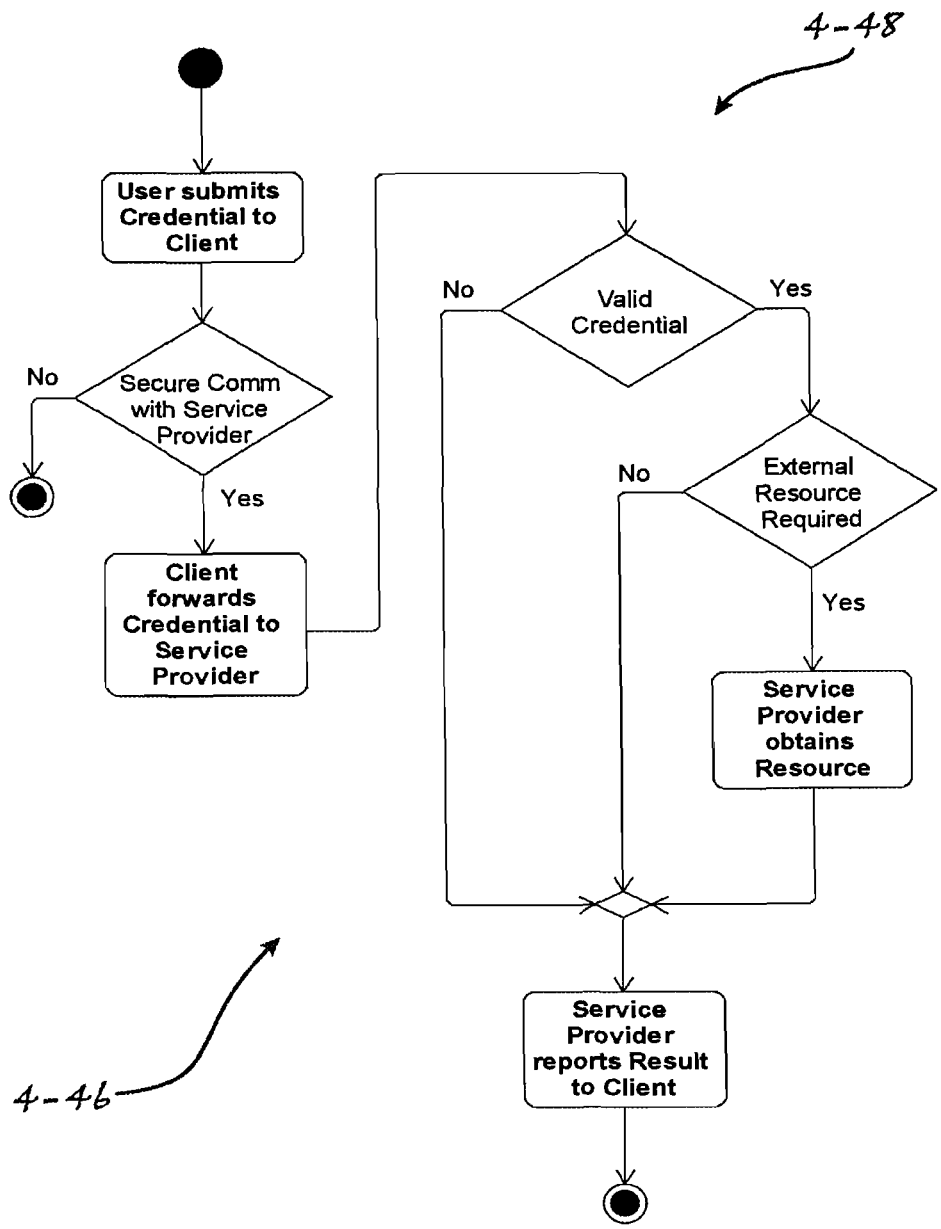
Figure 4:
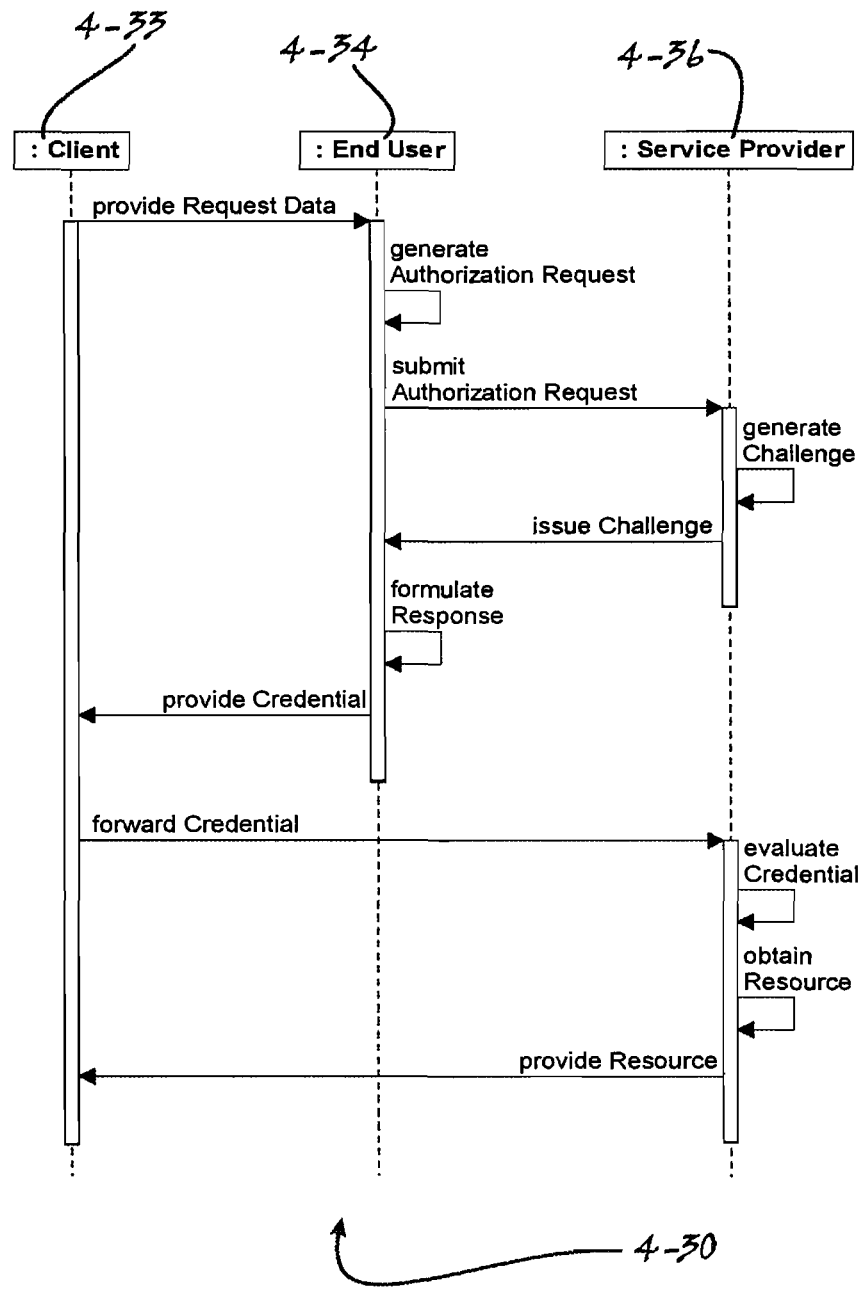
Figures 4, 5:
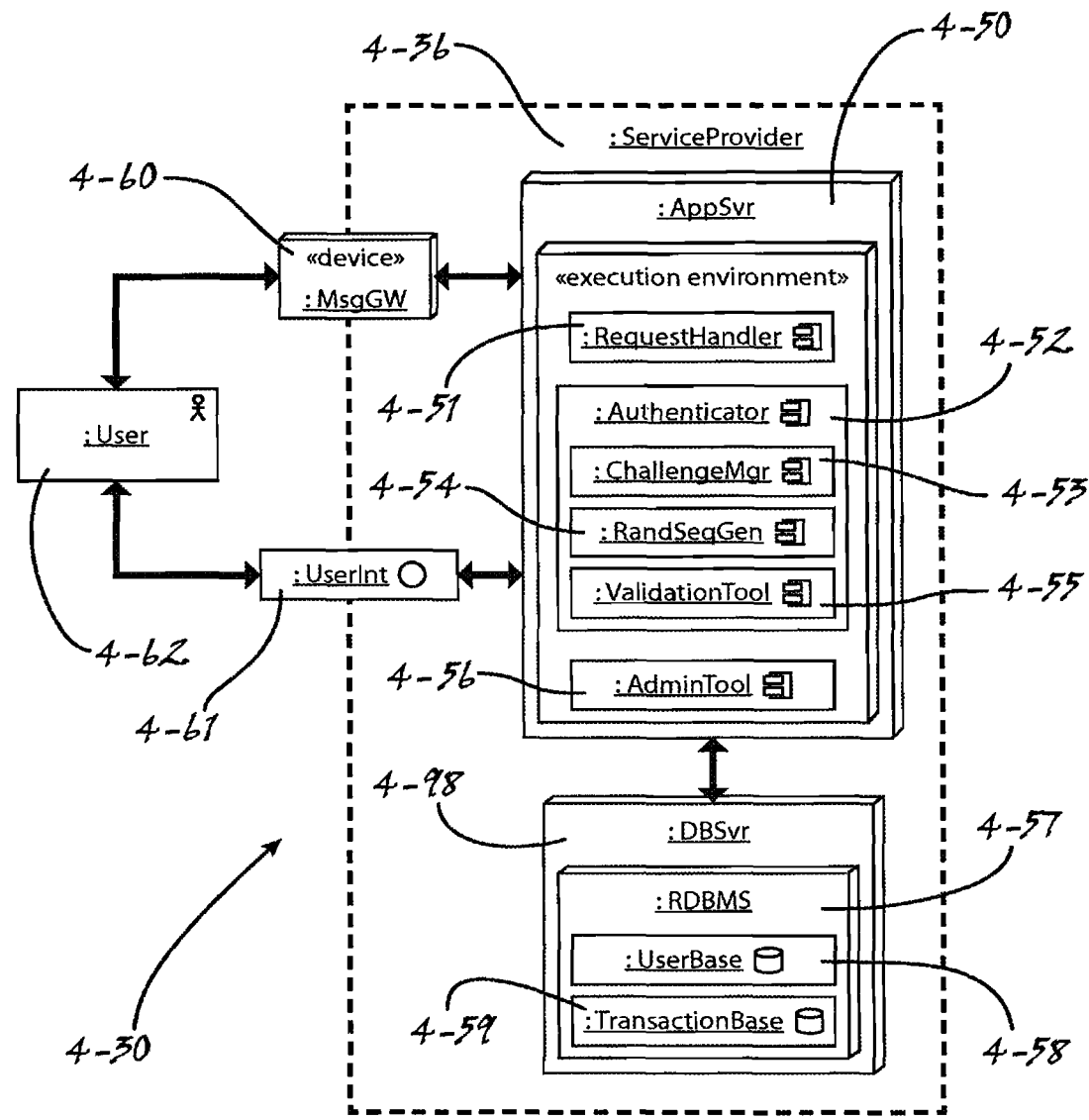
Figures 4, 5, 6:
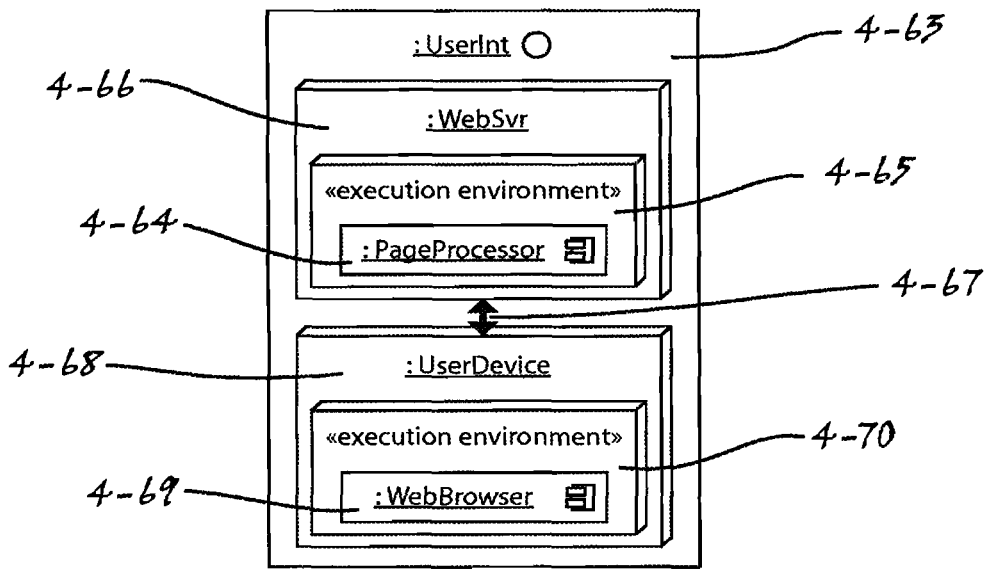
Figures 4, 5, 6, 7:
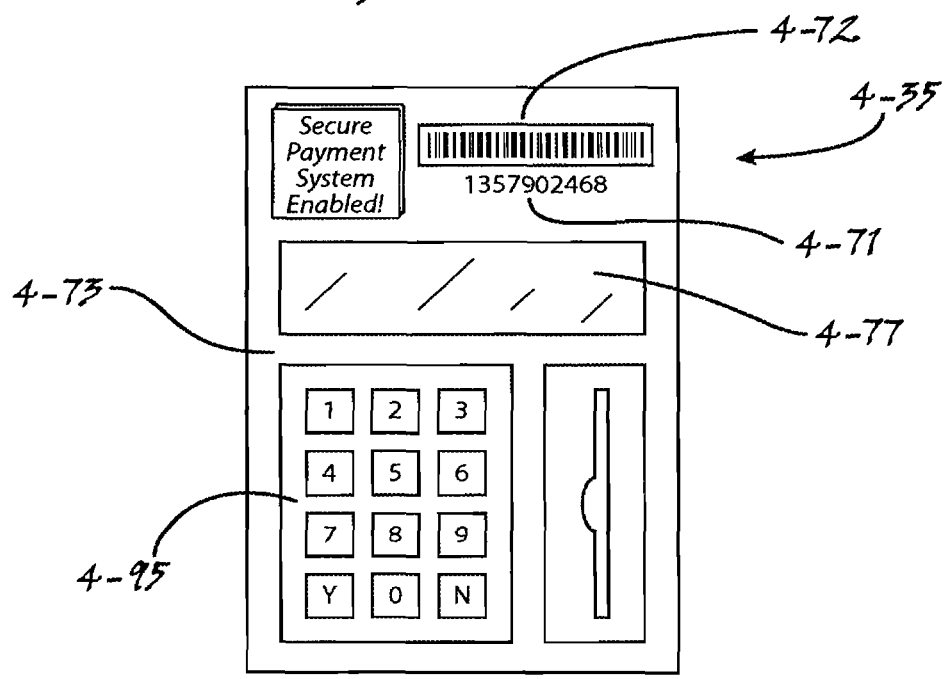
Figures 4, 5, 6, 7:
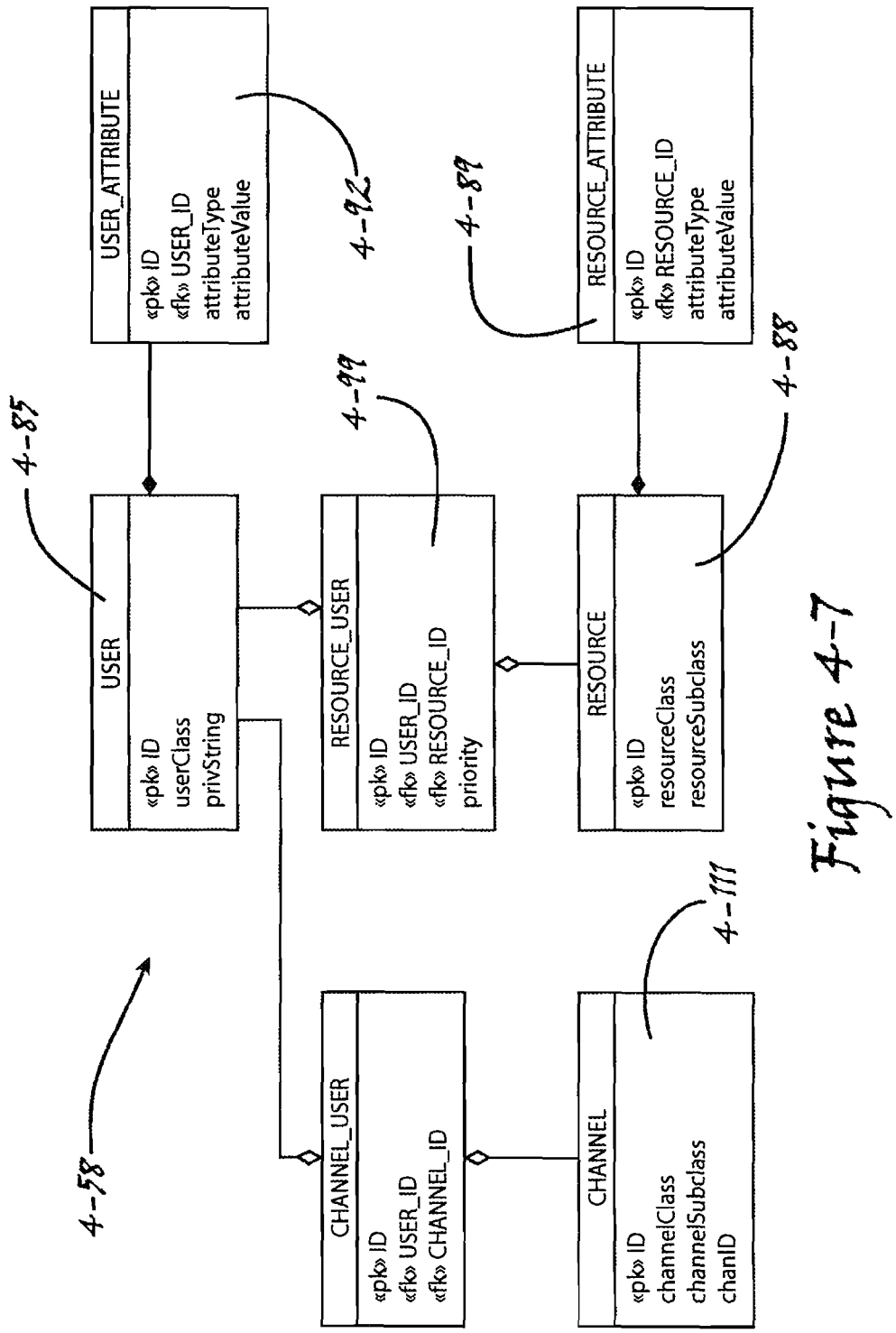
Figures 4, 5, 6, 7, 8:
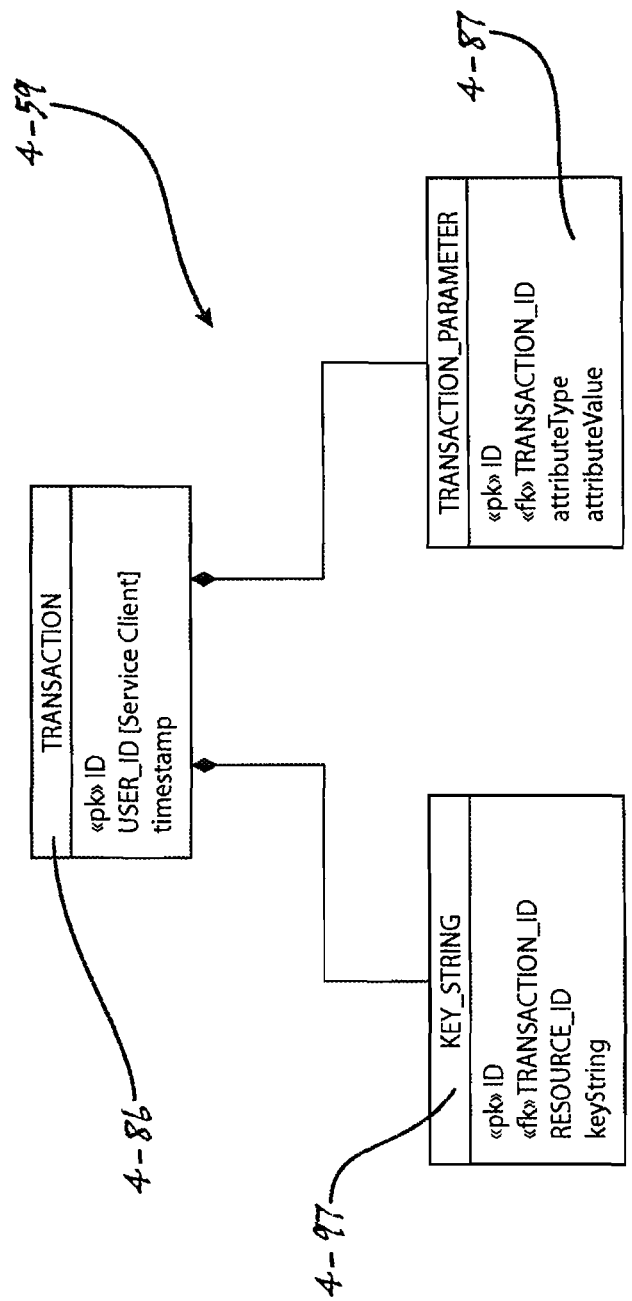
Figures 4, 5, 6, 7, 8, 9, 10:
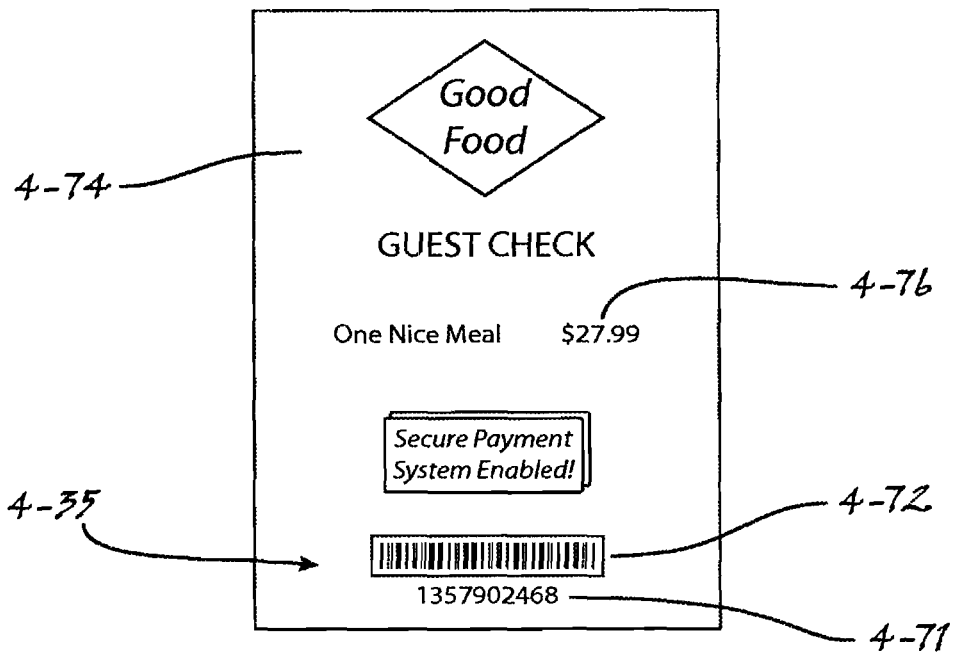
Figures 4, 5, 6, 7, 8, 9, 10, 11:
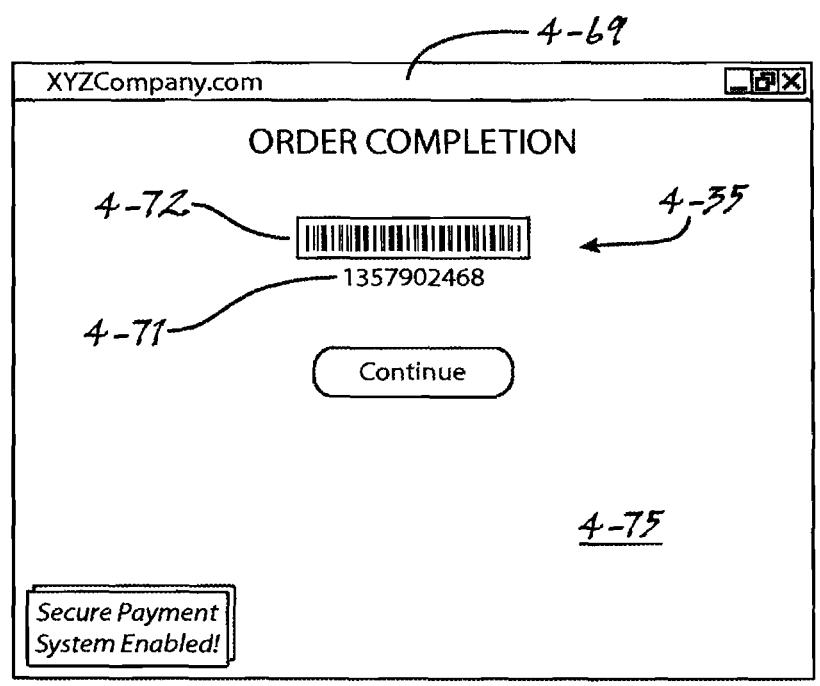
Figures 4, 5, 6, 7, 8, 9, 10, 11, 12:
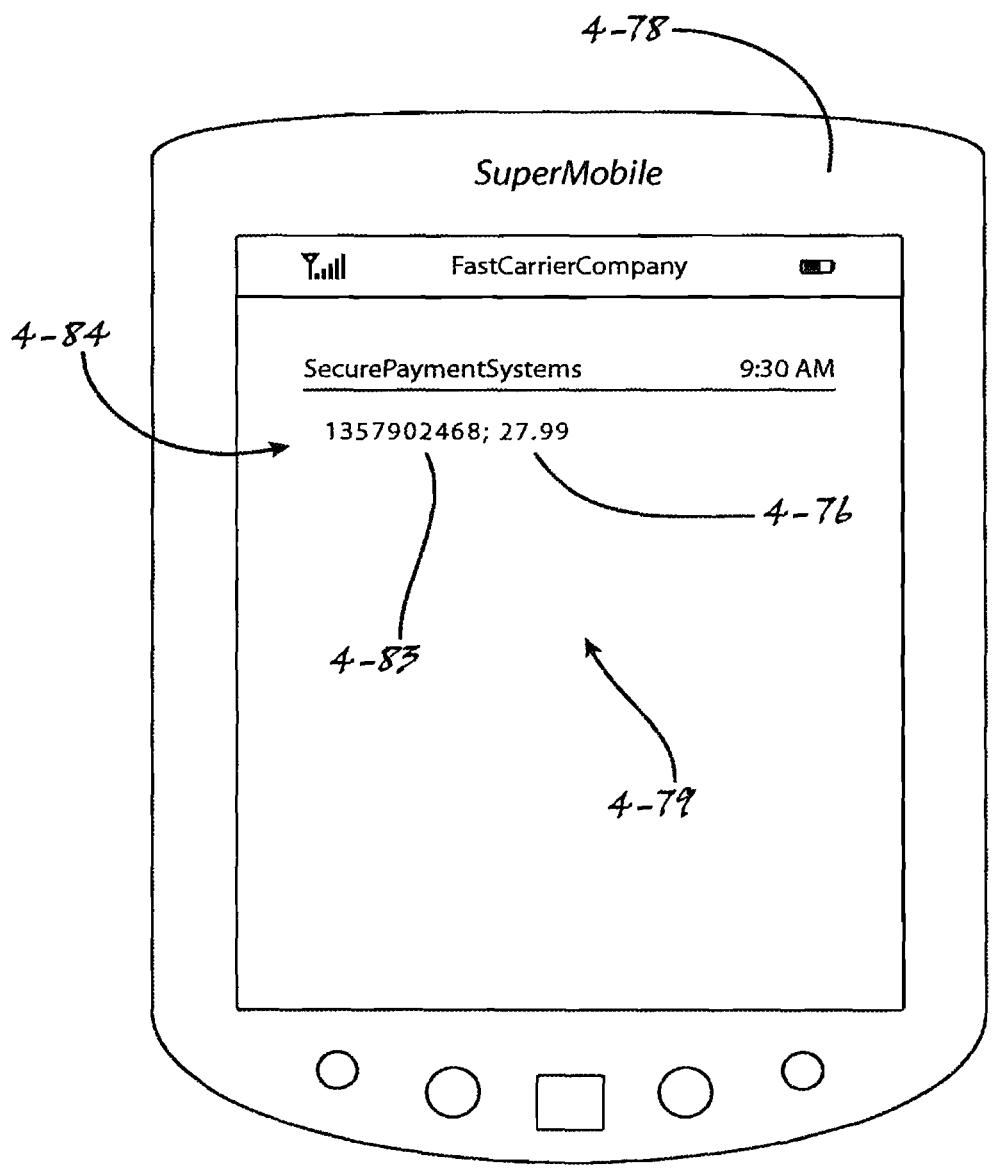
Figures 4, 5, 6, 7, 8, 9, 10, 11, 12, 13:
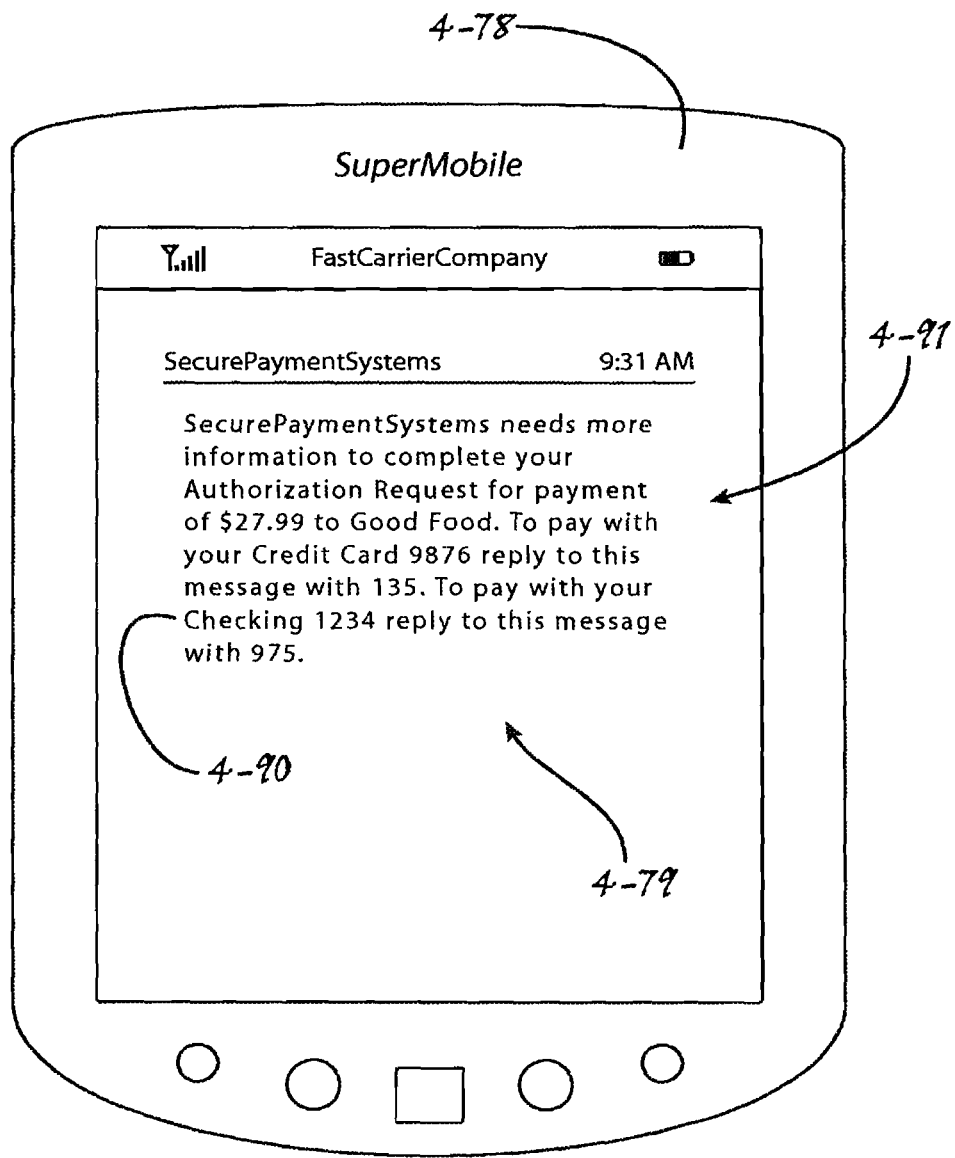
Figures 4, 5, 6, 7, 8, 9, 10, 11, 12, 13, 14:
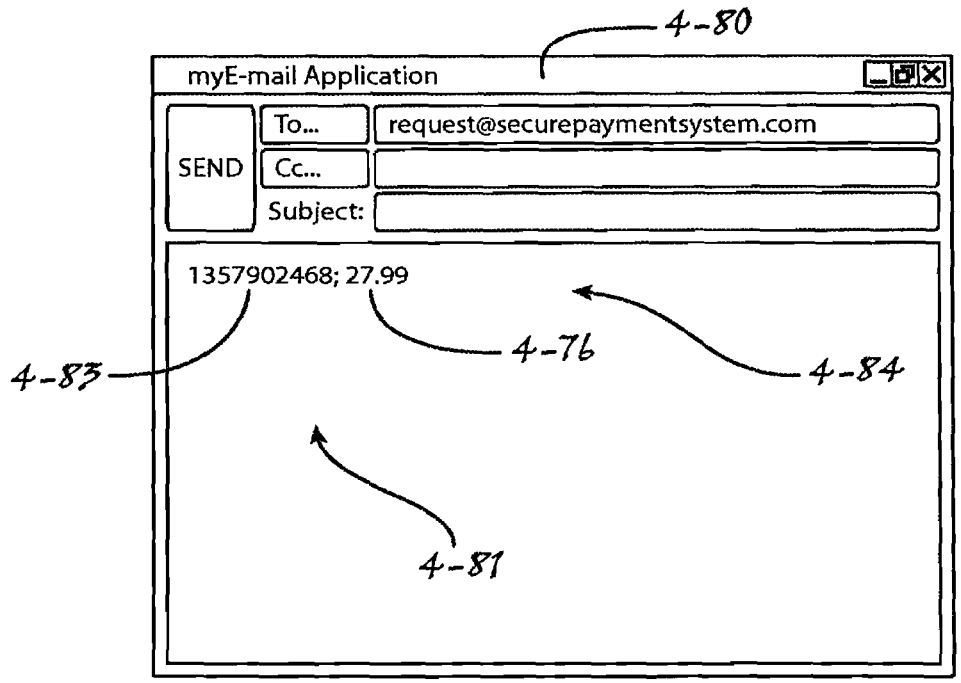
Figures 4, 5, 6, 7, 8, 9, 10, 11, 12, 13, 14, 15:
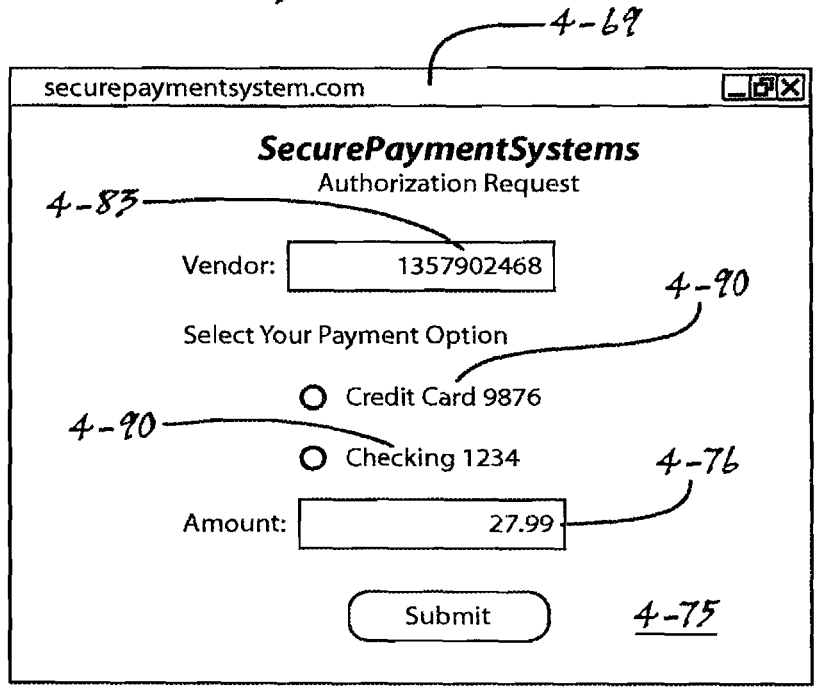
Figures 4, 5, 6, 7, 8, 9, 10, 11, 12, 13, 14, 15, 16:
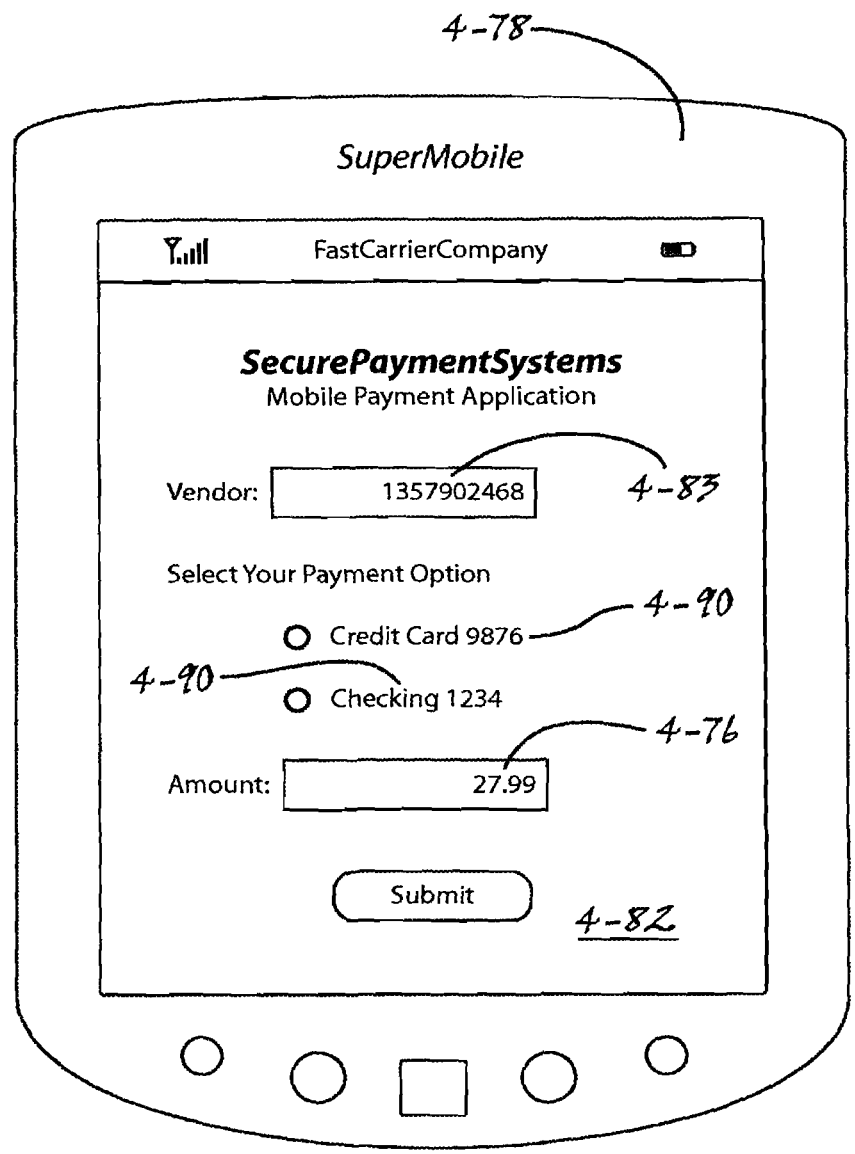
Figures 4, 5, 6, 7, 8, 9, 10, 11, 12, 13, 14, 15, 16, 17:
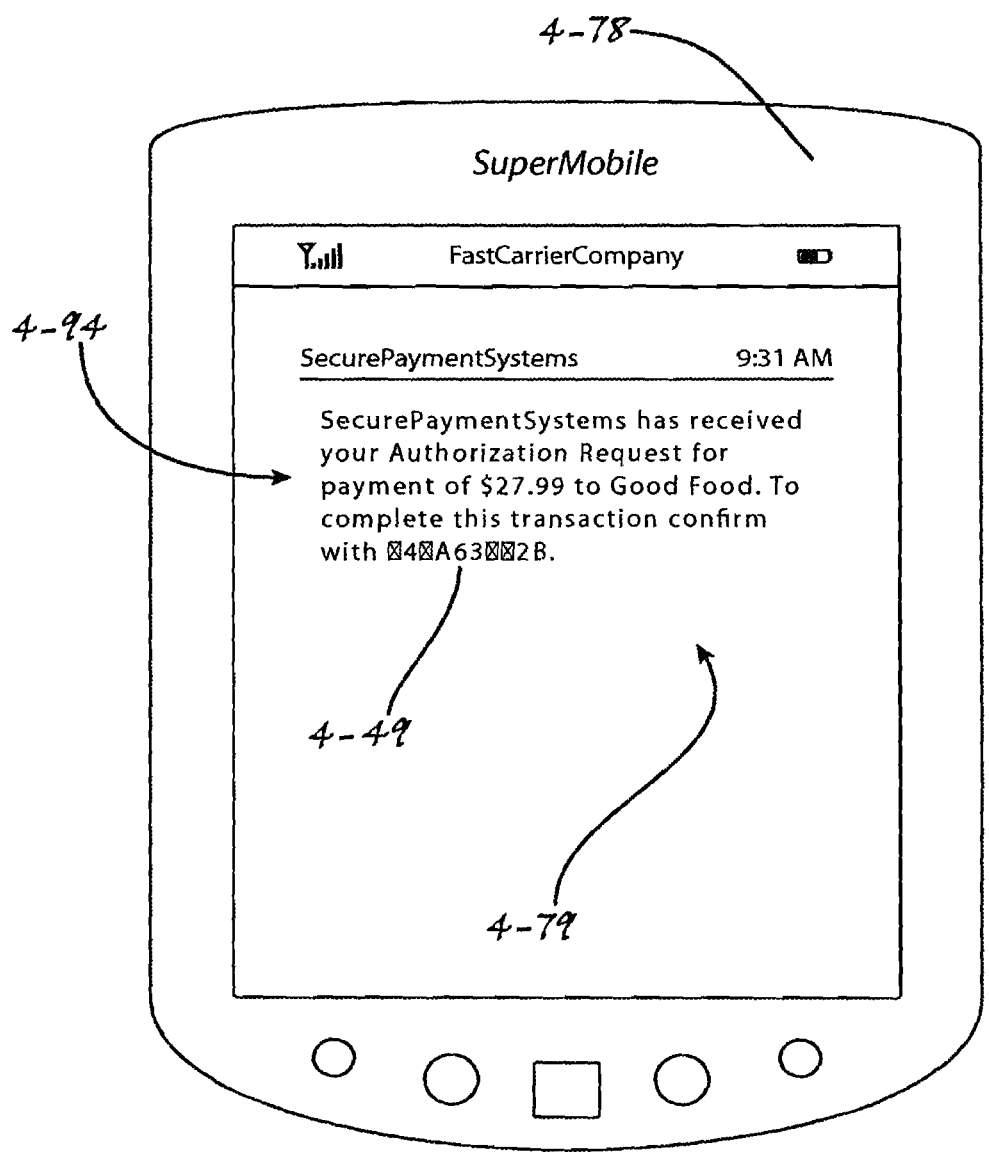
Figures 4, 5, 6, 7, 8, 9, 10, 11, 12, 13, 14, 15, 16, 17, 18:
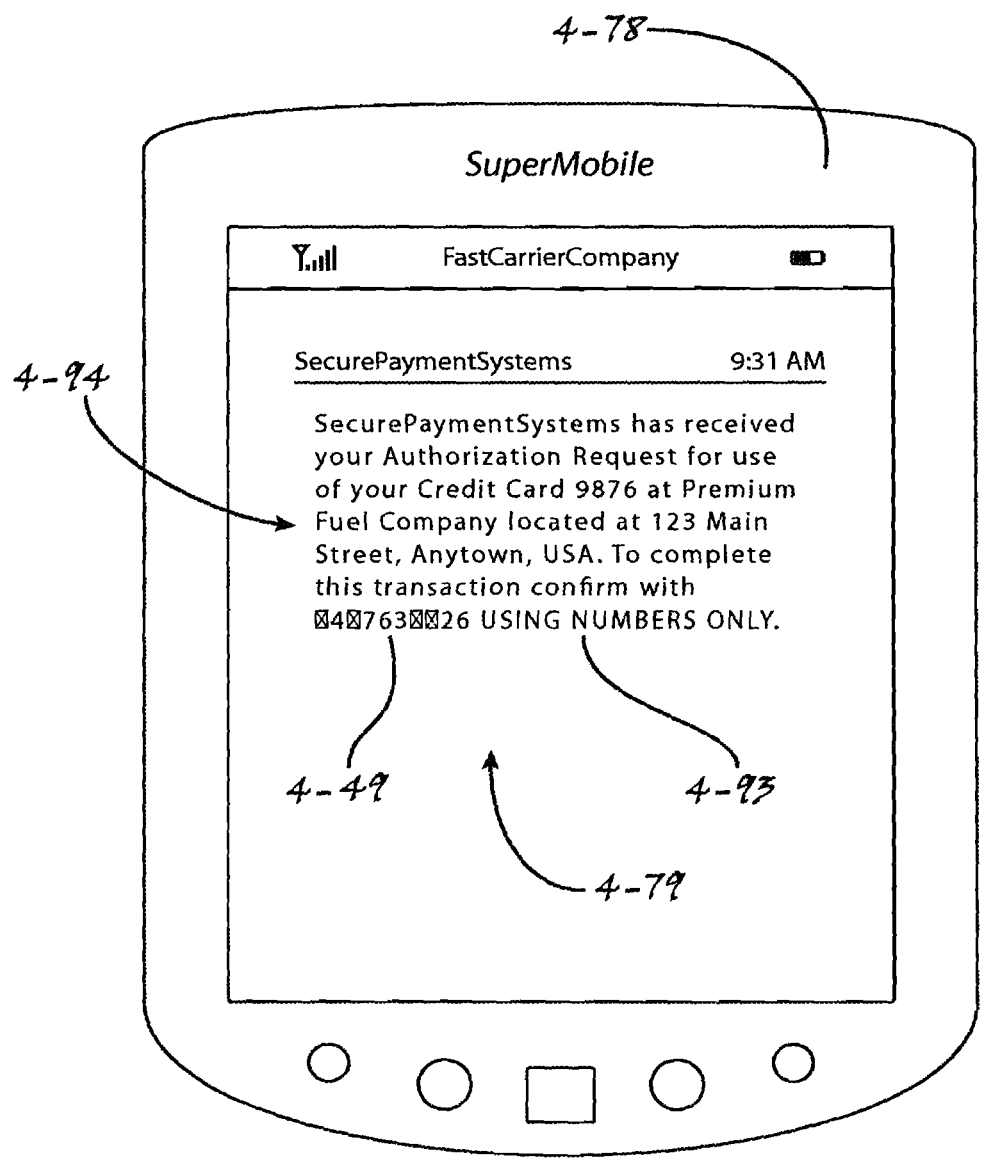
Figures 4, 5, 6, 7, 8, 9, 10, 11, 12, 13, 14, 15, 16, 17, 18, 19:
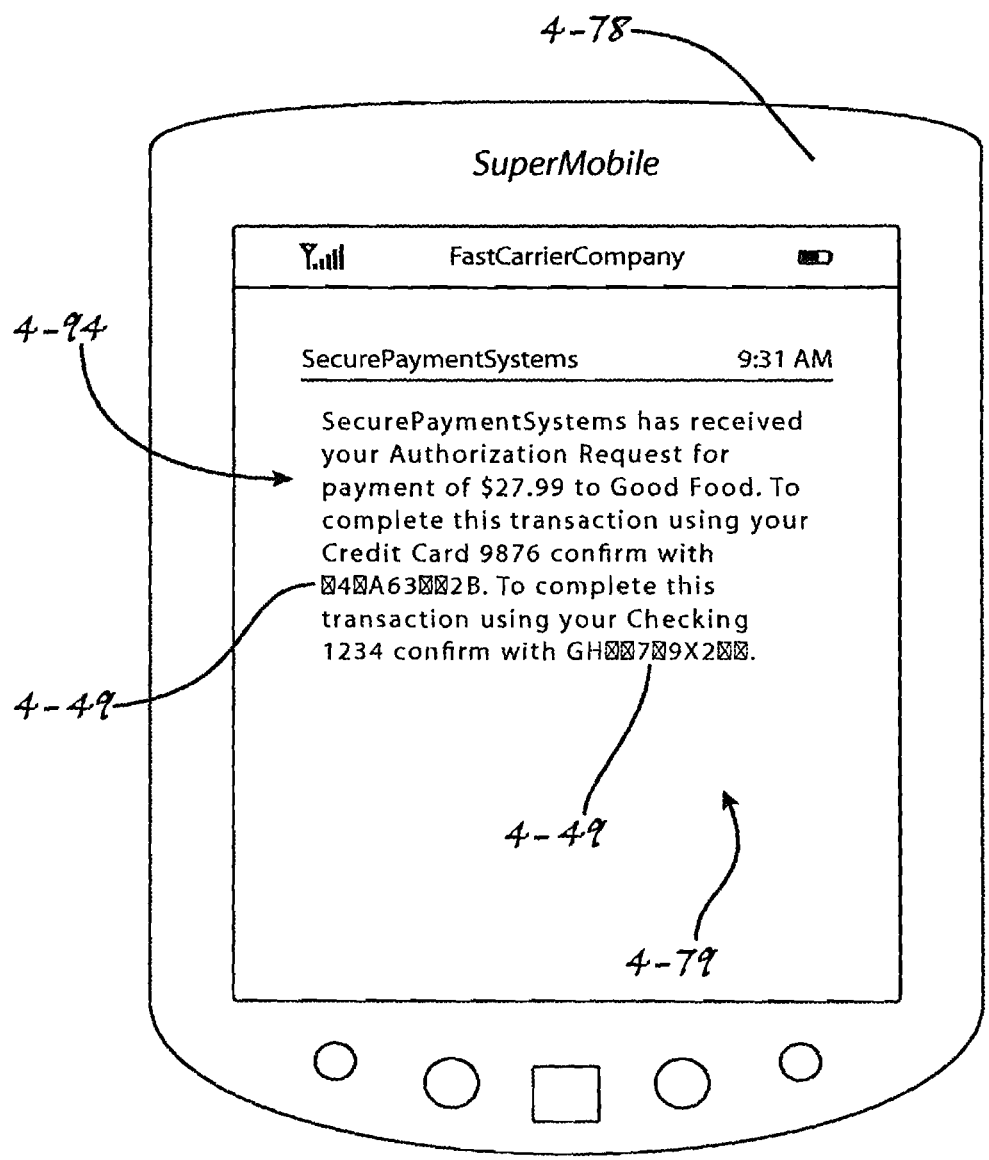
Figure 5:
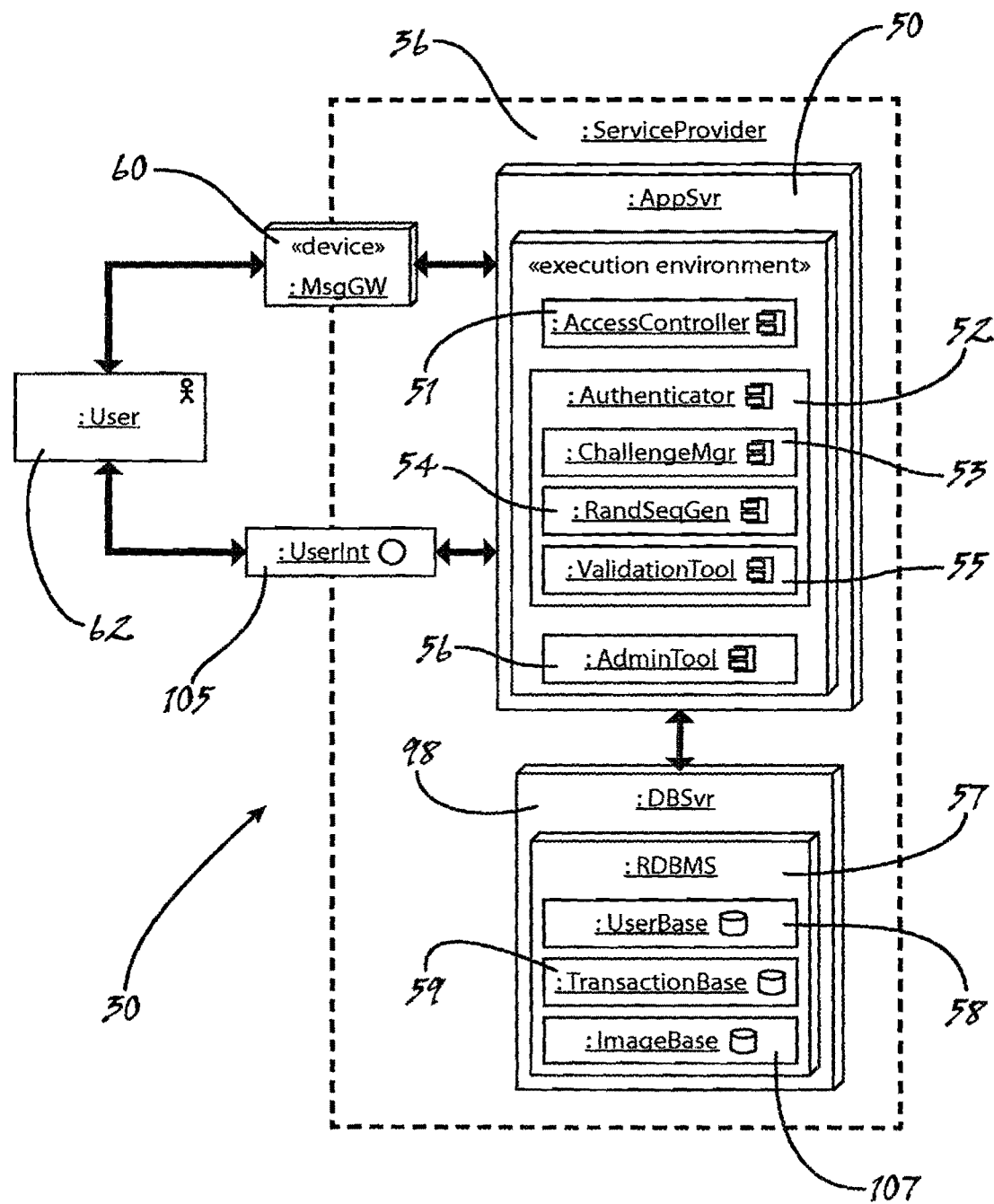
Figures 1, 5:
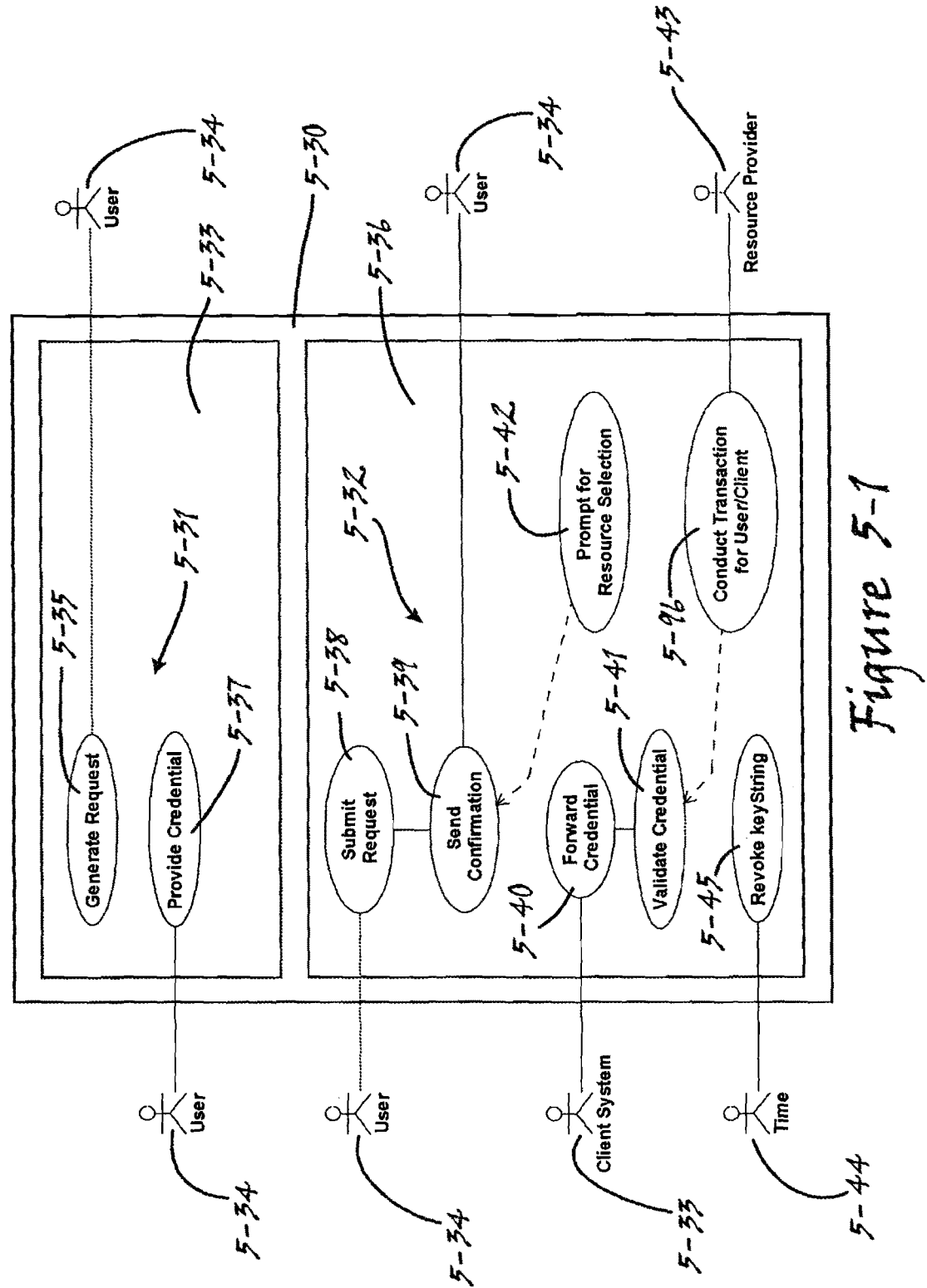
Figures 2, 5:
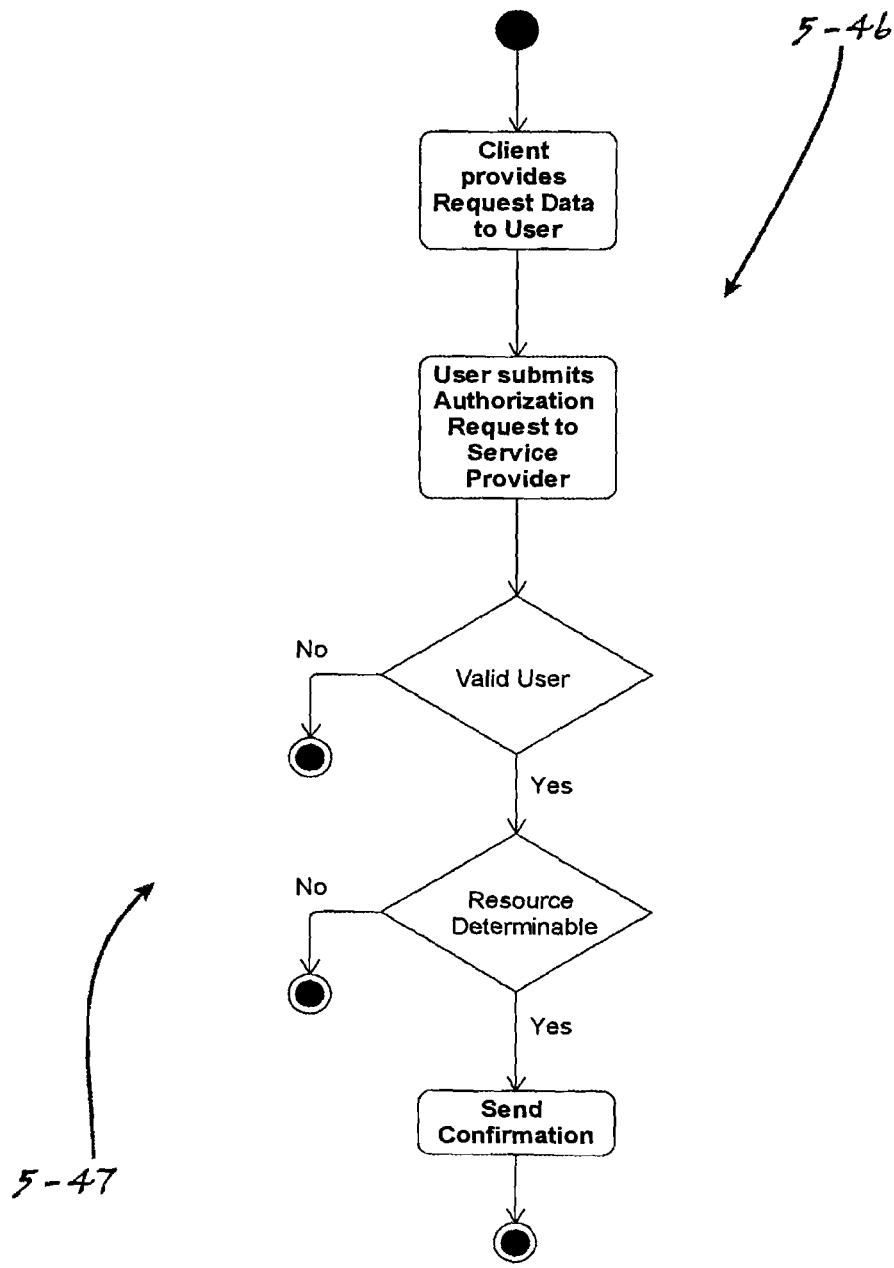
Figures 3, 5:
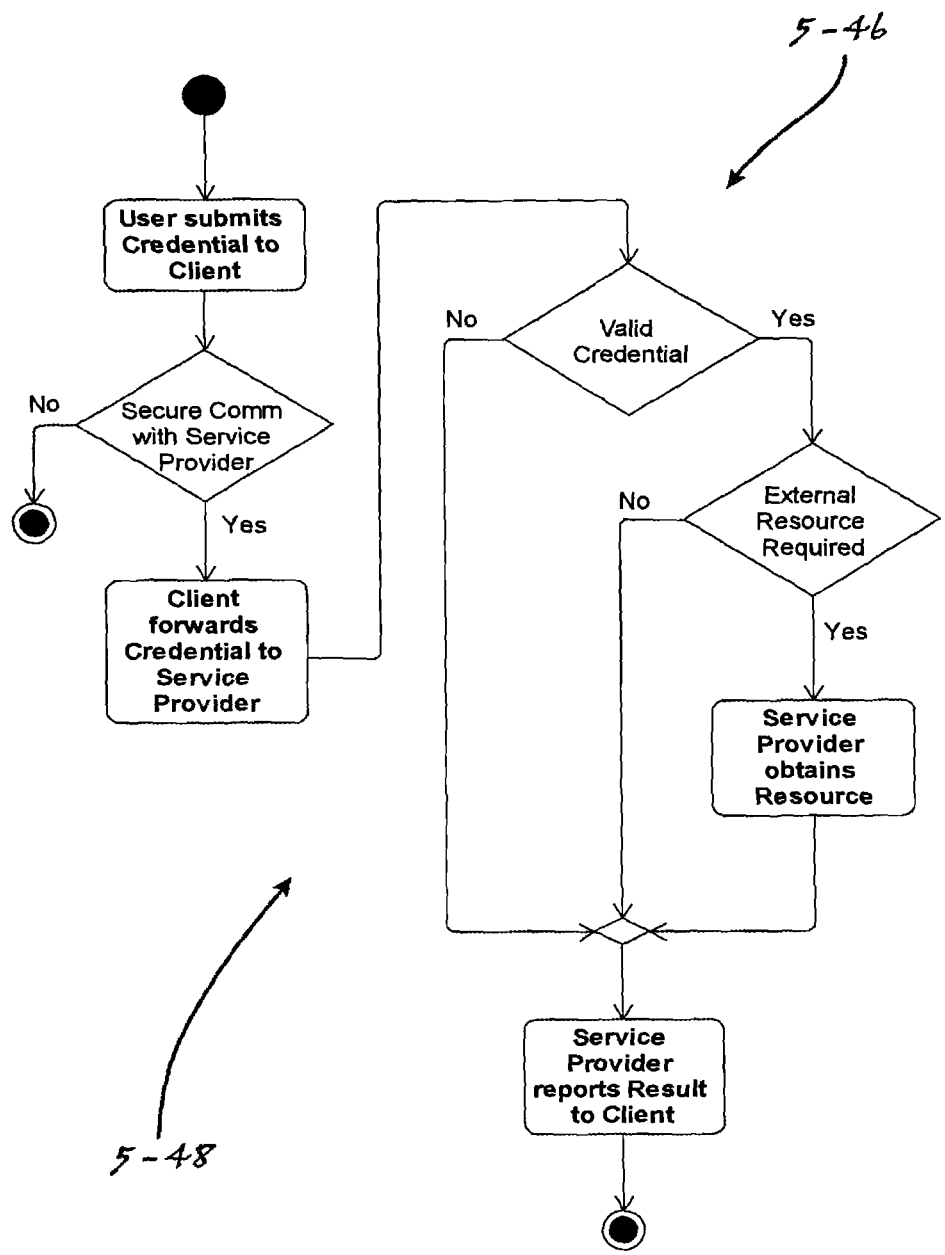
Figures 4, 5:
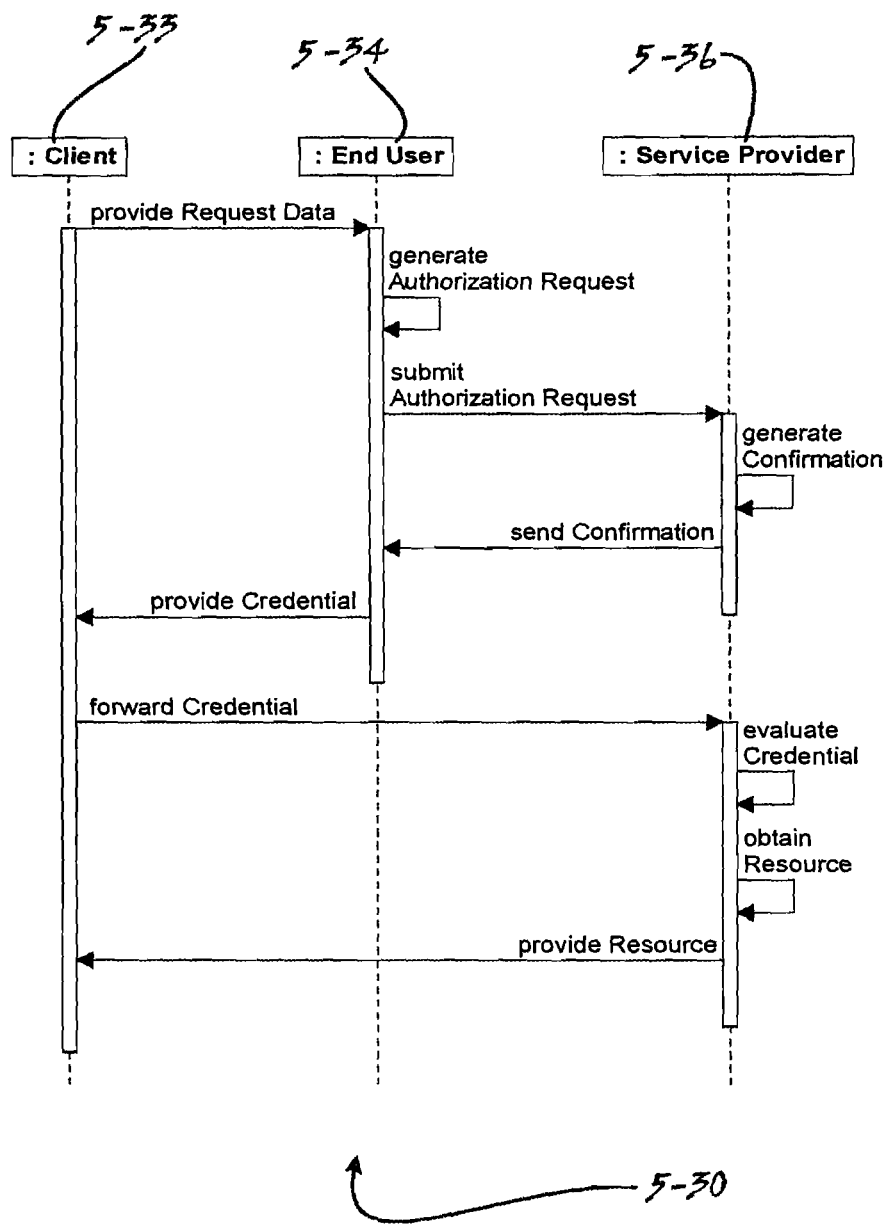
Figure 5:
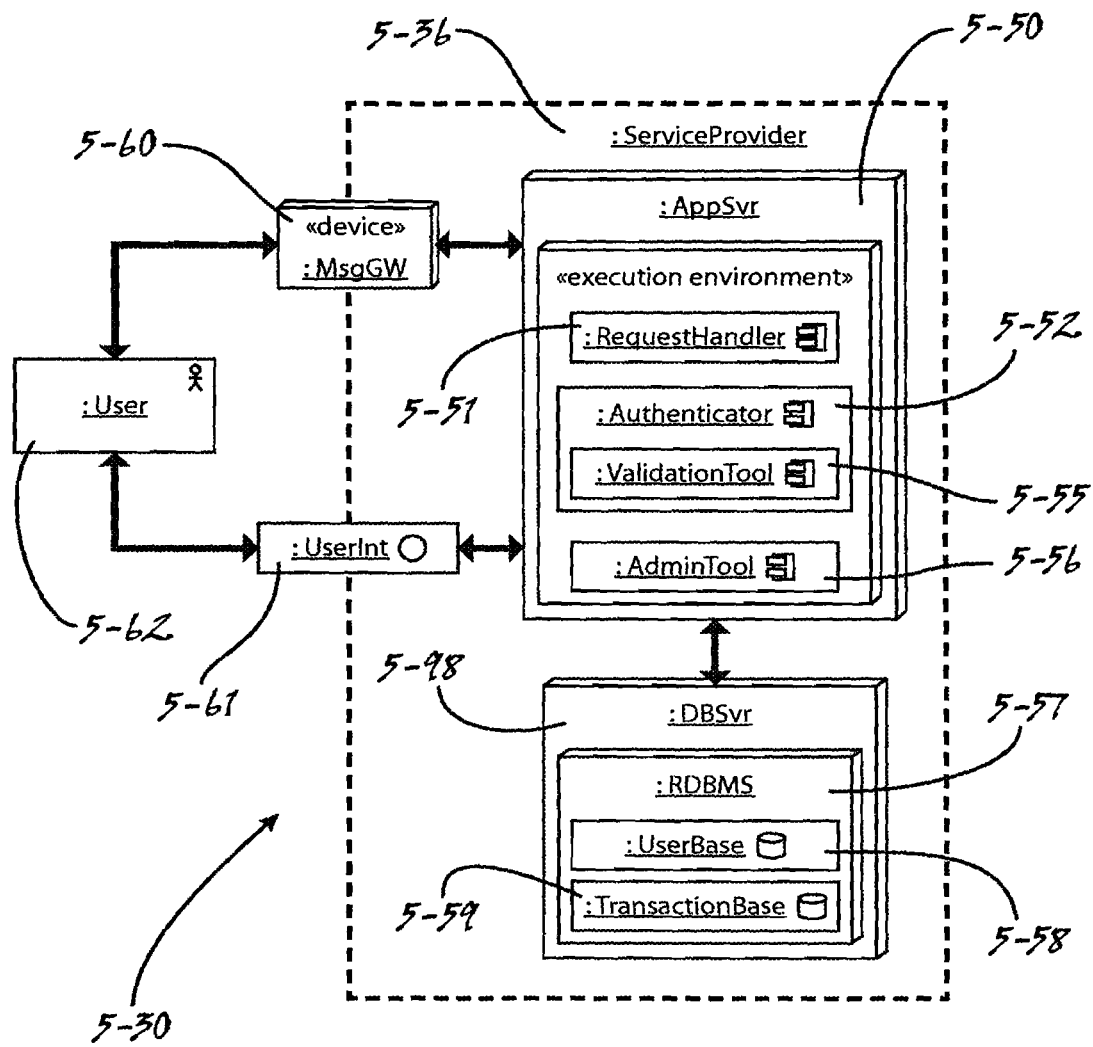
Figures 5, 6:
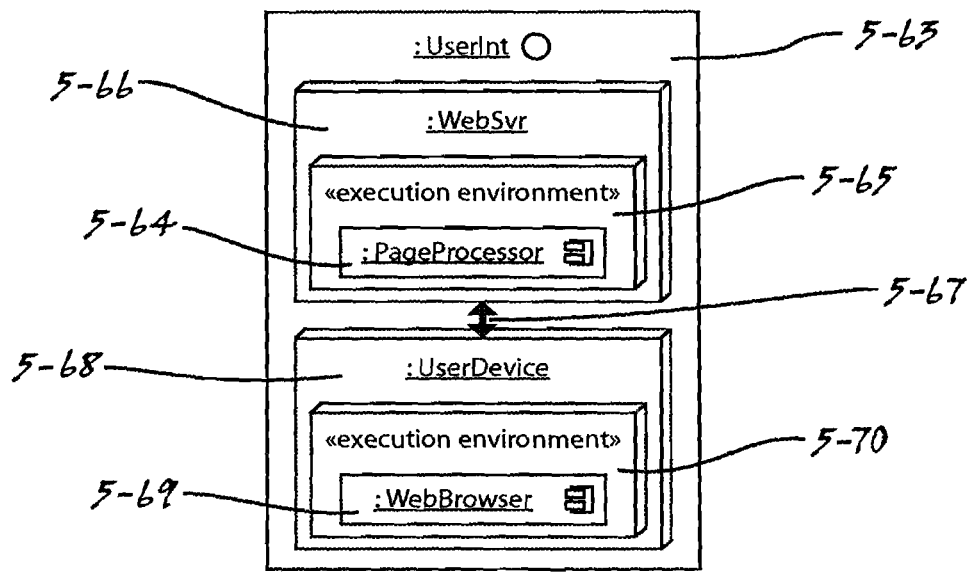
Figures 5, 6, 7, 8, 9:
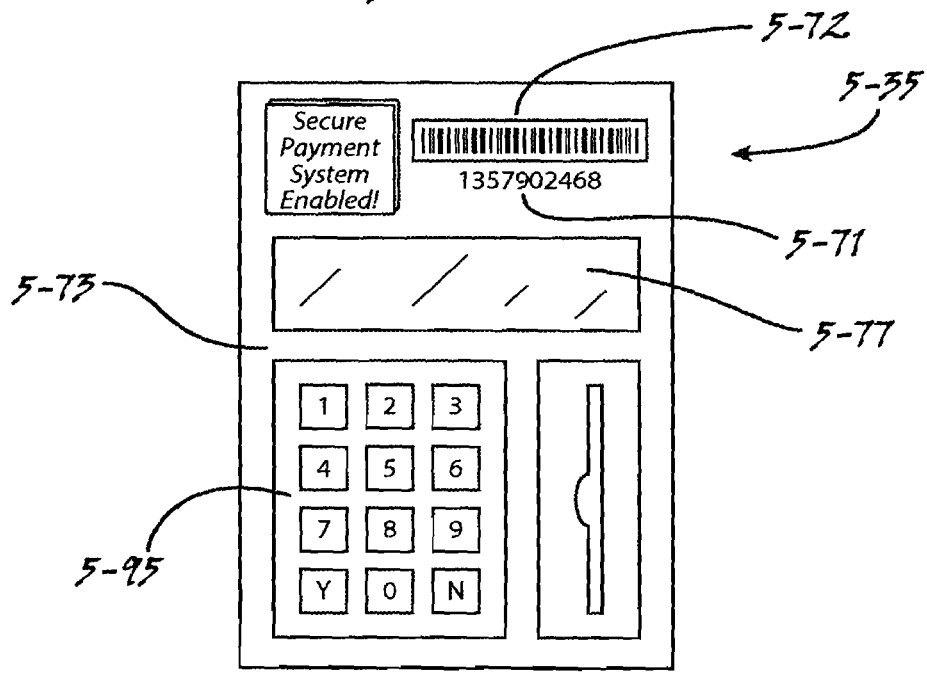
Figures 5, 6, 7:
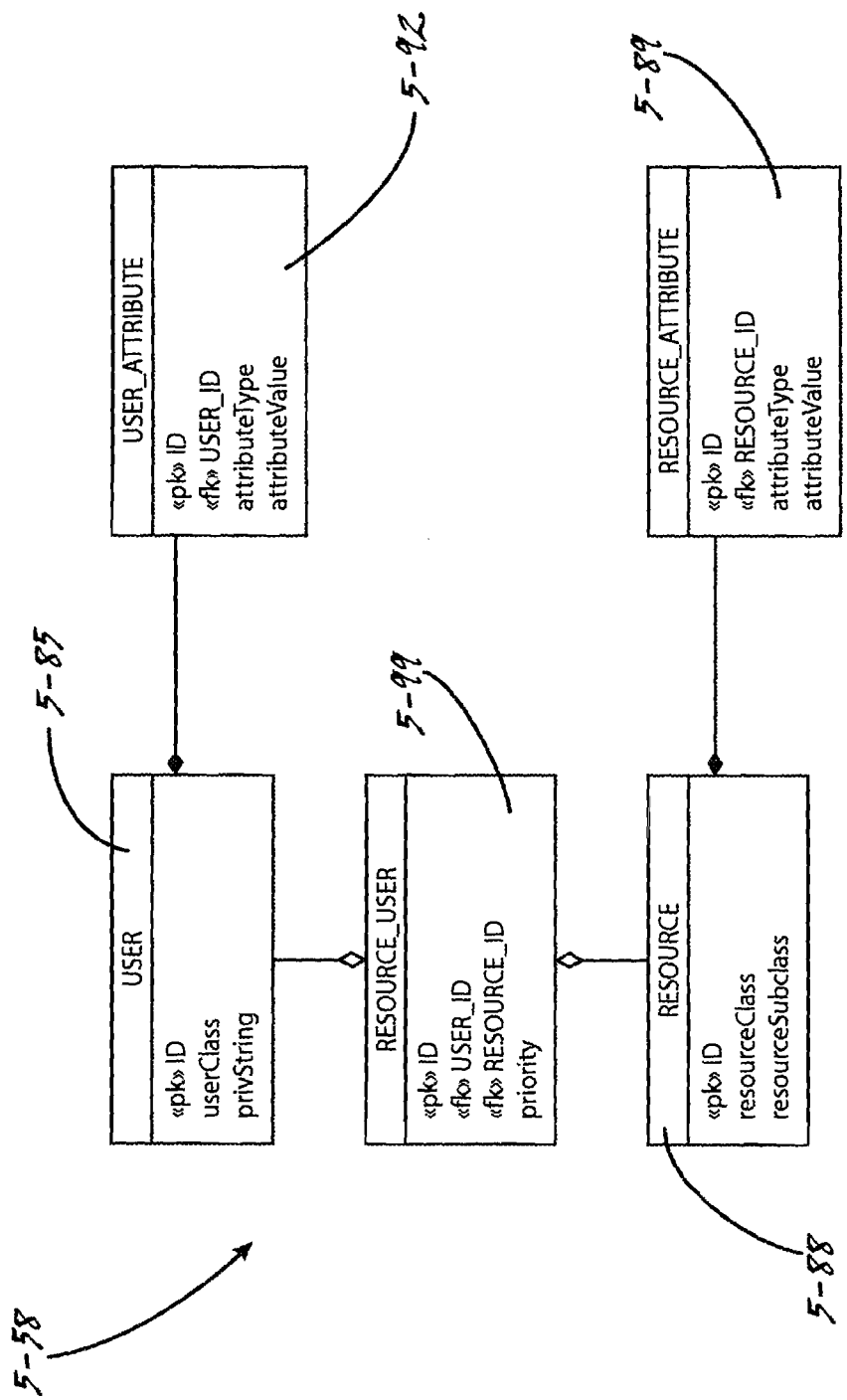
Figures 5, 6, 7, 8:
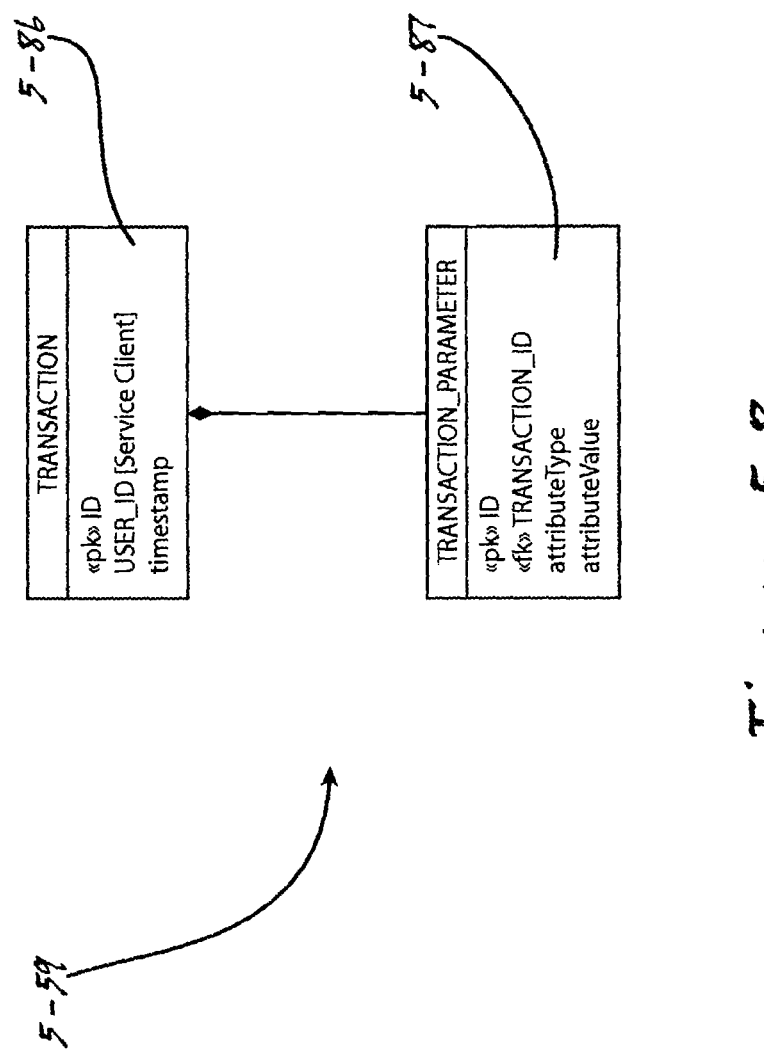
Figures 5, 6, 7, 8, 9, 10:
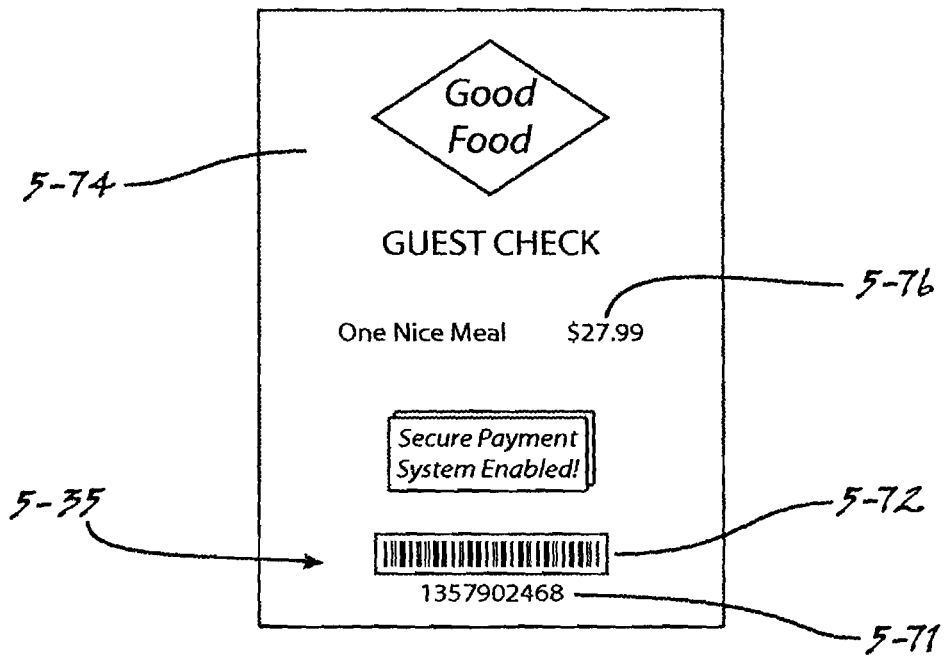
Figures 5, 6, 7, 8, 9, 10, 11:
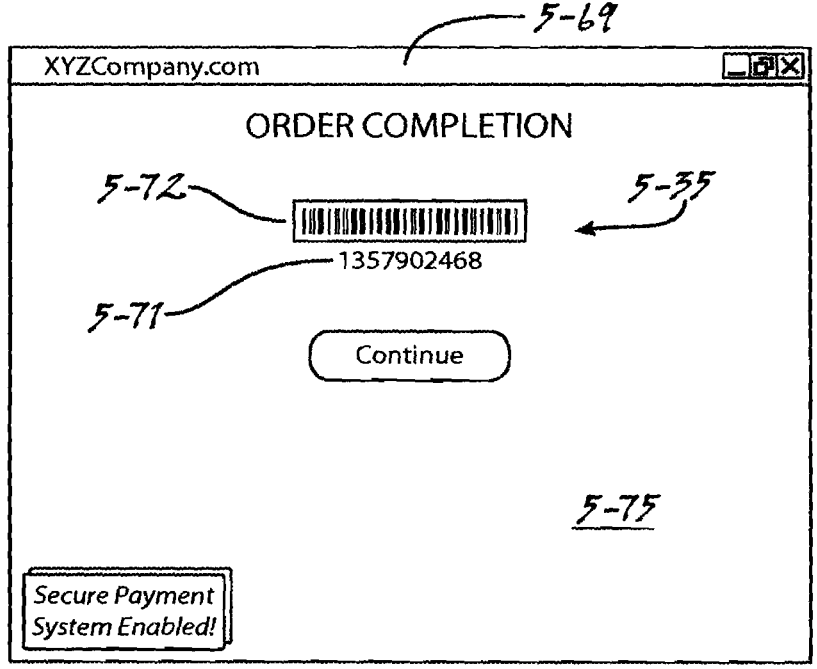
Figures 5, 6, 7, 8, 9, 10, 11, 12:
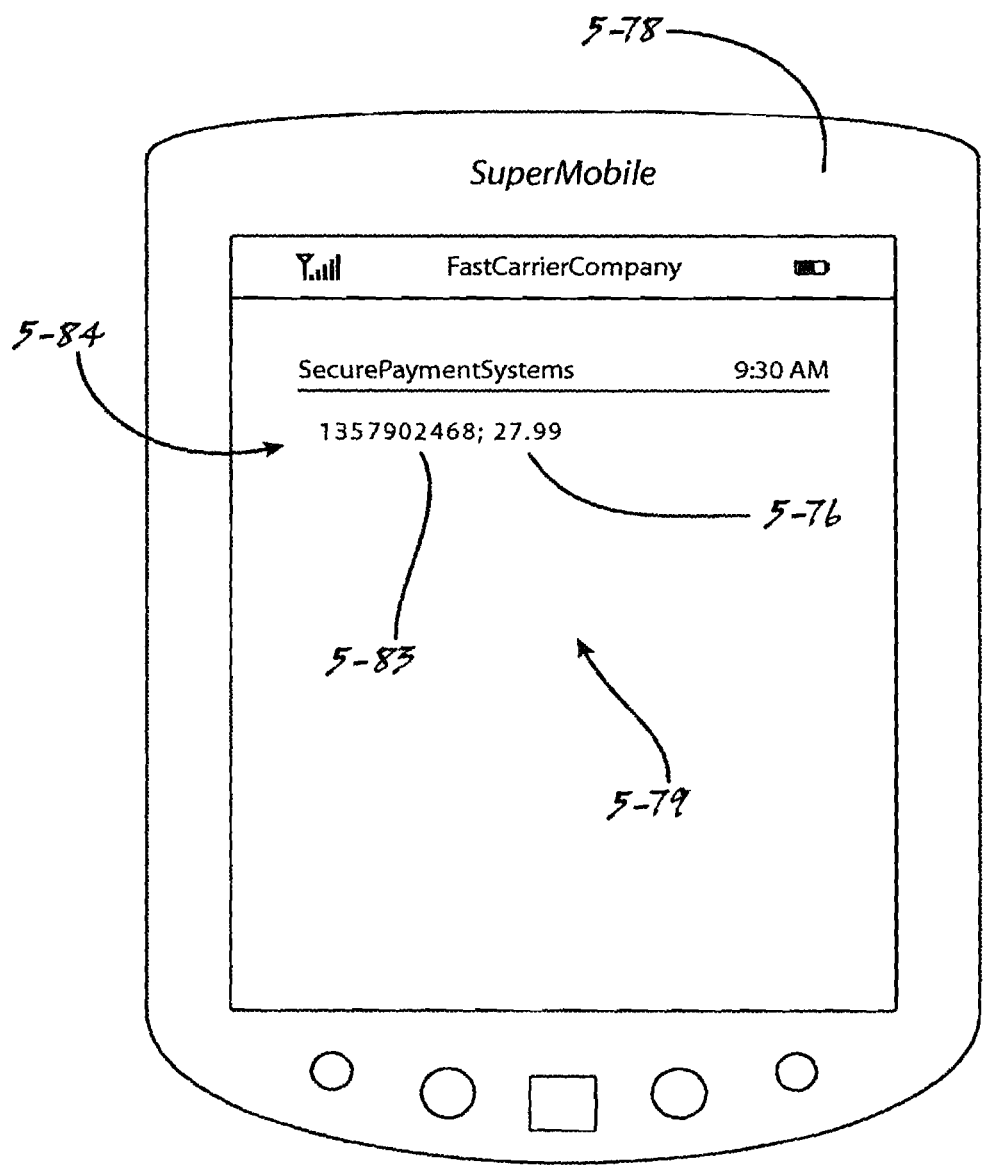
Figures 5, 6, 7, 8, 9, 10, 11, 12, 13:
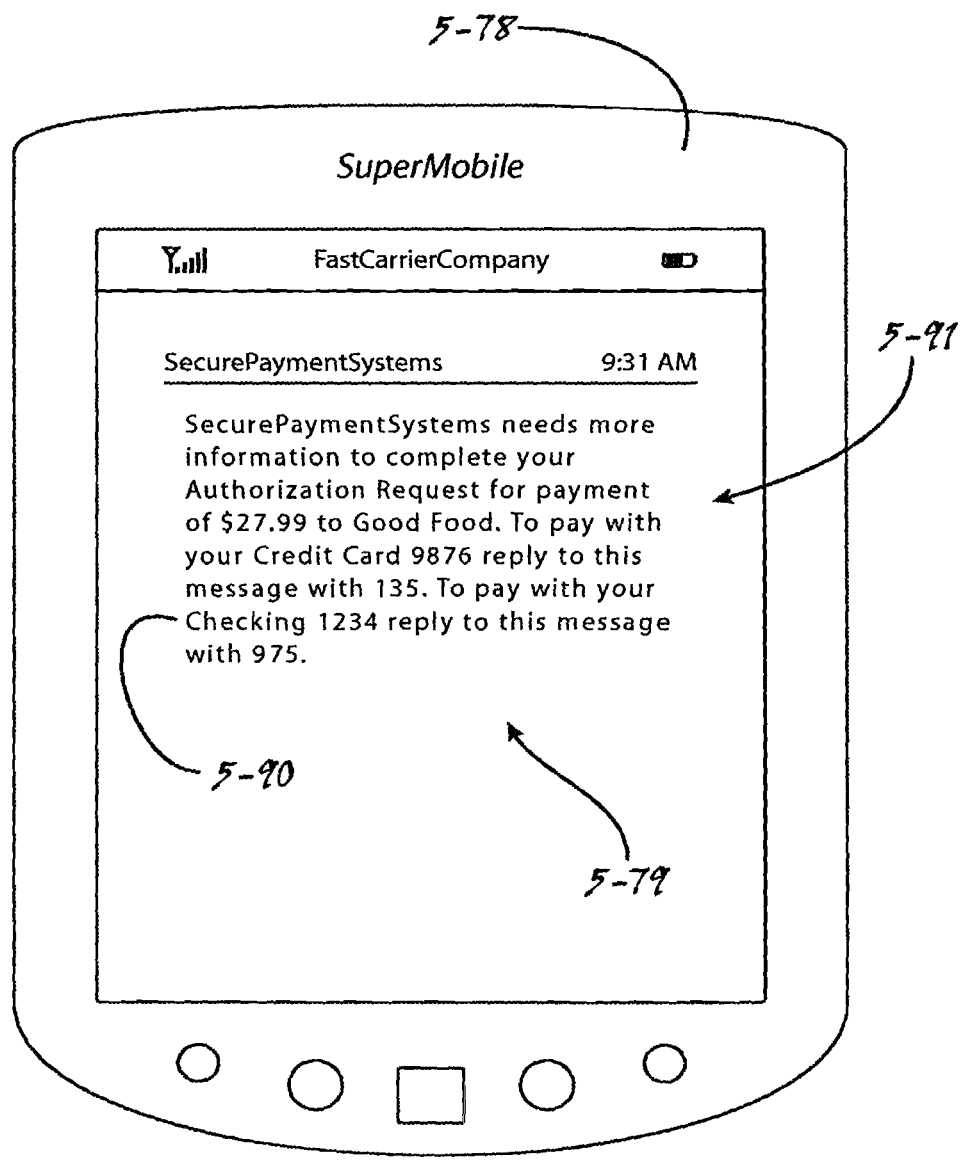
Figures 5, 6, 7, 8, 9, 10, 11, 12, 13, 14:
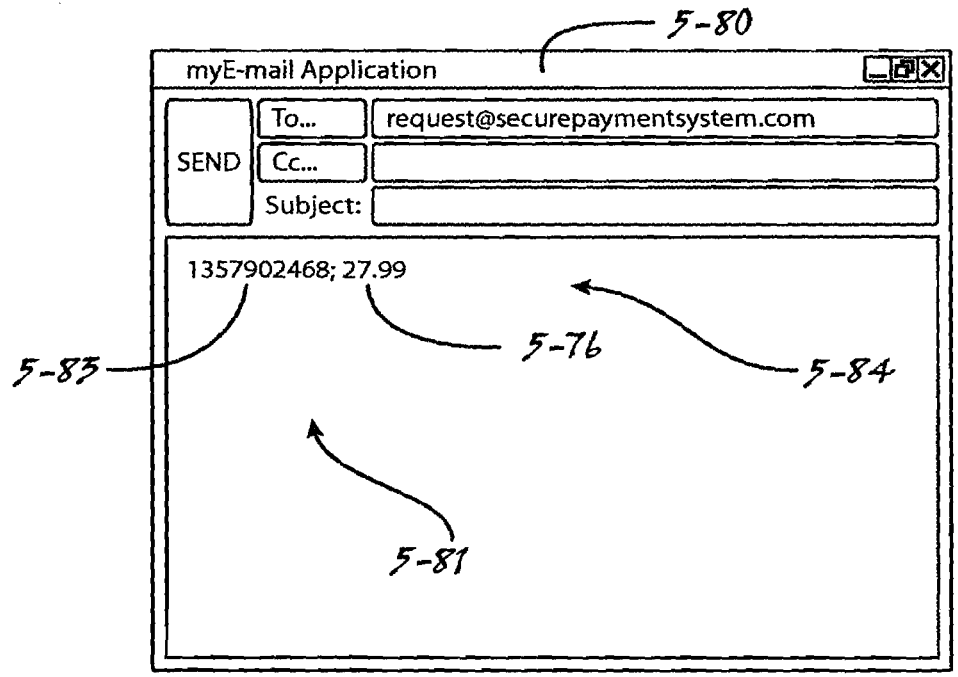
Figures 5, 6, 7, 8, 9, 10, 11, 12, 13, 14, 15:
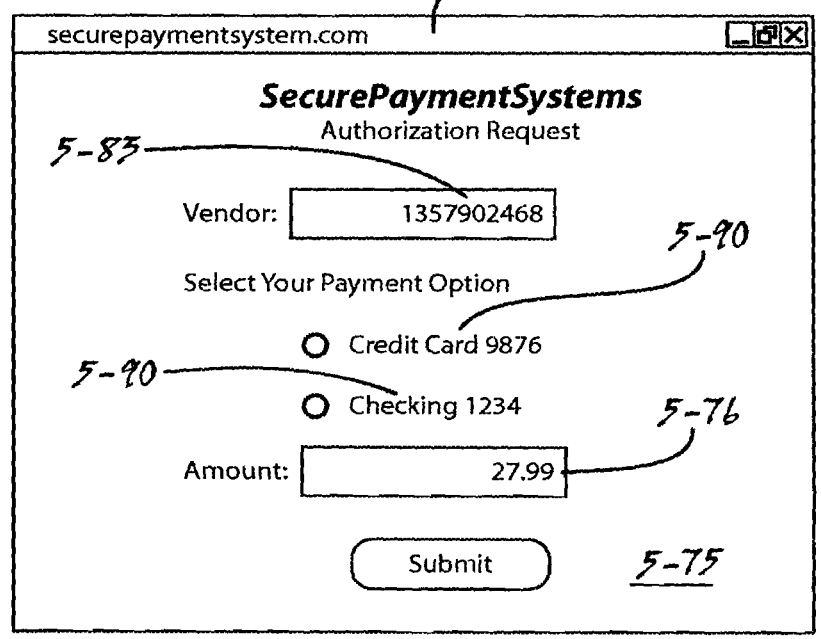
Figures 5, 6, 7, 8, 9, 10, 11, 12, 13, 14, 15, 16:
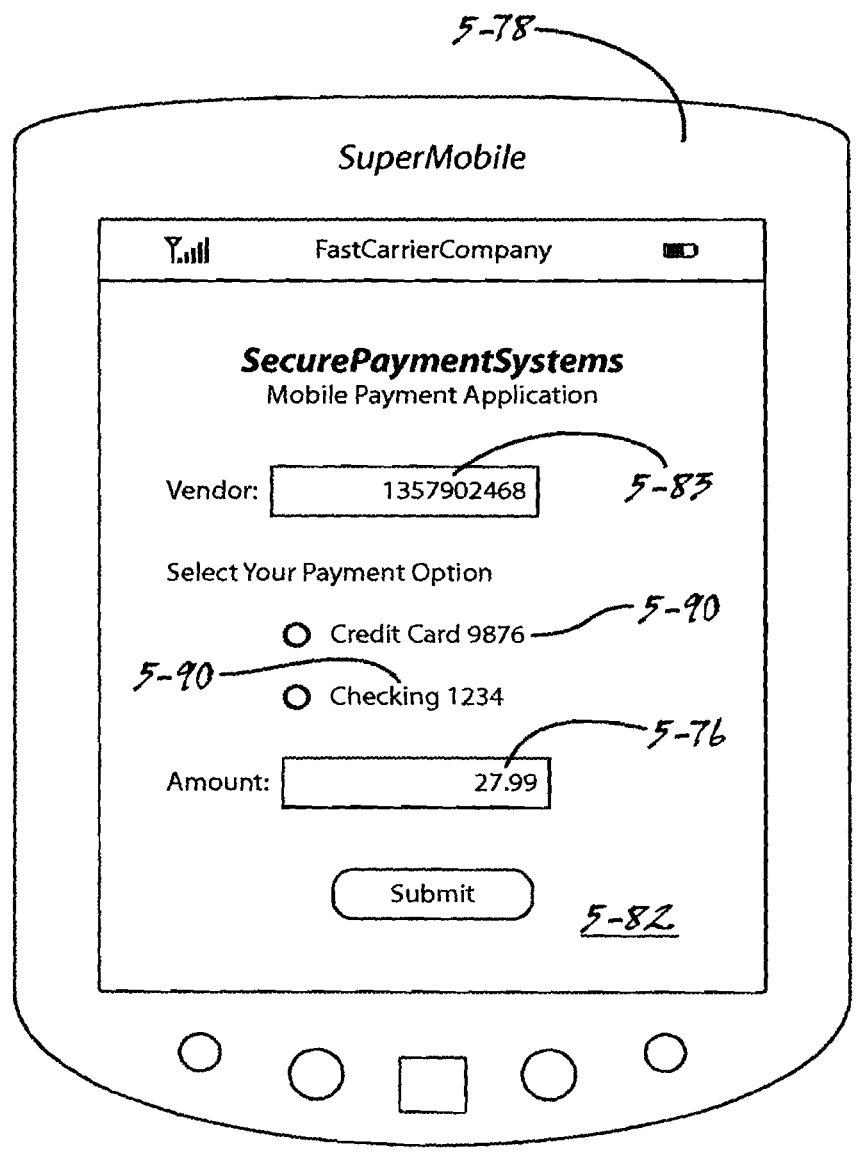
Figures 5, 6, 7, 8, 9, 10, 11, 12, 13, 14, 15, 16, 17:
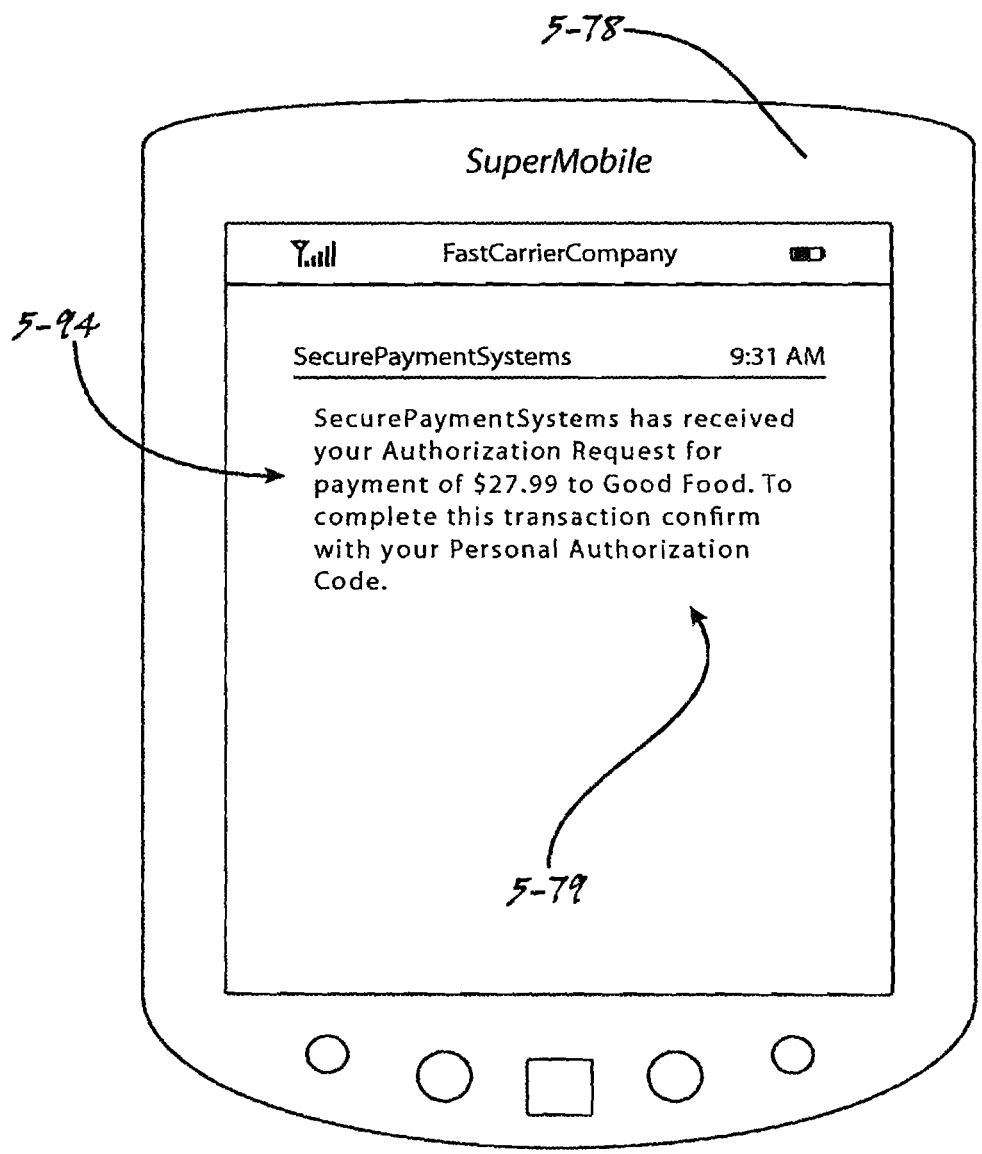
Figure 6:
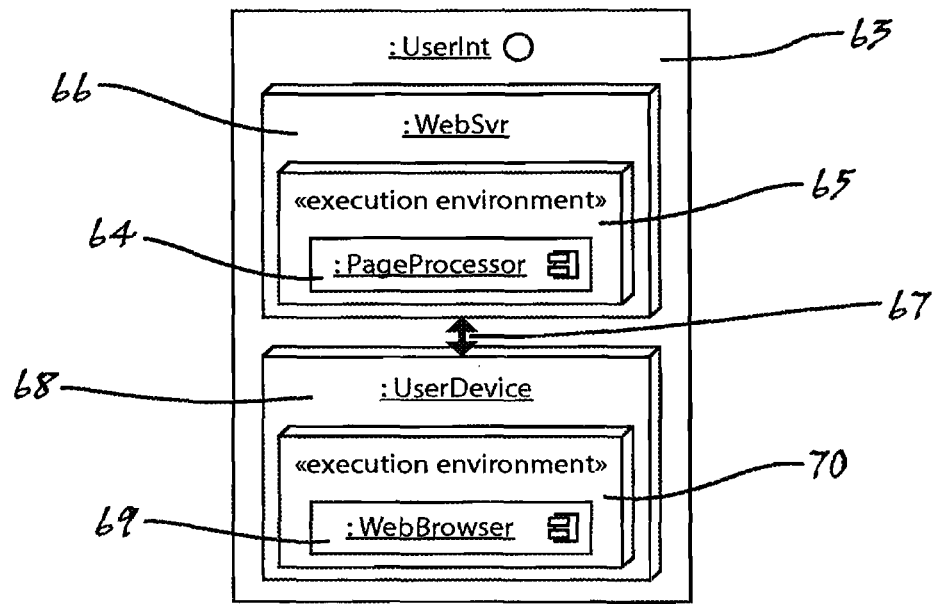
Figure 7:
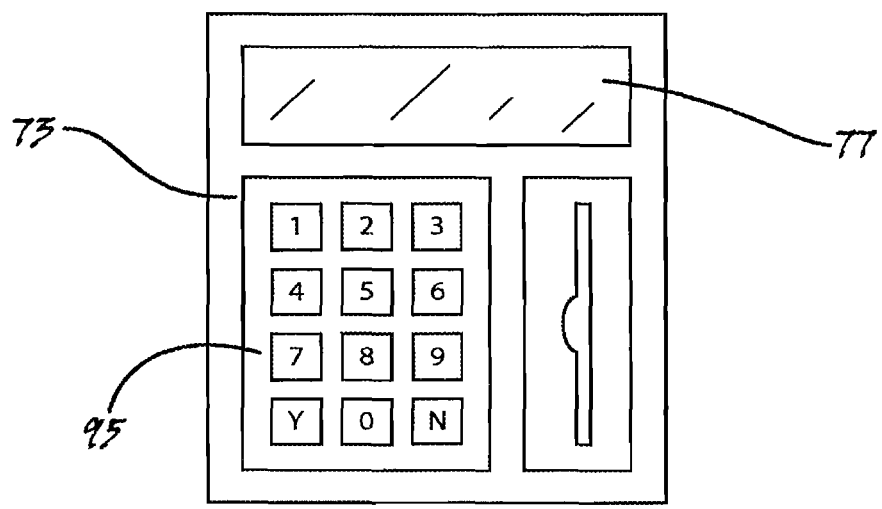
Figures 1, 6:
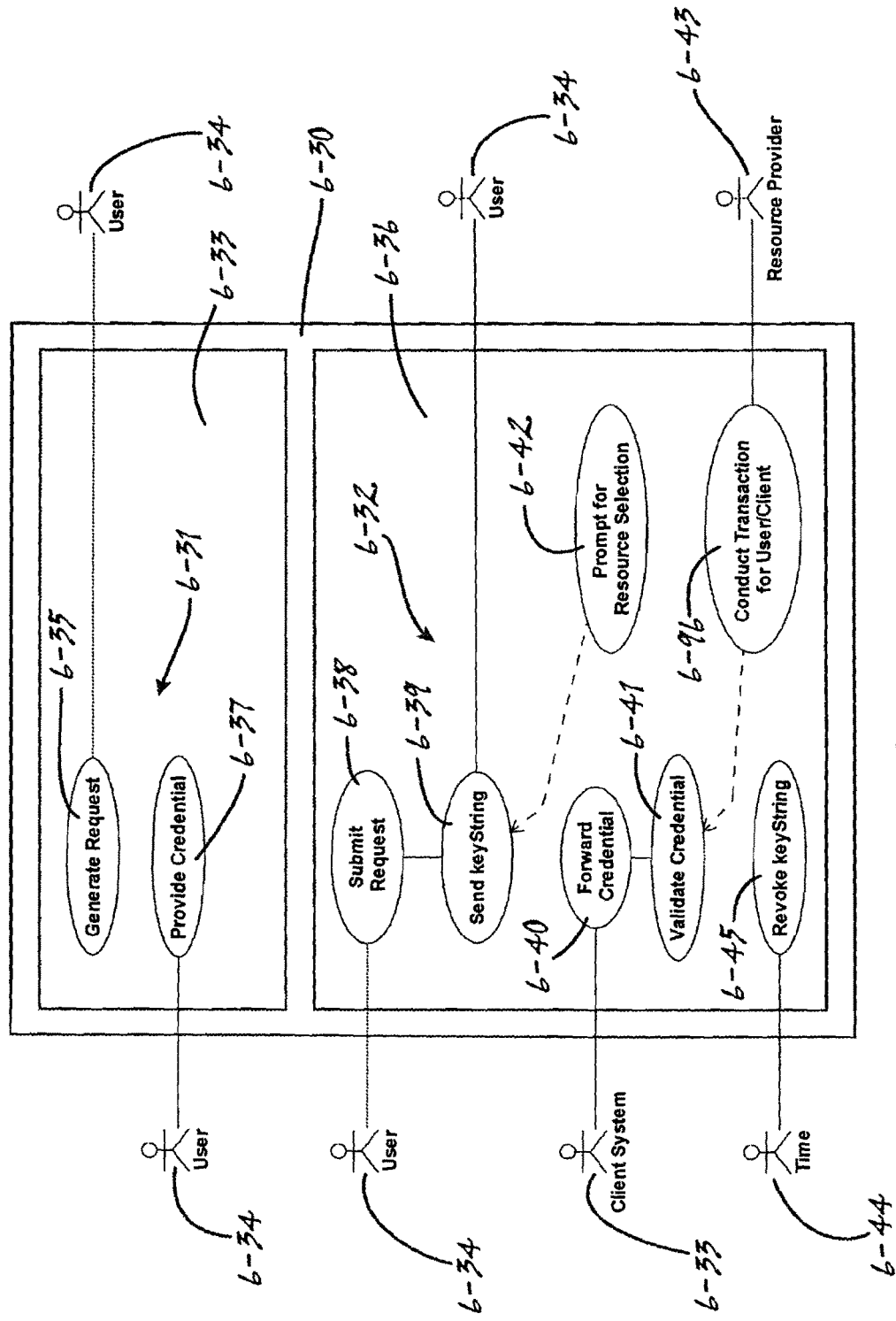
Figures 2, 6:
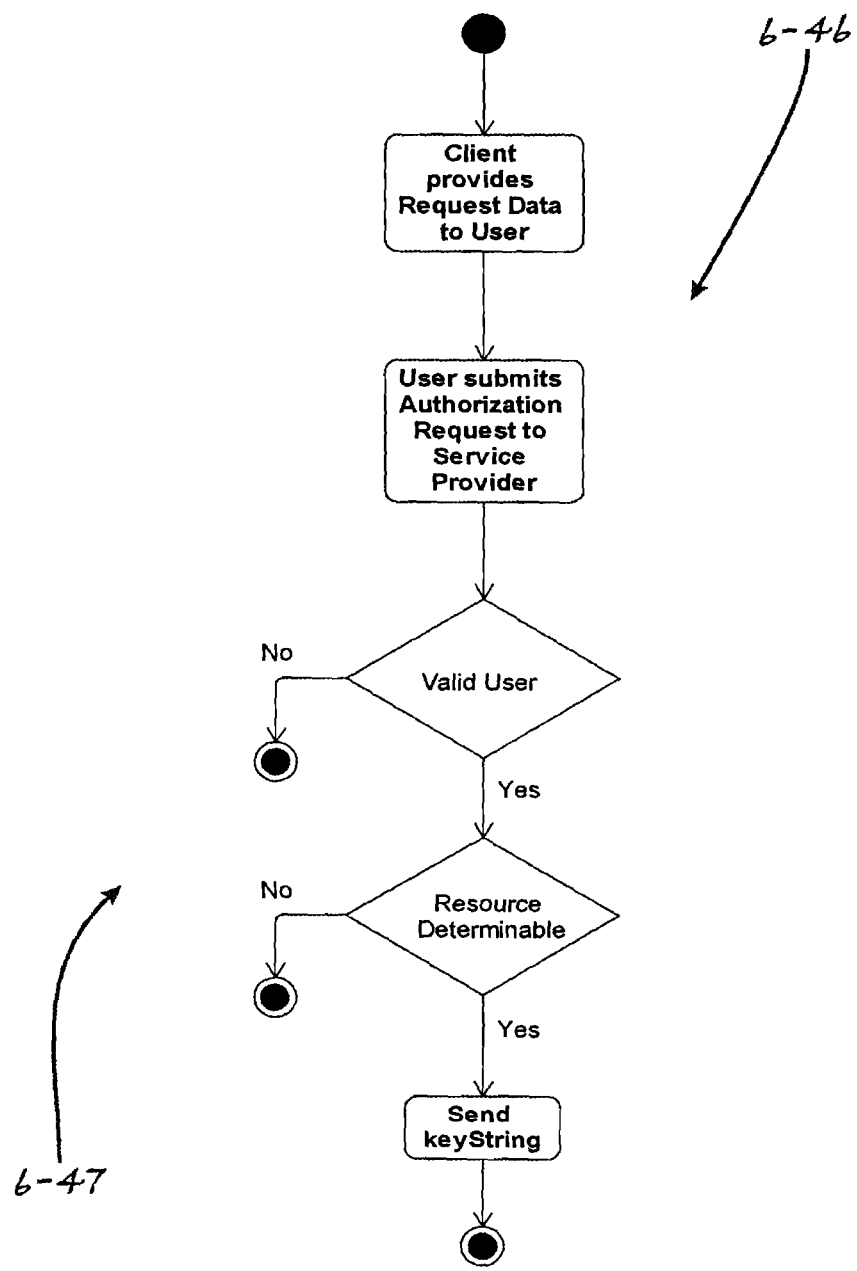
Figures 3, 6:
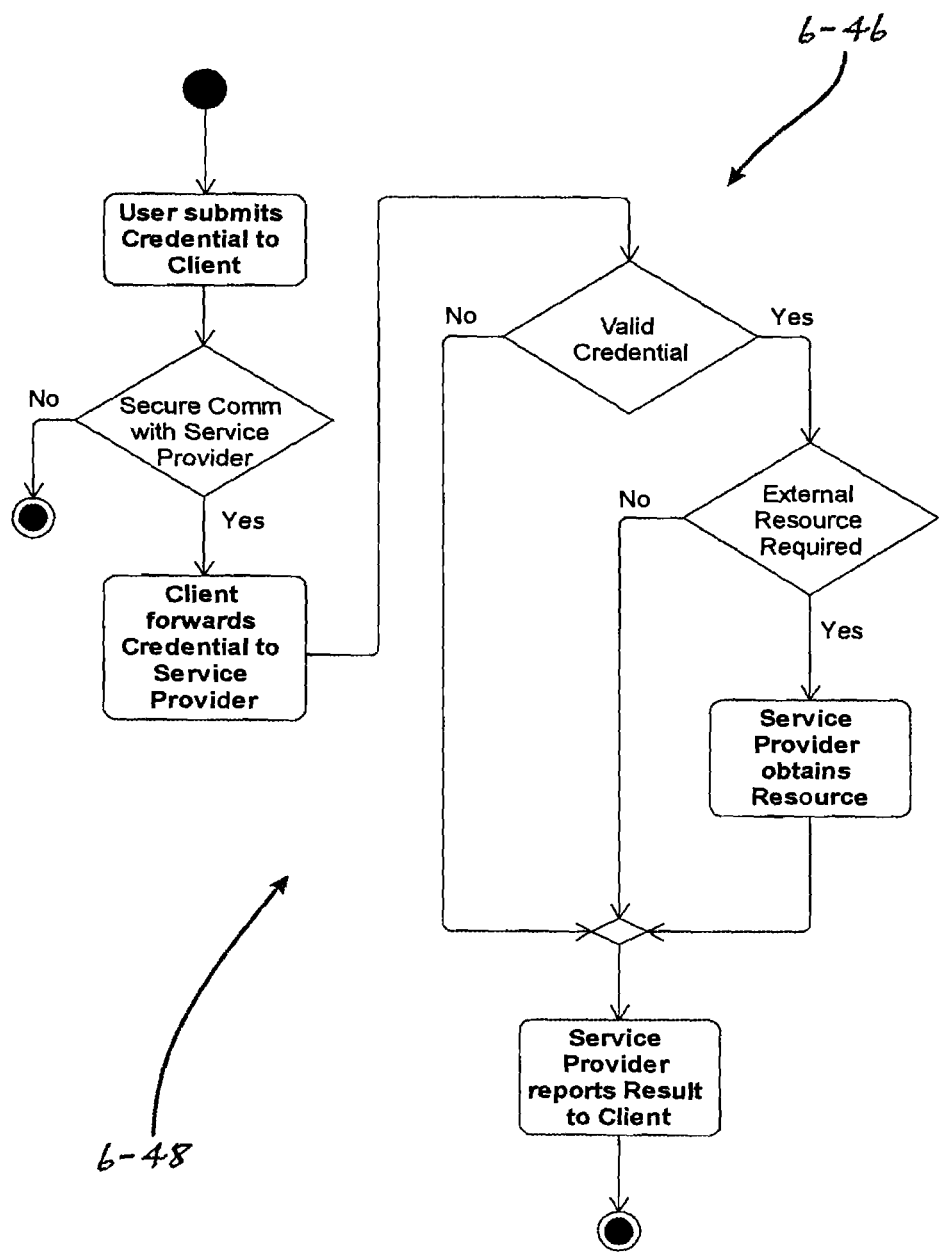
Figures 4, 6:
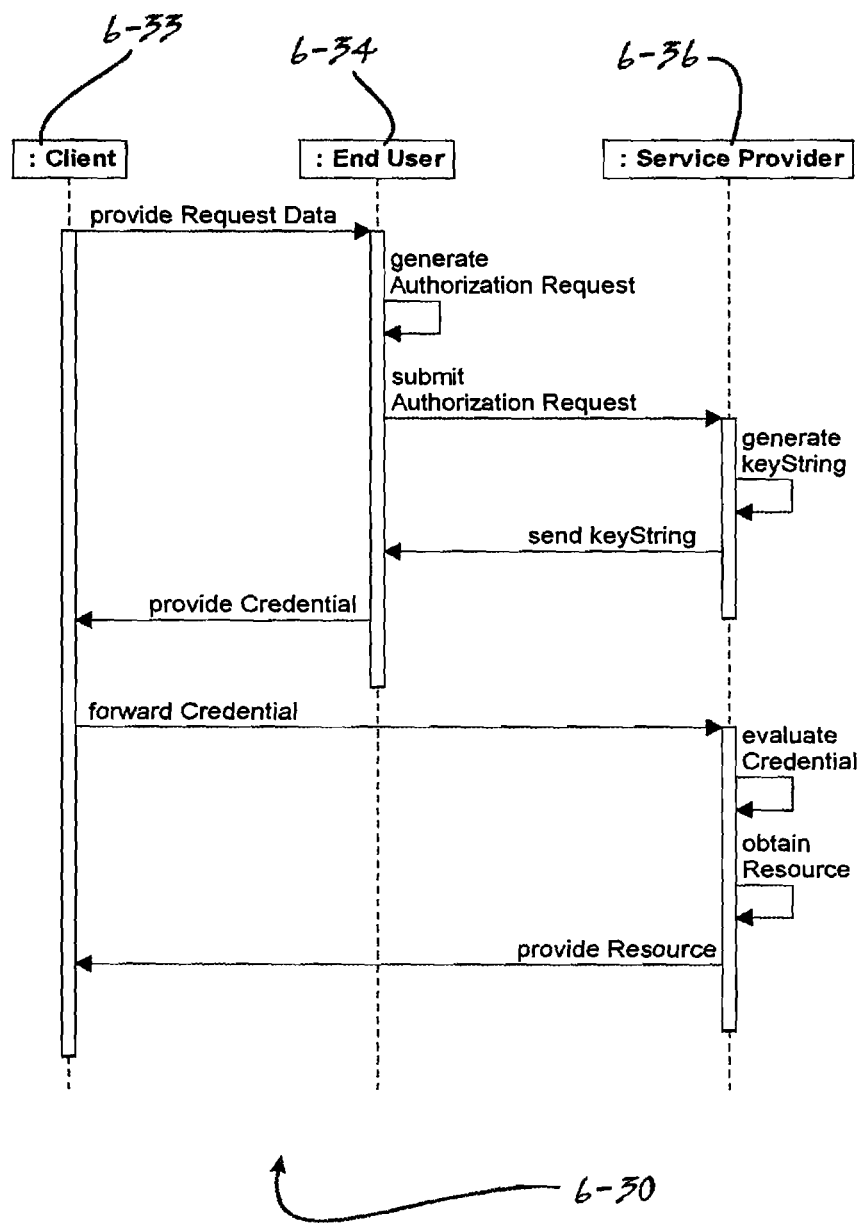
Figures 5, 6:
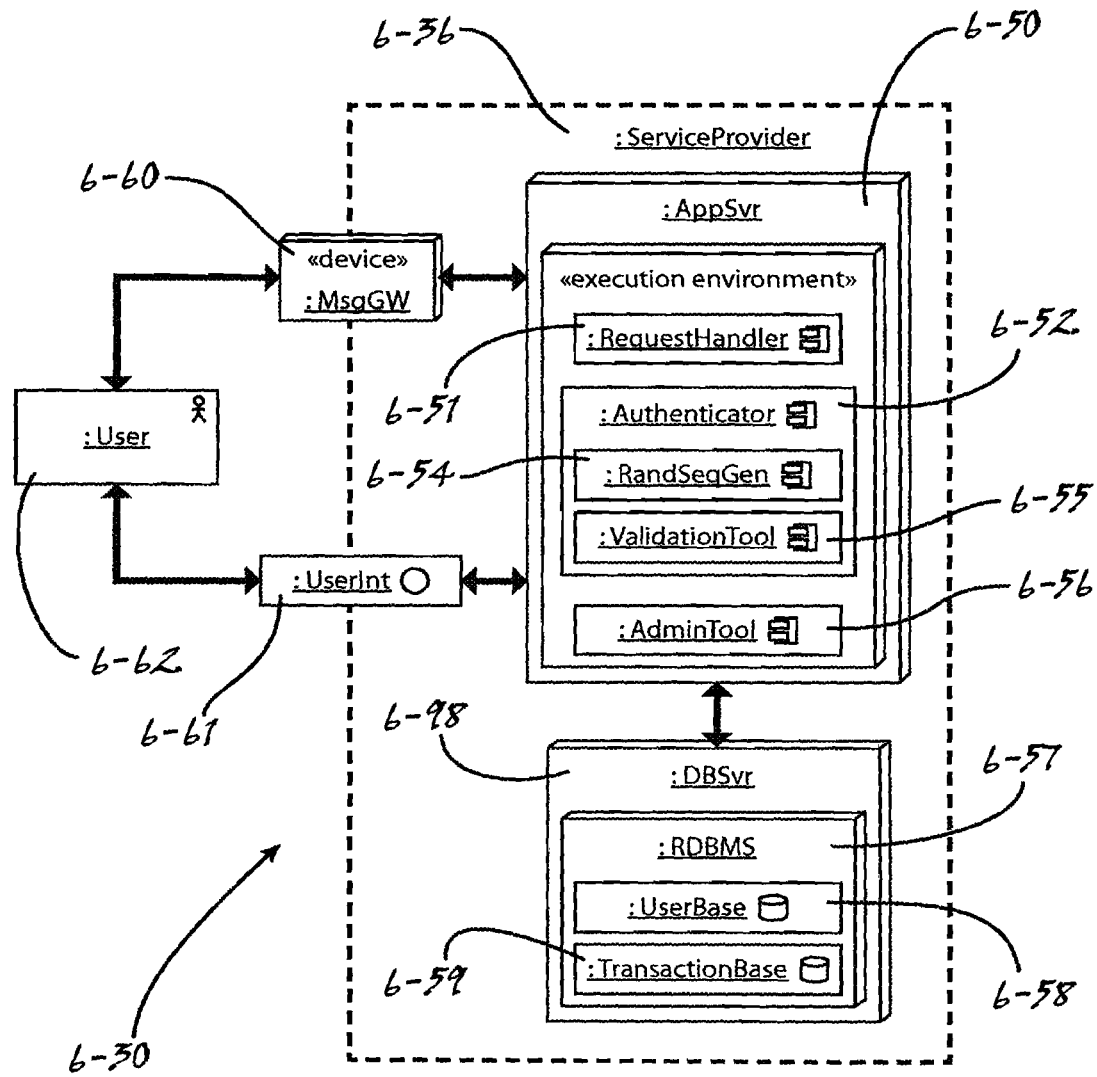
Figure 6:
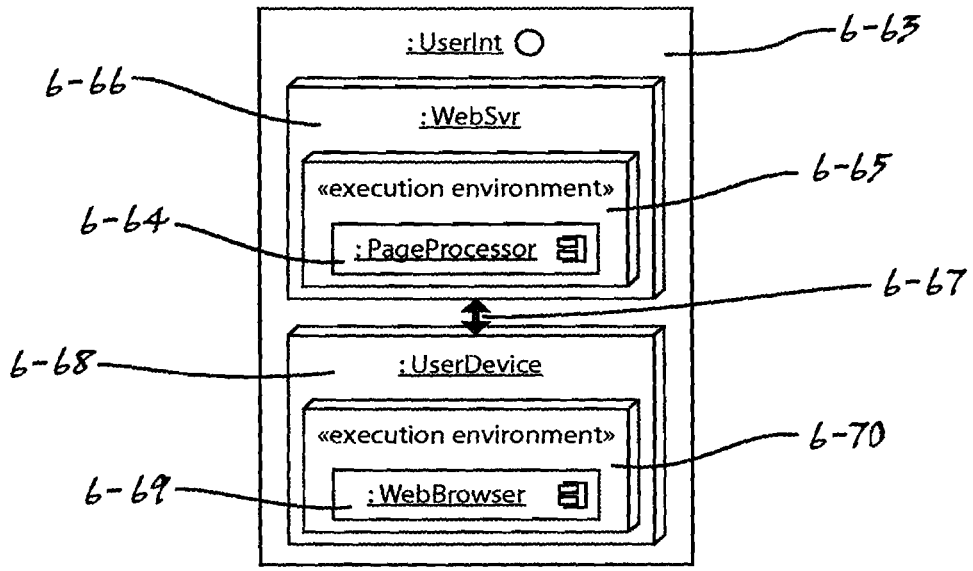
Figures 6, 7, 8, 9:
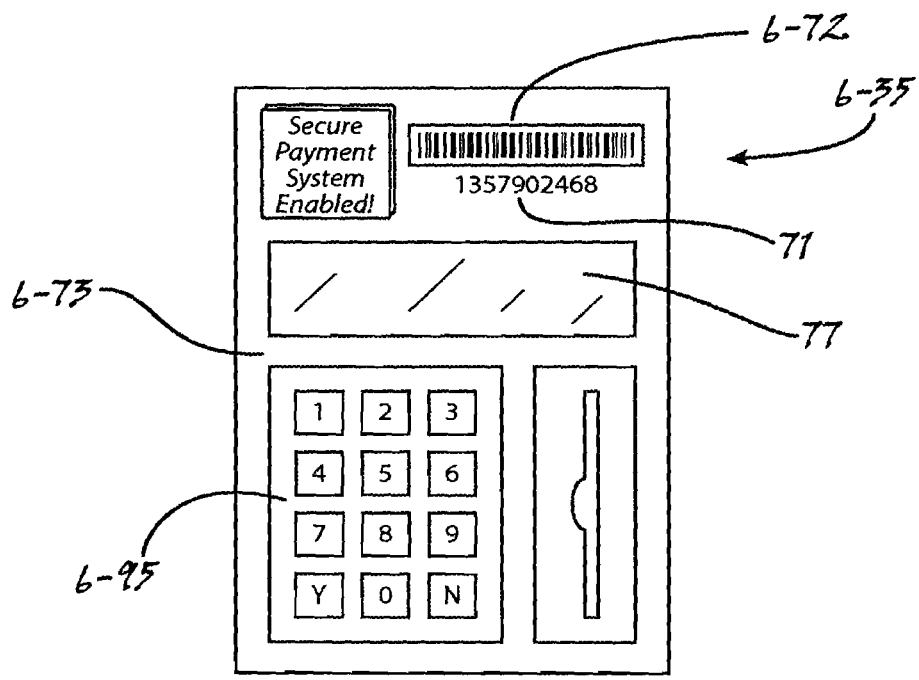
Figures 6, 7:
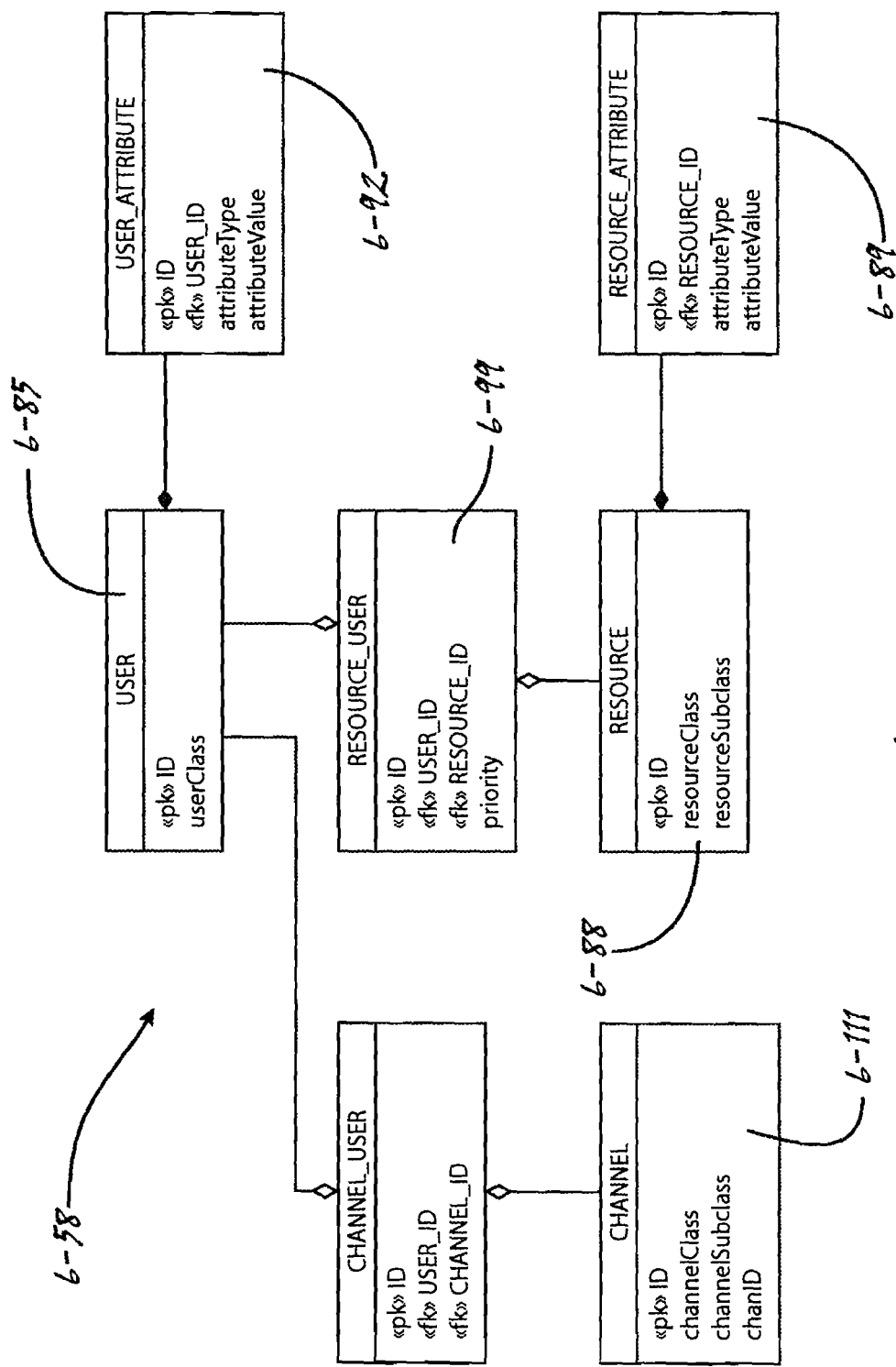
Figures 6, 7, 8:
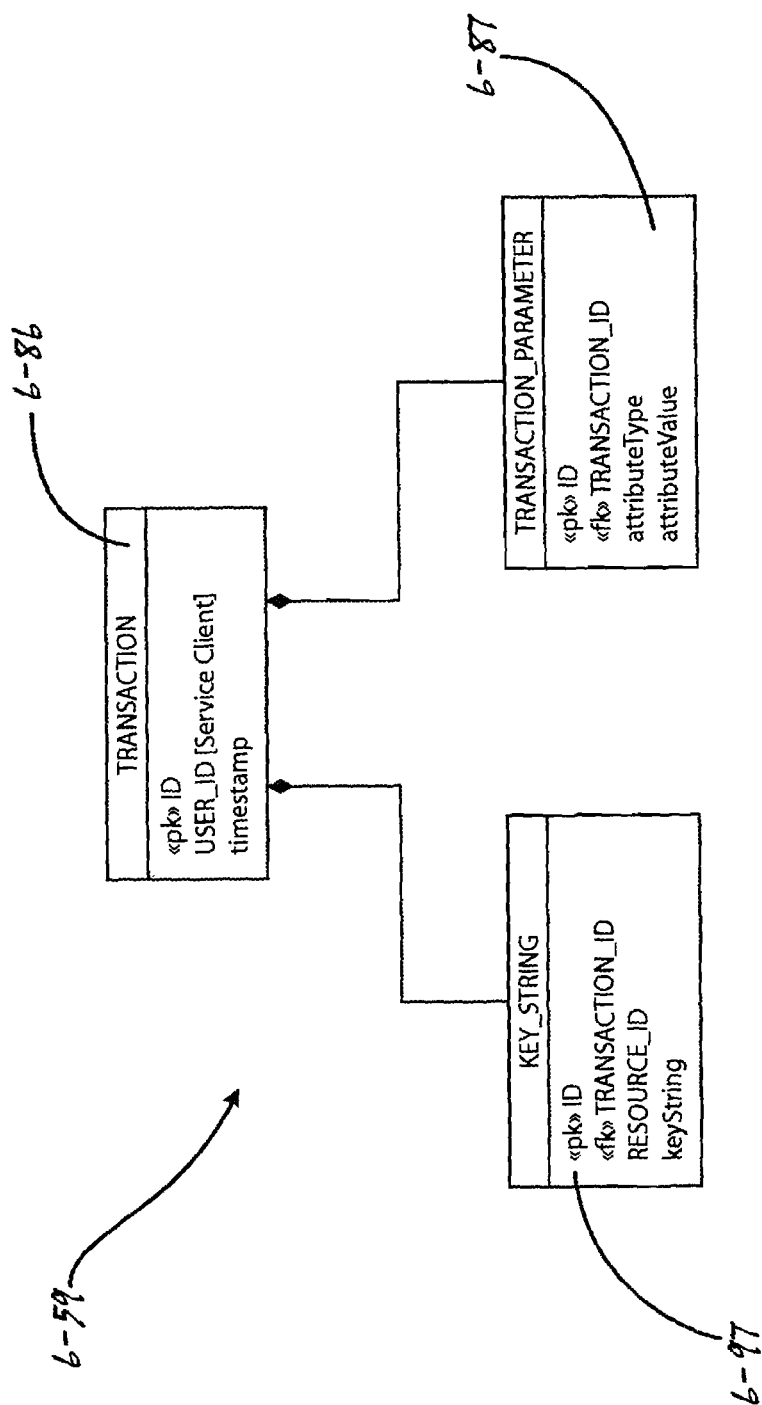
Figures 6, 7, 8, 9, 10:
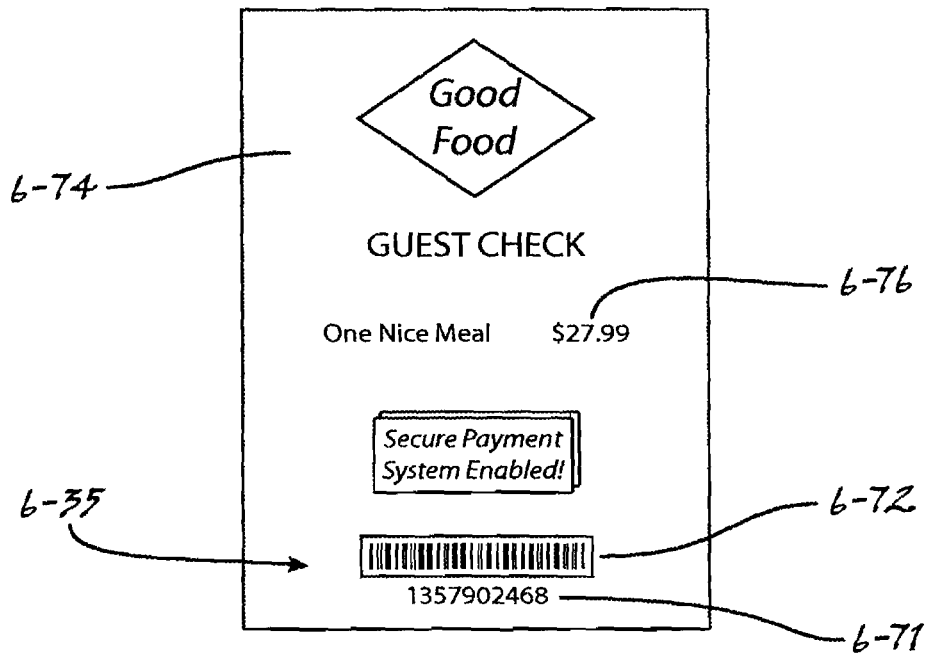
Figures 6, 7, 8, 9, 10, 11:
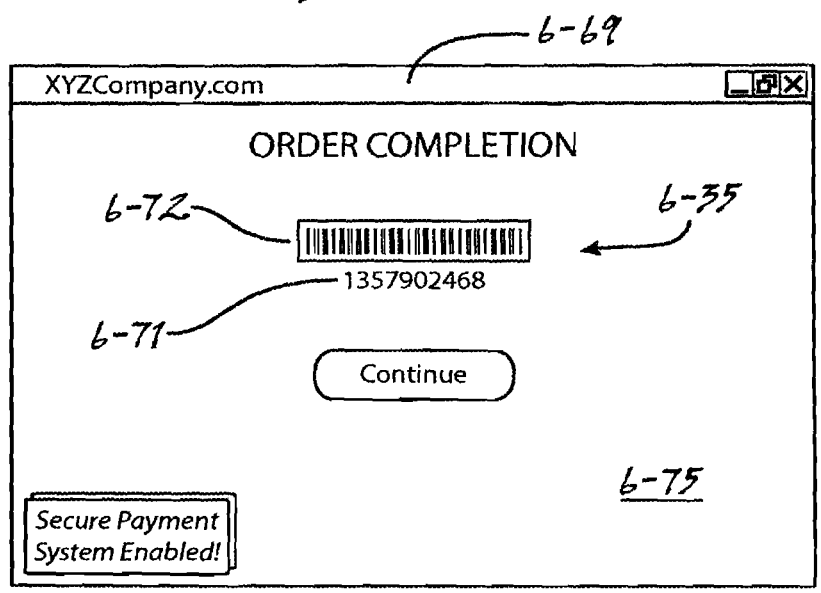
Figures 6, 7, 8, 9, 10, 11, 12:
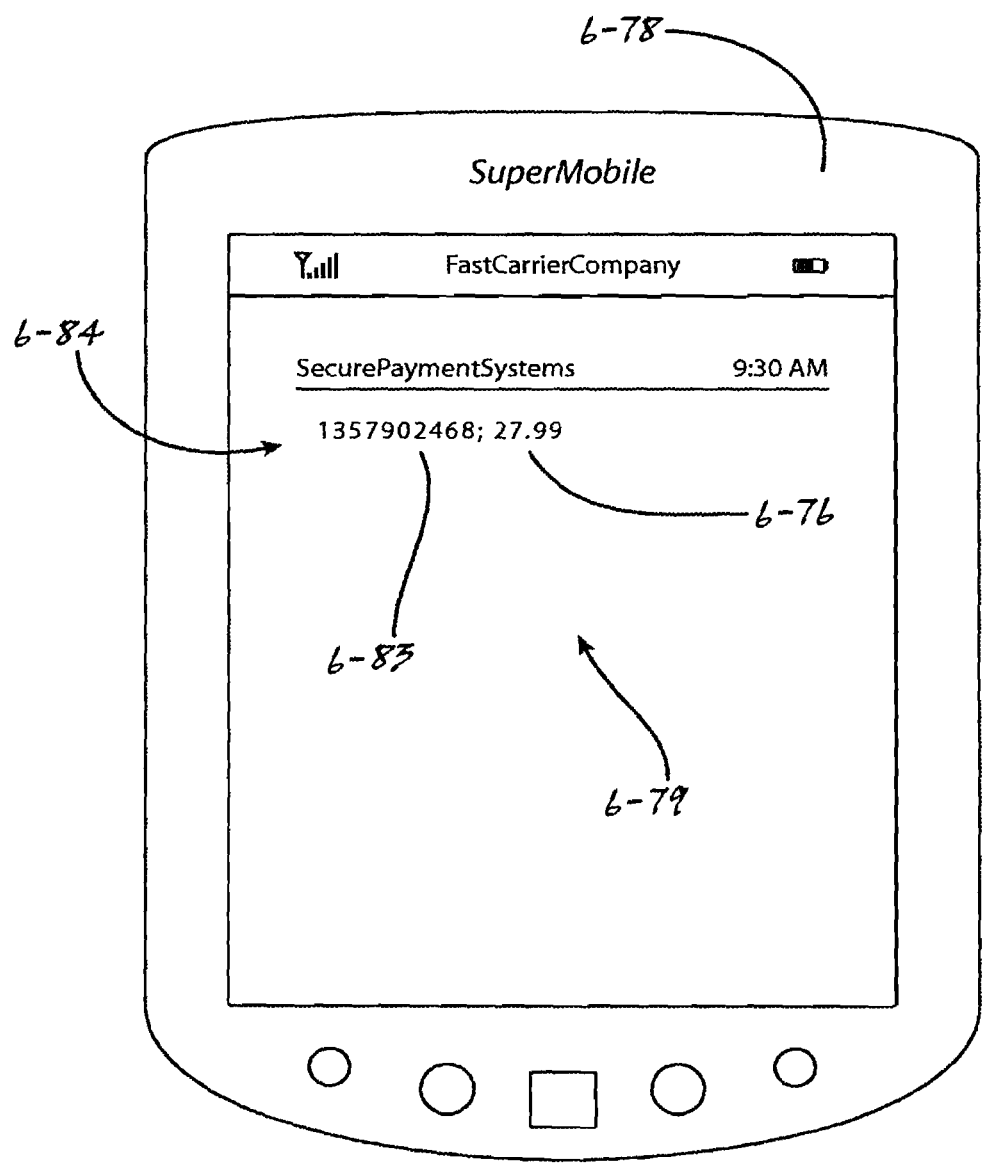
Figures 6, 7, 8, 9, 10, 11, 12, 13:
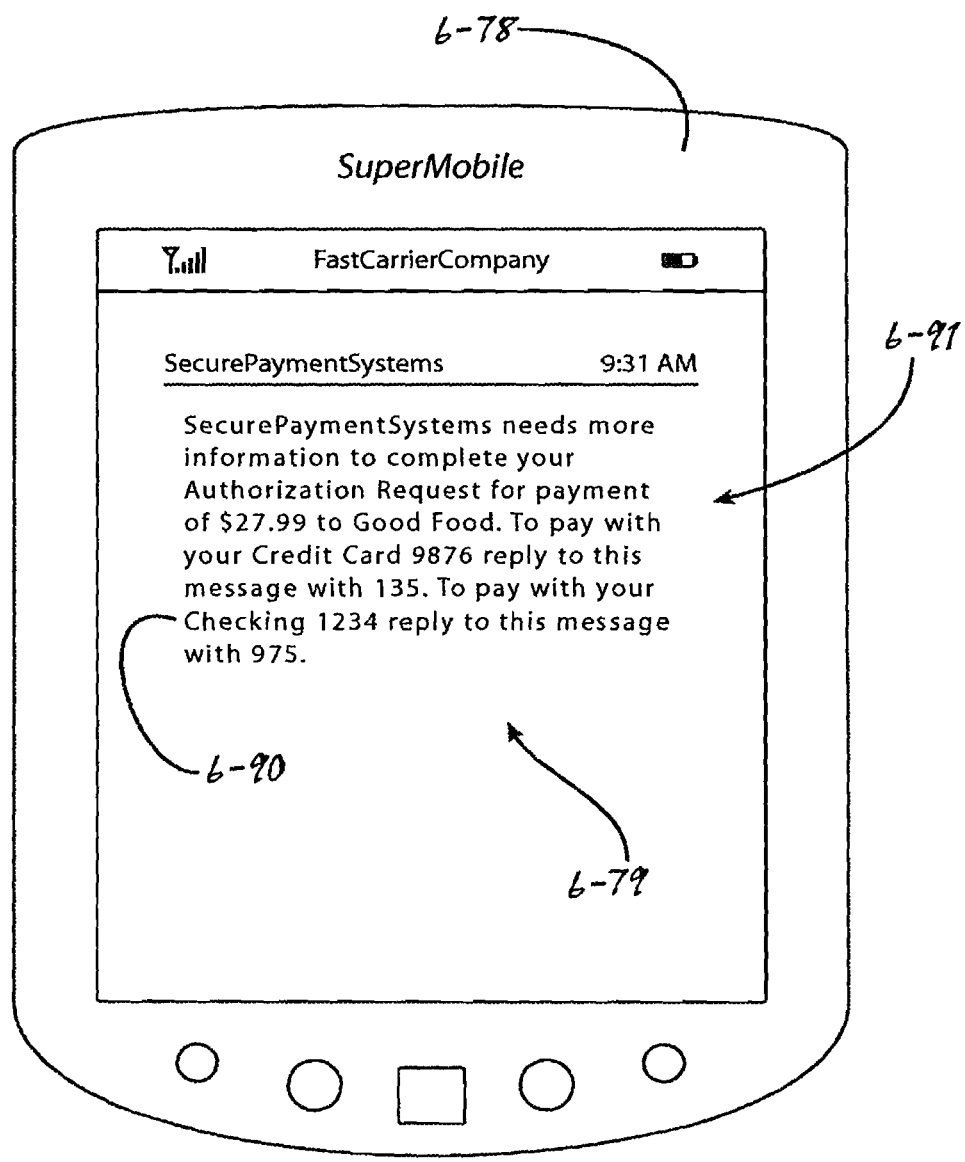
Figures 6, 7, 8, 9, 10, 11, 12, 13, 14:
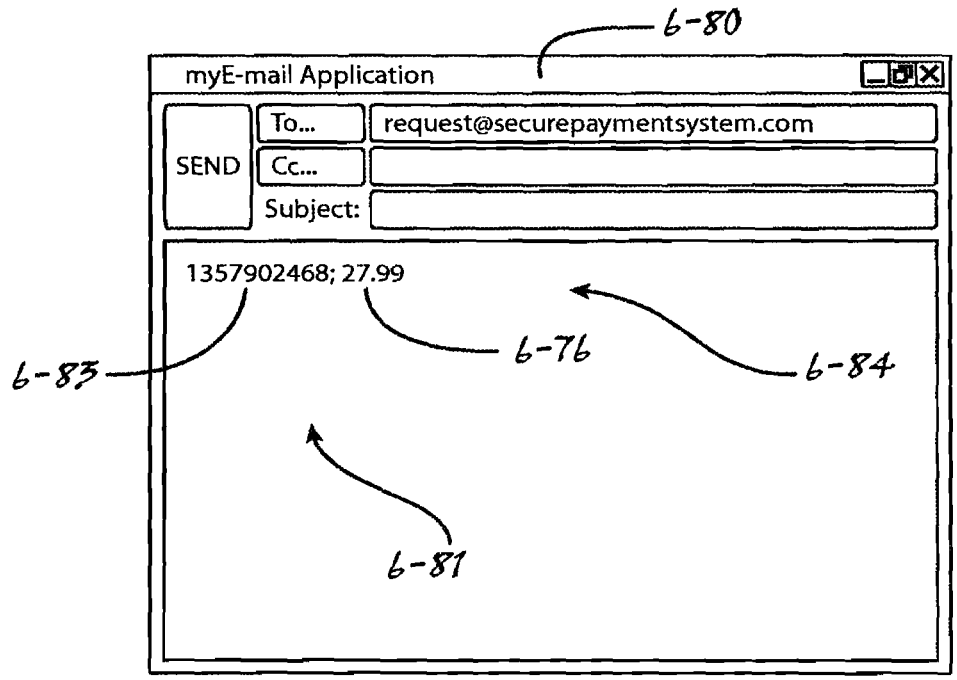
Figures 6, 7, 8, 9, 10, 11, 12, 13, 14, 15:
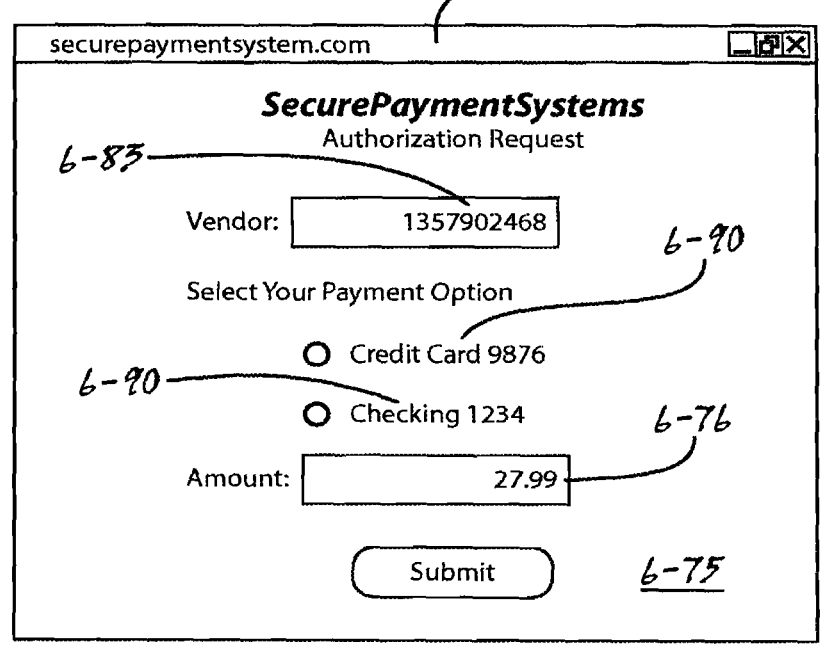
Figures 6, 7, 8, 9, 10, 11, 12, 13, 14, 15, 16:
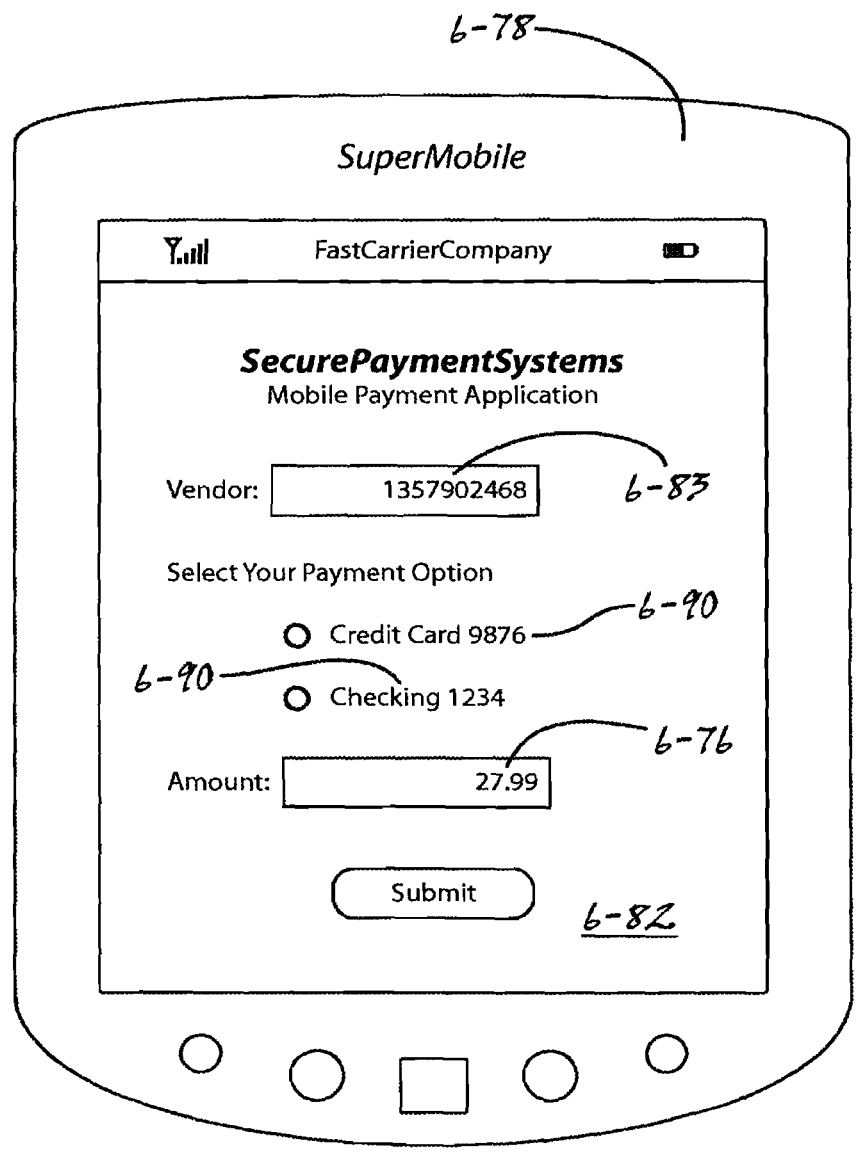
Figures 6, 7, 8, 9, 10, 11, 12, 13, 14, 15, 16, 17:
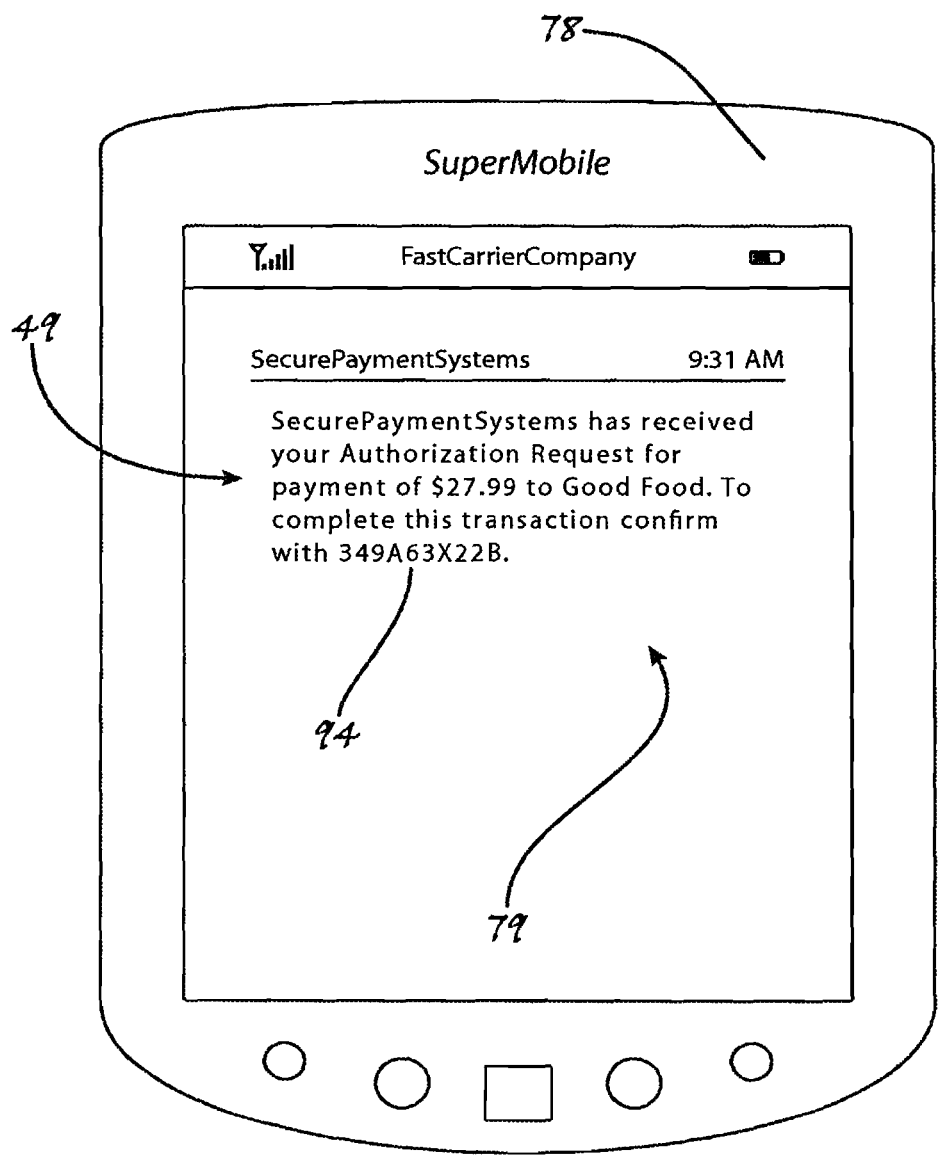
Figures 6, 7, 8, 9, 10, 11, 12, 13, 14, 15, 16, 17, 18:
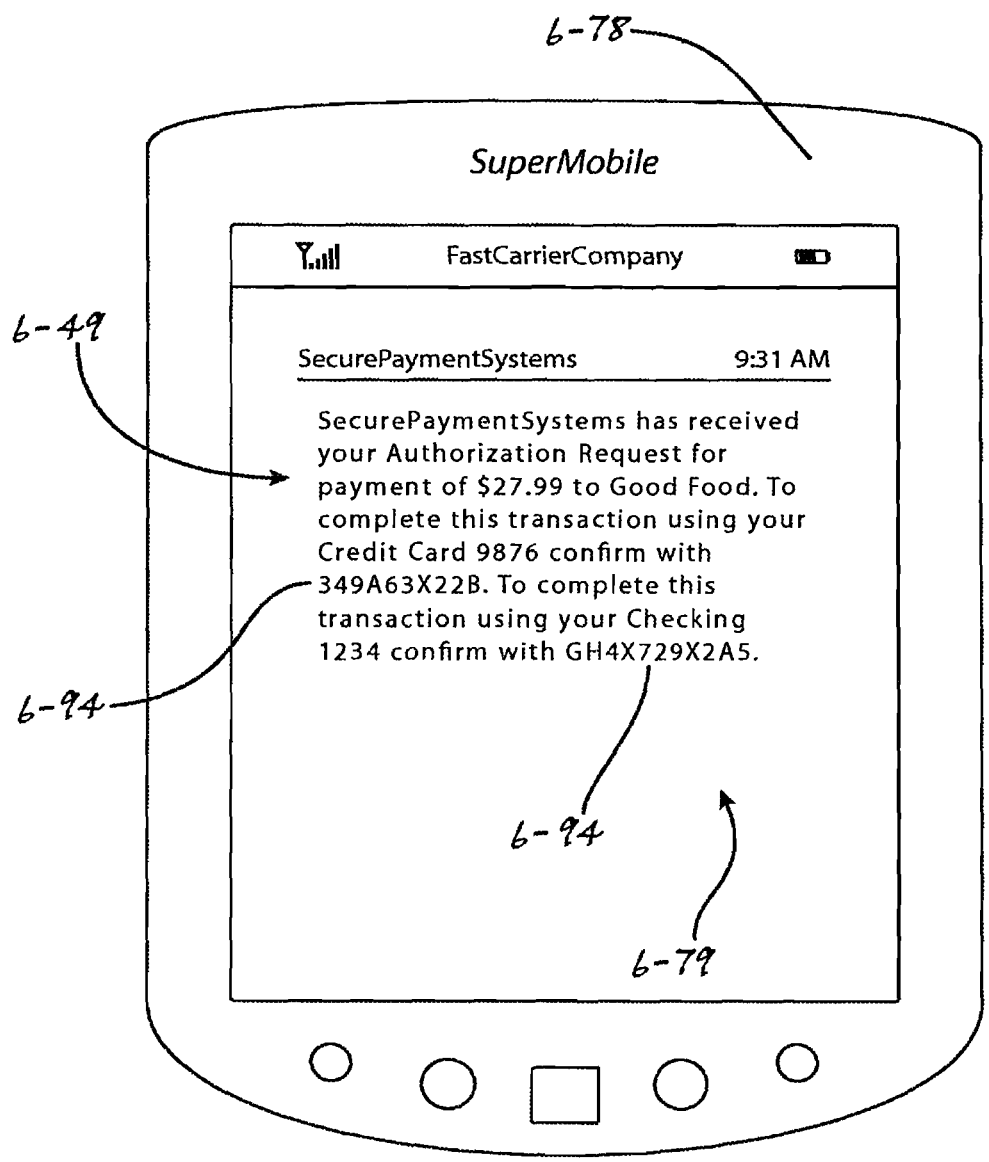
Figure 8:
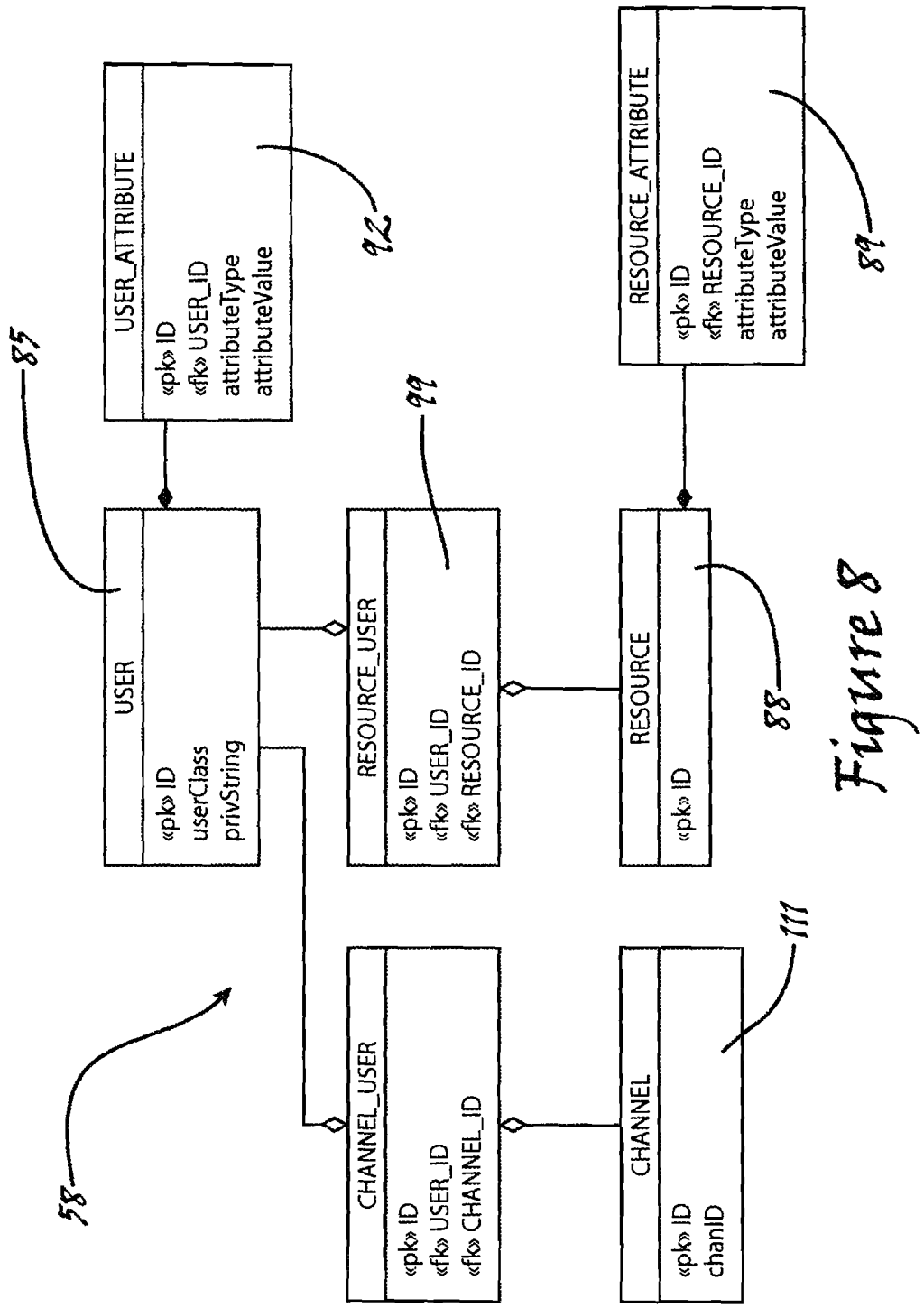
Figure 9:
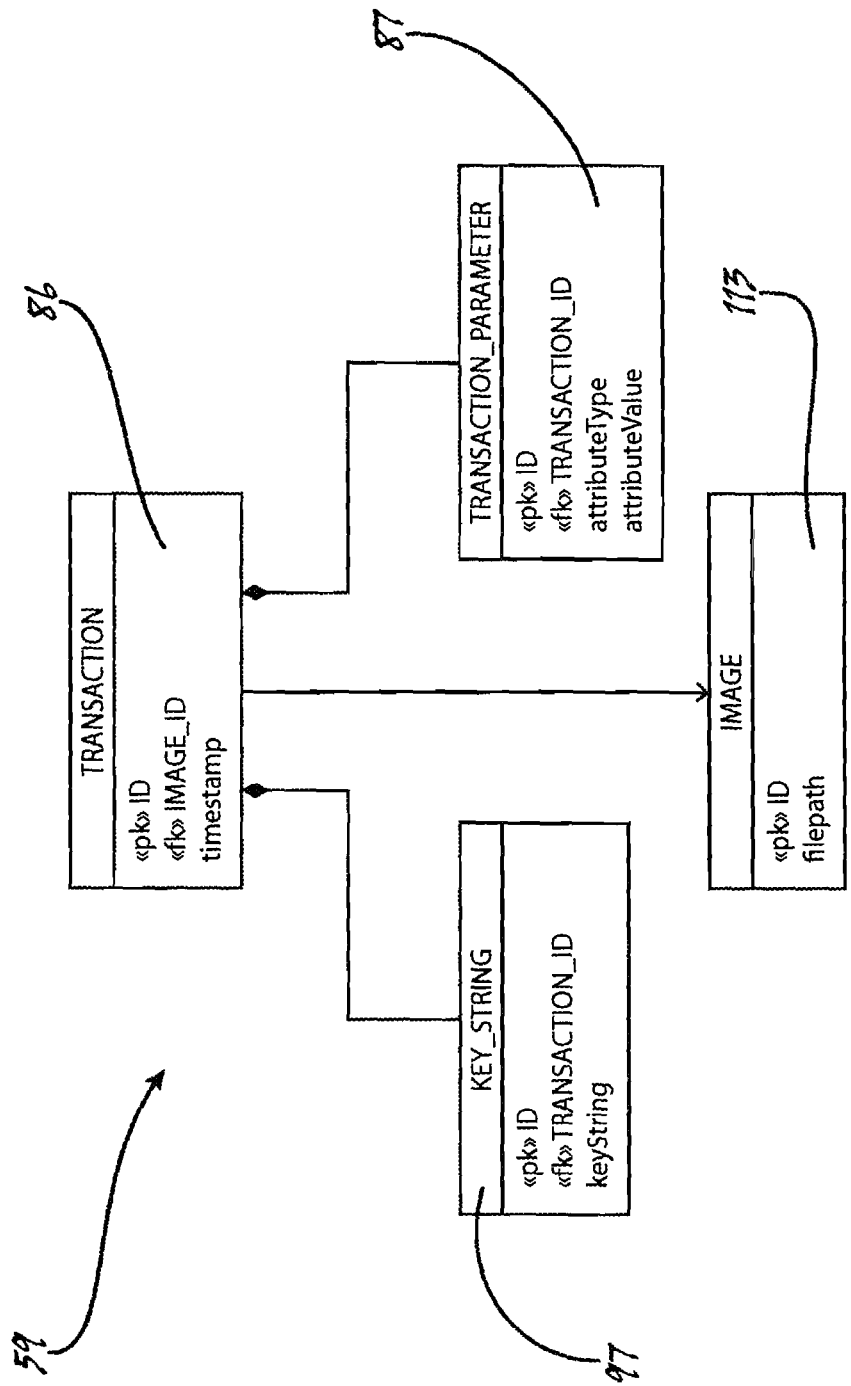
Figure 10:
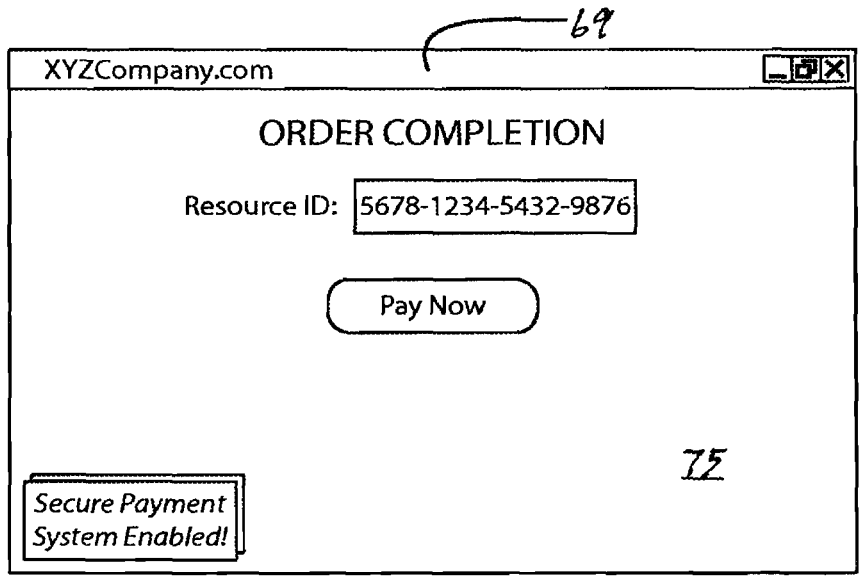
Figure 14:
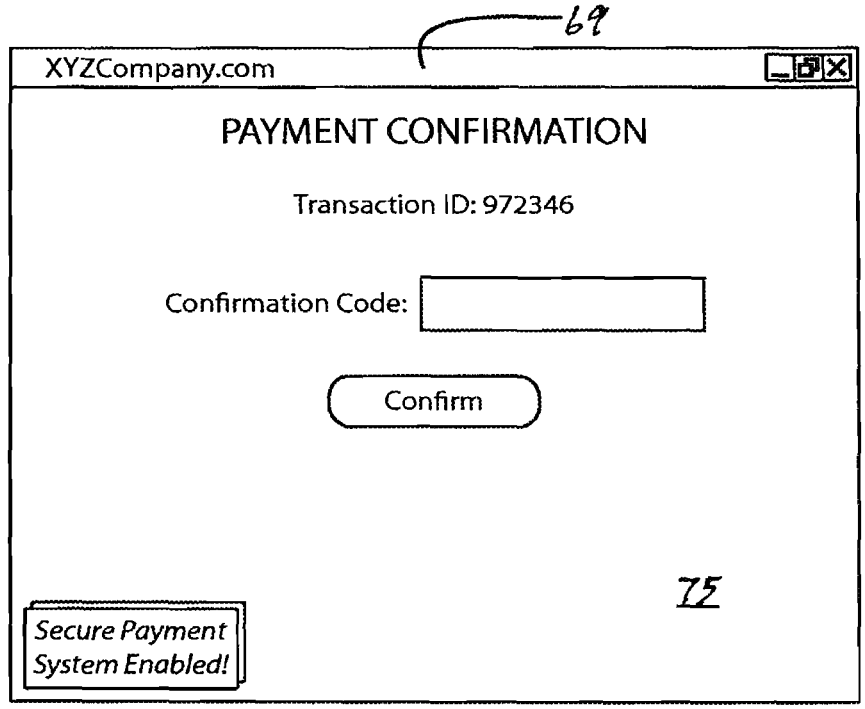
Figure 11:
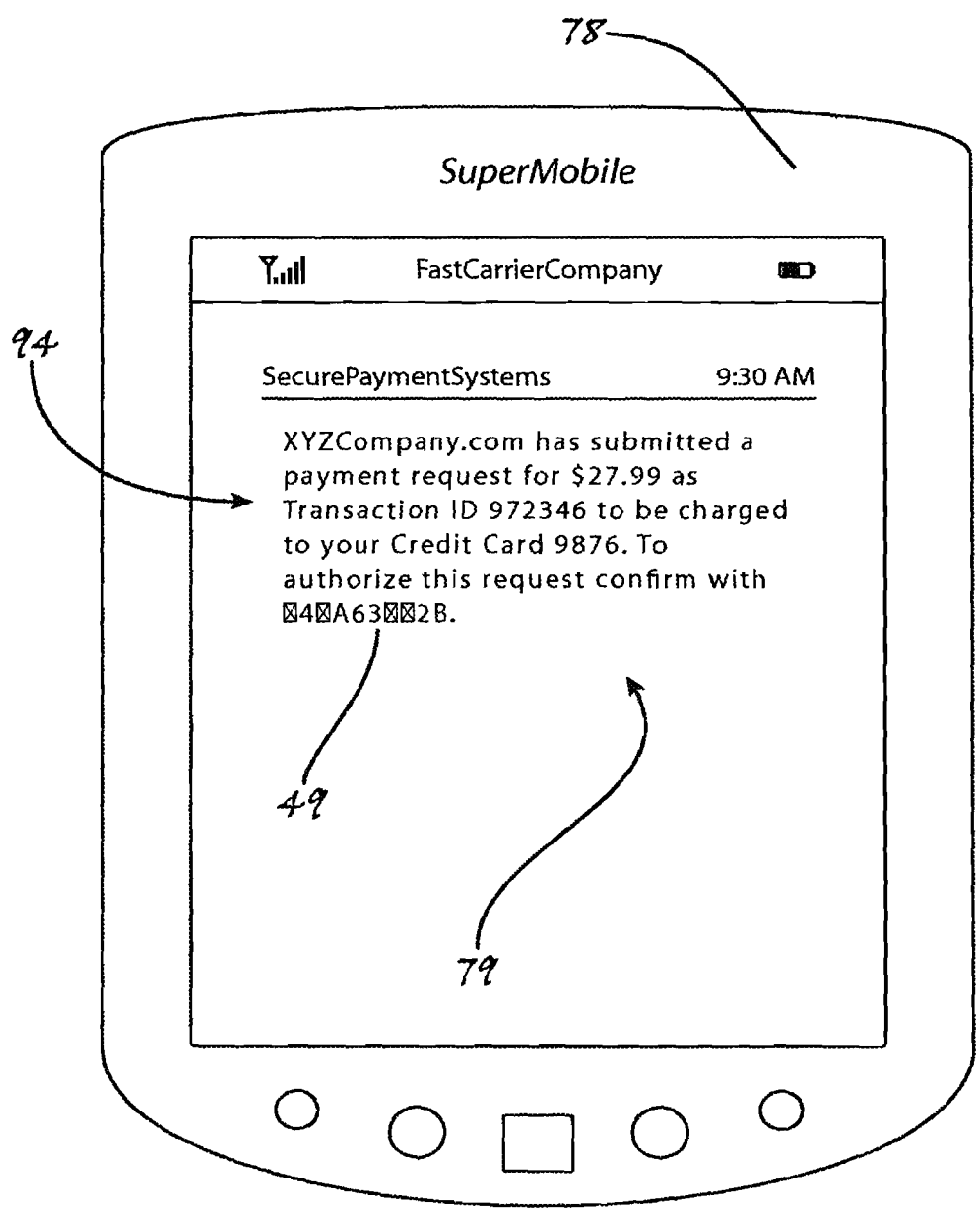
Figure 12:
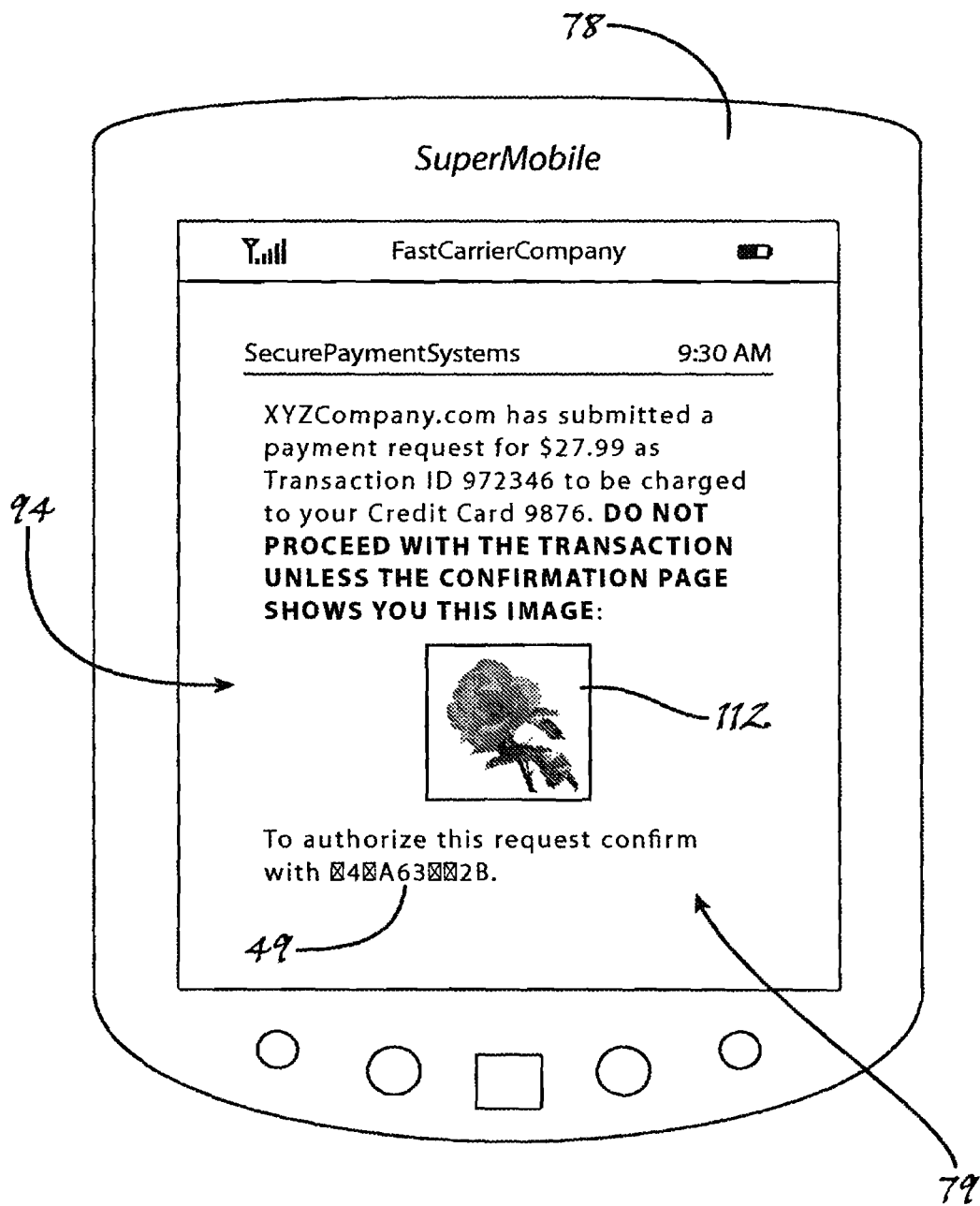
Figure 13:
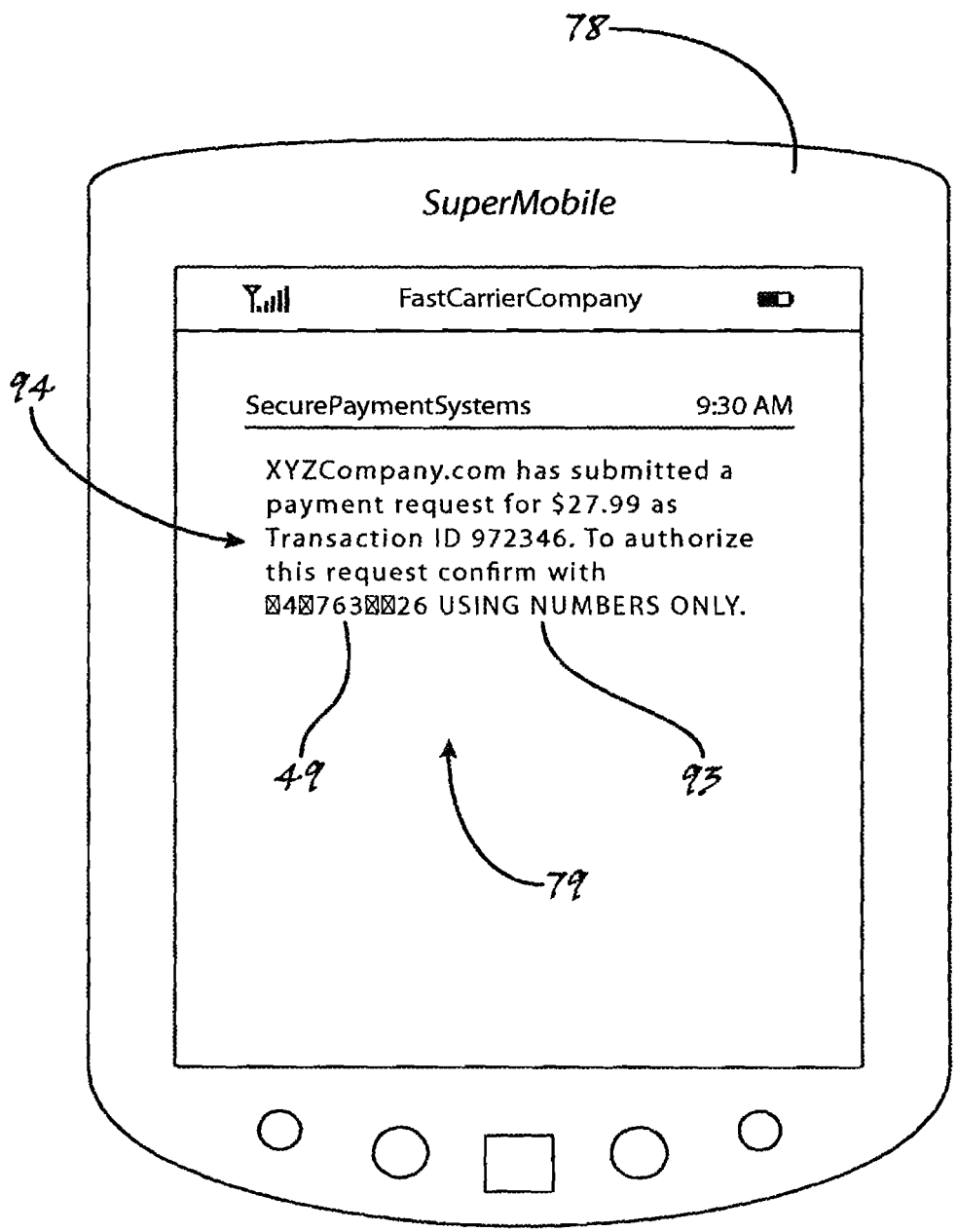
Figure 15:
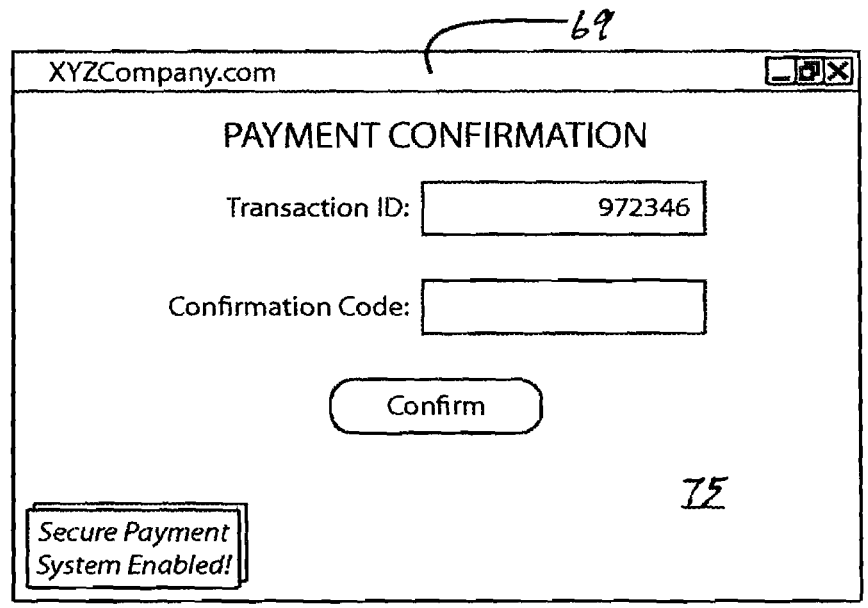
Figure 16:
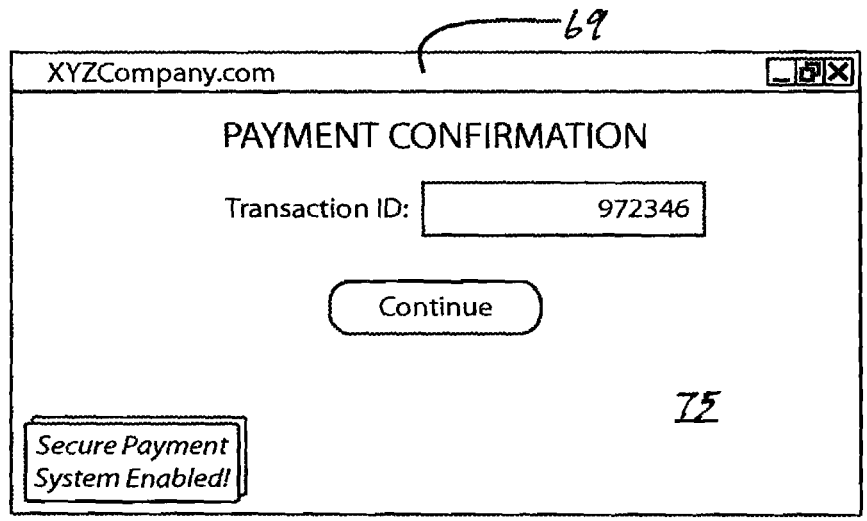
Figure 17:
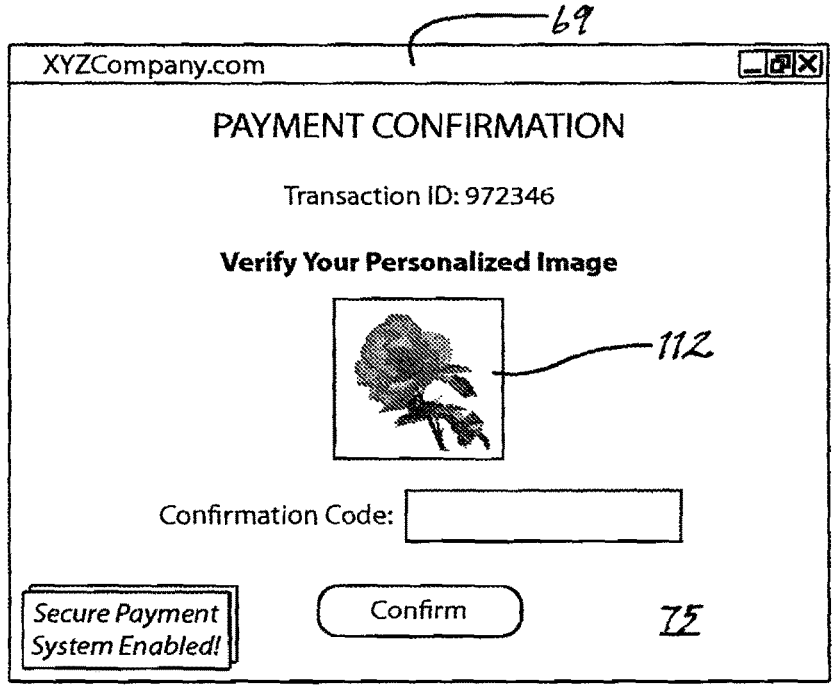
Figure 18:
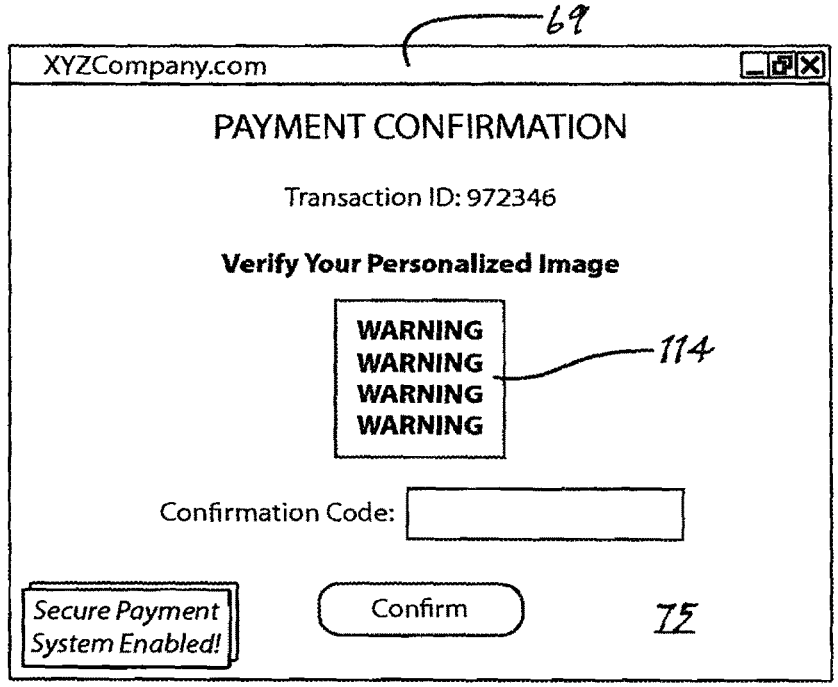
Figure 19:
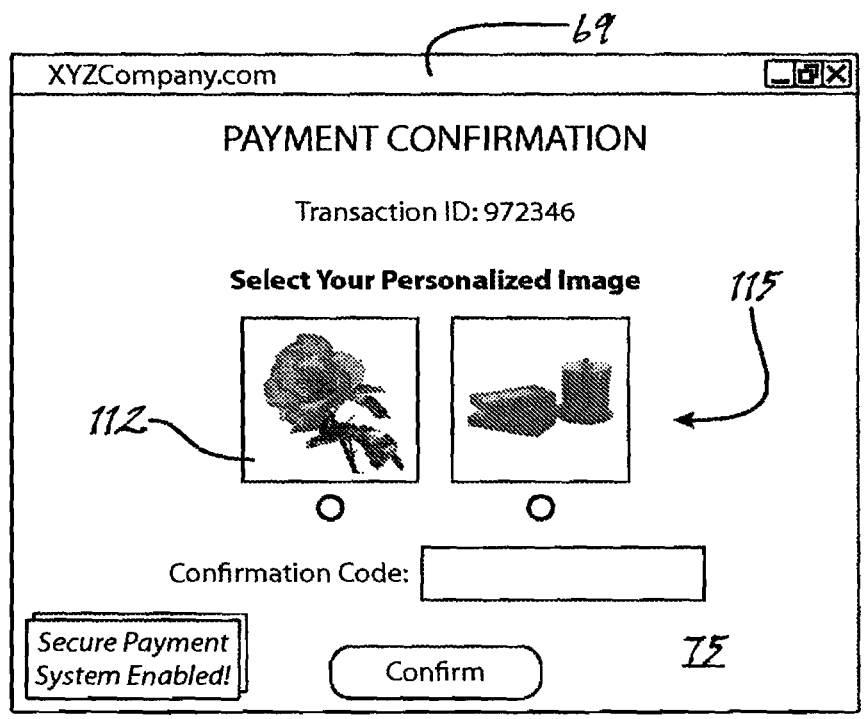

Finally, as shown in FIG. 19, the consumer may be required to actually select one image 112 from a plurality of images 115 at the same time as he or she is required to enter his or her response string. In such a case, the image selection will be transmitted with the response string and will form a part of the overall response to be evaluated by the authenticator 52. As will be appreciated by those of ordinary skill in the art, this embodiment serves to ensure that a careless consumer does not fail to carefully check for the required image 112.

In any case, with the response string entered, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the access controller 51 hosted on the on-line retailer's application server 50 whereafter the response message is submitted to the authenticator 52 hosted on the service provider's application server 50.

The authenticator 52 will then direct the validation tool 55 to evaluate the response string based upon the transaction reference for the response message. The validation tool 55 will access the key string table 97 of the transaction database 59 to retrieve the key string associated with the particular transaction reference and will evaluate the submitted response string against the retrieved key string taking into account, if appropriate for the particular implementation, the passage of time. Additionally, in a case where the selection of a particular image also forms part of the required response in addition to the response string, the validation tool 55 will also determine whether the correct image was selected by the end user 34. In any case, the validation tool 55 will then report the result of the evaluation to the authenticator 52. If the evaluation fails, the process 48 will terminate and the failure will be reported to the access controller 51, which in turn will block the end user 34 from access to the requested secured resource. If, on the other hand, the evaluation passes the authenticator 52 will report the authenticated status to the access controller 51, which in turn will allow the access as requested by the end user 34.

Finally, it is noted that in previously describing the manner in which the authentication system 30, implemented according to the exemplary example presented, may determine an otherwise unknown unique USER_ID for the consumer from knowledge of the unique RESOURCE_ID for an identified secured resource (the credit card number in the presented example) it was stated that from the resource table 88 (holding the unique RESOURCE_ID for the credit card) the user table 85 (holding the unique USER_ID for the consumer) could be accessed through the resource user table 99. While those of ordinary skill in the art will recognize that the foregoing example use could have been carried out with an implementation omitting the intermediary resource user table 99, provision of the resource user table 99 as join table for the resource table 88 and the user table 85 establishes a many-to-many relationship 20 between the records of the resource table 88 and the user table 85, whereby additional functionality is imparted to the authentication system 30 and method 46 of the present invention. In particular, by allowing a single secured resource to be associated with a plurality of end users 34, joint or other plural access control may be established for the secured resource.

For example, a parent of child patient presenting for treatment at a medical clinic may provide the child's Social Security Number to the clinic for use by the clinic in requesting access to the child's electronic medical records accessible by either one of two passwords held one each by two parents. In this case, the authentication system 30 implemented to provide for multiple user association with a single secured resource may simply look up each parent end user 34 associated with the child's identified medical record (secured resource) and send a separate challenge message 94 to each, storing the appropriate key strings in separate records of the key string table 97 of the transaction database 59, each record being connected by TRANSACTION_ID to the single transaction record established in the transaction table 86 of the transaction database 59 for the request for access to the child's medical record. As will be appreciated by those of ordinary skill in the art, the validation tool 55 of the authentication system 30 will evaluate a received response string against each key string associated with the transaction and will find valid a response string matching either. By way of further example, and without limitation, it should be appreciated, especially in light of this exemplary description, that this aspect of the present invention will have broad application, including for use in authorizing transactions against shared credit card or banking accounts, accessing shared on-line service accounts, deactivating an alarm system or accessing a computer controlled door for a home, business or other facility shared by many occupants or similar applications. Likewise, this aspect of the present invention may also be implemented such that a correct response string must be received from a plurality of end users 34 in order for the authentication system 30 and process 46 to authenticate a particular request for access to a secured resource. In this manner, "two-person control" and like security protocols may be readily handled within the scope of the present invention.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 34 that system, facility or the like for which the end user 34 desires access has implemented the teachings of the present invention. Likewise, those of ordinary skill in the art will recognize that a special program magnetic card or the like may be implemented in order to enable card swipe type initiation of a request for access. In this case, of course, the magnetic card may be encoded with an identification code for the user including no confidential or sensitive information, but preferably useful only in connection with identifying the end user 34 to an authentication system 30 implemented in accordance with the teachings of the present invention. In any case, because the scope of the present invention is much broader than any particular embodiment, the foregoing detailed description should not be construed as a limitation of the scope of the present invention, which is limited only by the claims appended hereto.

Second Described Embodiment

Referring now to FIG. 2-1 in particular, the authentication system 2-30 of the present invention is shown to generally comprise an operative combination of a plurality of service client implemented use cases 2-31 and a plurality of service provider implemented use cases 2-32. In particular, the service client 2-33 of the present invention will generally provide for an end user actor 2-34 a means 2-38 for requesting access to a secured resource and, additionally, a means 2-37 for submitting an authentication credential for use in validating the purported access right of the end user actor 2-34. In an extension of the present invention particularly useful in implementations comprising an Internet website-based or other client user interface 2-105 generally susceptible to spoofing type deceptions, the service client 2-33 may in combination with the means 2-37 for submitting an authentication credential also be adapted to provide for the end user actor 2-34 a means 2-35 for detecting the existence of a spoofing type deception.

As also particularly shown in FIG. 2-1, the service provider 2-36 of the present invention will generally provide for a service client actor 2-33 a means 2-74 for forwarding an end user actor submitted request for access to a secured resource to the service provider 36 and, additionally, a means 2-40 for forwarding an end user provided authentication credential to the service provider 2-36. Additionally, the service provider 36 of the present invention will generally provide responsive to the forwarding by a service client actor 2-33 of an end user submitted request for access to a secured resource a means 39 for generating and sending to an end user actor 2-34 a challenge message 2-94 designed to enable only the intended end user actor 2-34 to determine the content of a transient authentication credential. Still further, the service provider 2-36 of the present invention will generally provide responsive to the forwarding by a service client actor 2-33 of an end user submitted authentication credential a means 2-41 for validating the authentication credential.

In a further aspect of the extension of the present invention previously discussed as being particularly useful in implementations comprising an Internet website-based or other client user interface 2-105 generally susceptible to spoofing type deceptions, the service provider 2-36 may in combination with the means 2-39 for generating and sending to an end user actor 2-34 a challenge message 2-94 also be adapted to provide a means 2-82 for generating content for use in the means for detecting the existence of a spoofing type deception and to provide such content to the end user actor 2-34 as well as to the service client actor 2-33.

In a further extension of the present invention particularly useful in the most typical implementations of the present invention wherein for security or other reasons the service client 2-33 is unable to directly access features or functionality of a resource for which an end user actor 2-34 has requested access, the service provider 2-36 is also adapted to provide for the end user actor 2-34 and/or the service client actor 2-33 a means 2-96 for conducting a transaction reliant upon or otherwise in connection with the requested secured resource. In this case, it is noted that the secured resource may be provided by and/or otherwise under the further control of a resource provider actor 2-43 external to the service provider 2-36 or, in the alternative, may be provided and/or implemented by and/or otherwise under the control of the service provider 2-36. In any event, the means 2-96 for conducting a transaction reliant upon or otherwise in connection with the requested secured resource may generally also further comprise a means for reporting the conducted transaction to the service client actor 2-33 and/or the end user actor 2-34.

Finally, it is noted that time 2-44 as an actor may be accommodated as desired in any particular implementation wherein the service provider 2-36 is also provided with means 2-45 responsive to the passage of time for revoking or otherwise invalidating an authentication credential such that an authentication credential otherwise correctly determined by an end user actor 2-34 in response to a service provider generated challenge message 2-94 may as a result of the passage of time be deemed to be incorrect, thereby resulting in a validation failure upon application of the means 2-45 for validating the authentication credential.

Referring now then to FIG. 2-2 through FIG. 2-4 in particular, the authentication method 2-46 of the present invention as operative upon the described authentication system 2-30 is shown to generally comprise various series of interactions between an end user 2-34, a service client system 2-33 and a service provider system 2-36, as broadly set out in FIG. 2-4, wherein the interactions may be broadly categorized as steps 2-47 implicated in requesting access to a secured resource, as broadly set out in FIG. 2-2, and steps 2-48 implicated in validating the purported access right of the user requesting access to the secured resource, as broadly set out in FIG. 2-3.

As particularly shown in FIG. 2-2 and FIG. 2-4, the authentication method 2-46 of the present invention generally begins with an end user 2-34 submitting or otherwise making through a service client 2-33 a request for access to a secured resource, which end user submitted request is then forwarded by the service client 2-33 to the service provider 2-36. Although generally considered to be an optional feature of the present invention, it is noted that prior to forwarding the end user submitted request to the service provider 2-36 the service client 2-33 may, if desired, first determine whether the end user 2-34 making the request is authorized or otherwise permitted to make such use of the service client system 2-33. If in an implementation of this feature it is determined that the end user 2-34 is not authorized or otherwise permitted to make the attempted use of the service client system 2-33 the instigated process 2-47 will generally terminate whereas if it is determined that the end user 2-34 is authorized or otherwise permitted to make the attempted use of the service client system 2-33 the process 2-47 will generally continue. In any case, in an additional also optional but most preferred feature of the present invention, the service client systems 2-33 may be programmed or otherwise configured to ensure prior to forwarding the end user submitted request to the service provider 2-36 that a secure communication channel is first established between the service client 2-33 and the service provider 2-36. If in an implementation of this feature the required secure communication channel cannot be established between the service client 2-33 and the service provider 2-36 the continuing process 2-47 will generally terminate whereas if the required secure communication channel is successfully established between the service client 2-33 and the service provider 2-36 the process 2-47 will generally continue.

In any case, once an end user submitted request is forwarded by the service client 2-33 to the service provider 2-36 the remaining processing of the request is conducted by the service provider 2-36. In particular, once the forwarded request is received by the service provider 2-36, the service provider 2-36 preferably determines whether the end user 2-34 making the request is authorized or otherwise permitted to make such use of the authentication system 2-30. If in an implementation of this feature it is determined that the end user 2-34 is not authorized or otherwise permitted to make the attempted use of the authentication system 2-30 the process 2-47 will generally terminate whereas if it is determined that the end user 2-34 is authorized or otherwise permitted to make the attempted use of the authentication system 2-30 the process 2-47 will generally continue. In any case, it is noted that in an important aspect of the present invention the service provider 36 must be able to evaluate the service client forwarded request to determine the specific identity of the resource for which the request is made. To this end, as will be better understood further herein, the forwarded request preferably comprises at least the common identifier for the resource. In any case, if the available information is insufficient for the service provider 2-36 to positively determine the identity of the resource for which the end user 2-34 has requested access the process 2-47 will generally terminate whereas if the available information is sufficient for the service provider 36 to positively determine the identity of the resource for which the end user 2-34 has requested access the process 2-47 will generally continue.

In the final steps for processing 2-47 an end user submitted request for access to a secured resource, the service provider 2-36 generates a challenge message 2-94 designed to enable only an authorized end user 2-34 to determine the content of a transient authentication credential and, thereafter, issues the challenge message 2-94 to the end user 2-34. In connection with the step of generating the challenge message 94, however, and as a predicate to the step of issuing the challenge message 2-94, a service provider system 2-36 implemented as part of an authentication system 2-30 that also comprises a means 2-35 for detecting the existence of a spoofing type deception must be adapted to determine whether under the circumstances of the particular in process request for access to a secured resource such a means 2-35 for detecting the existence of a spoofing type deception should be deployed. If in such an implementation it is determined that no test for detecting the existence of a spoofing type deception need be established the challenge message 2-94 is issued without more whereas if it is determined that a test for detecting the existence of a spoofing type deception should be deployed the service provider 2-36 will establish the parameters of an appropriate test and include the established parameters in connection with or as part of the issued challenge. Additionally, the service provider 2-36 will also communicate the established parameters for the test to the service client 2-33 for use in and during the conduct of steps implicated in validating the purported access right of the end user 2-34 requesting access, which steps will be described in greater detail further herein.

With the challenge message 2-94 issued by the service provider 36 to the end user 2-34, the end user 2-34 then formulates a response to the challenge based upon information generally known only to the end user 2-34 and the service provider 2-36 and which, in no case, is ever known by or communicated to or through the service client 2-33. Once the end user 2-34 has formulated a response to the challenge, and assuming that the end user 2-34 desires to continue the in-process transaction, the end user 2-34 will then submit the formulated response to the service client 2-33 as an authentication credential.

Referring now then to FIG. 2-3 and FIG. 2-4 in particular, validation 2-48 of the purported access right of the user requesting access to a secured resource is shown to generally begin with the submission to a service client 2-33 by the end user 2-34 of an authentication credential, which authentication credential has been previously formulated by the end user 2-34 in response to issuance by the service provider 2-36 of a challenge message 2-94. As shown in FIG. 2-3, however, service client systems 2-33 implemented as part of an authentication system 2-30 that comprises a means 2-35 for detecting the existence of a spoofing type deception will prior to allowing submission by the end user 2-34 of an authentication credential first determine whether under the circumstances of the particular request in process for access to a secured resource such a means 2-35 for detecting the existence of a spoofing type deception should be deployed. If in such an implementation it is determined that no test for detecting the existence of a spoofing type deception need be established the end user 2-34 is allowed by the service client 2-33 to submit the authentication credential without more whereas if it is determined that a test for detecting the existence of a spoofing type deception should be deployed the service client 2-33 will present to the end user 2-34 an appropriate test for detecting the existence of a spoofing type deception, wherein the presented test is constructed by the service client 2-33 using the test parameters as previously established and provided by the service provider 2-36.

In any case, an authentication credential submitted by the end user 2-34 must in order for the validation to continue be forwarded by the service client 2-33 to the service provider 36. In an optional but most preferred feature of the present invention, the service client 2-33 may be programmed or otherwise configured to ensure prior to forwarding an end user submitted authentication credential to the service provider 2-36 that a secure communication channel is first established between the service client 2-33 and the service provider 2-36. If in an implementation of this feature the required secure communication channel cannot be established between the service client 2-33 and the service provider 2-36 the continuing process 2-48 will generally terminate whereas if the required secure communication channel is successfully established between the service client 2-33 and the service provider 2-36 the process 2-48 will generally continue.

Upon successful forwarding by the service client 2-33 to the service provider 36 of the end user submitted authentication credential, the service provider 2-36 proceeds to validate the responsive authentication credential by comparing the authentication credential against a key string. As will be appreciated by those of ordinary skill in the art in light of this exemplary description, the key string will prior to or at the time of validation be determined by the service provider 2-36 utilizing knowledge of the previously discussed information generally known only to the end user 2-34 and the service provider 36 to formulate the key string as the known correct response to at least a portion of the previously issued challenge message 2-94 (the "primary challenge"). In addition to comparison of the authentication credential to a known key string, however, it is noted that in an authentication system 2-30 utilizing time 2-44 as an actor in order to provide a timeout for the validity of an outstanding challenge message 2-94, the service provider 36 will be programmed or otherwise adapted to determine as part of the validation step whether as a result of the passage of time the authentication credential should be deemed to be incorrect. In any case, if the authentication credential is found or otherwise deemed to be incorrect, the service provider 2-36 will preferably report the incorrect finding to the service client 2-33 and/or the end user 2-34 and the process 2-48 will generally terminate whereas if the authentication credential is found to be correct the process 2-48 will generally continue.

With the authentication credential found to be correct, the service provider 2-36 may simply report the correct finding to the service client 2-33 or, if for security or other reasons the service client 2-33 is unable to directly access features or functionality of a secured resource for which an end user actor 2-34 has requested access, the service provider 2-36 will then obtain for the end user 2-34 and/or the service client 2-33 the benefit of the requested secured resource and thereafter appropriately report the conducted transaction to the service client 2-33 and/or the end user 2-34.

With the foregoing broad overview of the general structure and function of the authentication system 2-30 of the present invention in mind, it is now noted that in accordance with the present invention an end user 2-34 may comprise any person or machine requiring, in connection with some other use, access or other relationship with a service client 2-33, access to a secured resource for which the service client 2-33 is restricted from full knowledge and for which the service provider 2-36 may hold full knowledge, full knowledge being defined herein as knowledge sufficient to make ordinary full use of the secured resource outside of the framework of the authentication system 2-30 and method 2-46 of the present invention. By way of simple example, the resource may comprise password protected information (e.g., a credit report) a portion of which (e.g., only the credit scores) a human end user 2-34 wishes to share with a service client 2-33 comprising an information consumer (e.g., a potential creditor) without providing to the information consumer the password (e.g., by which the full credit report is protected and as would otherwise enable the potential creditor to gain full access to the protected credit file). While the present invention contemplates that the service client 2-33 may be restricted from access to the content of a particular secured resource, in which case the service provider 2-36 may be adapted to obtain for the service client 2-33 the requested portion or benefit of the secured resource for which the end user 2-34 authorizes access, it should be noted that in at least some implementations of the present the secured resource may simply comprise a password or other authentication credential held by the end user 2-34. In this case, the authentication system 2-30 of the present invention may be implemented simply to provide a novel "universal password" system wherein the end user 2-34 is never required to provide his or her true password to any particular service client 2-34. In any case, under the present invention, a service provider 2-36 having associated therewith a hardware and/or software implementation of the previously generally discussed functionality is in accordance with the present invention programmed or otherwise adapted to receive directly from the service client 2-33 an end user submitted request for access to the secured resource and, thereafter, to validate that the end user submitted request as forwarded by the service client 2-33 is made under the authorization of an end user 2-34 having right of access to the secured resource. In a critical aspect of all implementations of the present invention, however, the actual information held by the end user 2-34 through which the service provider 2-36 is capable of authenticating the access right of the end user 2-34 is strictly withheld from the service client 2-33.

With this in mind, the end user 2-34 may, for example and without limitation, be a patient wishing to share medical information (a secured resource) with a caregiver (a service client 2-33) without having to grant to the caregiver unfettered access to all of his or her medical records; or may be the holder of a credit card account, banking account, automated teller machine ("ATM") card and/or account or the like (a secured resource) wishing to purchase merchandise, service, information or the like from a retail store, service station, on-line service provider or merchandiser, other business or the like (a service client 2-33) without providing the service client 2-33 with his or her full credit card information, e.g. without providing his or her Card Verification ("CV") code, banking account information, personal identification number ("PIN") associated with the ATM card or the like; or may be a credit applicant or other holder of an information product wishing to share a credit score or other information (a secured resource) with a consumer of information products, such as an automobile dealership in need of consumer credit data, (a service client 2-33) without providing his or her Social Security Number or other information not necessary to the conduct of the present transaction.

In at least one implementation of the authentication system 2-30 and method 2-46 of the present invention, however, the end user 2-34 may be the holder of an on-line service account protected by a password and wherein the on-line account is under the control of the service client 2-33 but the password (a secured resource) for access to or control of the account by the end user 2-34 is not known to the service client 2-33. In any case, in order to better describe the critical and other aspects of the present invention, however, reference is now made to the deployment diagram of FIG. 5 (comprising FIG. 2-5A and FIG. 2-5B), wherein there is shown the various elements of an exemplary hardware and software based implementation of an authentication system 2-30 constructed in accordance with the teachings of the present invention.

Before continuing, however, it is noted that while the implementation depicted in FIG. 2-5 is exemplary of the authentication system 2-30 of the present invention, it is in no manner meant to be all encompassing or otherwise limiting of the wide range of implementations as are possible. In addition, it is noted that while some elements are in FIG. 2-5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 2-5, there is generally shown in FIG. 2-5A a service client 2-33 (such as, for example, may comprise a retail store, service station, on-line service provider or merchandiser or other business; a healthcare or medical insurance provider; an automated teller machine provider; a consumer of information products, such as an automobile dealership in need of consumer credit data; or the like) and various elements generally associated or often collocated with the service client 2-33. In particular, an exemplary service client 2-33 may deploy one or more application servers 2-101 or database servers 2-102 upon which may be hosted software functionality necessary to operation within the framework of the present invention in addition to the unrelated operations of the service client 2-33. In particular, an application server 2-101 may host a request handler software component 2-51 adapted to receive, process and/or otherwise handle requests and submissions from an end user 2-34 as well as to produce output for the end user 2-34 as may be necessary in the operation of the present invention. In facilitation of such activities, a database management system 2-103 comprising one or more client databases 2-104 may be provided to store and access data as may be required. Additionally, a client user interface 2-105 is provided and adapted to provide input from an end user 2-34 to the hardware and/or software systems of the service client 2-33 and to provide output from these systems to an end user 2-34. Finally, a service gateway 2-106 provides preferably secure communication between the service client systems 2-33 and the systems of the service provider 2-36.

As is generally shown in FIG. 2-5B, a service provider 2-36 (such as, for example, may comprise a specialized provider of the authentication services of the present invention; a provider of other products or services having need of authentication services, such as, for example, a credit card processor or financial institution or an alarm monitoring company; or the like) also has associated therewith one or more application servers 2-50 or database servers 2-98 upon which may be hosted software functionality necessary to operation within the framework of the present invention. In particular, an application server 2-50 may host an authenticator 2-52 adapted to handle or otherwise control all aspects of the authentication process within the realm of responsibility of the service provider 2-36, including receiving authentication requests, storing and/or retrieving data pertinent to the processing of such requests, directing the generation and sending of challenge messages 2-94, and directing the validation of authentication credentials submitted in response to challenge messages 2-94 and actions taken based upon the results of such validations. In order to improve efficiency, the authenticator component 2-52 may comprise one or more further specialized components such as, for example, a challenge manager 2-53 adapted to facilitate creation and transmission of challenge messages 2-94, a random sequence generator 2-54 as may be useful in the highly specialized task of creating random sequences which, as will be better understood further herein, are an integral feature of the present invention, and a validation tool 2-55 adapted to conduct the specialized task of comparing received authentication credentials with known key strings. Additionally, the application server may also host an administration tool 2-56 through which various aspects of the setup, maintenance and operation of the hardware and software systems of the service provider 2-36 may be managed.

In order to efficiently manage and handle the large quantity of data that may typically be stored in connection with an implementation of the present invention, one or more dedicated database servers 2-98 hosting database management systems 2-57 are generally desired. As shown in FIG. 2-5B, a typical database management system may include a user database 2-58 for storing a wide variety of generally user centric data as may be required in the operation of the present invention, a transaction database 2-59 for storing data generally associated with the conduct of individual transactions and an image database 2-107, which, as will be better understood further herein, is particularly adapted for storing data associated with implementation of the means 2-35 for detecting the existence of a spoofing type deception. Although those of ordinary skill in the art will recognize that virtually unlimited alternatives are possible, FIG. 8 shows a very high level but generally representative schema for a user database 2-58 and FIG. 2-9 shows a very high level but also generally representative schema for a transaction database 2-59, each of which will be described in greater detail further herein in connection with an exemplary description of the conduct of a typical transaction.

Additionally, one or more client gateways 2-108 provide preferably secure communication between the service provider systems 2-36 and the systems of one or more service clients 2-33 and a preferably unified messaging gateway 2-60 is provided for use in issuing challenge messages 2-94 through various communication channels to end users 2-34. As will be appreciated by those of ordinary skill in the art, such a unified messaging gateway 2-60 may be utilized to transmit a generated challenge message 2-94 in any of a plurality of message formats (such as, for example, as a SMS message, a standard text message, an e-mail message, a synthesized voice message, an alphanumeric page or the like) over any of a plurality of communication channels (such as, for example, an SMS or other text channel, a SMTP channel, a POTS channel, a paging network or private broadcast channel or the like) to be received by any of a plurality of user devices (such as, for example, a mobile or landline telephone, a smart phone, an e-mail client, a PDA, a numeric or digital pager or the like). Still further, a service user interface 2-61 is provided and adapted to provide input from all manner of users 2-62, including administrative users, end users 2-34 and service clients 2-33, to the hardware and/or software systems of the service provider 2-36 and to provide output from these systems to the various users 2-62. As will be appreciated by those of ordinary skill in the art, the provision of a service user interface 2-61, which of course should be secured, enables the various users 2-62 to maintain and/or otherwise manage the data stored in the user database 2-58 as may be appropriate as well as to generally manage and maintain the implemented authentication system 2-30. Finally, one or more resource communication gateways 2-109 may be provided in order to establish preferably secure communication between the systems of the service provider 2-36 and outside resource providers 2-43.

As exemplified by FIG. 2-6 and FIG. 2-7, the client user interface 2-105 in particular, but also to some extent the service user interface 2-61, may take a wide variety of forms depending upon the circumstances of any particular implementation. For example, as shown in FIG. 2-6, a typical user interface may be implemented as a web interface 2-63 wherein there may be provided a page processor 2-64 hosted on an appropriate execution environment 2-65 installed on a dedicated web server 2-66 in Internet communication 2-67 with a user device 2-68, such as, for example, a personal computer, a smart phone, other mobile device 2-78 or the like, and on which is installed and/or hosted a web browser running 2-69 in a provided execution environment 2-70. On the other hand, as shown in FIG. 2-7, a client user interface 2-105 may comprise a more dedicated and integrated arrangement such as the depicted POS, fueling station or ATM terminal device 2-73 comprising as input modalities a keypad 2-95 and a card reader and comprising as an output modality a visual display such as the depicted screen 2-77. Additionally, those of ordinary skill in the art will recognize that in addition to the depicted implementations, the client user interface 2-105 may comprise a network interface such as may be utilized by a customer service representative (considered herein as an end user 2-34 acting through the representative), a telephone auto attendant, which may implement a DTMF decoder, speech recognition engine, TDD/TTY decoder or the like; or virtually any other combination of input modalities (including barcode readers or scanners, keyboards, keypads, card and/or magnetic stripe readers, pointing devices, microphones and the like) and output modalities (including visual displays such as computer or other device monitors or screens, audio output devices such as headphones or other speakers, tactile output devices such as may be adapted for the visually impaired and the like).

Continuing then with the example generally described with respect to FIG. 2-5, further details of the implementation are now described by way of the following detailed description of a possible use of the implementation for conducting a retail purchase transaction, which, for purposes of the example, shall be taken as completion of a purchase at an on-line retailer (the service client 2-33) by a consumer (the end user 2-34) having available for payment a credit card (secured resource) for which a CV or like code must be provided as a condition precedent to authorization of a credit card charge. To complete the transaction, the consumer will indicate a desire to make a credit card payment to the on-line retailer, which will forward the consumer's request (which will generally include the credit card number) to a service provider 2-36 for determination whether the identified credit card is a valid secured resource connected with the authentication system 2-30, for authentication of the consumer's right of access to the identified credit card and for obtaining payment for the on-line retailer from the identified credit card. In accordance with a critical aspect of the present invention, however, the on-line retailer must not be given any information that would allow the on-line retailer to repeat the transaction without again obtaining authorization from the consumer (i.e., the on-line retailer must not be provided with access to the CV or like code required under the present example for authorization of a transaction charged against the consumer's credit card).

To begin the process, then, the consumer end user 2-34 will use his or her web browser 2-69 to first navigate to the URL of an order completion webpage 2-75 for the on-line retailer service client 2-33. As is otherwise conventional, the consumer's web browser 2-69 will send a page request to the on-line retailer's web server 2-66 where a hosted page processor 2-64 will create and send back to the consumer's web browser 2-69 the requested "order completion" webpage 2-75, making use if required of the on-line retailer's client database 2-104 to retrieve stored information pertaining to the consumer, the transaction or the like. As shown in FIG. 2-10, the requested page 2-75 may simply comprise a simple form through which the consumer may input information indicative of the nature of the consumer's request for access to a secured resource. In this case, the consumer enters the credit card number for the credit card for which he or she requests use (access) and then selects the depicted "pay now" button. With the data entered as shown, the consumer's web browser 2-69 submits the data to the on-line retailer's web server 2-66 where the hosted page processor 2-64 may validate the form data for technical completeness and accurate formatting. Assuming that the submitted data is technically correct or is subsequently made technically correct, the page processor 2-64 submits the consumer's request to the request handler 2-51 hosted on the on-line retailer's application server 2-101.

At this point, in an optional feature of the present invention, the on-line retailer may choose to verify that the tentatively identified consumer presenting the credit card is permitted to make use of the on-line retailer's services for the requested purposes. For example, it may be that the on-line retailer requires registration prior to use of the authentication system 2-30 and method 2-46 of the present invention which, it is noted, may be utilized in a completely anonymous fashion to conduct extraordinarily secure financial and other transactions. If so, the request handler 2-51 may access the client database 2-104 or other accessible data store to determine that the tentatively identified consumer is a valid end user 34 from the perspective of the on-line retailer.

In any case, the request handler 2-51 will generally continue by creating a client reference for the transaction and assembling any other necessary parameters, such as payment amount, for transmission to the service provider 2-36. As will be appreciated by those of ordinary skill in the art, under many circumstances a service client 2-33 will have available all or virtually all information necessary for submitting (on behalf of an end user 2-34) a request to the service provider 2-36 without need for the end user 2-34 to enter additional data. For example, in a case where the consumer is otherwise "logged in" to the on-line retailer's website and the on-line retailer has previously stored the consumer's credit card number the consumer need only indicate that he or she wishes to "pay now" in order to make complete use of the facilities of the present invention. In any case, once assembled the complete request data, including unique client reference but not necessarily including the credit card number, is preferably stored in the client database 2-104 for retrieval as may be required. In the case of a real-time transaction, however, storage is not required.

When the end user submitted request (including at least the credit card number) is thus ready for forwarding by the on-line retailer to a service provider 2-36 appropriate for handling the type of request made, the request handler 2-51 will generally queue the request at the on-line retailer's service gateway device 2-106. If not already established, the service gateway device 2-106 will then undertake to establish secure communication with the corresponding client gateway device 2-108 at the service provider 2-36. As will be appreciated by those of ordinary skill in the art, because the relationship between a service client 2-33 and a service provider 2-36 will generally be ongoing, well known and fairly static, the required secure communication may be established through any number of very secure protocols including, for example, the use of cryptography, Internet Protocol ("IP") verification and the like. In any case, once the required secure communication is established the service gateway 2-106 will forward the consumer's completed request through the established secure communication channel to the service provider's client gateway 2-108, where the nature of the request will be identified and the request will then be conventionally routed to the authenticator 2-52 hosted on the service provider's application server 2-50.

Upon receipt of the consumer's request, the authenticator 2-52 will generally first undertake to determine whether the credit card for which the end user 2-34 has requested access is recognized at the service provider 2-36. To this end, the authenticator 2-52 may access the user database 2-58, as generally shown in FIG. 2-8, to determine whether the provided credit card number can be located in the resource table 2-88 of the user database 2-58. If not, the authentication process 2-46 may be terminated without or, preferably, with notice to the service client 2-33 or an appropriate message may be transmitted from the service provider 2-36 to the service client 2-33 allowing the service client 2-33 to prompt the end user 2-34 for correction and reentry of the unrecognized identifying information. If, on the other hand, the provided credit card number is recognized the authenticator 2-52 will proceed to establish a new transaction record in the transaction table 86 of the transaction database 2-59, as generally shown in FIG. 2-9, and at this time should also store in the transaction record the unique USER_ID by which the on-line service provider is known in the user database 2-58 and the on-line retailer's client reference.

Additionally, transaction parameter records may be created in the transaction parameter table 2-87 of the transaction database 2-59 in order to collect and store information pertinent to the continued processing of the transaction such as, for example, the unique RESOURCE_ID by which the identified credit card is known in the user database 2-58, the amount of the requested payment or the like. Still further, the unique USER_ID by which the tentatively identified consumer is known in the user database 2-58, as may be determined (if not provided as part of the forwarded request) with reference through the resource use table 2-99 to the user table 2-85 of the user database 2-58, should also be stored in the transaction parameter table 2-87 of the transaction database 2-59.

With the end user 2-34 and the resource for which the end user 2-34 requests access both identified and logged to the transaction database 2-59, the authenticator 2-52 next undertakes to direct the generation of an appropriate challenge message 2-94, the response to which may be used to positively authenticate the identity of the presently tentatively identified end user 2-34.

In accordance then with the authentication system 2-30 and method 2-46 of the present invention, the primary challenge is generated to include a random string comprising a plurality of symbols wherein at least one of the symbols of the string is a null character, such a random string being referred to herein as a challenge string 2-49. Additionally, each end user 2-34 (and, if desired, also other types of users such as client users and/or administrative users) will have stored in the user table 2-85 of the user database 2-58 a private string, which is a user selected or assigned (depending on implementation preferences) string comprising symbols of the same set as used for generating the challenge string 2-49 but most preferably excluding use of the null character. The private string is generally only known to the user with which it is associated and the service provider 2-36. As will be better understood further herein, a user will formulate a response to a challenge string 2-49 by using the symbols of the user's private string to replace the null character or characters of the challenge string 2-49 to formulate a response string. In this manner, the response string may be passed through the service client 2-33 without the service client 2-33 being able to detect the private string and, accordingly, a system of readily established single use "passwords" is presented. Additionally, as also will be better understood further herein, the authentication system 2-30 and method 2-46 of the present invention may be implemented such that the protocol for creating a response string from a challenge string 2-49 is standardized in advance or, in the alternative, instructions 2-93 may be provided with the challenge message 2-94 or inferred from the manner of delivery of the challenge or circumstances of the use. For example, the user may be directed to formulate the response string using only numbers of the private string or may assume that only numbers should be used when entering the response string into a limited keypad 2-95 such as depicted in FIG. 2-7. Further, instructions 2-93 may be given to use every second or third symbol of the private string, to begin with a certain symbol of the private string, to take symbols from the private string in reverse order, or any combination of these and similar instructions 2-93. Still further, the user may be instructed as standard procedure or by challenge message 2-94 to repeat usage of certain symbols of the private string or the entire private string in order to respond to a challenge string 2-49 with more null characters than symbols available in the user's private string and/or simply as a matter of choice by the service provider 2-36.

Returning then to the example use of the authentication system 2-30 of the present invention it is noted that in the most preferred embodiment of the present invention prior to directing the generation of a challenge message 2-94 the authenticator 2-52 evaluates all available information that may impact the ability of an end user 2-34 to readily receive a particular challenge message 2-94 and/or to readily respond to a particular challenge message 2-94 and, additionally, determines whether any special security requirements may exist for access to the particular resource. In particular, the authenticator 2-52 will preferably obtain from the channel table 2-111 of the user database 2-58 channel data indicating the type of communication channel that will be utilized to transmit the challenge message 2-94. Additionally, the user attribute table 2-92 of the user database 2-58 may indicate whether the end user 2-34 suffers any disability that would impact the manner of response and/or may contain data associated with a service client 2-33 that may indicate special security requirements, such as a minimum length for the response string, or capabilities or limitations of the client user interface 2-105, such as being limited to entry of numeric characters only. Still further, the resource attribute table 2-89 of the user database 2-58 may also indicate special resource dictated security requirements, such as minimum length or desired complexity for a response string. In any case, the authenticator 2-52 will determine the characteristics that should be exhibited by the challenge string 2-49, including the manner of issuance, and will then instruct the challenge manager 2-53 to initiate issuance of a challenge message 2-94.

At this point it is noted that in accordance with an extension of the present invention, the primary challenge (comprising the challenge string 49 and any necessary response instructions 2-93) may be supplemented with the provision of a test designed to detect the existence of a spoofing type deception. In particular, the present invention contemplates the use of a dynamically selected image 2-112 for the conduct of this test. Although the particular conduct of this test will be described in greater detail further herein, it should at this time be noted that in an implementation wherein such a test will be required the challenge manager 2-53 will generally at this point in the process obtain from the image database 2-107 image data identifying the selected image 2-112 and its location on a fileserver and will store the obtained image data in the image table 2-113 of the transaction database 2-59. In any case, the challenge manager 2-53 will continue to obtain from the random sequence generator 2-54 a challenge string 2-49 meeting the requirements established and communicated by the authenticator 2-52. With the challenge string 2-49 generated and any image data obtained, the challenge manager 2-53 will proceed to construct the challenge message 2-94 which will at least comprise the challenge string 2-49, any special response instructions 2-93 and a copy of the image file if required. With the challenge message 2-94 assembled, the challenge manager 2-53 queues the challenge message 2-94 by providing the messaging gateway 2-60 with the challenge message 2-94, the type of communication channel to be utilized and the CHANNEL_ID for the channel. For example, if the challenge message 2-94 is to be sent by SMS text message 2-79, the challenge manager 2-53 will inform the messaging gateway 60 that the challenge message 2-94 is to be transmitted by SMS text message 2-79 and will provide the messaging gateway 2-60 with a telephone number for a SMS text capable user device.

At this juncture it is noted that it is considered critical to the present invention that the challenge message 2-94 be transmitted through a discrete channel, which is herein defined as being a communication channel not readily identifiable by information submitted by an end user 2-34 in making a request for access to a secured resource. For example, if the end user 2-34 chooses to utilize his or her electronic mail address as a user identification, the schema for the user database 2-58 and/or the authenticator 2-52 should ensure that the challenge message 2-94 is not transmitted by electronic mail to the same electronic mail address. Likewise, an end user 2-34 requesting access to a secured resource using his or her mobile telephone number as an identifier will not be able to receive a challenge message 2-94 by SMS or standard text message 2-79 or synthesized voice call to the same mobile telephone number. That said, however, it is noted that the schema as depicted in FIG. 2-8 contemplates that a single user may have more than one possible message channels assigned. As a result, a channel may be discrete for some requests, but not for others depending upon the information provided by the end user 2-34 to the service client 2-33 in making a particular request.

Referring to FIG. 2-11 in particular, there is shown a typical simple challenge message 2-94 as may be transmitted to an end user 2-34 through an SMS text enable smart phone or like mobile device 2-78. Following with the presented example, it is noted that in an optional but useful feature of the present invention the challenge message 2-94 may also include information helpful to the consumer in making a response. For example, the challenge message 2-94 depicted in FIG. 2-13 includes the name of the on-line service provider, the purchase amount for which the user requests access to his or her secured resource and also the client reference used by the on-line service provider.

Substantially contemporaneously with transmission of the challenge message 2-94, the challenge manager 2-53 will report transmission of the challenge message 2-94 to the authenticator 2-52. With the challenge message 2-94 transmitted, the authenticator 2-52 will then proceed to provide the service client 2-33 with the image data necessary to the conduct of any required test designed to detect the existence of a spoofing type deception. As previously noted, the challenge manager 2-53 sent an image file to the consumer. Rather than providing such an image file to the service client 2-33, however, the preferred implementation of the test comprises sending to the service client 2-33 a file location for a copy of the image file resident on a fileserver associated with the service provider 2-36, which file location may then be made temporary for use as will be better understood further herein. In any case, once an appropriate message containing the necessary image data is generated, the authenticator 2-52 will generally queue the spoofing test message at the service provider's client gateway device. If not already established, the client gateway device 2-108 will then undertake to establish secure communication with the corresponding service gateway device 2-106 at the service client 2-33. Once the required secure communication is established the client gateway 2-108 will forward the spoofing test message through the established secure communication channel to the service client's service gateway 2-106, where the nature of the spoofing test message will be identified and the spoofing test message will then be conventionally routed to the request handler 2-51 on the service client's application server 2-101. Once received by the request handler 2-51, the request handler 2-51 will proceed to store the image data in along with the previously stored request data in the client database 2-104 for later use as will be explained in greater detail further herein.

Finally, the authenticator 2-52 obtains the consumer's private string from the user table 2-85 of the user database 2-58, as shown in FIG. 2-8, and then submits the challenge string 2-49 (along with any special instructions 2-93) and the private string to the validation tool 2-55, which in turn determines the correct response string. The determined correct response string is then assigned as the key string for the transaction and stored in the key string table 2-97 of the transaction database 2-59. At this time, a timestamp may also be entered into the transaction table 2-86 of the transaction database 2-59 in order to provide a reference by which may be calculated a timeout event for the validity of the key string (response string submitted as an authentication credential).

Before turning the example to detailed discussion of the steps 2-48 implicated in validating the purported access right of the user requesting access to the secured resource, however, attention is directed to FIG. 2-12 and FIG. 2-13, which each depict some variation of possible challenge messages 2-94 and/or additional detail regarding the presentation to the consumer of an image 2-112 for use in detecting a possible spoofing type deception. In FIG. 2-12, in particular, an image 2-112 is shown as being presented with the challenge string 2-49 as part of the challenge message 2-94. As indicated by the example instruction text included with or as part of the challenge message 2-94, the consumer is directed to look for a corresponding image to be displayed on the website of the on-line retail store and to not enter a response string unless the correct image is observed. FIG. 2-13 shows one simple example of the many previously discussed possibilities for providing special instructions 2-93 in connection with the issuance of a challenge message 2-94. In the depicted case, the consumer is directed to respond to the challenge string 2-49 using only numbers from his or her private string. As will be appreciated by those of ordinary skill in the art, this instruction 2-93 will be particularly beneficial when it is known that the consumer will be forced to enter the response string through a limited input modality such as, for example, the simple keypad 2-95 depicted in FIG. 2-7.

Turning the example now to detailed discussion of the steps implicated in validating the purported access right of the user requesting access to the secured resource, it is first noted that an end user 2-34 of the present invention will necessarily formulate a response string corresponding to a challenge string 2-49 outside of the hardware and/or software provided as part of the authentication system 2-30 of the present invention. That said, the validation steps begin with the consumer using his or her web browser 2-69 to first navigate to the URL of a payment confirmation webpage 2-75 for the on-line retailer service client 2-33. As is otherwise conventional, the consumer's web browser 2-69 will send a page request to the on-line retailer's web server 2-66 where a hosted page processor 2-64 will create and send back to the consumer's web browser 2-69 the requested "payment confirmation" webpage 2-75, making use of the on-line retailer's client database 2-104 to retrieve stored information pertaining to the consumer, the transaction or the like. As shown in FIG. 2-14, the requested page 2-75 may simply comprise a simple form through which the consumer may input his or her formulated response string and then select the depicted "confirm" button. As will be appreciated by those of ordinary skill in the art, this simple example assumes that the consumer has remained on the website of the on-line retailer such that the transaction identifier remains known to the page processor 2-64 and also that no test designed to detect the existence of a spoofing type deception will be presented. Similarly, the requested page 2-75 as depicted in FIG. 2-15 also assumes that no test designed to detect the existence of a spoofing type deception will be presented, but contemplates that the consumer may have left and returned to the website for completion of the purchase transaction. As will be appreciated by those of ordinary skill in the art in light of this exemplary description, the depictions of FIG. 2-14 and FIG. 2-15 may be appropriate for responding to the challenge as depicted in FIG. 2-11. For purposes of this continuing example, it shall be assumed that the consumer's private string is 2F46DAH525. As a result, the correct response string for the challenge string 2-49 of FIG. 2-11 would be 24FA63462B, which would be entered by the consumer. With the response string entered, the consumer's web browser 2-69 submits the data to the on-line retailer's web server 2-66 where the hosted page processor 2-64 may validate the form data for technical completeness and accurate formatting. Assuming that the submitted data is technically correct or is subsequently made technically correct, the page processor 2-64 submits the consumer's response string to the request handler 2-51 hosted on the on-line retailer's application server 2-101.

As shown in FIG. 2-16, however, the requested page 2-75 may comprise a slightly more complex form through which the consumer may be required to enter the client reference for the transaction although, as shown in FIG. 2-16 the client reference data may be pre-populated if the consumer has not left the website. As will be appreciated by those of ordinary skill in the art, this form contemplates that the consumer may want to address a different transaction than presently being handled by the webpage 2-75 or that the consumer has left and returned to the website for completion of the purchase transaction. Additionally, this exemplary form contemplates that a test designed to detect the existence of a spoofing type deception may or may not be presented. In any case, once the consumer is satisfied that the desired client reference is shown the consumer will then select the depicted "continue" button, whereafter the consumer's web browser 2-69 submits the data to the on-line retailer's web server 66 where the hosted page processor 2-64 may validate the form data for technical completeness and accurate formatting. Assuming that the submitted data is technically correct or is subsequently made technically correct, the page processor 2-64 submits the consumer's response string to the request handler 2-51 hosted on the on-line retailer's application server 2-101. Once received by the request handler 2-51, the client reference will be utilized to retrieve the stored request data from the client database 2-104 and the request handler 51 will determine whether a test designed to detect the existence of a spoofing type deception should be presented. If not, the request handler 2-51 will so inform the page processor 2-64 which, in turn, may then update or otherwise create and send back to the consumer's web browser 2-69 a "payment confirmation" webpage 2-75 like that of FIG. 2-14, whereafter the consumer continues as previously discussed.

If, on the other hand, the request handler 2-51 determines that a test designed to detect the existence of a spoofing type deception should be presented the request handler 2-51 will retrieve from the client database 2-104 the image data previously transmitted from the service provider 2-36 and associated with the transaction by client reference. In the preferred embodiment of the present invention, the image data will comprise a web address pointing to a publicly accessible image file matching the image file transmitted as part of the challenge message 2-94 to the consumer. The page processor 2-64 will then create a page 2-75 such as depicted in FIG. 2-17, wherein the webpage 2-75 presents the image 2-112 by linking to the external web address at which the image 2-112 is hosted. As will be appreciated by those of ordinary skill in the art in light of this exemplary description, the depiction of FIG. 2-17 may be appropriate for responding to the challenge as depicted in FIG. 2-12. Assuming still that the consumer's private string is 2F46DAH525, the correct response string for the challenge string 2-49 of FIG. 2-12 would again be 24FA63462B, which would be entered by the consumer.

As previously discussed, the preferred implementation of the test designed to detect the existence of a spoofing type deception comprises sending the service client 2-33 a file location for a copy of the image file resident on a fileserver associated with the service provider 2-36, which file location may then be made temporary. By making the file location temporary, the file can be removed or restricted and/or replaced with a warning image once accessed. In this manner, if the consumer has accidently navigated to a spoofed web site conducting a man-in-the-middle type deception in particular, the bad actor will in the course of accessing the true on-line retailer's website access the image link. In the unlikely case that the bad actor is able to retrieve and replicate the link for presentation to the consumer, however, the image 2-112 will have been removed or replaced by the time that the consumer links to the web address for the image. In this case, as shown in FIG. 2-18, the consumer will see the bad actor generated webpage with the prominently displayed warning image 2-114.

Finally, as shown in FIG. 2-19, the consumer may be required to actually select one image 2-112 from a plurality of images 2-115 at the same time as he or she is required to enter his or her response string. In such a case, the image selection will be transmitted with the response string and will form a part of the overall response to be evaluated by the service provider 2-36. As will be appreciated by those of ordinary skill in the art, this embodiment serves to ensure that a careless consumer does not fail to carefully check for the required image 2-112.

In any case, with the response string entered, the consumer's web browser 2-69 submits the data to the on-line retailer's web server 2-66 where the hosted page processor 2-64 may validate the form data for technical completeness and accurate formatting. Assuming that the submitted data is technically correct or is subsequently made technically correct, the page processor 2-64 submits the consumer's response string to the request handler 2-51 hosted on the on-line retailer's application server 2-101 where a response message is assembled for transmission to the service provider 2-36. The request handler 2-51 will then generally queue the response message, which will include the entered response string, at the on-line retailer's service gateway device 2-106. If not already established, the service gateway device 2-106 will then undertake to establish secure communication with the corresponding client gateway device 2-108 at the service provider 2-36. Once the required secure communication is established the service gateway 2-106 will forward the response message through the established secure communication channel to the service provider's client gateway 2-108, where the nature of the response message will be identified and the response message will then be conventionally routed to the authenticator 2-52 hosted on the service provider's application server 2-50.

The authenticator 2-52 will then direct the validation tool 2-55 to evaluate the response string based upon the client reference for the response message. The validation tool 2-55 will access the key string table 2-97 of the transaction database 2-59 to retrieve the key string associated with the particular client reference and will evaluate the submitted response string against the retrieved key string taking into account, if appropriate for the particular implementation, the passage of time. Additionally, in a case where the selection of a particular image also forms part of the required response in addition to the response string, the validation tool 2-55 will also determine whether the correct image was selected by the end user 2-34. In any case, the validation tool 2-55 will then report the result of the evaluation to the authenticator 2-52. If the evaluation fails, the process 2-48 will terminate and the failure will be reported to the service client 2-33. If, on the other hand, the evaluation passes the authenticator 2-52 will determine whether a secured resource need be accessed on behalf of the on-line retailer.

If the authenticator 2-52 determines that a secured resource should be accessed, a resource request is formulated using the transaction parameters stored in the transaction parameter table 2-87 of the transaction database 2-59 and any additional information as may be necessary that is stored in the user database 2-58. For example, in the case of processing a credit card transaction, the authenticator 2-52 will retrieve the transaction amount from the transaction parameter table 2-87 of the transaction database 2-59 and will retrieve the full credit card number, expiration date, billing address, CV number or other necessary information pertaining to the credit card account from the resource attribute table 2-89 of the user database 2-58 and may also retrieve from the user attribute table 2-92 of the user database 2-58 necessary information concerning the on-line retailer such as, for example, the on-line retailer's banking information for deposit of obtained funds. In any case, the complete resource request is by the authenticator 2-52 queued to the resource gateway 2-109 and processed whereafter the result of the transaction is reported to the on-line retailer and also, preferably, to the consumer.

In a particularly efficient feature of the present invention, the service provider 2-36 may provide for the consumer an electronically generated receipt for the conducted transaction, which may be transmitted by electronic mail or otherwise. In a case where the on-line retailer or other service client 2-33 provides itemized or otherwise detailed purchase data, such data may be included as part of the receipt. This, of course, completely relieves the service client 2-33 of having to generate a receipt. Additionally, combined transaction data may be assembled by the service provider 2-36 for periodic bulk reporting to the service client 2-33. Still further, the service provider 2-36 may, if desired, implement a budgeting service for the end user 2-34, wherein at the end user's behest financial transactions over budgeted limits or over budgeted limits for particular service clients 2-33 or types of service clients 2-33 will be deemed to fail validation in order to force compliance with the terms of a budget.

Finally, it is noted that in previously describing the manner in which the authentication system 2-30, implemented according to the exemplary example presented, may determine an otherwise unknown unique USER_ID for the consumer from knowledge of the unique RESOURCE_ID for an identified secured resource (the credit card number in the presented example) it was stated that from the resource table 2-88 (holding the unique RESOURCE_ID for the credit card) the user table 2-85 (holding the unique USER_ID for the consumer) could be accessed through the resource user table 2-99. While those of ordinary skill in the art will recognize that the foregoing example use could have been carried out with an implementation omitting the intermediary resource user table 2-99, provision of the resource user table 2-99 as join table for the resource table 88 and the user table 85 establishes a many-to-many relationship between the records of the resource table 2-88 and the user table 2-85, whereby additional functionality is imparted to the authentication system 2-30 and method 2-46 of the present invention. In particular, by allowing a single secured resource to be associated with a plurality of end users 2-34, joint or other plural access control may be established for the secured resource.

For example, a parent of child patient presenting for treatment at a medical clinic may provide the child's Social Security Number to the clinic for use by the clinic in requesting access to the child's electronic medical records accessible by either one of two passwords held one each by two parents. In this case, the authentication system 2-30 implemented to provide for multiple user association with a single secured resource may simply look up each parent end user 2-34 associated with the child's identified medical record (secured resource) and send a separate challenge message 2-94 to each, storing the appropriate key strings in separate records of the key string table 2-97 of the transaction database 2-59, each record being connected by TRANSACTION_ID to the single transaction record established in the transaction table 2-86 of the transaction database 2-59 for the request for access to the child's medical record. As will be appreciated by those of ordinary skill in the art, the validation tool 2-55 of the authentication system 2-30 will evaluate a received response string against each key string associated with the transaction and will find valid a response string matching either. By way of further example, and without limitation, it should be appreciated, especially in light of this exemplary description, that this aspect of the present invention will have broad application, including for use in authorizing transactions against shared credit card or banking accounts, accessing shared on-line service accounts, deactivating an alarm system or access a computer controlled door for a home, business or other facility shared by many occupants or similar applications.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 2-34 that system, facility or the like for which the end user 2-34 desires access has implemented the teachings of the present invention. Likewise, those of ordinary skill in the art will recognize that a special program magnetic card or the like may be implemented in order to enable card swipe type initiation of a request for access. In this case, of course, the magnetic card may be encoded with an identification code for the user including no confidential or sensitive information, but preferably useful only in connection with identifying the end user 2-34 to an authentication system 2-30 implemented in accordance with the teachings of the present invention. In any case, because the scope of the present invention is much broader than any particular embodiment, the foregoing detailed description should not be construed as a limitation of the scope of the present invention, which is limited only by the claims appended hereto.

Third Described Embodiment

Referring now to FIG. 3-1 in particular, the authentication system 3-30 of the present invention is shown to generally comprise an operative combination of a plurality of service client implemented use cases 3-31 and a plurality of service provider implemented use cases 3-32. In particular, the service client 3-33 of the present invention will generally provide for an end user actor 3-34 a means 3-38 for requesting access to a secured resource and, additionally, a means 3-3-37 for submitting an authentication credential for use in validating the purported access right of the end user actor 3-34. In an extension of the present invention particularly useful in implementations comprising an Internet website-based or other client user interface 3-105 generally susceptible to spoofing type deceptions, the service client 3-33 may in combination with the means 3-37 for submitting an authentication credential also be adapted to provide for the end user actor 3-34 a means 3-35 for detecting the existence of a spoofing type deception.

As also particularly shown in FIG. 3-1, the service provider 3-36 of the present invention will generally provide for a service client actor 3-33 a means 3-74 for forwarding an end user actor submitted request for access to a secured resource to the service provider 3-36 and, additionally, a means 3-40 for forwarding an end user provided authentication credential to the service provider 3-36. Additionally, the service provider 3-36 of the present invention will generally provide responsive to the forwarding by a service client actor 3-33 of an end user submitted request for access to a secured resource a means 3-39 for generating and sending to an end user actor 3-34 a challenge message 3-94 designed to enable only the intended end user actor 3-34 to determine the content of a transient authentication credential. Still further, the service provider 3-36 of the present invention will generally provide responsive to the forwarding by a service client actor 3-33 of an end user submitted authentication credential a means 3-41 for validating the authentication credential.

In a further aspect of the extension of the present invention previously discussed as being particularly useful in implementations comprising an Internet website-based or other client user interface 3-105 generally susceptible to spoofing type deceptions, the service provider 3-36 may in combination with the means 3-39 for generating and sending to an end user actor 3-34 a challenge message 3-94 also be adapted to provide a means 3-82 for generating content for use in the means for detecting the existence of a spoofing type deception and to provide such content to the end user actor 3-34 as well as to the service client actor 3-33.

In a further extension of the present invention particularly useful in implementations wherein the service provider 3-36 may not otherwise be readily able to determine the identity of a resource to which an end user actor 3-34 requests access based on the information content of the request as initially forwarded by a service client actor 3-33 to the service provider 3-36, the service provider 36 may in combination with the means 3-74 for forwarding an end user provided request for access to a secured resource also be adapted to provide a means 3-42 for prompting the service client actor 3-33 to provide additional identifying information for the requested resource. In this case, the service client 3-33 may in combination with providing for an end user actor 3-34 a means 3-38 for requesting access to a secured resource also be adapted to provide a means for determining a particular resource for which the end user actor 3-34 requests access such as, for example, a means for prompting the end user actor 3-34 to provide additional identifying information for the requested resource.

In yet a further extension of the present invention particularly useful in the most typical implementations of the present invention wherein for security or other reasons the service client 3-33 is unable to directly access features or functionality of a resource for which an end user actor 3-34 has requested access, the service provider 3-36 is also adapted to provide for the end user actor 3-34 and/or the service client actor 3-33 a means 3-96 for conducting a transaction reliant upon or otherwise in connection with the requested secured resource. In this case, it is noted that the secured resource may be provided by and/or otherwise under the further control of a resource provider actor 3-43 external to the service provider 3-36 or, in the alternative, may be provided and/or implemented by and/or otherwise under the control of the service provider 3-36. In any event, the means 3-96 for conducting a transaction reliant upon or otherwise in connection with the requested secured resource may generally also further comprise a means for reporting the conducted transaction to the service client actor 3-33 and/or the end user actor 3-34.

Finally, it is noted that time 3-44 as an actor may be accommodated as desired in any particular implementation wherein the service provider 3-36 is also provided with means 3-45 responsive to the passage of time for revoking or otherwise invalidating an authentication credential such that an authentication credential otherwise correctly determined by an end user actor 3-34 in response to a service provider generated challenge message 3-94 may as a result of the passage of time be deemed to be incorrect, thereby resulting in a validation failure upon application of the means 3-45 for validating the authentication credential.

Referring now then to FIG. 3-2 through FIG. 3-4 in particular, the authentication method 3-46 of the present invention as operative upon the described authentication system 3-30 is shown to generally comprise various series of interactions between an end user 3-34, a service client system 3-33 and a service provider system 3-36, as broadly set out in FIG. 4, wherein the interactions may be broadly categorized as steps 3-47 implicated in requesting access to a secured resource, as broadly set out in FIG. 3-2, and steps 3-48 implicated in validating the purported access right of the user requesting access to the secured resource, as broadly set out in FIG. 3-3.

As particularly shown in FIG. 3-2 and FIG. 3-4, the authentication method 46 of the present invention generally begins with an end user 3-34 submitting or otherwise making through a service client 3-33 a request for access to a secured resource, which end user submitted request is then forwarded by the service client 3-33 to the service provider 3-36. Although generally considered to be an optional feature of the present invention, it is noted that prior to forwarding the end user submitted request to the service provider 36 the service client 3-33 may, if desired, first determine whether the end user 3-34 making the request is authorized or otherwise permitted to make such use of the service client system 3-33. If in an implementation of this feature it is determined that the end user 3-34 is not authorized or otherwise permitted to make the attempted use of the service client system 3-33 the instigated process 3-47 will generally terminate whereas if it is determined that the end user 3-34 is authorized or otherwise permitted to make the attempted use of the service client system 3-33 the process 3-47 will generally continue. In any case, in an additional also optional but most preferred feature of the present invention, the service client systems 3-33 may be programmed or otherwise configured to ensure prior to forwarding the end user submitted request to the service provider 3-36 that a secure communication channel is first established between the service client 3-33 and the service provider 3-36. If in an implementation of this feature the required secure communication channel cannot be established between the service client 3-33 and the service provider 3-36 the continuing process 3-47 will generally terminate whereas if the required secure communication channel is successfully established between the service client 3-33 and the service provider 3-36 the process 3-47 will generally continue.

In any case, once an end user submitted request is forwarded by the service client 3-33 to the service provider 3-36 the remaining processing of the request is conducted by the service provider 3-36. In particular, once the forwarded request is received by the service provider 3-36, the service provider 3-36 preferably determines whether the end user 3-34 making the request is authorized or otherwise permitted to make such use of the authentication system 3-30. If in an implementation of this feature it is determined that the end user 3-34 is not authorized or otherwise permitted to make the attempted use of the authentication system 3-30 the process 3-47 will generally terminate whereas if it is determined that the end user 3-34 is authorized or otherwise permitted to make the attempted use of the authentication system 3-30 the process 3-47 will generally continue. In any case, it is noted that in an important aspect of the present invention the service provider 3-36 must be able to evaluate the service client forwarded request to determine the specific identity of the resource for which the request is made. Because, as a critical feature of the present invention, the common identifier for the resource will for security reasons be hidden from the service client 3-33, this step necessarily involves determining the identity of the resource from some element or combination of elements of information other than the common identifier for the resource. In any case, if the available and/or obtainable information is insufficient for the service provider 3-36 to positively determine the identity of the resource for which the end user 3-34 has requested access the process 3-47 will generally terminate whereas if the available and/or obtainable information is sufficient for the service provider 3-36 to positively determine the identity of the resource for which the end user 3-34 has requested access the process 3-47 will generally continue.

In the final steps for processing 3-47 an end user submitted request for access to a secured resource, the service provider 3-36 generates a challenge message 94 designed to enable only an authorized end user 3-34 to determine the content of a transient authentication credential and, thereafter, issues the challenge message 3-94 to the end user 3-34. In connection with the step of generating the challenge message 3-94, however, and as a predicate to the step of issuing the challenge message 3-94, a service provider system 3-36 implemented as part of an authentication system 3-30 that also comprises a means 3-35 for detecting the existence of a spoofing type deception must be adapted to determine whether under the circumstances of the particular in process request for access to a secured resource such a means 3-35 for detecting the existence of a spoofing type deception should be deployed. If in such an implementation it is determined that no test for detecting the existence of a spoofing type deception need be established the challenge message 3-94 is issued without more whereas if it is determined that a test for detecting the existence of a spoofing type deception should be deployed the service provider 3-36 will establish the parameters of an appropriate test and include the established parameters in connection with or as part of the issued challenge. Additionally, the service provider 3-36 will also communicate the established parameters for the test to the service client 3-33 for use in and during the conduct of steps implicated in validating the purported access right of the end user 3-34 requesting access, which steps will be described in greater detail further herein.

With the challenge message 3-94 issued by the service provider 3-36 to the end user 3-34, the end user 3-34 then formulates a response to the challenge based upon information generally known only to the end user 3-34 and the service provider 3-36 and which, in no case, is ever known by or communicated to or through the service client 3-33. Once the end user 3-34 has formulated a response to the challenge, and assuming that the end user 3-34 desires to continue the in-process transaction, the end user 3-34 will then submit the formulated response to the service client 3-33 as an authentication credential.

Referring now then to FIG. 3-3 and FIG. 3-4 in particular, validation 3-48 of the purported access right of the user requesting access to a secured resource is shown to generally begin with the submission to a service client 3-33 by the end user 3-34 of an authentication credential, which authentication credential has been previously formulated by the end user 3-34 in response to issuance by the service provider 3-36 of a challenge message 3-94. As shown in FIG. 3-3, however, service client systems 3-33 implemented as part of an authentication system 3-30 that comprises a means 3-35 for detecting the existence of a spoofing type deception will prior to allowing submission by the end user 3-34 of an authentication credential first determine whether under the circumstances of the particular request in process for access to a secured resource such a means 3-35 for detecting the existence of a spoofing type deception should be deployed. If in such an implementation it is determined that no test for detecting the existence of a spoofing type deception need be established the end user 3-34 is allowed by the service client 3-33 to submit the authentication credential without more whereas if it is determined that a test for detecting the existence of a spoofing type deception should be deployed the service client 3-33 will present to the end user 3-34 an appropriate test for detecting the existence of a spoofing type deception, wherein the presented test is constructed by the service client 3-33 using the test parameters as previously established and provided by the service provider 3-36.

In any case, an authentication credential submitted by the end user 3-34 must in order for the validation to continue be forwarded by the service client 3-33 to the service provider 3-36. In an optional but most preferred feature of the present invention, the service client 3-33 may be programmed or otherwise configured to ensure prior to forwarding an end user submitted authentication credential to the service provider 3-36 that a secure communication channel is first established between the service client 3-33 and the service provider 3-36. If in an implementation of this feature the required secure communication channel cannot be established between the service client 3-33 and the service provider 3-36 the continuing process 3-48 will generally terminate whereas if the required secure communication channel is successfully established between the service client 3-33 and the service provider 3-36 the process 3-48 will generally continue.

Upon successful forwarding by the service client 3-33 to the service provider 36 of the end user submitted authentication credential, the service provider 3-36 proceeds to validate the responsive authentication credential by comparing the authentication credential against a key string. As will be appreciated by those of ordinary skill in the art in light of this exemplary description, the key string will prior to or at the time of validation be determined by the service provider 3-36 utilizing knowledge of the previously discussed information generally known only to the end user 3-34 and the service provider 3-36 to formulate the key string as the known correct response to at least a portion of the previously issued challenge message 3-94 (the "primary challenge"). In addition to comparison of the authentication credential to a known key string, however, it is noted that in an authentication system 30 utilizing time 3-44 as an actor in order to provide a timeout for the validity of an outstanding challenge message 3-94, the service provider 3-36 will be programmed or otherwise adapted to determine as part of the validation step whether as a result of the passage of time the authentication credential should be deemed to be incorrect. In any case, if the authentication credential is found or otherwise deemed to be incorrect, the service provider 3-36 will preferably report the incorrect finding to the service client 3-33 and/or the end user 3-34 and the process 3-48 will generally terminate whereas if the authentication credential is found to be correct the process 3-48 will generally continue.

With the authentication credential found to be correct, the service provider 36 may simply report the correct finding to the service client 3-33 or, if for security or other reasons the service client 3-33 is unable to directly access features or functionality of a secured resource for which an end user actor 3-34 has requested access, the service provider 3-36 will then obtain for the end user 3-34 and/or the service client 3-33 the benefit of the requested secured resource and thereafter appropriately report the conducted transaction to the service client 3-33 and/or the end user 3-34.

With the foregoing broad overview of the general structure and function of the authentication system 3-30 of the present invention in mind, it is now noted that in accordance with the present invention an end user 3-34 may comprise any person or machine requiring, in connection with some other use, access or other relationship with a service client 3-33, access to a secured resource for which the service client 3-33 is restricted from full knowledge and for which the service provider 3-36 may hold full knowledge, full knowledge being defined herein as knowledge sufficient to make ordinary full use of the secured resource outside of the framework of the authentication system 3-30 and method 3-46 of the present invention. By way of simple example, the resource may comprise password protected information (e.g., a credit report) a portion of which (e.g., only the credit scores) a human end user 3-34 wishes to share with a service client 3-33 comprising an information consumer (e.g., a potential creditor) without providing to the information consumer the password (e.g., by which the full credit report is protected and as would otherwise enable the potential creditor to gain full access to the protected credit file).

Under the present invention, a service provider 3-36 having associated therewith a hardware and/or software implementation of the previously generally discussed functionality is in accordance with the present invention programmed or otherwise adapted to receive directly from the service client 3-33 an end user submitted request for access to the secured resource and, thereafter, to validate that the end user submitted request as forwarded by the service client 3-33 is made under the authorization of an end user 3-34 having right of access to the secured resource. In a critical aspect of all implementations of the present invention, the actual information held by the end user 3-34 through which the service provider 3-36 is capable of authenticating the access right of the end user 3-34 is strictly withheld from the service client 3-33.

With this in mind, the end user 3-34 may, for example, be a patient wishing to share medical information (a secured resource) with a caregiver (a service client 3-33) without having to grant to the caregiver unfettered access to all of his or her medical records; the end user 3-34 may be the holder of a credit card account, banking account, automated teller machine ("ATM") card and/or account or the like (a secured resource) wishing to purchase merchandise, service, information or the like from a retail store, service station, on-line service provider or merchandiser, other business or the like (a service client 3-33) without providing the service client 3-33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data, (a service client 3-33) without providing his or her Social Security Number or other information not necessary to the conduct of the present transaction.

In an additional critical aspect of the authentication system 3-30 and method 3-46 of the present invention an additional security measure is implemented by requiring that the service client 3-33 be restricted also from access to the common identifier for the secured resource, e.g. the account number for a credit card or financial deposit account; the Social Security Number of a patient; the account number of an ATM card; or the like. As will be better understood further herein, this critical aspect of the present invention will require that the service provider system 3-36 be capable of determining from other information the identity of the resource to which the end user 3-34 desires access. In order to better describe these critical aspects of the present invention, however, reference is now made to the deployment diagram of FIG. 3-5A and FIG. 3-5B, wherein there is shown the various elements of an exemplary hardware and software based implementation of an authentication system 3-30 constructed in accordance with the teachings of the present invention.

Before continuing, however, it is noted that while the implementation depicted in FIGS. 3-5A and 3-5B is exemplary of the authentication system 3-30 of the present invention, it is in no manner meant to be all encompassing or otherwise limiting of the wide range of implementations as are possible. In addition, it is noted that while some elements are in FIGS. 3-5A and 3-5B shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIGS. 3-5A and 3-5B, there is generally shown in FIG. 3-5A a service client 3-33 (such as, for example, may comprise a retail store, service station, on-line service provider or merchandiser or other business; a healthcare or medical insurance provider; an automated teller machine provider; a consumer of information products, such as an automobile dealership in need of consumer credit data; or the like) and various elements generally associated or often collocated with the service client 3-33. In particular, an exemplary service client 3-33 may deploy one or more application servers 3-101 or database servers 3-102 upon which may be hosted software functionality necessary to operation within the framework of the present invention in addition to the unrelated operations of the service client 3-33. In particular, an application server 3-101 may host a request handler software component 3-51 adapted to receive, process and/or otherwise handle requests and submissions from an end user 3-34 as well as to produce output for the end user 3-34 as may be necessary in the operation of the present invention. In facilitation of such activities, a database management system 3-103 comprising one or more client databases 3-104 may be provided to store and access data as may be required. Additionally, a client user interface 3-105 is provided and adapted to provide input from an end user 3-34 to the hardware and/or software systems of the service client 3-33 and to provide output from these systems to an end user 3-34. Finally, a service gateway 3-106 provides preferably secure communication between the service client systems 3-33 and the systems of the service provider 3-36.

As is generally shown in FIG. 3-5B, a service provider 3-36 (such as, for example, may comprise a specialized provider of the authentication services of the present invention; a provider of other products or services having need of authentication services, such as, for example, a credit card processor or financial institution or an alarm monitoring company; or the like) also has associated therewith one or more application servers 3-50 or database servers 3-98 upon which may be hosted software functionality necessary to operation within the framework of the present invention. In particular, an application server 3-50 may host an authenticator 3-52 adapted to handle or otherwise control all aspects of the authentication process within the realm of responsibility of the service provider 3-36, including receiving authentication requests, storing and/or retrieving data pertinent to the processing of such requests, directing the generation and sending of challenge messages 3-94, and directing the validation of authentication credentials submitted in response to challenge messages 3-94 and actions taken based upon the results of such validations. In order to improve efficiency, the authenticator component 3-52 may comprise one or more further specialized components such as, for example, a challenge manager 3-53 adapted to facilitate creation and transmission of challenge messages 3-94, a random sequence generator 3-54 as may be useful in the highly specialized task of creating random sequences which, as will be better understood further herein, are an integral feature of the present invention, and a validation tool 3-55 adapted to conduct the specialized task of comparing received authentication credentials with known key strings. Additionally, the application server may also host an administration tool 56 through which various aspects of the setup, maintenance and operation of the hardware and software systems of the service provider 36 may be managed.

In order to efficiently manage and handle the large quantity of data that may typically be stored in connection with an implementation of the present invention, one or more dedicated database servers 98 hosting database management systems 3-57 are generally desired. As shown in FIG. 3-5B, a typical database management system may include a user database 3-58 for storing a wide variety of generally user centric data as may be required in the operation of the present invention, a transaction database 3-59 for storing data generally associated with the conduct of individual transactions and an image database 3-107, which, as will be better understood further herein, is particularly adapted for storing data associated with implementation of the means 3-35 for detecting the existence of a spoofing type deception. Although those of ordinary skill in the art will recognize that virtually unlimited alternatives are possible, FIG. 3-8 shows a very high level but generally representative schema for a user database 3-58 and FIG. 3-9 shows a very high level but also generally representative schema for a transaction database 3-59, each of which will be described in greater detail further herein in connection with an exemplary description of the conduct of a typical transaction.

Additionally, one or more client gateways 3-108 provide preferably secure communication between the service provider systems 3-36 and the systems of one or more service clients 3-33 and a preferably unified messaging gateway 3-60 is provided for use in issuing challenge messages 3-94 through various communication channels to end users 3-34. As will be appreciated by those of ordinary skill in the art, such a unified messaging gateway 3-60 may be utilized to transmit a generated challenge message 3-94 in any of a plurality of message formats (such as, for example, as a SMS message, a standard text message, an e-mail message, a synthesized voice message, an alphanumeric page or the like) over any of a plurality of communication channels (such as, for example, an SMS or other text channel, a SMTP channel, a POTS channel, a paging network or private broadcast channel or the like) to be received by any of a plurality of user devices (such as, for example, a mobile or landline telephone, a smart phone, an e-mail client, a PDA, a numeric or digital pager or the like). Still further, a service user interface 3-61 is provided and adapted to provide input from all manner of users 3-62, including administrative users, end users 3-34 and service clients 3-33, to the hardware and/or software systems of the service provider 36 and to provide output from these systems to the various users 3-62. As will be appreciated by those of ordinary skill in the art, the provision of a service user interface 3-61, which of course should be secured, enables the various users 3-62 to maintain and/or otherwise manage the data stored in the user database 3-58 as may be appropriate as well as to generally manage and maintain the implemented authentication system 3-30. Finally, one or more resource communication gateways 3-109 may be provided in order to establish preferably secure communication between the systems of the service provider 3-36 and outside resource providers 3-43.

As exemplified by FIG. 3-6 and FIG. 3-7, the client user interface 3-105 in particular, but also to some extent the service user interface 3-61, may take a wide variety of forms depending upon the circumstances of any particular implementation. For example, as shown in FIG. 3-6, a typical user interface may be implemented as a web interface 3-63 wherein there may be provided a page processor 3-64 hosted on an appropriate execution environment 3-65 installed on a dedicated web server 3-66 in Internet communication 3-67 with a user device 68, such as, for example, a personal computer, a smart phone, other mobile device 3-78 or the like, and on which is installed and/or hosted a web browser running 3-69 in a provided execution environment 3-70. On the other hand, as shown in FIG. 3-7, a client user interface 105 may comprise a more dedicated and integrated arrangement such as the depicted POS, fueling station or ATM terminal device 3-73 comprising as input modalities a keypad 3-95 and a card reader and comprising as an output modality a visual display such as the depicted screen 3-77. Additionally, those of ordinary skill in the art will recognize that in addition to the depicted implementations, the client user interface 3-105 may comprise a network interface such as may be utilized by a customer service representative (considered herein as an end user 3-34 acting through the representative), a telephone auto attendant, which may implement a DTMF decoder, speech recognition engine, TDD/TTY decoder or the like; or virtually any other combination of input modalities (including barcode readers or scanners, keyboards, keypads, card and/or magnetic stripe readers, pointing devices, microphones and the like) and output modalities (including visual displays such as computer or other device monitors or screens, audio output devices such as headphones or other speakers, tactile output devices such as may be adapted for the visually impaired and the like).

Continuing then with the example generally described with respect to FIGS. 3-5A and 3-5B, further details of the implementation are now described by way of the following detailed description of a possible use of the implementation for conducting a retail purchase transaction, which, for purposes of the example, shall be taken as completion of a purchase at an on-line retailer (the service client 3-33) by a consumer (the end user 3-34) having available for payment a credit card and a checking account (secured resources). To complete the transaction, the consumer will indicate a desire to make a payment to the on-line retailer, which will forward the consumer's request to a service provider 36 for identification of the secured payment resource with which to fulfill the consumer's request, for authentication of the consumer's right of access to the identified secured payment resource and for obtaining payment for the on-line retailer from the identified secured payment resource. In accordance with a critical aspect of the present invention, however, the on-line retailer cannot be provided with or otherwise be made aware of either the consumer's credit card or checking account number and also must not be given any information that would allow the on-line retailer to repeat the transaction without again obtaining authorization from the consumer.

To begin the process, then, the consumer end user 3-34 will use his or her web browser 3-69 to first navigate to the URL of an order completion webpage 3-75 for the on-line retailer service client 3-33. As is otherwise conventional, the consumer's web browser 3-69 will send a page request to the on-line retailer's web server 3-66 where a hosted page processor 3-64 will create and send back to the consumer's web browser 3-69 the requested "order completion" webpage 3-75, making use if required of the on-line retailer's client database 3-104 to retrieve stored information pertaining to the consumer, the transaction or the like. As shown in FIG. 3-10, the requested page 3-75 may simply comprise a simple form through which the consumer may input information indicative of the nature of the consumer's request for access to a secured resource. In this case, the consumer enters a payer identification, such as the consumer's e-mail address, as shown, or a telephone number, user name or the like and also selects the depicted "pay now" button. As will be better understood further herein, these two information components convey sufficient information to convey the purported identity of the consumer as well as the consumer's desire to make a payment transaction. With the data entered as shown, the consumer's web browser 3-69 submits the data to the on-line retailer's web server 3-66 where the hosted page processor 3-64 may validate the form data for technical completeness and accurate formatting. Assuming that the submitted data is technically correct or is subsequently made technically correct, the page processor 3-64 submits the consumer's request to the request handler 3-51 hosted on the on-line retailer's application server 3-101.

At this point, in an optional feature of the present invention, the on-line retailer may choose to verify that the tentatively identified consumer is permitted to make use of the on-line retailer's services for the requested purposes. For example, it may be that the on-line retailer requires registration prior to use of the authentication system 3-30 and method 3-46 of the present invention which, it is noted, may be utilized in a completely anonymous fashion to conduct extraordinarily secure financial and other transactions. If so, the request handler 3-51 may access the client database 3-104 or other accessible data store to determine that the tentatively identified consumer is a valid end user 3-34 from the perspective of the on-line retailer.

In any case, the request handler 3-51 will generally continue by creating a client reference for the transaction and assembling any other necessary parameters, such as payment amount, for transmission to the service provider 3-36. As will be appreciated by those of ordinary skill in the art, under many circumstances a service client 3-33 will have available all or virtually all information necessary for submitting (on behalf of an end user 3-34) a request to the service provider 3-36 without need for the end user 3-34 to enter additional data. To this end, an alternative depiction of an "order completion" page 3-75 is shown in FIG. 3-11 where the consumer need only indicate that he or she wishes to "pay now" in order to make complete use of the facilities of the present invention. In any case, once assembled the complete request data, including unique client reference, is preferably stored in the client database 3-104 for retrieval as may be required. In the case of a real-time transaction, however, storage is not required.

When the end user submitted request is thus ready for forwarding by the on-line retailer to a service provider 3-36 appropriate for handling the type of request made, the request handler 3-51 will generally queue the request at the on-line retailer's service gateway device 3-106. If not already established, the service gateway device 3-106 will then undertake to establish secure communication with the corresponding client gateway device 3-108 at the service provider 3-36. As will be appreciated by those of ordinary skill in the art, because the relationship between a service client 3-33 and a service provider 3-36 will generally be ongoing, well known and fairly static, the required secure communication may be established through any number of very secure protocols including, for example, the use of cryptography, Internet Protocol ("IP") verification and the like. In any case, once the required secure communication is established the service gateway 3-106 will forward the consumer's completed request through the established secure communication channel to the service provider's client gateway 3-108, where the nature of the request will be identified and the request will then be conventionally routed to the authenticator 3-52 hosted on the service provider's application server 3-50.

Upon receipt of the consumer's request, the authenticator 3-52 will generally first undertake to determine whether the purported end user 3-34 is recognized at the service provider 3-36. To this end, the authenticator 3-52 may access the user database 3-58, as generally shown in FIG. 3-8, to determine whether the provided payer identification can be located in the user table 3-85 or the alias table 3-110 of the user database 3-58. If not, the authentication process 3-46 may be terminated without or, preferably, with notice to the service client 3-33 or an appropriate message may be transmitted from the service provider 3-36 to the service client 3-33 allowing the service client 3-33 to prompt the end user 3-34 for correction and reentry of the unrecognized identifying information. If, on the other hand, the provided payer identification is recognized the authenticator 3-52 will proceed to establish a new transaction record in the transaction table 86 of the transaction database 3-59, as generally shown in FIG. 3-9, and at this time should also store in the transaction record the unique USER_ID by which the on-line service provider is known in the user database 3-58 and the on-line retailer's client reference. Additionally, transaction parameter records may be created in the transaction parameter table 3-87 of the transaction database 3-59 in order to collect and store information pertinent to the continued processing of the transaction such as, for example, the unique USER_ID by which the tentatively identified consumer is known in the user database 3-58, the amount of the requested payment or the like.

With the new transaction record established and known pertinent information appropriately stored, the authenticator 3-52 then undertakes to identify a particular secured resource for fulfillment of the consumer's request. As previously noted in the setup to the present example, however, the consumer wishing to make payment to the on-line retailer has more than one secured payment resource available for use, which information will become known to the authenticator 3-52 upon searching the resource table 88 of the user database 3-58 for secured resources associated with the USER_ID by which the tentatively identified consumer is known.

As shown in the exemplary user database 3-58 of FIG. 3-8, the resource table 3-88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system 3-30 of the present invention is preferably provided with means for determining a particular resource for access by or on the authority of the end user 3-34.

In a first example of such a means a priority may be assigned by each user of a resource to the particular resource, whereby resources of a particular class or, if the service client 3-33 accepts only a certain subclass, on the basis of a particular class and subclass the available resources meeting the selection criteria may be sorted to determine the appropriate resource for use. Such priority values may, for example, be stored in the resource user table 3-99 of the user database 3-58 as depicted in FIG. 3-8.

In a second example of such a means each resource may be assigned a pseudonym 3-90 comprising generally non-identifying information but nonetheless information which is unique among the class of resource for any particular user, which pseudonyms 3-90 may be stored in the resource table 3-88 of the user database 3-58. Making use of the stored pseudonym 3-90, this means for determining a particular resource for access by the end user 3-34 comprises generating an inquiry to the service client 3-33 whereby the service provider 3-36 requests that the service client 3-33 query the end user 3-34 for a selection of one resource based on the assigned pseudonym 3-90.

In the example implementation (assuming that no priority information was stored), upon determining that the tentatively identified end user 3-34 has more than one secured payment resources, but that each available resource has associate therewith a pseudonym 3-90, the service provider 3-36 would generate an inquiry for transmission for the on-line retailer, which inquiry may request that the on-line retailer attempt to determine whether the consumer wishes to proceed using his or her "Credit Card 9876" or using his or her "Checking 1234." Once generated, the authenticator 3-52 will generally queue the request at the service provider's client gateway device 3-108. If not already established, the client gateway device 3-108 will then undertake to establish secure communication with the corresponding service gateway device 3-106 at the service client 3-33. Once the required secure communication is established the client gateway 3-108 will forward the inquiry message through the established secure communication channel to the service client's service gateway 3-106, where the nature of the inquiry will be identified and the inquiry will then be conventionally routed to the request handler 3-51 on the service client's application server 3-101.

Upon receiving the inquiry message, the request handler 3-51 will generally retrieve the request data previously stored in the client database 3-104 and will then provide the combined previously stored data and newly received inquiry information to the page processor 3-64 for updating of the "order completion" page 3-75 and resending of the page to the consumer's web browser 3-69, which may then be rendered as shown in FIG. 3-12. In accordance with the present invention, the consumer may then select the desired payment option (as will be recognized by the end user 3-34 by the displayed pseudonym 3-90) and click the "continue" button. The consumer's web browser 3-69 then submits the updated data to the on-line retailer's web server 3-66 where the hosted page processor 3-64 may validate the form data for technical completeness and accurate formatting. Assuming that the submitted data is technically correct or is subsequently made technically correct, the page processor 3-64 submits the consumer's updated request to the request handler 3-51 hosted on the on-line retailer's application server 3-101.

When the updated end user submitted request is thus ready for resubmission by the on-line retailer to the service provider 3-36, the request handler 3-51 will generally queue the updated request at the on-line retailer's service gateway device 3-106. If not already established, the service gateway device 3-106 will then undertake to establish secure communication with the corresponding client gateway device 3-108 at the service provider 3-36. Once the required secure communication is established the service gateway 3-106 will forward the consumer's updated request through the established secure communication channel to the service provider's client gateway 3-108, where the nature of the updated request will be identified and the updated request will then be conventionally routed to the authenticator 3-52 hosted on the service provider's application server 3-50. At this point the authenticator 3-52 will again undertake to identify a particular secured resource for fulfillment of the consumer's request.

Finally, in a third example means for determining a particular resource for access by the end user 3-34, the determination is deferred and made in connection with issuing a challenge message 3-94 to the end user 3-34. This means, however, will be described in greater detail further herein in connection with further description of the challenge process.

In any case, once an appropriate particular secured resource is identified for access, the unique RESOURCE_ID by which the identified resource is known in the user database 3-58 is preferably stored in the key string table 3-97 of the transaction database 3-59, as shown in FIG. 9, while any remaining transaction parameters are preferably stored in the transaction parameter table 3-87 of the transaction database 3-59, as also shown in FIG. 3-9. With the end user 3-34 and the resource for which the end user 3-34 requests access both identified and logged to the transaction database 3-59, the authenticator 3-52 next undertakes to direct the generation of an appropriate challenge message 3-94, the response to which may be used to positively authenticate the identity of the presently tentatively identified end user 3-34.

In accordance then with the authentication system 3-30 and method 3-46 of the present invention, the primary challenge is generated to include a random string comprising a plurality of symbols wherein at least one of the symbols of the string is a null character, such a random string being referred to herein as a challenge string 3-49. Additionally, each end user 3-34 (and, if desired, also other types of users such as client users and/or administrative users) will have stored in the user table 3-85 of the user database 3-58 a private string, which is a user selected or assigned (depending on implementation preferences) string comprising symbols of the same set as used for generating the challenge string 3-49 but most preferably excluding use of the null character. The private string is generally only known to the user with which it is associated and the service provider 3-36. As will be better understood further herein, a user will formulate a response to a challenge string 3-49 by using the symbols of the user's private string to replace the null character or characters of the challenge string 3-49 to formulate a response string. In this manner, the response string may be passed through the service client 3-33 without the service client 3-33 being able to detect the private string and, accordingly, a system of readily established single use "passwords" is presented. Additionally, as also will be better understood further herein, the authentication system 3-30 and method 3-46 of the present invention may be implemented such that the protocol for creating a response string from a challenge string 3-49 is standardized in advance or, in the alternative, instructions 3-93 may be provided with the challenge message 3-94 or inferred from the manner of delivery of the challenge or circumstances of the use. For example, the user may be directed to formulate the response string using only numbers of the private string or may assume that only numbers should be used when entering the response string into a limited keypad 3-95 such as depicted in FIG. 3-7. Further, instructions 3-93 may be given to use every second or third symbol of the private string, to begin with a certain symbol of the private string, to take symbols from the private string in reverse order, or any combination of these and similar instructions 3-93. Still further, the user may be instructed as standard procedure or by challenge message 3-94 to repeat usage of individual symbols of the private string or the entire private string in order to respond to a challenge string 3-49 with more null characters than symbols available in the user's private string and/or simply as a matter of choice by the service provider 3-36.

Returning then to the example use of the authentication system 3-30 of the present invention it is noted that in the most preferred embodiment of the present invention prior to directing the generation of a challenge message 3-94 the authenticator 3-52 evaluates all available information that may impact the ability of an end user 3-34 to readily receive a particular challenge message 3-94 and/or to readily respond to a particular challenge message 94 and, additionally, determines whether any special security requirements may exist for access to the particular resource. In particular, the authenticator 3-52 will preferably obtain from the channel table 3-111 of the user database 3-58 channel data indicating the type of communication channel that will be utilized to transmit the challenge message 3-94. Additionally, the user attribute table 3-92 of the user database 3-58 may indicate whether the end user 3-34 suffers any disability that would impact the manner of response and/or may contain data associated with a service client 3-33 that may indicate special security requirements, such as a minimum length for the response string, or capabilities or limitations of the client user interface 3-105, such as being limited to entry of numeric characters only. Still further, the resource attribute table 3-89 of the user database 3-58 may also indicate special resource dictated security requirements, such as minimum length or desired complexity for a response string. In any case, the authenticator 3-52 will determine the characteristics that should be exhibited by the challenge string 3-49, including the manner of issuance, and will then instruct the challenge manager 3-53 to initiate issuance of a challenge message 3-94.

At this point it is noted that in accordance with an extension of the present invention, the primary challenge (comprising the challenge string 3-49 and any necessary response instructions 3-93) may be supplemented with the provision of a test designed to detect the existence of a spoofing type deception. In particular, the present invention contemplates the use of a dynamically selected image 3-112 for the conduct of this test. Although the particular conduct of this test will be described in greater detail further herein, it should at this time be noted that in an implementation wherein such a test will be required the challenge manager 3-53 will generally at this point in the process obtain from the image database 3-107 image data identifying the selected image 3-112 and its location on a fileserver and will store the obtained image data in the image table 3-113 of the transaction database 3-59. In any case, the challenge manager 3-53 will continue to obtain from the random sequence generator 3-54 a challenge string 3-49 meeting the requirements established and communicated by the authenticator 3-52. With the challenge string 49 generated and any image data obtained, the challenge manager 3-53 will proceed to construct the challenge message 3-94 which will at least comprise the challenge string 3-49, any special response instructions 3-93 and a copy of the image file if required. With the challenge message 3-94 assembled, the challenge manager 3-53 queues the challenge message 3-94 by providing the messaging gateway 3-60 with the challenge message 3-94, the type of communication channel to be utilized and the CHANNEL_ID for the channel. For example, if the challenge message 3-94 is to be sent by SMS text message 3-79, the challenge manager 3-53 will inform the messaging gateway 3-60 that the challenge message 3-94 is to be transmitted by SMS text message 3-79 and will provide the messaging gateway 3-60 with a telephone number for a SMS text capable user device.

At this juncture it is noted that it is considered critical to the present invention that the challenge message 3-94 be transmitted through a discrete channel, which is herein defined as being a communication channel not readily identifiable by information submitted by an end user 3-34 in making a request for access to a secured resource. For example, if the end user 3-34 chooses to utilize his or her electronic mail address as a user identification (or alias), the schema for the user database 3-58 and/or the authenticator 3-52 should ensure that the challenge message 3-94 is not transmitted by electronic mail to the same electronic mail address. Likewise, an end user 3-34 requesting access to a secured resource using his or her mobile telephone number as an identifier will not be able to receive a challenge message 3-94 by SMS or standard text message 3-79 or synthesized voice call to the same mobile telephone number. That said, however, it is noted that the schema as depicted in FIG. 3-8 contemplates that a single user may have more than one possible message channels assigned. As a result, a channel may be discrete for some requests, but not for others depending upon the information provided by the end user 3-34 to the service client 3-33 in making a particular request.

Referring to FIG. 3-13 in particular, there is shown a typical simple challenge message 3-94 as may be transmitted to an end user 3-34 through an SMS text enable smart phone or like mobile device 3-78. Following with the presented example, it is noted that in an optional but useful feature of the present invention the challenge message 3-94 may also include information helpful to the consumer in making a response. For example, the challenge message 3-94 depicted in FIG. 3-13 includes the name of the on-line service provider, the purchase amount for which the user requests access to his or her secured resource and also the client reference used by the on-line service provider.

Substantially contemporaneously with transmission of the challenge message 3-94, the challenge manager 3-53 will report transmission of the challenge message 3-94 to the authenticator 3-52. With the challenge message 3-94 transmitted, the authenticator 3-52 will then proceed to provide the service client 3-33 with the image data necessary to the conduct of any required test designed to detect the existence of a spoofing type deception. As previously noted, the challenge manager 3-53 sent an image file to the consumer. Rather than providing such an image file to the service client 3-33, however, the preferred implementation of the test comprises sending to the service client 3-33 a file location for a copy of the image file resident on a fileserver associated with the service provider 3-36, which file location may then be made temporary for use as will be better understood further herein. In any case, once an appropriate message containing the necessary image data is generated, the authenticator 3-52 will generally queue the spoofing test message at the service provider's client gateway device. If not already established, the client gateway device 3-108 will then undertake to establish secure communication with the corresponding service gateway device 3-106 at the service client 3-33. Once the required secure communication is established the client gateway 3-108 will forward the spoofing test message through the established secure communication channel to the service client's service gateway 3-106, where the nature of the spoofing test message will be identified and the spoofing test message will then be conventionally routed to the request handler 3-51 on the service client's application server 3-101. Once received by the request handler 3-51, the request handler 3-51 will proceed to store the image data in along with the previously stored request data in the client database 3-104 for later use as will be explained in greater detail further herein.

Finally, the authenticator 3-52 obtains the consumer's private string from the user table 3-85 of the user database 3-58, as shown in FIG. 3-8, and then submits the challenge string 3-49 (along with any special instructions 3-93) and the private string to the validation tool 3-55, which in turn determines the correct response string. The determined correct response string is then assigned as the key string for the transaction and stored in the key string table 3-97 of the transaction database 3-59. At this time, a timestamp may also be entered into the transaction table 3-86 of the transaction database 3-59 in order to provide a reference by which may be calculated a timeout event for the validity of the key string (response string submitted as an authentication credential).

Before turning the example to detailed discussion of the steps 3-48 implicated in validating the purported access right of the user requesting access to the secured resource, however, attention is directed to FIG. 3-14 through FIG. 3-16, which each depict some variation of possible challenge messages 3-94 and/or additional detail regarding the presentation to the consumer of an image 3-112 for use in detecting a possible spoofing type deception. In FIG. 3-14, in particular, an image 3-112 is shown as being presented with the challenge string 3-49 as part of the challenge message 3-94. As indicated by the example instruction text included with or as part of the challenge message 3-94, the consumer is directed to look for a corresponding image to be displayed on the website of the on-line retail store and to not enter a response string unless the correct image is observed. In FIG. 3-15, in particular, it is noted that two challenge strings 3-49 are presented in the challenge message 3-94. As is apparent from the schema of FIG. 3-9, the preferred embodiment of the present invention contemplates generation of any number of key strings for any one transaction. Additionally, it should be noted that for each key string logged in the key string table 3-97 of the transaction database 3-59, there is in the same record associated one secured resource identified by RESOURCE_ID. In this manner, as previously alluded to, a third example means for determining a particular resource for access by the end user 3-34 is implemented in connection with the issuing of a challenge message 3-94 to the consumer. In use, the resource will be identified based upon which of multiple possible correct response strings the consumer submits to a service client 3-33 for authentication by the service provider 3-36. Finally, FIG. 3-16 shows one simple example of the many previously discussed possibilities for providing special instructions 3-93 in connection with the issuance of a challenge message 3-94. In the depicted case, the consumer is directed to respond to the challenge string 3-49 using only numbers from his or her private string. As will be appreciated by those of ordinary skill in the art, this instruction 3-93 will be particularly beneficial when it is known that the consumer will be forced to enter the response string through a limited input modality such as, for example, the simple keypad 3-95 depicted in FIG. 3-7.

Turning the example now to detailed discussion of the steps implicated in validating the purported access right of the user requesting access to the secured resource, it is first noted that an end user 3-34 of the present invention will necessarily formulate a response string corresponding to a challenge string 3-49 outside of the hardware and/or software provided as part of the authentication system 3-30 of the present invention. That said, the validation steps begin with the consumer using his or her web browser 3-69 to first navigate to the URL of a payment confirmation webpage 3-75 for the on-line retailer service client 33. As is otherwise conventional, the consumer's web browser 3-69 will send a page request to the on-line retailer's web server 3-66 where a hosted page processor 3-64 will create and send back to the consumer's web browser 3-69 the requested "payment confirmation" webpage 3-75, making use of the on-line retailer's client database 3-104 to retrieve stored information pertaining to the consumer, the transaction or the like. As shown in FIG. 3-17, the requested page 3-75 may simply comprise a simple form through which the consumer may input his or her formulated response string and then select the depicted "confirm" button. As will be appreciated by those of ordinary skill in the art, this simple example assumes that the consumer has remained on the website of the on-line retailer such that the transaction identifier remains known to the page processor 3-64 and also that no test designed to detect the existence of a spoofing type deception will be presented. Similarly, the requested page 3-75 as depicted in FIG. 3-18 also assumes that no test designed to detect the existence of a spoofing type deception will be presented, but contemplates that the consumer may have left and returned to the website for completion of the purchase transaction. As will be appreciated by those of ordinary skill in the art in light of this exemplary description, the depictions of FIG. 3-17 and FIG. 3-18 may be appropriate for responding to the challenge as depicted in FIG. 3-13. For purposes of this continuing example, it shall be assumed that the consumer's private string is 2F46DAH525. As a result, the correct response string for the challenge string 3-49 of FIG. 3-13 would be 24FA63462B, which would be entered by the consumer. With the response string entered, the consumer's web browser 3-69 submits the data to the on-line retailer's web server 3-66 where the hosted page processor 3-64 may validate the form data for technical completeness and accurate formatting. Assuming that the submitted data is technically correct or is subsequently made technically correct, the page processor 3-64 submits the consumer's response string to the request handler 3-51 hosted on the on-line retailer's application server 3-101.

As shown in FIG. 3-19, however, the requested page 3-75 may comprise a slightly more complex form through which the consumer may be required to enter the client reference for the transaction although, as shown in FIG. 3-19 the client reference data may be pre-populated if the consumer has not left the website. As will be appreciated by those of ordinary skill in the art, this form contemplates that the consumer may want to address a different transaction than presently being handled by the webpage 3-75 or that the consumer has left and returned to the website for completion of the purchase transaction. Additionally, this exemplary form contemplates that a test designed to detect the existence of a spoofing type deception may or may not be presented. In any case, once the consumer is satisfied that the desired client reference is shown the consumer will then select the depicted "continue" button, whereafter the consumer's web browser 3-69 submits the data to the on-line retailer's web server 3-66 where the hosted page processor 3-64 may validate the form data for technical completeness and accurate formatting. Assuming that the submitted data is technically correct or is subsequently made technically correct, the page processor 3-64 submits the consumer's response string to the request handler 3-51 hosted on the on-line retailer's application server 3-101. Once received by the request handler 3-51, the client reference will be utilized to retrieve the stored request data from the client database 3-104 and the request handler 3-51 will determine whether a test designed to detect the existence of a spoofing type deception should be presented. If not, the request handler 3-51 will so inform the page processor 3-64 which, in turn, may then update or otherwise create and send back to the consumer's web browser 69 a "payment confirmation" webpage 3-75 like that of FIG. 3-17, whereafter the consumer continues as previously discussed.

If, on the other hand, the request handler 3-51 determines that a test designed to detect the existence of a spoofing type deception should be presented the request handler 3-51 will retrieve from the client database 3-104 the image data previously transmitted from the service provider 3-36 and associated with the transaction by client reference. In the preferred embodiment of the present invention, the image data will comprise a web address pointing to a publicly accessible image file matching the image file transmitted as part of the challenge message 94 to the consumer. The page processor 64 will then create a page 3-75 such as depicted in FIG. 3-20, wherein the webpage 3-75 presents the image 3-112 by linking to the external web address at which the image 3-112 is hosted. As will be appreciated by those of ordinary skill in the art in light of this exemplary description, the depiction of FIG. 3-20 may be appropriate for responding to the challenge as depicted in FIG. 3-14 or FIG. 3-15. Assuming still that the consumer's private string is 2F46DAH525, the correct response string for the challenge string 3-49 of FIG. 3-14 would again be 24FA63462B, which would be entered by the consumer. In FIG. 3-15, however, the correct response string will again be 24FA63462B if the consumer wishes to convey to the service provider 3-36 that he or she wishes to complete the purchase with his or her Credit Card 9876 but will be GH2F749X26D if the consumer wishes to convey to the service provider 3-36 that he or she wishes to complete the purchase with his or her Checking 1234.

As previously discussed, the preferred implementation of the test designed to detect the existence of a spoofing type deception comprises sending the service client 3-33 a file location for a copy of the image file resident on a fileserver associated with the service provider 3-36, which file location may then be made temporary. By making the file location temporary, the file can be removed or restricted and/or replaced with a warning image once accessed. In this manner, if the consumer has accidently navigated to a spoofed website conducting a man-in-the-middle type deception in particular, the bad actor will in the course of accessing the true on-line retailer's website access the image link. In the unlikely case that the bad actor is able to retrieve and replicate the link for presentation to the consumer, however, the image 3-112 will have been removed or replaced by the time that the consumer links to the web address for the image. In this case, as shown in FIG. 3-21, the consumer will see the bad actor generated webpage with the prominently displayed warning image 3-114.

Finally, as shown in FIG. 3-22, the consumer may be required to actually select one image 3-112 from a plurality of images 3-115 at the same time as he or she is required to enter his or her response string. In such a case, the image selection will be transmitted with the response string and will form a part of the overall response to be evaluated by the service provider 3-36. As will be appreciated by those of ordinary skill in the art, this embodiment serves to ensure that a careless consumer does not fail to carefully check for the required image 3-112.

In any case, with the response string entered, the consumer's web browser 3-69 submits the data to the on-line retailer's web server 3-66 where the hosted page processor 3-64 may validate the form data for technical completeness and accurate formatting. Assuming that the submitted data is technically correct or is subsequently made technically correct, the page processor 3-64 submits the consumer's response string to the request handler 3-51 hosted on the on-line retailer's application server 3-101 where a response message is assembled for transmission to the service provider 3-36. The request handler 3-51 will then generally queue the response message, which will include the entered response string, at the on-line retailer's service gateway device 3-106. If not already established, the service gateway device 3-106 will then undertake to establish secure communication with the corresponding client gateway device 3-108 at the service provider 3-36.

Once the required secure communication is established the service gateway 3-106 will forward the response message through the established secure communication channel to the service provider's client gateway 3-108, where the nature of the response message will be identified and the response message will then be conventionally routed to the authenticator 3-52 hosted on the service provider's application server 3-50.

The authenticator 3-52 will then direct the validation tool 3-55 to evaluate the response string based upon the client reference for the response message. The validation tool 3-55 will access the key string table 3-97 of the transaction database 3-59 to retrieve the key string or key strings associated with the particular client reference and will evaluate the submitted response string against each taking into account, if appropriate for the particular implementation, the passage of time. Additionally, in a case where the selection of a particular image also forms part of the required response in addition to the response string, the validation tool 3-55 will also determine whether the correct image was selected by the end user 3-34. In any case, the validation tool 3-55 will then report the result of the evaluation to the authenticator 3-52. If the evaluation fails, the process 3-48 will terminate and the failure will be reported to the service client 3-33. If, on the other hand, the evaluation passes the authenticator 3-52 will determine whether a secured resource need be accessed on behalf of the on-line retailer.

If the authenticator 3-52 determines that a secured resource should be accessed, a resource request is formulated using the transaction parameters stored in the transaction parameter table 3-87 of the transaction database 3-59 and any additional information as may be necessary that is stored in the user database 3-58. For example, in the case of processing a credit card transaction, the authenticator 3-52 will retrieve the transaction amount from the transaction parameter table 3-87 of the transaction database 3-59 and will retrieve the full credit card number, expiration date, billing address, CV number or other necessary information pertaining to the credit card account from the resource attribute table 3-89 of the user database 3-58 and may also retrieve from the user attribute table 3-92 of the user database 3-58 necessary information concerning the on-line retailer such as, for example, the on-line retailer's banking information for deposit of obtained funds. In any case, the complete resource request is by the authenticator 3-52 queued to the resource gateway 3-109 and processed whereafter the result of the transaction is reported to the on-line retailer and also, preferably, to the consumer.

In a particularly efficient feature of the present invention, the service provider 36 may provide for the consumer an electronically generated receipt for the conducted transaction, which may be transmitted by electronic mail or otherwise. In a case where the on-line retailer or other service client 3-33 provides itemized or otherwise detailed purchase data, such data may be included as part of the receipt. This, of course, completely relieves the service client 3-33 of having to generate a receipt. Additionally, combined transaction data may be assembled by the service provider 3-36 for periodic bulk reporting to the service client 3-33. Still further, the service provider 3-36 may, if desired, implement a budgeting service for the end user 3-34, wherein at the end user's behest financial transactions over budgeted limits or over budgeted limits for particular service clients 3-33 or types of service clients 3-33 will be deemed to fail validation in order to force compliance with the terms of a budget.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 3-34 that system, facility or the like for which the end user 3-34 desires access has implemented the teachings of the present invention. Likewise, those of ordinary skill in the art will recognize that a special program magnetic card or the like may be implemented in order to enable card swipe type initiation of a request for access. In this case, of course, the magnetic card may be encoded with an identification code for the user including no confidential or sensitive information, but preferably useful only in connection with identifying the end user 3-34 to an authentication system 3-30 implemented in accordance with the teachings of the present invention. In any case, because the scope of the present invention is much broader than any particular embodiment, the foregoing detailed description should not be construed as a limitation of the scope of the present invention, which is limited only by the claims appended hereto.

Fourth Described Embodiment

Referring now to FIG. 4-1 in particular, the authentication system 4-30 of the present invention is shown to generally comprise an operative combination of a plurality of service client implemented use cases 4-31 and a plurality of service provider implemented use cases 4-32. In particular, the service client 4-33 of the present invention will generally provide for an end user actor 4-34 a means 4-35 for identifying the service client 4-33 to a service provider 4-36 for the purpose of requesting that the service provider 4-36 provide for the service client 4-33 access to a secured resource. Additionally, the service client 4-33 of the present invention will generally provide for an end user actor 4-34 a means 4-37 for submitting an authentication credential to the service client 4-33 for use by the service client 4-33 in obtaining from the service provider 4-36 access to the requested secured resource.

As also particularly shown in FIG. 4-1, the service provider 4-36 of the present invention will generally provide for an end user actor 4-34 a means 4-38 for requesting that access to a secured resource be provided by the service provider 4-36 for a service client 4-33. Additionally, the service provider 4-36 of the present invention will generally provide responsive to the submission by an end user actor 4-34 of a request for access to a secured resource a means 4-39 for generating and sending to the end user actor 4-34 a challenge message 4-94 designed to enable only the intended end user actor 4-34 to determine the content of a transient authentication credential. Further, the service provider 4-36 of the present invention will generally provide for a service client actor 4-33 a means 4-40 for forwarding an end user provided authentication credential to the service provider 4-36. Still further, the service provider 4-36 of the present invention will generally provide responsive to the forwarding by a service client actor 4-33 of an authentication credential a means 4-41 for validating the authentication credential.

In an extension of the present invention particularly useful in implementations wherein the service provider 4-36 may not otherwise be readily able to determine the identity of a resource to which an end user actor 4-34 requests access based on the information content of the request as initially submitted by the end user actor 4-34 to the service provider 4-36, the service provider 4-36 may in combination with the means 4-38 for requesting access to a secured resource also be adapted to provide a means for determining a particular resource for access on the authority of the end user actor 4-34 such as, for example, a means 4-42 for prompting the end user actor 4-34 to provide additional identifying information for the requested resource.

In a further extension of the present invention particularly useful in the most typical implementations of the present invention wherein for security or other reasons the service client 4-33 is unable to directly access features or functionality of a resource for which an end user actor 4-34 has requested access, the service provider 4-36 is also adapted to provide for the end user actor 4-34 and/or the service client actor 4-33 a means 4-96 for conducting a transaction reliant upon or otherwise in connection with the requested secured resource. In this case, it is noted that the secured resource may be provided by and/or otherwise under the further control of a resource provider actor 4-43 external to the service provider 4-36 or, in the alternative, may be provided and/or implemented by and/or otherwise under the control of the service provider 4-36. In any event, the means 4-96 for conducting a transaction reliant upon or otherwise in connection with the requested secured resource may generally also further comprise a means for reporting the conducted transaction to the service client actor 4-33 and/or the end user actor 4-34.

Finally, it is noted that time 4-44 as an actor may be accommodated as desired in any particular implementation wherein the service provider 4-36 is also provided with a means 4-45 responsive to the passage of time for revoking or otherwise invalidating an authentication credential such that an authentication credential otherwise correctly determined by an end user actor 4-34 in response to a service provider generated challenge message 4-94 may as a result of the passage of time be deemed to be incorrect, thereby resulting in a validation failure upon application of the means 4-41 for validating the authentication credential.

Referring now to FIG. 4-2 through FIG. 4-4 in particular, the authentication method 4-46 of the present invention as operative upon the described authentication system 4-30 is shown to generally comprise various series of interactions between a user 4-34, a service client system 4-33 and a service provider system 4-36, as broadly set out in FIG. 4-4, wherein the interactions may be broadly categorized as steps 4-47 implicated in requesting access to a secured resource, as broadly set out in FIG. 4-2, and steps 4-48 implicated in validating the purported access right of the user requesting access to the secured resource, as broadly set out in FIG. 4-3.

As particularly shown in FIG. 4-2 and FIG. 4-4, the authentication method 4-46 of the present invention generally begins with an end user 4-34 obtaining from a service client 4-33 data or other information necessary for the end user 4-34 to request that a service provider 4-36 provide for the service client 4-33 access to a secured resource. This data or other information will generally comprise the identification of the service client 4-33, but may additionally comprise any other data or information as may be helpful for the conduct of a particular transaction such as, for example, a purchase amount 4-76, a client reference, detailed or itemized transaction data or the like. In any case, the service client provided information is then utilized by the end user 4-34 to submit a request message 4-84 to the service provider 4-36 for the service provider 4-36 to provide for the service client 4-33 access to a secured resource.

Once a submitted request message 4-84 is received by the service provider 4-36, the service provider 4-36 preferably determines whether the end user 4-34 making the request is authorized or otherwise permitted to make such use of the authentication system 4-30. If in an implementation of this feature it is determined that the end user 4-34 is not authorized or otherwise permitted to make the attempted use of the authentication system 4-30 the process 4-47 will generally terminate whereas if it is determined that the end user 4-34 is authorized or otherwise permitted to make the attempted use of the authentication system 4-30 the process 4-47 will generally continue. Continuing in an important step, the service provider 4-36 must be able to evaluate the request message 4-84 to determine the specific identity of the resource for which the request is made. Because, in at least some implementations of the present invention, the common identifier for the resource will for security reasons not be allowed to be openly transmitted as part of submitted request, this step will in such implementations involve determining the identity of the resource from some element or combination of elements of information other than the common identifier for the resource. In any case, if the available and/or obtainable information is insufficient for the service provider 4-36 to positively determine the identity of the resource for which the end user 4-34 has requested access the process 4-47 will generally terminate whereas if the available and/or obtainable information is sufficient for the service provider 4-36 to positively determine the identity of the resource for which the end user 4-34 has requested access the process 4-47 will generally continue.

In the final steps for processing a request for access to a secured resource, the service provider 4-36 generates a challenge message 4-94 designed to enable the end user 4-34 to determine the content of a transient authentication credential and, thereafter, issues the challenge message 4-94 to the end user 4-34. With the challenge message 4-94 issued by the service provider 4-36 to the end user 4-34, the end user 4-34 then formulates a response to the challenge message 4-94 based upon information generally known only to the end user 4-34 and the service provider 4-36 and which, in no case, is ever known by or communicated to or through the service client 4-33. Once the end user 4-34 has formulated a response to the challenge message 4-94, and assuming that the end user 4-34 desires to continue the in-process transaction 4-46, the end user 4-34 will then submit the formulated response to the service client 4-33 as an authentication credential.

Referring now then to FIG. 4-3 and FIG. 4-4 in particular, validation 4-48 of the purported access right of the user requesting access to a secured resource is shown to generally begin with the submission to a service client 4-33 by the end user 4-34 of an authentication credential, which authentication credential has been previously formulated by the end user 4-34 in response to issuance in connection with the transaction in progress by the service provider 4-36 of a challenge message 4-94. Once submitted by an end user 4-34 to a service client 4-33, an authentication credential must in order for the validation 4-8 to continue be forwarded by the service client 4-33 to the service provider 36. In an optional feature of the present invention, however, the service client 4-33 may be programmed or otherwise configured to ensure prior to forwarding the authentication credential to the service provider 4-36 that a secure communication channel is first established between the service client 4-33 and the service provider 4-36. If in an implementation of this feature the required secure communication channel cannot be established between the service client 4-33 and the service provider 4-36 the continuing process 4-48 will generally terminate whereas if the required secure communication channel is successfully established between the service client 4-33 and the service provider 4-36 the process 4-48 will generally continue.

Upon successful forwarding by the service client 4-33 to the service provider 4-36 of the end user submitted authentication credential, the service provider 4-36 proceeds to validate the responsive authentication credential by comparing the credential against a key string. As will be appreciated by those of ordinary skill in the art in light of this exemplary description, the key string will prior to or at the time of validation 4-48 be determined by the service provider 4-36 utilizing knowledge of the previously discussed information generally known only to the end user 4-34 and the service provider 4-36 to formulate the key string as the known correct response to the previously issued challenge message 4-94. In addition to comparison of the authentication credential to a known key string, however, it is noted that in an authentication system utilizing time 4-44 as an actor in order to provide a timeout for the validity of an outstanding challenge message 4-94, the service provider 4-36 will be programmed or otherwise adapted to determine as part of the validation step whether as a result of the passage of time 4-44 the authentication credential should be deemed to be incorrect. In any case, if the authentication credential is found or otherwise deemed to be incorrect, the service provider 4-36 will preferably report the incorrect finding to the service client 4-33 and/or the end user 4-34 and the process 4-48 will generally terminate whereas if the authentication credential is found to be correct the process 4-48 will generally continue.

With the authentication credential found to be correct, the service provider 4-36 may simply report the correct finding to the service client 4-33 or, if for security or other reasons the service client 4-33 is unable to directly access features or functionality of a resource for which an end user actor 4-34 has requested access, the service provider 4-36 will then obtain for the end user 4-34 and/or the service client 4-33 the benefit of the requested secured resource and thereafter appropriately report the conducted transaction to the service client 4-33 and/or the end user 4-34.

With the foregoing broad overview of the general structure and function of the authentication system 4-30 of the present invention in mind, it is now noted that in accordance with the present invention an end user 4-34 may comprise any person or machine requiring, in connection with some other use, access or other relationship with a service client 4-33, access for the service client 4-33 to a secured resource for which the service client 4-33 is restricted from full knowledge and for which the service provider 4-36 may hold full knowledge, full knowledge being defined herein as knowledge sufficient to make ordinary full use of the secured resource outside of the framework of the authentication system 4-30 and method 4-46 of the present invention. By way of simple example, the resource may comprise password protected information (e.g., a credit report) a portion of which (e.g., only the credit scores) a human end user 4-34 wishes to share with a service client 4-33 comprising an information consumer (e.g., a potential creditor) without providing to the information consumer the password (e.g., by which the full credit report is protected and as would otherwise enable the potential creditor to gain full access to the protected credit file). Under the present invention, a service provider 4-36 having associated therewith a hardware and/or software implementation of the previously generally discussed functionality is in accordance with the present invention programmed or otherwise adapted to receive directly from the service client 4-33 an end user provided authentication credential associated with a request by the end user 4-34 for the service provider 4-36 to provide for the service client 4-33 access to a secured resource and, thereafter, to validate the authentication credential from the service client 4-33 to ensure that the request is made under the authorization of an end user 4-34 having right of access to the secured resource. In a critical aspect of all implementations of the present invention, the actual information held by the end user 4-34 through which the service provider 4-36 is capable of authenticating the access right of the end user 4-34 is strictly withheld from the service client 4-33.

With this in mind, the end user 4-34 may, for example and without limitation, be a patient wishing to share medical information (a secured resource) with a healthcare or medical insurance provider (a service client 4-33) without having to grant to the healthcare or medical insurance provider unfettered access to all of his or her medical records; the end user 4-34 may be the holder of a credit card account, banking account, automated teller machine ("ATM") card and/or account or the like (a secured resource) wishing to purchase merchandise, services, information or the like from a retail store, service station, on-line service provider or merchandiser, other business or the like (a service client 4-33) without providing the service client 4-33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data or the like (a service client 4-33) without providing his or her Social Security Number or other information not necessary to the conduct of the present transaction.

In an additional critical aspect of the authentication system 4-30 and method 4-46 of the present invention, an additional security measure is implemented by requiring that the service client 4-33 be restricted also from access to the common identifier for the secured resource, e.g. the account number for a credit card or financial deposit account; the Social Security Number of a patient; the account number of an ATM card; or the like. In order to better describe these critical aspects of the present invention, however, reference is now made to the deployment diagram of FIG. 4-5, wherein there is shown the various elements of an exemplary hardware and software based implementation of an authentication system 4-30 constructed in accordance with the teachings of the present invention.

Before continuing, however, it is noted that while the implementation depicted in FIG. 4-5 is exemplary of the authentication system 4-30 of the present invention, it is in no manner meant to be all encompassing or otherwise limiting of the wide range of implementations as are possible. In addition, it is noted that while some elements are in FIG. 4-5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 4-5, a service provider 4-36 (such as, for example, may comprise a specialized provider of the authentication services of the present invention; a provider of other products or services having need of authentication services, such as, for example, a credit card processor or financial institution or an alarm monitoring company; or the like) is shown for purposes of this exemplary discussion to have associated therewith one or more application servers 4-50 or database servers 4-98 upon which may be hosted software functionality necessary to operation within the framework of the present invention. In particular, an application server 4-50 may host a request handler software component 4-51 adapted to receive, process and/or otherwise handle request messages 4-84 from end users 4-34 and submissions from end users 4-34 or service clients 4-33 as well as to produce output for end users 4-34 and/or service clients 4-33 as may be necessary in the operation of the present invention. Additionally, the application server 4-50 may host an authenticator 4-52 adapted to handle or otherwise control all aspects of the authentication process within the realm of responsibility of the service provider 4-36, including receiving authentication requests, storing and/or retrieving data pertinent to the processing of such requests, directing the generation and sending of challenge messages 4-94, and directing the validation of credentials submitted in response to challenge messages 4-94 and actions taken based upon the results of such validations. In order to improve efficiency, the authenticator component 4-52 may comprise one or more further specialized components such as, for example, a challenge manager 4-53 adapted to facilitate creation and transmission of challenge messages 4-94, a random sequence generator 4-54 as may be useful in the highly specialized task of creating random sequences which, as will be better understood further herein, are an integral feature of the present invention, and a validation tool 4-55 adapted to conduct the specialized task of comparing received credentials with known key strings. Still further, the application server 4-50 may also host an administration tool 4-56 through which various aspects of the setup, maintenance and operation of the hardware and software systems of the service provider 4-36 may be managed.

In order to efficiently manage and handle the large quantity of data that may typically be stored in connection with an implementation of the present invention, one or more dedicated database servers 4-98 hosting database management systems 4-57 are generally desired. As shown in FIG. 4-5, a typical database management system 4-57 may include a user database 4-58 for storing a wide variety of generally user centric data as may be required in the operation of the present invention and a transaction database 4-59 for storing data generally associated with the conduct of individual transactions. Although those of ordinary skill in the art will recognize that virtually unlimited alternatives are possible, FIG. 4-7 shows a very high level but generally representative schema for a user database 4-58 and FIG. 4-8 shows a very high level but also generally representative schema for a transaction database 4-59, each of which will be described in greater detail further herein in connection with an exemplary description of the conduct of a typical transaction.

Additionally, a preferably unified messaging gateway 4-60 is provided for use in receiving request messages 4-84 from and issuing challenge messages 4-94 to end users 4-34 through various communication channels. As will be appreciated by those of ordinary skill in the art, such a unified messaging gateway 4-60 may be utilized to receive a request message 4-84 or transmit a generated challenge message 4-94 in any of a plurality of message formats (such as, for example, as a SMS message, a standard text message, an e-mail message, a synthesized voice message, an alphanumeric page or the like) over any of a plurality of communication channels (such as, for example, an SMS or other text channel, a SMTP channel, a POTS channel, a paging network or private broadcast channel or the like) to be received by any of a plurality of user devices (such as, for example, a mobile or landline telephone, a smart phone, an e-mail client, a PDA, a numeric or digital pager or the like). Still further, a service user interface 4-61 is provided and adapted to provide input from all manner of users 4-62, including administrative users, end users 4-34 and service client users 4-33, to the hardware and/or software systems of the service provider 4-36 and to provide output from these systems to the various users 4-62. Although the service user interface 4-61 may take a wide variety of forms depending upon the circumstances of any particular implementation, a typical user interface may be implemented as a web interface 4-63, as shown in FIG. 4-6, wherein there may be provided a page processor 4-64 hosted on an appropriate execution environment 4-65 installed on a dedicated web server 4-66 in Internet communication 4-67 with a user device 4-68, such as, for example, a personal computer, smart phone, other mobile device 4-78 or the like, and on which is installed and/or hosted a web browser 4-69 running in a provided execution environment 4-70. In any case, as will be appreciated by those of ordinary skill in the art, the provision of a service user interface 4-61, which of course should be secured, enables the various users 4-62 to maintain and/or otherwise manage the data stored in the user database 4-58 as may be appropriate as well as to generally manage and maintain the implemented authentication system 4-30. Finally, one or more resource communication gateways (not shown) may be provided in order to establish preferably secure communication between the systems of the service provider 4-36 and outside resource providers 4-43.

Continuing then with the example generally described with respect to FIG. 4-5, further details of the implementation are now described by way of the following detailed description of a possible use of the implementation for conducting a retail purchase transaction, which, for purposes of the example, shall be taken as completion of a purchase at an automobile fueling station, a restaurant or an on-line retailer (the service client 4-33) by a consumer (the end user 4-34) having available for payment a credit card and a checking account (secured resources). To complete the transaction, the consumer will indicate a desire to make a payment to the automobile fueling station, restaurant or on-line retailer by submitting to a service provider 4-36 a request for payment to the service client 4-33 and for authentication of the consumer's right of access to an identified secured payment resource, whereafter the service provider 4-36 will establish for the consumer an authentication credential to be provided to the service client 4-33. The service client 4-33 will then forward the authentication credential to the service provider 4-36 for validation in order to obtain payment from the identified secured payment resource as requested by the consumer. In accordance with a critical aspect of the present invention, however, the automobile fueling station, restaurant or on-line retailer cannot be provided with or otherwise be made aware of either the consumer's credit card or checking account number and also must not be given any information that would allow the automobile fueling station, restaurant or on-line retailer to repeat the transaction without again obtaining authorization from the consumer.

As previously discussed, the authentication method 4-46 of the present invention generally begins with an end user 4-34 obtaining from a service client 4-33 data or other information necessary for the end user 4-34 to request that a service provider 4-36 provide for the service client 4-33 access to a secured resource. As also previously discussed, this data or other information will generally comprise the identification of the service client 4-33. Referring then to FIG. 4-9 through FIG. 4-11 in particular, representative means 4-35 for identifying a service client 4-33 are shown to comprise an alphabetic and/or numeric identification code 4-71 and a machine readable identification code 4-72 such as, for example, a barcode or like representation. As particularly shown in FIG. 4-9, one or more such means 4-35 may be affixed by printing, placard or other labeling or electronically displayed on a screen, monitor or the like of a POS, fueling station, ATM, or like terminal device 4-73. As particularly shown in FIG. 4-10, one or more such means 4-35 may be printed on a guest check 4-74, sales slip, invoice or the like prepared in anticipation of the completion of a financial transaction or on a similarly formatted request document such as, for example, a consent form for access to medical records, credit records or the like. As particularly shown in FIG. 4-11, one or more such means 4-35 may be displayed on a webpage 4-75, as part of a computer or like application program such as, for example, may be generated or otherwise provided in connection with an on-line financial transaction, activation or deactivation of an alarm system, access to or control of a computer or other machine, control of a door lock or a like application.

As also previously discussed, the data or other information obtained from a service client 4-33 may additionally comprise any other data or information as may be helpful for the conduct of a particular transaction such as, for example, a purchase amount 4-76, a client reference, detailed or itemized transaction data or the like. To this end it is noted that in most cases a means 4-35 for identifying a service client 4-33 may be dynamically generated on a transaction-by-transaction basis. For example, in the case of FIG. 4-9 representing a fueling station terminal device, the numeric identifier and/or barcode could be generated by the fueling station controller and displayed on the depicted screen, whereby the information collected by the end user 4-34 for use in submitting a request message 4-84 to the service provider 4-36 may include, for example, a transaction number or the like. Similarly, in the case of FIG. 4-9 representing an ATM terminal device, the numeric identifier 4-71 and/or barcode 4-72 could be generated by the ATM controller in at least partial reliance on user submitted information and, thereafter, displayed on the depicted screen 4-77, whereby the information collected by the end user 4-34 for use in submitting a request message 4-84 to the service provider 4-36 may include, for example, the amount of a withdrawal or other transaction, the types of accounts to use in completing the desired transaction or the like. In the case of FIG. 4-10 representing a document created for a particular transaction or in the case of FIG. 4-11 representing a computer or other dynamically created display, those of ordinary skill in the art will recognize that virtually any type of data or other information may be included for use by the end user 4-34 in submitting a request message 4-84 to the service provider 4-36.

Still further, however, the data or other information may for enhanced security include, in addition to the identification of the service client 4-33, a dynamically generated value that must be included as part of the identification of the service client 4-33 in order for a request message 4-84 submitted by an end user 4-34 to be accepted by a service provider 4-36. In implementation of such a feature, the end user 34 will generally provide some input to the service client 4-33 indicating that the end user 4-34 wants to make use of the service 4-30. At this point, the service client 4-33 will, preferably through a secured communication channel, request and obtain from the service provider 4-36 a uniquely formulated identification for use only in connection with the present transaction. The obtained unique identification is then used by the service client 4-33 and the end user 4-34 in the same manner as otherwise would be used a static identification. As will be appreciated by those of ordinary skill in the art, this feature is particularly useful in the detection and/or prevention of man-in-the-middle or other spoofing type deceptions.

In any case, as also previously discussed, the service client provided information is then utilized by the end user 4-34 to submit a request message 4-84 to the service provider 36 for requesting that the service provider 4-36 provide for the service client 4-33 access to a secured resource. To this end, the end user 4-34 will require a means 4-38 for communicating the request message 4-84 to the service provider 4-36. As shown in FIG. 4-12, a mobile device 4-78, such as a cellular telephone, smart phone or the like, may be utilized to send an SMS or standard text message 4-79 over any available SMS or standard text capable communication channel to the messaging gateway 4-60 implemented for the service provider 4-36. Similarly, as shown in FIG. 4-14, an electronic mail client 4-80 may be utilized to send an electronic mail message 4-81 over any electronic mail capable communication channel to the messaging gateway 4-60 implemented for the service provider 4-36. Additionally, a web interface 4-63, which may be implemented as or in connection with the service user interface 4-61, may be utilized to enable the end user 4-34 to interactively communicate the request message 4-84 to the service provider 4-36. While implementation of the web interface 4-63 will generally dictate establishing at least some login functionality, which minimally would include requiring the provision of a user name or the like by which the service provider 4-36 can identify the particular end user 4-34 making a submission, those of ordinary skill in the art will recognize that such an implementation also has the advantage of providing the end user 4-34 with broad flexibility in tailoring of the request message 4-84 to any particular transaction. Still further, as shown in FIG. 4-16, a user application 4-82, which may be adapted for use on or in connection with a mobile device 4-78, a personal computer or any other appropriate hardware, may also be provided. As will be appreciated by those of ordinary skill in the art, implementation of such a user application 4-82 will not only provide generally the same advantageous flexibility as a web interface 4-63, but also may be provided with means for securely identifying the end user 4-34 to the service provider 4-36. For example, such a user application 4-82 may have embedded therein a token or other identifier, which may be encrypted if desired, for passage to the service provider 4-36 to identify the end user 4-34. In any case, it is also noted that because any desired formatting may generally be effected by a user application 4-82 such a user application 4-82 may also be adapted to communicate with the messaging gateway 4-60 or other user interface 4-61 implemented for the service provider 4-36 over virtually any communication channel including, for example and without limitation, an SMS or standard text capable communication channel, an SMTP capable communication channel, a POTS communication channel, a hypertext transfer protocol ("HTTP"), secure hypertext transfer protocol ("HTTPS"), file transfer protocol ("FTP") or other Internet or like network transfer protocol communication channel. Finally, it is noted that other devices and communication channels may also be utilized for submission by an end user 4-34 of a request message 4-84 to the service provider 36 as well as for communication by the service provider 4-36 to the end user 4-34 of a challenge message 4-94. For example, and without limitation, the means 4-38 for communicating a request message 4-84 to a service provider 4-36 and/or means 4-39 for communicating a challenge message 4-94 to an end user 4-34 may also comprise a telephone auto attendant, which may implement a DTMF decoder, speech recognition engine, TDD/TTY decoder or the like, or virtually any other combination of input modalities (including barcode readers or scanners, keyboards, keypads, pointing devices, microphones and the like) and output modalities (including visual displays such as computer or other device monitors or screens, audio output devices such as headphones or other speakers, tactile output devices such as may be adapted for the visually impaired and the like).

As particularly shown in FIG. 4-12 and FIG. 4-14, a typical request message 4-84 may simply comprise information 4-83 identifying the service client 4-33 (such as, for example, a credit card program merchant identification number, a service provider issued or registered identification number or other identifier or the like) and, if necessary for the particular transaction, one or more additional parameters (such as, for example, a purchase amount 4-76 or the like). As exemplified by the depicted examples, the request message 4-84 may be formatted according to a predetermined pattern or other scheme, which, as will be appreciated by those of ordinary skill in the art, is particularly advantageous in implementations wherein the end user 4-34 may be required to submit the request by text message 4-79, inasmuch as such a formatted input will generally require only a bare minimum of data entry by the end user 4-34. In any case, it is noted that in the examples of FIG. 4-12 and FIG. 4-14 the request message 4-84 does not include identifying information for the end user 4-34. As will be appreciated by those of ordinary skill in the art, however, such information may be obtained by the service provider 4-36 by examining the telephone number from which the text message 4-79 was sent, in the case of FIG. 4-12, or by examining the "reply to" electronic mail address from which the electronic mail message 4-81 was sent, in the case of FIG. 4-14.

As particularly shown in FIG. 4-15 and FIG. 4-16, the request message 4-84 may be formatted for transmission by the implemented website page processor 4-64 and/or user application 4-82, the details of which formatting will generally not need to be known by the end user 4-34. Additionally, it is noted that the information provided in either depicted implementation may be manually entered by the end user 4-34, automatically entered through a barcode reader (which, in the case of a mobile application 4-82 may be provided in connection with the camera application of a mobile device 4-78), or through a combination of manual and automatic entry. Additionally, these implementations are readily adapted to include any number of convenience features. For example, the screen as depicted in FIG. 4-16 may be produced as a result of scanning the barcode provided on the guest check 4-74 depicted in FIG. 4-10, but prior to submitting the request to the service provider 4-36 the end user 4-34 may change the amount 4-76 from "27.99" to "33.99," which may, under the circumstances of the transaction (including, for example, the knowledge that the service client 4-33 is a restaurant), be automatically interpreted by the service provider 4-36 as an indication that the end user 4-34 wishes to add a tip in the amount of $6.00 to the purchase price 4-76. In any case, once the request message 4-84 is assembled and/or formatted, if required, by the end user 4-34, the request message 4-84 is submitted to the service provider 4-36.

Once the request message 4-84 is received by the implemented messaging gateway 4-60 or, if appropriate, service user interface 4-61, the nature of the request will be identified and the request message 4-84 will then be routed to the request handler 4-51 hosted on the service provider's application server 4-50. Upon receipt of the consumer's request message 4-84, the request handler 4-51 will generally first undertake to determine whether the purported end user 4-34 is recognized at the service provider 4-36. To this end, the request handler 4-51 may access the user database 4-58, as generally shown in FIG. 4-7, to determine whether the provided or inferred end user 4-34 identification can be located in the user table 4-85. If not, the authentication process 4-46 will generally terminate. If, on the other hand, the provided or inferred end user 4-34 identification is recognized the request handler 4-51 will proceed to establish a new transaction record in the transaction table 4-86 of the transaction database 4-59, as generally shown in FIG. 4-8, and at this time should also store in the transaction record the unique USER_ID by which the automobile fueling station, restaurant or on-line retailer is known in the user database 4-58. Additionally, any other pertinent provided information such as, for example, the client reference, purchase amount 4-76 or the like, may be stored in the transaction parameter records 4-87, which will be created as required.

With the new transaction record established and known pertinent information appropriately stored, the request handler 4-51 then undertakes to identify a particular secured resource for fulfillment of the consumer's request. As previously noted in the setup to the present example, however, the consumer wishing to make payment to the automobile fueling station, restaurant or on-line retailer has more than one secured payment resource available for use, which information will become known to the request handler 4-51 upon searching the resource table 4-88 of the user database 4-58 for secured resources associated with the USER_ID by which the tentatively identified consumer is known.

As shown in the exemplary user database 4-58 of FIG. 4-7, the resource table 4-88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system of the present invention is preferably provided with means for determining a particular resource for access on the authority of the end user 4-34.

In a first example of such a means a priority may be assigned by each user 4-34 of a resource to the particular resource, whereby resources of a particular class or, if the service client 4-33 accepts only a certain subclass, on the basis of a particular class and subclass the available resources meeting the selection criteria may be sorted to determine the appropriate resource for use. Such priority values may, for example, be stored in the resource user table 4-99 of the user database 4-58 as depicted in FIG. 4-7.

In a second example of such a means each resource may be assigned a pseudonym 4-90 comprising generally non-identifying information but nonetheless information which is unique among the class of resource for any particular user, which pseudonyms may be stored in the resource attribute table 4-89 of the user database 4-58. Making use of the stored pseudonym 4-90, this means for determining a particular resource for access by the end user 4-34 comprises generating an inquiry message 4-91 for transmission to the end user 4-34 whereby the service provider 4-36 requests that the end user 4-34 select one resource based on the assigned pseudonym. As particularly shown in FIG. 4-13, such an inquiry message 4-91 may be sent by generally any means available for communication with the end user 4-34, including any means appropriate for submitting request messages 4-84 or issuing challenge messages 4-94, and is preferably formatted for simple reply.

In the example implementation (assuming that no priority information was stored), upon determining that the tentatively identified end user 4-34 has more than one secured payment resource, but that each available resource has associated therewith a pseudonym 4-90, the service provider 4-36 would generate an inquiry message 4-91 for transmission to the end user 4-34, which inquiry message 4-91 may request that the consumer enter a simple response indicating whether he or she wishes to proceed using his or her "Credit Card 9876" or using his or her "Checking 1234." Once generated, the request handler 4-51 will generally queue the inquiry message 4-91 at the service provider's messaging gateway device 4-60 for transmission to the consumer. The consumer may then select the desired payment option and respond, causing an updated request message 4-84 to be routed to the request handler 4-51. At this point the request handler 4-51 will again undertake to identify a particular secured resource for fulfillment of the consumer's request.

Finally, in a third example means for determining a particular resource for access by the end user 4-34, the determination is deferred and made in connection with issuing 4-39 a challenge message 4-94 to the end user 4-34. This means will be described in greater detail further herein in connection with further description of the challenge process.

In any case, once an appropriate particular secured resource is identified for access, any remaining transaction parameters, including the unique RESOURCE_ID by which the identified resource is known in the user database 4-58, is preferably stored in the transaction database 4-59 as shown in FIG. 4-8. With the end user 4-34 and the resource for which the end user 4-34 requests access both identified and logged to the transaction database 4-59, the authenticator 4-52 hosted on the service provider's application server 4-50 takes control from the request handler 4-51 and undertakes to direct the generation of an appropriate challenge message 4-94, the response to which may be used to positively authenticate the identity of the presently tentatively identified end user 4-34.

In accordance then with the authentication system 4-30 and method 4-46 of the present invention, the challenge is generated to include a random string comprising a plurality of symbols wherein at least one of the symbols of the string is a null character, such a random string being referred to herein as a challenge string 4-49. Additionally, each end user 4-34 (and, if desired, also other types of users such as client users 4-33 and/or administrative users) will have stored in the user table 4-85 of the user database 4-58 a private string, which is a user selected or assigned (depending on implementation preferences) string comprising symbols of the same set as used for generating the challenge string 4-49 but most preferably excluding use of the null character. The private string is generally only known to the user with which it is associated and the service provider 4-36. As will be better understood further herein, a user will formulate a response to a challenge string 4-49 by using the symbols of the user's private string to replace the null character or characters of the challenge string 4-49 to formulate a response string. In this manner, the response string may be passed through the service client 4-33 without the service client 4-33 being able to detect the private string and, accordingly, a system of readily established single use "passwords" is presented. Additionally, as also will be better understood further herein, the authentication system 4-30 and method 4-46 of the present invention may be implemented such that the protocol for creating a response string from a challenge string 4-49 is standardized in advance or, in the alternative, instructions may be provided with the challenge message 4-94 or inferred from the manner of delivery of the challenge message 4-94 or circumstances of the use. For example, the user may be directed to formulate the response string using only numbers of the private string or may assume that only numbers should be used when entering the response string into a limited keypad 4-95 such as depicted in FIG. 4-9. Further, instructions may be given to use every second or third symbol of the private string, to begin with a certain symbol of the private string, to take symbols from the private string in reverse order, or any combination of these and similar instructions. Still further, the user may be instructed as standard procedure or by challenge message 4-94 to repeat usage of certain symbols of the private string or the entire private string in order to respond to a challenge string 4-49 with more null characters than symbols available in the user's private string and/or simply as a matter of choice by the service provider 4-36.

Returning then to the example use of the authentication system 4-30 of the present invention it is noted that in the most preferred embodiment of the present invention prior to directing the generation of a challenge message 4-94 the authenticator 4-52 evaluates all available information that may impact the ability of an end user 4-34 to readily receive a particular challenge message 4-94 and/or to readily respond to a particular challenge message 4-94 and, additionally, determines whether any special security requirements may exist for access to the particular resource. In particular, the authenticator 4-52 will preferably obtain from the channel table 4-111 of the user database 4-58 channel data indicating the type of communication channel that will be utilized to transmit the challenge message 4-94. Additionally, the user attribute table 4-92 of the user database 4-58 may indicate whether the end user 4-34 suffers any disability that would impact the manner of response and/or may contain data associated with the service client 4-33 that may indicate special security requirements, such as a minimum length for the response string, or capabilities or limitations of the service client user interface 4-73, such as being limited to entry of numeric characters only. Still further, the resource attribute table 4-89 of the user database 4-58 may also indicate special resource dictated security requirements, such as minimum length or desired complexity for a response string. In any case, the authenticator 4-52 will determine the characteristics that should be exhibited by the challenge string 4-49, including the manner of issuance, and will then instruct the challenge manager 4-53 to initiate issuance of a challenge message 4-94.

The challenge manager 4-53 will then obtain from the random sequence generator 4-54 a challenge string 4-49 meeting the requirements established and communicated by the authenticator 4-52. With the challenge string 4-49 generated, the challenge manager 4-53 will proceed to construct the challenge message 4-94 which will at least comprise the challenge string 4-49 and any special response instructions 4-93. With the challenge message 4-94 assembled, the challenge manager 4-53 queues the challenge message 4-94 by providing the messaging gateway 4-60 with the challenge message 4-94, the type of communication channel to be utilized and the CHANNEL_ID for the channel. For example, if the challenge message 4-94 is to be sent by text message 4-79, the challenge manager 4-53 will inform the messaging gateway 4-60 that the challenge message 4-94 is to be transmitted by text message 4-79 and will provide the messaging gateway 4-60 with a telephone number for a text capable user device 4-78.

Referring then to FIG. 4-17 in particular, there is shown a typical simple challenge message 4-94 as may be transmitted to an end user 4-34 through a text enable smart phone or like mobile device 4-78. Following with the presented example, it is noted that in an optional but useful feature of the present invention the challenge message 4-94 may also include information helpful to the consumer in making a response. For example, the challenge message 4-94 depicted in FIG. 4-17 includes the name of the restaurant for which the consumer made the access request and the purchase amount 4-76 for which the consumer requests access to his or her secured resource.

Substantially contemporaneously with transmission of the challenge message 4-94, the challenge manager 4-53 will report transmission of the challenge message 4-94 to the authenticator 4-52. The authenticator 4-52 then obtains the consumer's private string from the user database 4-58 and submits the challenge string 4-49 (along with any special instructions 4-93 included in the challenge message 4-94) and the private string to the validation tool 4-55, which in turn determines the correct response string. The determined correct response string is then assigned as the key string for the transaction and stored in the key string table 4-97 of the transaction database 4-59. At this time, a timestamp may also be entered into the transaction table 4-86 in order to provide a reference by which may be calculated a timeout event for the validity of the key string.

Before turning the example to detailed discussion of the steps 48 implicated in validating the purported access right of the user requesting access to the secured resource, attention is directed to FIG. 4-18, which depicts one possible variation of the presentation of a challenge message 4-94. In particular, FIG. 4-18 shows one simple example of the many previously discussed possibilities for providing special instructions 4-93 in connection with the issuance of a challenge message 4-94. In the depicted case, the consumer is directed to respond to the challenge string 4-49 using only numbers from his or her private string. As will be appreciated by those of ordinary skill in the art, this instruction 4-93 will be particularly beneficial when it is known that the consumer will be forced to enter the response string through a limited input modality such as, for example, the simple keypad 4-95 depicted in FIG. 4-9, which of course will commonly be encountered at a POS, ATM or fueling station terminal device 4-73.

Turning the example now to detailed discussion of the steps 4-48 implicated in validating the purported access right of the user requesting access to the secured resource, it is first noted that an end user 4-34 of the present invention will necessarily formulate a response string corresponding to a challenge string 4-49 outside of the hardware and/or software provided as part of the authentication system 4-30 of the present invention. That said, the validation steps 4-48 begin with the consumer providing to the service client 4-33 for which access to a secured resource has been requested, as an authentication credential, his or her formulated response string. While the authentication credential (response string) may generally be provided to a service client 4-33 in any conceivable manner, including verbally, in writing, by electronic transmission or the like, at least some implementations may require that the end user 4-34 provide the response string in a particular manner. For example, as previously discussed, a self-service type transaction at a POS, ATM or fueling station terminal device 4-73 will generally dictate that the end user 4-34 provide the authentication credential through a service client provided input modality such as, for example, the limited keypad 4-95 depicted in FIG. 4-9.

In any case, for purposes of this continuing example, it shall be assumed that the consumer's private string IS 2F46DAH525. As a result, the correct response string for the challenge string 4-49 of FIG. 4-17 would be 24FA63462B, which would be entered by the consumer through a service client provided input modality or otherwise provided to the service client 4-33. As previously discussed, however, the challenge string 4-49 of FIG. 4-18 is particularly adapted for use in a case where it is to be expected that the consumer will be forced to enter his or her response string through a service client provided input modality having limited functionality such as, for example, the numeric only keypad 4-95 depicted in FIG. 4-9. In this case, the correct response string for the challenge string 4-49 of FIG. 4-18 would be 2447636526, which, of course, may be readily entered by the consumer through a limited keypad 4-95. In any case, with the authentication credential provided, the fueling station, restaurant or on-line retailer submits the authentication credential to the service provider 4-36 along with the service client's identifying information 4-71 for validation and, assuming validation passes, access to the end user's authorized secured resource—in this case payment.

Once the authentication credential is received by the service provider 4-36, it is routed by the messaging gateway 4-60 or service user interface 4-61 to the authenticator 4-52 hosted on the service provider's application server 4-50. The authenticator 4-52 will then direct the validation tool 4-55 to evaluate the response string based upon the client identity and/or client reference for the response message. The validation tool 4-55 will access the transaction database 4-59 to retrieve the key string or key strings associated with the particular client identity and/or client reference and will evaluate the submitted response string against each (taking into account, if appropriate for the particular implementation, the passage of time) and will then report the result of the evaluation to the authenticator 4-52. If the evaluation fails, the process 4-48 will terminate and the failure will be reported by the request handler 4-51 to the service client 4-33. If, on the other hand, the evaluation passes the request handler 4-51 will determine whether a resource need be accessed on behalf of the fueling station, restaurant or on-line retailer.

If the request handler 4-51 determines that a resource should be accessed, a resource request is formulated using the transaction parameters stored in the transaction database 4-59 and any additional information as may be necessary that is stored in the user database 4-58. For example, in the case of processing a credit card transaction, the request handler 4-51 will retrieve the transaction amount from the transaction database 4-59 and will retrieve the full credit card number, expiration date, billing address, CV number or other necessary information pertaining to the credit card account from the resource attribute table 4-89 of the user database 4-58 and may also retrieve from the user attribute table 4-92 of the user database 4-58 necessary information concerning the fueling station, restaurant or on-line retailer such as, for example, banking information for deposit of obtained funds. In any case, the complete resource request is by the request handler 4-51 queued to a resource communication gateway and processed whereafter the result of the transaction is reported to the fueling station, restaurant or on-line retailer and also, preferably, to the consumer.

As previously mentioned, however, a third example means for determining a particular resource for access by the end user 4-34 may be implemented in connection with the issuing of a challenge message 4-94 to the consumer. In particular, as shown in FIG. 4-19, two or more challenge strings 4-49 may be presented in a challenge message 4-94 to an end user 4-34. As is apparent from the schema of FIG. 4-8, the preferred embodiment of the present invention contemplates generation of any number of key strings for any one transaction. Additionally, it should be noted that for each key string logged in the key string table 4-97 of the transaction database 4-59, there is in the same record associated one secured resource identified by RESOURCE_ID.

In use, the resource will be identified based upon which of multiple possible correct response strings the consumer provides to the service client 4-33 for submission by the service client 4-33 for authentication by the service provider 4-36.

In a particularly efficient feature of the present invention, the service provider 36 may provide for the consumer an electronically generated receipt for the conducted transaction, which may be transmitted by e-mail or otherwise. In a case where the fueling station, restaurant, on-line retailer or other service client 4-33 provides itemized or otherwise detailed purchase data, such data may be included as part of the receipt. This, of course, completely relieves the service client 4-33 of having to generate a receipt. Additionally, combined transaction data may be assembled by the service provider 36 for periodic bulk reporting to the service client 4-33. Still further, the service provider 36 may, if desired, implement a budgeting service for the end user 4-34, wherein at the end user's behest financial transactions over budgeted limits or over budgeted limits for particular service clients 4-33 or types of service clients 4-33 will be deemed to fail validation in order to force compliance with the terms of a budget.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 4-34 that system, facility or the like for which the end user 4-34 desires access has implemented the teachings of the present invention. In any case, because the scope of the present invention is much broader than any particular embodiment, the foregoing detailed description should not be construed as a limitation of the scope of the present invention, which is limited only by the claims appended hereto.

Fifth Described Embodiment

Referring now to FIG. 5-1 in particular, the authentication system 5-30 of the present invention is shown to generally comprise an operative combination of a plurality of service client implemented use cases 5-31 and a plurality of service provider implemented use cases 5-32. In particular, the service client 5-33 of the present invention will generally provide for an end user actor 5-34 a means 5-35 for identifying the service client 5-33 to a service provider 5-36 for the purpose of requesting that the service provider 5-36 provide for the service client 5-33 access to a secured resource. Additionally, the service client 5-33 of the present invention will generally provide for an end user actor 5-34 a means 5-37 for submitting an authentication credential to the service client 5-33 for use by the service client 5-33 in obtaining from the service provider 5-36 access to the requested secured resource.

As also particularly shown in FIG. 5-1, the service provider 5-36 of the present invention will generally provide for an end user actor 5-34 a means 5-38 for requesting that access to a secured resource be provided by the service provider 5-36 for a service client 5-33. Additionally, the service provider 5-36 of the present invention will generally provide responsive to the submission by an end user actor 5-34 of a request for access to a secured resource a means 5-39 for generating and sending to the end user actor 5-34 a confirmation message 5-94 indicating that a submitted request was received by the service provider 5-36. Further, the service provider 5-36 of the present invention will generally provide for a service client actor 5-33 a means 5-40 for forwarding an end user provided authentication credential to the service provider 5-36. Still further, the service provider 5-36 of the present invention will generally provide responsive to the forwarding by a service client actor 5-33 of an authentication credential a means 5-41 for validating the authentication credential.

In an extension of the present invention particularly useful in implementations wherein the service provider 5-36 may not otherwise be readily able to determine the identity of a resource to which an end user actor 5-34 requests access based on the information content of the request as initially submitted by the end user actor 5-34 to the service provider 5-36, the service provider 5-36 may in combination with the means 5-38 for requesting access to a secured resource also be adapted to provide a means for determining a particular resource for access on the authority of the end user actor 5-34 such as, for example, a means 5-42 for prompting the end user actor 5-34 to provide additional identifying information for the requested resource.

In a further extension of the present invention particularly useful in the most typical implementations of the present invention wherein for security or other reasons the service client 5-33 is unable to directly access features or functionality of a resource for which an end user actor 5-34 has requested access, the service provider 5-36 is also adapted to provide for the end user actor 5-34 and/or the service client actor 5-33 a means 5-96 for conducting a transaction reliant upon or otherwise in connection with the requested secured resource. In this case, it is noted that the secured resource may be provided by and/or otherwise under the further control of a resource provider actor 5-43 external to the service provider 5-36 or, in the alternative, may be provided and/or implemented by and/or otherwise under the control of the service provider 5-36. In any event, the means 5-96 for conducting a transaction reliant upon or otherwise in connection with the requested secured resource may generally also further comprise a means for reporting the conducted transaction to the service client actor 5-33 and/or the end user actor 5-34.

Finally, it is noted that time 5-44 as an actor may be accommodated as desired in any particular implementation wherein the service provider 5-36 is also provided with a means 5-45 responsive to the passage of time for revoking or otherwise invalidating an authentication credential such that an authentication credential otherwise correctly provided by an end user actor 5-34 to a service client actor 5-33 and forwarded to the service provider 5-36 may as a result of the passage of time be deemed to be incorrect, thereby resulting in a validation failure upon application of the means 5-41 for validating the authentication credential.

Referring now then to FIG. 5-2 through FIG. 5-4 in particular, the authentication method 5-46 of the present invention as operative upon the described authentication system 5-30 is shown to generally comprise various series of interactions between a user 34, a service client system 5-33 and a service provider system 5-36, as broadly set out in FIG. 5-4, wherein the interactions may be broadly categorized as steps 5-47 implicated in requesting access to a secured resource, as broadly set out in FIG. 5-4, and steps 5-48 implicated in validating the purported access right of the user requesting access to the secured resource, as broadly set out in FIG. 5-3.

As particularly shown in FIG. 5-2 and FIG. 5-4, the authentication method 5-46 of the present invention generally begins with an end user 5-34 obtaining from a service client 5-33 data or other information necessary for the end user 5-34 to request that a service provider 5-36 provide for the service client 5-33 access to a secured resource. This data or other information will generally comprise the identification of the service client 5-33, but may additionally comprise any other data or information as may be helpful for the conduct of a particular transaction such as, for example, a purchase amount 5-76, a client reference, detailed or itemized transaction data or the like. In any case, the service client provided information is then utilized by the end user 5-34 to submit a request message 5-84 to the service provider 5-36 for the service provider 5-36 to provide for the service client 5-33 access to a secured resource.

Once a submitted request message 5-84 is received by the service provider 5-36, the service provider 5-36 preferably determines whether the end user 5-34 making the request is authorized or otherwise permitted to make such use of the authentication system 5-30. If in an implementation of this feature it is determined that the end user 5-34 is not authorized or otherwise permitted to make the attempted use of the authentication system 5-30 the process 5-47 will generally terminate whereas if it is determined that the end user 5-34 is authorized or otherwise permitted to make the attempted use of the authentication system 5-30 the process 5-47 will generally continue. Continuing in an important step, the service provider 5-36 must be able to evaluate the request message 5-84 to determine the specific identity of the resource for which the request is made. Because, in at least some implementations of the present invention, the common identifier for the resource will for security reasons not be allowed to be openly transmitted as part of submitted request, this step will in such implementations involve determining the identity of the resource from some element or combination of elements of information other than the common identifier for the resource. In any case, if the available and/or obtainable information is insufficient for the service provider 5-36 to positively determine the identity of the resource for which the end user 5-34 has requested access the process 5-47 will generally terminate whereas if the available and/or obtainable information is sufficient for the service provider 5-36 to positively determine the identity of the resource for which the end user 5-34 has requested access the process 5-47 will generally continue.

In the final steps for processing a request for access to a secured resource, the service provider 5-36 preferably generates a confirmation message 5-94 for use by the end user 5-34 for indicating to the end user 5-34 that a submitted request message 5-84 has in good order been received by the service provider 5-36 and, thereafter, sends the confirmation message 5-94 to the end user 5-34. With the confirmation message 5-94 issued by the service provider 5-36 to the end user 5-34, the end user 5-34 will then submit a previously established authentication credential to the service client 5-33.

Referring then to FIG. 5-3 and FIG. 5-4 in particular, validation 5-48 of the purported access right of the user requesting access to a secured resource is shown to generally begin with the submission to a service client 5-33 by the end user 5-34 of an authentication credential, which authentication credential simply comprises a previously established key string known to both the service provider 5-36 and the end user 5-34. Once submitted by an end user 5-34 to a service client 5-33, however, an authentication credential must in order for the validation 5-48 to continue be forwarded by the service client 5-33 to the service provider 5-36. To this end, in an optional but most preferred feature of the present invention, the service client 5-33 may be programmed or otherwise configured to ensure prior to forwarding the authentication credential to the service provider 5-36 that a secure communication channel is first established between the service client 5-33 and the service provider 5-36. If in an implementation of this feature the required secure communication channel cannot be established between the service client 5-33 and the service provider 5-36 the continuing process 5-48 will generally terminate whereas if the required secure communication channel is successfully established between the service client 5-33 and the service provider 5-36 the process 5-48 will generally continue.

Upon successful forwarding by the service client 5-33 to the service provider 5-36 of the end user submitted authentication credential, the service provider 5-36 proceeds to validate the responsive authentication credential by comparing the credential against a known correct key string. As will be appreciated by those of ordinary skill in the art in light of this exemplary description, the known correct key string will simply be the same key string known to both the service provider 5-36 and the end user 5-34 and used by end user 5-34 as an authentication credential in connection with the transaction in progress. In addition to comparison of the authentication credential to a known correct key string, however, it is noted that in an authentication system utilizing time 5-44 as an actor in order to provide a timeout for the validity of an authentication credential provided in connection with a particular requested transaction the service provider 5-36 will be programmed or otherwise adapted to determine as part of the validation step whether as a result of the passage of time 5-44 the authentication credential should for the particular transaction is progress be deemed to be incorrect. In any case, if the authentication credential is found or otherwise deemed to be incorrect, the service provider 5-36 will preferably report the incorrect finding to the service client 5-33 and/or the end user 5-34 and the process 5-48 will generally terminate whereas if the authentication credential is found to be correct the process 5-48 will generally continue.

With the authentication credential found to be correct, the service provider 36 may simply report the correct finding to the service client 5-33 or, if for security or other reasons the service client 5-33 is unable to directly access features or functionality of a resource for which an end user actor 5-34 has requested access, the service provider 5-36 will then obtain for the end user 5-34 and/or the service client 5-33 the benefit of the requested secured resource and thereafter appropriately report the conducted transaction to the service client 5-33 and/or the end user 5-34.

With the foregoing broad overview of the general structure and function of the authentication system 5-30 of the present invention in mind, it is now noted that in accordance with the present invention an end user 5-34 may comprise any person or machine requiring, in connection with some other use, access or other relationship with a service client 5-33, access for the service client 5-33 to a secured resource for which the service client 5-33 is restricted from full knowledge and for which the service provider 5-36 may hold full knowledge, full knowledge being defined herein as knowledge sufficient to make ordinary full use of the secured resource outside of the framework of the authentication system 5-30 and method 5-46 of the present invention. By way of simple example, the resource may comprise password protected information (e.g., a credit report) a portion of which (e.g., only the credit scores) a human end user 5-34 wishes to share with a service client 5-33 comprising an information consumer (e.g., a potential creditor) without providing to the information consumer the password (e.g., by which the full credit report is protected and as would otherwise enable the potential creditor to gain full access to the protected credit file). Under the present invention, a service provider 5-36 having associated therewith a hardware and/or software implementation of the previously generally discussed functionality is in accordance with the present invention programmed or otherwise adapted to receive directly from the service client 5-33 an end user provided authentication credential associated with the service client 5-33 as a result of a request by the end user 5-34 for the service provider 5-36 to provide for the service client 5-33 access to a secured resource and, thereafter, to validate the authentication credential from the service client 5-33 to ensure that the request is made under the authorization of an end user 5-34 having right of access to the secured resource.

With this in mind, the end user 5-34 may, for example and without limitation, be a patient wishing to share medical information (a secured resource) with a healthcare or medical insurance provider (a service client 5-33) without having to grant to the healthcare or medical insurance provider unfettered access to all of his or her medical records; the end user 5-34 may be the holder of a credit card account, banking account, automated teller machine ("ATM") card and/or account or the like (a secured resource) wishing to purchase merchandise, services, information or the like from a retail store, service station, on-line service provider or merchandiser, other business or the like (a service client 5-33) without providing the service client 5-33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data or the like (a service client 5-33) without providing his or her Social Security Number or other information not necessary to the conduct of the present transaction.

In a critical aspect of the authentication system 5-30 and method 5-46 of the present invention, an additional security measure is implemented by requiring that the service client 5-33 be restricted from access to the common identifier for the secured resource, e.g. the account number for a credit card or financial deposit account; the Social Security Number of a patient; the account number of an ATM card; or the like. In order to better describe these critical aspects of the present invention, however, reference is now made to the deployment diagram of FIG. 5-5, wherein there is shown the various elements of an exemplary hardware and software based implementation of an authentication system 5-30 constructed in accordance with the teachings of the present invention.

Before continuing, however, it is noted that while the implementation depicted in FIG. 5-5 is exemplary of the authentication system 5-30 of the present invention, it is in no manner meant to be all encompassing or otherwise limiting of the wide range of implementations as are possible. In addition, it is noted that while some elements are in FIG. 5-5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 5-5, a service provider 5-36 (such as, for example, may comprise a specialized provider of the authentication services of the present invention; a provider of other products or services having need of authentication services, such as, for example, a credit card processor or financial institution or an alarm monitoring company; or the like) is shown for purposes of this exemplary discussion to have associated therewith one or more application servers 5-50 or database servers 5-98 upon which may be hosted software functionality necessary to operation within the framework of the present invention. In particular, an application server 5-50 may host a request handler software component 5-51 adapted to receive, process and/or otherwise handle request messages 5-84 from end users 5-34 and submissions from end users 5-34 or service clients 5-33 as well as to produce output for end users 5-34 and/or service clients 5-33 as may be necessary in the operation of the present invention. Additionally, the application server 5-50 may host an authenticator 5-52 adapted to handle or otherwise control all aspects of the authentication process within the realm of responsibility of the service provider 5-36, including receiving authentication requests, storing and/or retrieving data pertinent to the processing of such requests, directing the generation and sending of confirmation messages 5-94, and directing the validation of credentials submitted for authentication and actions taken based upon the results of such validations. In order to improve efficiency, the authenticator component 5-52 may comprise one or more further specialized components such as, for example, a validation tool 5-55 adapted to conduct the specialized task of comparing received credentials with known key strings. Still further, the application server 5-50 may also host an administration tool 5-56 through which various aspects of the setup, maintenance and operation of the hardware and software systems of the service provider 5-36 may be managed.

In order to efficiently manage and handle the large quantity of data that may typically be stored in connection with an implementation of the present invention, one or more dedicated database servers 5-98 hosting database management systems 5-57 are generally desired. As shown in FIG. 5-5, a typical database management system 5-57 may include a user database 5-58 for storing a wide variety of generally user centric data as may be required in the operation of the present invention and a transaction database 5-59 for storing data generally associated with the conduct of individual transactions. Although those of ordinary skill in the art will recognize that virtually unlimited alternatives are possible, FIG. 5-7 shows a very high level but generally representative schema for a user database 5-58 and FIG. 5-8 shows a very high level but also generally representative schema for a transaction database 5-59, each of which will be described in greater detail further herein in connection with an exemplary description of the conduct of a typical transaction.

Additionally, a preferably unified messaging gateway 5-60 is provided for use in receiving request messages 5-84 from and issuing confirmation messages 5-94 to end users 5-34 through various communication channels. As will be appreciated by those of ordinary skill in the art, such a unified messaging gateway 5-60 may be utilized to receive a request message 5-84 or transmit a generated confirmation message 5-94 in any of a plurality of message formats (such as, for example, as a SMS message, a standard text message, an e-mail message, a synthesized voice message, an alphanumeric page or the like) over any of a plurality of communication channels (such as, for example, an SMS or other text channel, a SMTP channel, a POTS channel, a paging network or private broadcast channel or the like) to be received by any of a plurality of user devices (such as, for example, a mobile or landline telephone, a smart phone, an e-mail client, a PDA, a numeric or digital pager or the like). Still further, a service user interface 5-61 is provided and adapted to provide input from all manner of users 5-62, including administrative users, end users 5-34 and service client users 5-33, to the hardware and/or software systems of the service provider 5-36 and to provide output from these systems to the various users 5-62. Although the service user interface 5-61 may take a wide variety of forms depending upon the circumstances of any particular implementation, a typical user interface may be implemented as a web interface 5-63, as shown in FIG. 5-6, wherein there may be provided a page processor 5-64 hosted on an appropriate execution environment 5-65 installed on a dedicated web server 5-66 in Internet communication 5-67 with a user device 5-68, such as, for example, a personal computer, smart phone 5-78 or the like, and on which is installed and/or hosted a web browser 5-69 running in a provided execution environment 5-70. In any case, as will be appreciated by those of ordinary skill in the art, the provision of a service user interface 5-61, which of course should be secured, enables the various users 5-62 to maintain and/or otherwise manage the data stored in the user database 5-58 as may be appropriate as well as to generally manage and maintain the implemented authentication system 5-30. Finally, one or more resource communication gateways (not shown) may be provided in order to establish preferably secure communication between the systems of the service provider 5-36 and outside resource providers 5-43.

Continuing then with the example generally described with respect to FIG. 5-5, further details of the implementation are now described by way of the following detailed description of a possible use of the implementation for conducting a retail purchase transaction, which, for purposes of the example, shall be taken as completion of a purchase at an automobile fueling station, a restaurant or an on-line retailer (the service client 5-33) by a consumer (the end user 5-34) having available for payment a credit card and a checking account (secured resources). To complete the transaction, the consumer will indicate a desire to make a payment to the automobile fueling station, restaurant or on-line retailer by submitting to a service provider 5-36 a request for payment to the service client 5-33 and for authentication of the consumer's right of access to an identified secured payment resource, whereafter the end user 5-34 will provide a previously established authentication credential to the service client 5-33. The service client 5-33 will then forward the authentication credential to the service provider 5-36 for validation in order to obtain payment from the identified secured payment resource as requested by the consumer. In accordance with a critical aspect of the present invention, however, the automobile fueling station, restaurant or on-line retailer cannot be provided with or otherwise be made aware of either the consumer's credit card or checking account number and also must not be given any information that would allow the automobile fueling station, restaurant or on-line retailer to repeat the transaction without again obtaining authorization from the consumer.

As previously discussed, the authentication method 5-46 of the present invention generally begins with an end user 5-34 obtaining from a service client 5-33 data or other information necessary for the end user 5-34 to request that a service provider 5-36 provide for the service client 5-33 access to a secured resource. As also previously discussed, this data or other information will generally comprise the identification of the service client 5-33. Referring then to FIG. 5-9 through FIG. 5-11 in particular, representative means 5-35 for identifying a service client 5-33 are shown to comprise an alphabetic and/or numeric identification code 5-71 and a machine readable identification code 5-72 such as, for example, a barcode or like representation. As particularly shown in FIG. 5-9, one or more such means 5-35 may be affixed by printing, placard or other labeling or electronically displayed on a screen, monitor or the like of a POS, fueling station, ATM or like terminal device 5-73. As particularly shown in FIG. 5-10, one or more such means 5-35 may be printed on a guest check 5-74, sales slip, invoice or the like prepared in anticipation of the completion of a financial transaction or on a similarly formatted request document such as, for example, a consent form for access to medical records, credit records or the like. As particularly shown in FIG. 5-11, one or more such means 5-35 may be displayed on a webpage 5-75, as part of a computer or like application program such as, for example, may be generated or otherwise provided in connection with an on-line financial transaction, activation or deactivation of an alarm system, access to of control of a computer or other machine, control of a door lock or a like application.

As also previously discussed, the data or other information obtained from a service client 5-33 may additionally comprise any other data or information as may be helpful for the conduct of a particular transaction such as, for example, a purchase amount 5-76, a client reference, detailed or itemized transaction data or the like. To this end it is noted that in most cases a means 5-35 for identifying a service client 5-33 may be dynamically generated on a transaction-by-transaction basis. For example, in the case of FIG. 5-9 representing a fueling station terminal device, the numeric identifier and/or barcode could be generated by the fueling station controller and displayed on the depicted screen, whereby the information collected by the end user 5-34 for use in submitting a request message 5-84 to the service provider 5-36 may include, for example, a transaction number or the like. Similarly, in the case of FIG. 5-9 representing an ATM terminal device, the numeric identifier 5-71 and/or barcode 5-72 could be generated by the ATM controller in at least partial reliance on user submitted information and, thereafter, displayed on the depicted screen 5-77, whereby the information collected by the end user 5-34 for use in submitting a request message 5-84 to the service provider 5-36 may include, for example, the amount of a withdrawal or other transaction, the types of accounts to use in completing the desired transaction or the like. In the case of FIG. 5-10 representing a document created for a particular transaction or in the case of FIG. 5-11 representing a computer or other dynamically created display, those of ordinary skill in the art will recognize that virtually any type of data or other information may be included for use by the end user 5-34 in submitting a request message 5-84 to the service provider 5-36.

Still further, however, the data or other information may for enhanced security include, in addition to the identification of the service client 5-33, a dynamically generated value that must be included as part of the identification of the service client 5-33 in order for a request message 5-84 submitted by an end user 5-34 to be accepted by a service provider 5-36. In implementation of such a feature, the end user 5-34 will generally provide some input to the service client 5-33 indicating that the end user 5-34 wants to make use of the service 5-30. At this point, the service client 5-33 will, preferably through a secured communication channel, request and obtain from the service provider 5-36 a uniquely formulated identification for use only in connection with the present transaction. The obtained unique identification is then used by the service client 5-33 and the end user 5-34 in the same manner as otherwise would be used a static identification. As will be appreciated by those of ordinary skill in the art, this feature is particularly useful in the detection and/or prevention of man-in-the-middle or other spoofing type deceptions.

In any case, as also previously discussed, the service client provided information is then utilized by the end user 5-34 to submit a request message 5-84 to the service provider 36 for requesting that the service provider 5-36 provide for the service client 5-33 access to a secured resource. To this end, the end user 5-34 will require a means 5-38 for communicating the request message 5-84 to the service provider 5-36. As shown in FIG. 5-12, a mobile device 5-8, such as a cellular telephone, smart phone or the like, may be utilized to send an SMS or standard text message 5-79 over any available SMS or standard text capable communication channel to the messaging gateway 5-60 implemented for the service provider 5-36. Similarly, as shown in FIG. 5-14, an electronic mail client 5-80 may be utilized to send an electronic mail message 5-81 over any electronic mail capable communication channel to the messaging gateway 5-60 implemented for the service provider 5-36. Additionally, a web interface 5-63, which may be implemented as or in connection with the service user interface 5-61, may be utilized to enable the end user 5-34 to interactively communicate the request message 5-84 to the service provider 5-36. While implementation of the web interface 5-63 will generally dictate establishing at least some login functionality, which minimally would include requiring the provision of a user name or the like by which the service provider 5-36 can identify the particular end user 5-34 making a submission, those of ordinary skill in the art will recognize that such an implementation also has the advantage of providing the end user 5-34 with broad flexibility in tailoring of the request message 5-84 to any particular transaction. Still further, as shown in FIG. 5-16, a user application 5-82, which may be adapted for use on or in connection with a mobile device 5-78, a personal computer or any other appropriate hardware, may also be provided. As will be appreciated by those of ordinary skill in the art, implementation of such a user application 5-82 will not only provide generally the same advantageous flexibility as a web interface 5-63, but also may be provided with means for securely identifying the end user 5-34 to the service provider 36. For example, such a user application 5-82 may have embedded therein a token or other identifier, which may be encrypted if desired, for passage to the service provider 5-36 to identify the end user 5-34. In any case, it is also noted that because any desired formatting may generally be effected by a user application 5-82 such a user application 5-82 may also be adapted to communicate with the messaging gateway 5-60 or other user interface 5-61 implemented for the service provider 5-36 over virtually any communication channel including, for example and without limitation, an SMS or standard text capable communication channel, an SMTP capable communication channel, a POTS communication channel, a hypertext transfer protocol (HTTP), secure HTTP (HTTPS), file transfer protocol (FTP) or other Internet or like network transfer protocol communication channel. Finally, it is noted that other devices and communication channels may also be utilized for submission by an end user 5-34 of a request message 5-84 to the service provider 5-36 as well as for communication by the service provider 5-36 to the end user 5-34 of a confirmation message 5-94. For example, and without limitation, the means 5-38 for communicating a request message 5-84 to a service provider 5-36 and/or means 5-39 for communicating a confirmation message 5-94 to an end user 5-34 may also comprise a telephone auto attendant, which may implement a DTMF decoder, speech recognition engine, TDD/TTY decoder or the like, or virtually any other combination of input modalities (including barcode readers or scanners, keyboards, keypads, pointing devices, microphones and the like) and output modalities (including visual displays such as computer or other device monitors or screens, audio output devices such as headphones or other speakers, tactile output devices such as may be adapted for the visually impaired and the like).

As particularly shown in FIG. 5-12 and FIG. 5-14, a typical request message 5-84 may simply comprise information 5-83 identifying the service client 5-33 (such as, for example, a credit card program merchant identification number, a service provider issued or registered identification number or other identifier or the like) and, if necessary for the particular transaction, one or more additional parameters (such as, for example, a purchase amount 5-76 or the like). As exemplified by the depicted examples, the request message 5-84 may be formatted according to a predetermined pattern or other scheme, which, as will be appreciated by those of ordinary skill in the art, is particularly advantageous in implementations wherein the end user 5-34 may be required to submit the request message 5-84 by text message 5-79, inasmuch as such a formatted input will generally require a bare minimum of data entry by the end user 5-34. In any case, it is noted that in the examples of FIGS. 5-12 and FIGS. 5-14 the request message 5-84 does not include identifying information for the end user 5-34. As will be appreciated by those of ordinary skill in the art, however, such information may be obtained by the service provider 36 by examining the telephone number from which the text message 5-79 was sent, in the case of FIG. 5-12, or by examining the "reply to" electronic mail address from which the electronic mail message 5-81 was sent, in the case of FIG. 5-14.

As particularly shown in FIG. 5-15 and FIG. 5-16, the request message 5-84 may be formatted for transmission by the implemented website page processor 5-64 and/or user application 5-82, the details of which formatting will generally not need to be known by the end user 5-34. Additionally, it is noted that the information provided in either depicted implementation may be manually entered by the end user 5-34, automatically entered through a barcode reader (which, in the case of a mobile application 5-82 may be provided in connection with the camera application of a mobile device 5-78), or through a combination of manual and automatic entry. Additionally, these implementations are readily adapted to include any number of convenience features. For example, the screen as depicted in FIG. 5-16 may be produced as a result of scanning the barcode provided on the guest check 5-74 depicted in FIG. 5-10, but prior to submitting the request to the service provider 5-36 the end user 5-34 may change the amount 5-76 from "27.99" to "33.99," which may, under the circumstances of the transaction (including, for example, the knowledge that the service client 5-33 is a restaurant), be automatically interpreted by the service provider 5-36 as an indication that the end user 5-34 wishes to add a tip in the amount of $6.00 to the purchase price 5-76. In any case, once the request message 5-84 is assembled and/or formatted, if required, by the end user 5-34, the request message 5-84 is submitted to the service provider 5-36.

Once the request message 5-84 is received by the implemented messaging gateway 5-60 or, if appropriate, service user interface 5-61, the nature of the request will be identified and the request message 5-84 will then be routed to the request handler 5-51 hosted on the service provider's application server 5-50. Upon receipt of the consumer's request message 5-84, the request handler 5-51 will generally first undertake to determine whether the purported end user 5-34 is recognized at the service provider 5-36. To this end, the request handler 5-51 may access the user database 5-58, as generally shown in FIG. 5-7, to determine whether the provided or inferred end user 5-34 identification can be located in the user table 5-85. If not, the authentication process 5-46 will generally terminate. If, on the other hand, the provided or inferred end user 5-34 identification is recognized the request handler 5-51 will proceed to establish a new transaction record in the transaction table 5-86 of the transaction database 5-59, as generally shown in FIG. 5-8, and at this time should also store in the transaction record the unique USER_ID by which the automobile fueling station, restaurant or on-line retailer is known in the user database 5-58. Additionally, any other pertinent provided information such as, for example, the client reference, purchase amount 5-76 or the like, may be stored in the transaction parameter records 5-87, which will be created as required.

With the new transaction record established and known pertinent information appropriately stored, the request handler 5-51 then undertakes to identify a particular secured resource for fulfillment of the consumer's request. As previously noted in the setup to the present example, however, the consumer wishing to make payment to the automobile fueling station, restaurant or on-line retailer has more than one secured payment resource available for use, which information will become known to the request handler 5-51 upon searching the resource table 5-88 of the user database 5-58 for secured resources associated with the USER_ID by which the tentatively identified consumer is known.

As shown in the exemplary user database 5-58 of FIG. 5-7, the resource table 5-88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system of the present invention is preferably provided with means for determining a particular resource for access on the authority of the end user 5-34.

In a first example of such a means a priority may be assigned by each user 5-34 of a resource to the particular resource, whereby resources of a particular class or, if the service client 5-33 accepts only a certain subclass, on the basis of a particular class and subclass the available resources meeting the selection criteria may be sorted to determine the appropriate resource for use. Such priority values may, for example, be stored in the resource user table 5-99 of the user database 5-58 as depicted in FIG. 5-7.

In a second example of such a means each resource may be assigned a pseudonym 5-90 comprising generally non-identifying information but nonetheless information which is unique among the class of resource for any particular user, which pseudonyms may be stored in the resource attribute table 5-89 of the user database 5-58. Making use of the stored pseudonym 5-90, this means for determining a particular resource for access by the end user 5-34 comprises generating an inquiry message 5-91 for transmission to the end user 5-34 whereby the service provider 5-36 requests that the end user 5-34 select one resource based on the assigned pseudonym. As particularly shown in FIG. 5-13, such an inquiry message 5-91 may be sent by generally any means available for communication with the end user 5-34, including any means appropriate for submitting request messages 5-84 or issuing challenge messages 5-94, and is preferably formatted for simple reply.

In the example implementation (assuming that no priority information was stored), upon determining that the tentatively identified end user 5-34 has more than one secured payment resource, but that each available resource has associated therewith a pseudonym 5-90, the service provider 5-36 would generate an inquiry message 5-91 for transmission to the end user 5-34, which inquiry message 5-91 may request that the consumer enter a simple response indicating whether he or she wishes to proceed using his or her "Credit Card 9876" or using his or her "Checking 1234." Once generated, the request handler 5-51 will generally queue the inquiry message 5-91 at the service provider's messaging gateway device 5-60 for transmission to the consumer. The consumer may then select the desired payment option and respond, causing an updated request message 5-84 to be routed to the request handler 5-51. At this point the request handler 5-51 will again undertake to identify a particular secured resource for fulfillment of the consumer's request.

In any case, once an appropriate particular secured resource is identified for access, any remaining transaction parameters, including the unique RESOURCE_ID by which the identified resource is known in the user database 5-58, is preferably stored in the transaction database 5-59 as shown in FIG. 5-8. With the end user 5-34 and the resource for which the end user 5-34 requests access both identified and logged to the transaction database 5-59, the authenticator 5-52 hosted on the service provider's application server 5-50 takes control from the request handler 5-51 and undertakes to determine the appropriate key string for use in positively authenticating the identity of the presently tentatively identified end user 5-34. To this end, the authenticator 5-52 will generally first look to the resource attribute table 5-89 of the user database 5-58 to determine if there exists a previously established key string specifically designated for use with the identified secured resource. If so, the located key string will generally be saved by the authenticator 5-52 in the transaction table 5-87 of the transaction database 5-59 for later retrieval and use as the key string with which to validate a submitted authentication credential. If, on the other hand, no key string is identified as being specifically designated for use with the identified secured resource, the authenticator 5-52 will use for the key string a private string, which in the preferred implementation of the present invention is an end user selected or service provider assigned key string that is for each end user 5-34 stored in the user table 5-85 of the user database 5-58 for use as a "default" key string for the end user 5-34. While in the most preferred implementations of the present invention it is desirable that the default private string be unique for each end user 5-34, it is generally sufficient that the private string comprises a string that is not readily predicable. In any case, a timestamp may at this time also be entered into the transaction table 86 in order to provide a reference by which may be calculated a timeout event for the validity of the key string.

It is now noted that as used herein a "string" shall for purposes of the present invention be expressly defined to mean "an ordered sequence of any subset of symbols selected from a set of symbols wherein each symbol forming the set may be represented in both a format that may be perceived by an end user 5-34 and a format that may be recognized by software or hardware," e.g. the set of all alphabetic and numeric characters in the English language. Although not strictly necessary for the conduct of the present invention, it will be desirable, in at least those implementations requiring human handling of an authentication credential, that the authentication credential comprise symbols that also may be perceived by a human end user 5-34.

With the appropriate key string identified and saved to the transaction database 5-59, the confirmation message 5-94 is, if required in a particular implementation of the present invention, sent to the end user 5-34. Referring then to FIG. 5-17 in particular, there is shown a typical simple confirmation message 5-94 as may be transmitted to an end user 5-34 through a text enable smart phone or like mobile device 5-78. Following with the presented example, it is noted that in an optional but useful feature of the present invention the confirmation message 5-94 may also include information helpful to the consumer in continuing the transaction in progress. For example, the confirmation message 5-94 depicted in FIG. 5-17 includes the name of the restaurant for which the consumer made the access request and the purchase amount 5-76 for which the consumer requests access to his or her secured resource.

Turning the example now to detailed discussion of the steps 5-48 implicated in validating the purported access right of the user requesting access to the secured resource, the validation steps 5-48 begin with the consumer providing to the service client 5-33 for which access to a secured resource has been requested, as an authentication credential, the key string as previously established between the end user 5-34 and the service provider 5-36 for use in connection with either the specific resource for which is access is requested or, if no such specific key string has been previously established, the private string for the end user 5-34. While the authentication credential (key string) may generally be provided to a service client 5-33 in any conceivable manner, including verbally, in writing, by electronic transmission or the like, at least some implementations may require that the end user 5-34 provide the key string in a particular manner. For example, a self-service type transaction at a POS, ATM or fueling station terminal device 5-73 will generally dictate that the end user 5-34 provide the authentication credential through the service client provided input modality 5-95. In any case, with the authentication credential provided, the fueling station, restaurant or on-line retailer submits in an authentication message the end user provided authentication credential to the service provider 5-36 along with the service client's identifying information 5-71 for validation and, assuming validation passes, access to the end user's authorized secured resource—in this case payment.

Once the authentication credential is received by the service provider 5-36, it is routed by the messaging gateway 5-60 or service user interface 5-61 to the authenticator 5-52 hosted on the service provider's application server 5-50. The authenticator 5-52 will then direct the validation tool 5-55 to evaluate the submitted authentication credential based upon the client identity and/or client reference for the authentication message. The validation tool 5-55 will access the transaction database 5-59 to retrieve the key string associated with the particular service client identity and/or service client reference and will evaluate the submitted credential against the retrieved key string (taking into account, if appropriate for the particular implementation, the passage of time) and will then report the result of the evaluation to the authenticator 5-52. As will be appreciated by those of ordinary skill in the art in light of this exemplary detailed description, only a submitted authentication credential matching a key string particularly pre-authorized by the end user 5-34 for use by the particular service client 5-33 making the submission in connection with transaction in process will pass evaluation. In any case, if the evaluation fails the process 5-48 will terminate and the failure will be reported by the request handler 5-51 to the service client 5-33. If, on the other hand, the evaluation passes the request handler 5-51 will determine whether a resource need be accessed on behalf of the fueling station, restaurant or on-line retailer.

If the request handler 5-51 determines that a resource should be accessed, a resource request is formulated using the transaction parameters stored in the transaction database 5-59 and any additional information as may be necessary that is stored in the user database 5-58. For example, in the case of processing a credit card transaction, the request handler 5-51 will retrieve the transaction amount from the transaction database 5-59 and will retrieve the full credit card number, expiration date, billing address, CV number or other necessary information pertaining to the credit card account from the resource attribute table 5-89 of the user database 5-58 and may also retrieve from the user attribute table 5-92 of the user database 5-58 necessary information concerning the fueling station, restaurant or on-line retailer such as, for example, banking information for deposit of obtained funds. In any case, the complete resource request is by the request handler 5-51 queued to a resource communication gateway and processed whereafter the result of the transaction is reported to the fueling station, restaurant or on-line retailer and also, preferably, to the consumer.

In a particularly efficient feature of the present invention, the service provider 5-36 may provide for the consumer an electronically generated receipt for the conducted transaction, which may be transmitted by e-mail or otherwise. In a case where the fueling station, restaurant, on-line retailer or other service client 5-33 provides itemized or otherwise detailed purchase data, such data may be included as part of the receipt. This, of course, completely relieves the service client 5-33 of having to generate a receipt. Additionally, combined transaction data may be assembled by the service provider 5-36 for periodic bulk reporting to the service client 5-33. Still further, the service provider 5-36 may, if desired, implement a budgeting service for the end user 5-34, wherein at the end user's behest financial transactions over budgeted limits or over budgeted limits for particular service clients 5-33 or types of service clients 5-33 will be deemed to fail validation in order to force compliance with the terms of a budget.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 5-34 that system, facility or the like for which the end user 5-34 desires access has implemented the teachings of the present invention. In any case, because the scope of the present invention is much broader than any particular embodiment, the foregoing detailed description should not be construed as a limitation of the scope of the present invention, which is limited only by the claims appended hereto.

Sixth Described Embodiment

Referring now to FIG. 6-1, the authentication system 6-30 of the present invention is shown to generally comprise an operative combination of a plurality of service client implemented use cases 6-31 and a plurality of service provider implemented use cases 6-32. In particular, the service client 6-33 of the present invention will generally provide for an end user actor 6-34 a means 6-35 for identifying the service client 6-33 to a service provider 6-36 for the purpose of requesting that the service provider 6-36 provide for the service client 6-33 access to a secured resource. Additionally, the service client 6-33 of the present invention will generally provide for an end user actor 6-34 a means 6-37 for submitting an authentication credential to the service client 6-33 for use by the service client 6-33 in obtaining from the service provider 6-36 access to the requested secured resource.

As also particularly shown in FIG. 6-1, the service provider 6-36 of the present invention will generally provide for an end user actor 6-34 a means 6-38 for requesting that access to a secured resource be provided by the service provider 6-36 for a service client 6-33. Additionally, the service provider 6-36 of the present invention will generally provide responsive to the submission by an end user actor 6-34 of a request for access to a secured resource a means 6-39 for generating and sending to the end user actor 6-34 a transient authentication credential. Further, the service provider 6-36 of the present invention will generally provide for a service client actor 6-33 a means 6-40 for forwarding an end user provided authentication credential to the service provider 6-36. Still further, the service provider 6-36 of the present invention will generally provide responsive to the forwarding by a service client actor 6-33 of an authentication credential a means 6-41 for validating the authentication credential.

In an extension of the present invention particularly useful in implementations wherein the service provider 6-36 may not otherwise be readily able to determine the identity of a resource to which an end user actor 6-34 requests access based on the information content of the request as initially submitted by the end user actor 6-34 to the service provider 6-36, the service provider 6-36 may in combination with the means 6-38 for requesting access to a secured resource also be adapted to provide a means for determining a particular resource for access on the authority of the end user actor 6-34 such as, for example, a means 6-42 for prompting the end user actor 6-34 to provide additional identifying information for the requested resource.

In a further extension of the present invention particularly useful in the most typical implementations of the present invention wherein for security or other reasons the service client 6-33 is unable to directly access features or functionality of a resource for which an end user actor 6-34 has requested access, the service provider 6-36 is also adapted to provide for the end user actor 6-34 and/or the service client actor 6-33 a means 6-96 for conducting a transaction reliant upon or otherwise in connection with the requested secured resource. In this case, it is noted that the secured resource may be provided by and/or otherwise under the further control of a resource provider actor 6-43 external to the service provider 6-36 or, in the alternative, may be provided and/or implemented by and/or otherwise under the control of the service provider 6-36. In any event, the means 6-96 for conducting a transaction reliant upon or otherwise in connection with the requested secured resource may generally also further comprise a means for reporting the conducted transaction to the service client actor 6-33 and/or the end user actor 6-34.

Finally, it is noted that time 6-44 as an actor may be accommodated as desired in any particular implementation wherein the service provider 6-36 is also provided with a means 6-45 responsive to the passage of time for revoking or otherwise invalidating an authentication credential such that an authentication credential otherwise correctly provided by an end user actor 6-34 to a service client actor 6-33 and forwarded to the service provider 6-36 may as a result of the passage of time be deemed to be incorrect, thereby resulting in a validation failure upon application of the means 6-41 for validating the authentication credential.

Referring now then to FIG. 6-2 through FIG. 6-4 in particular, the authentication method 6-46 of the present invention as operative upon the described authentication system 6-30 is shown to generally comprise various series of interactions between a user 6-34, a service client system 6-33 and a service provider system 6-36, as broadly set out in FIG. 6-4, wherein the interactions may be broadly categorized as steps 6-47 implicated in requesting access to a secured resource, as broadly set out in FIG. 6-2, and steps 6-48 implicated in validating the purported access right of the user requesting access to the secured resource, as broadly set out in FIG. 6-3.

As particularly shown in FIG. 6-2 and FIG. 6-4, the authentication method 46 of the present invention generally begins with an end user 6-34 obtaining from a service client 6-33 data or other information necessary for the end user 6-34 to request that a service provider 6-36 provide for the service client 6-33 access to a secured resource. This data or other information will generally comprise the identification of the service client 6-33, but may additionally comprise any other data or information as may be helpful for the conduct of a particular transaction such as, for example, a purchase amount 6-76, a client reference, detailed or itemized transaction data or the like. In any case, the service client provided information is then utilized by the end user 6-34 to submit a request message 6-84 to the service provider 6-36 for the service provider 6-36 to provide for the service client 6-33 access to a secured resource.

Once a submitted request message 6-84 is received by the service provider 6-36, the service provider 6-36 preferably determines whether the end user 6-34 making the request is authorized or otherwise permitted to make such use of the authentication system 6-30. If in an implementation of this feature it is determined that the end user 6-34 is not authorized or otherwise permitted to make the attempted use of the authentication system 6-30 the process 6-47 will generally terminate whereas if it is determined that the end user 6-34 is authorized or otherwise permitted to make the attempted use of the authentication system 6-30 the process 6-47 will generally continue. Continuing in an important step, the service provider 6-36 must be able to evaluate the request message 6-84 to determine the specific identity of the resource for which the request is made. Because, in at least some implementations of the present invention, the common identifier for the resource will for security reasons not be allowed to be openly transmitted as part of submitted request, this step will in such implementations involve determining the identity of the resource from some element or combination of elements of information other than the common identifier for the resource. In any case, if the available and/or obtainable information is insufficient for the service provider 6-36 to positively determine the identity of the resource for which the end user 6-34 has requested access the process 6-47 will generally terminate whereas if the available and/or obtainable information is sufficient for the service provider 6-36 to positively determine the identity of the resource for which the end user 6-34 has requested access the process 6-47 will generally continue.

In the final steps for processing a request for access to a secured resource, the service provider 6-36 generates a key string 6-94 for use by the end user 6-34 as a transient authentication credential and, thereafter, issues the key string 6-94 to the end user 6-34. With the key string 6-94 issued by the service provider 6-36 to the end user 6-34, the end user 6-34 will then submit the issued key string 6-94 to the service client 6-33 as an authentication credential.

Referring then to FIG. 6-3 and FIG. 6-4 in particular, validation 6-48 of the purported access right of the user requesting access to a secured resource is shown to generally begin with the submission to a service client 6-33 by the end user 6-34 of an authentication credential, which authentication credential simply comprises the key string 6-94 as issued by the service provider 6-36 to the end user 6-34 for use in connection with the transaction in progress. Once submitted by an end user 6-34 to a service client 6-33, however, an authentication credential must in order for the validation 6-48 to continue be forwarded by the service client 6-33 to the service provider 6-36. To this end, in an optional feature of the present invention, the service client 6-33 may be programmed or otherwise configured to ensure prior to forwarding the authentication credential to the service provider 6-36 that a secure communication channel is first established between the service client 6-33 and the service provider 6-36. If in an implementation of this feature the required secure communication channel cannot be established between the service client 6-33 and the service provider 6-36 the continuing process 6-48 will generally terminate whereas if the required secure communication channel is successfully established between the service client 6-33 and the service provider 6-36 the process 6-48 will generally continue.

Upon successful forwarding by the service client 6-33 to the service provider 6-36 of the end user submitted authentication credential, the service provider 6-36 proceeds to validate the responsive authentication credential by comparing the credential against a known correct key string. As will be appreciated by those of ordinary skill in the art in light of this exemplary description, the known correct key string will simply be the same key string 6-94 as previously generated for and issued to the end user 6-34 for use in connection with the transaction in progress. In addition to comparison of the authentication credential to a known correct key string, however, it is noted that in an authentication system utilizing time 6-44 as an actor in order to provide a timeout for the validity of an outstanding key string 6-94, the service provider 6-36 will be programmed or otherwise adapted to determine as part of the validation step whether as a result of the passage of time 6-44 the authentication credential should be deemed to be incorrect. In any case, if the authentication credential is found or otherwise deemed to be incorrect, the service provider 6-36 will preferably report the incorrect finding to the service client 6-33 and/or the end user 6-34 and the process 6-48 will generally terminate whereas if the authentication credential is found to be correct the process 6-48 will generally continue.

With the authentication credential found to be correct, the service provider 6-36 may simply report the correct finding to the service client 6-33 or, if for security or other reasons the service client 6-33 is unable to directly access features or functionality of a resource for which an end user actor 6-34 has requested access, the service provider 6-36 will then obtain for the end user 6-34 and/or the service client 6-33 the benefit of the requested secured resource and thereafter appropriately report the conducted transaction to the service client 6-33 and/or the end user 6-34.

With the foregoing broad overview of the general structure and function of the authentication system 6-30 of the present invention in mind, it is now noted that in accordance with the present invention an end user 6-34 may comprise any person or machine requiring, in connection with some other use, access or other relationship with a service client 6-33, access for the service client 6-33 to a secured resource for which the service client 6-33 is restricted from full knowledge and for which the service provider 6-36 may hold full knowledge, full knowledge being defined herein as knowledge sufficient to make ordinary full use of the secured resource outside of the framework of the authentication system 6-30 and method 6-46 of the present invention. By way of simple example, the resource may comprise password protected information (e.g., a credit report) a portion of which (e.g., only the credit scores) a human end user 6-34 wishes to share with a service client 6-33 comprising an information consumer (e.g., a potential creditor) without providing to the information consumer the password (e.g., by which the full credit report is protected and as would otherwise enable the potential creditor to gain full access to the protected credit file). Under the present invention, a service provider 6-36 having associated therewith a hardware and/or software implementation of the previously generally discussed functionality is in accordance with the present invention programmed or otherwise adapted to receive directly from the service client 6-33 an end user provided authentication credential associated with a request by the end user 6-34 for the service provider 6-36 to provide for the service client 6-33 access to a secured resource and, thereafter, to validate the authentication credential from the service client 6-33 to ensure that the request is made under the authorization of an end user 6-34 having right of access to the secured resource.

With this in mind, the end user 6-34 may, for example and without limitation, be a patient wishing to share medical information (a secured resource) with a healthcare or medical insurance provider (a service client 6-33) without having to grant to the healthcare or medical insurance provider unfettered access to all of his or her medical records; the end user 6-34 may be the holder of a credit card account, banking account, automated teller machine ("ATM") card and/or account or the like (a secured resource) wishing to purchase merchandise, services, information or the like from a retail store, service station, on-line service provider or merchandiser, other business or the like (a service client 6-33) without providing the service client 6-33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data or the like (a service client 6-33) without providing his or her Social Security Number or other information not necessary to the conduct of the present transaction.

In a critical aspect of the authentication system 6-30 and method 6-46 of the present invention, an additional security measure is implemented by requiring that the service client 6-33 be restricted from access to the common identifier for the secured resource, e.g. the account number for a credit card or financial deposit account; the Social Security Number of a patient; the account number of an ATM card; or the like. In order to better describe these critical aspects of the present invention, however, reference is now made to the deployment diagram of FIG. 6-5, wherein there is shown the various elements of an exemplary hardware and software based implementation of an authentication system 6-30 constructed in accordance with the teachings of the present invention.

Before continuing, however, it is noted that while the implementation depicted in FIG. 6-5 is exemplary of the authentication system 6-30 of the present invention, it is in no manner meant to be all encompassing or otherwise limiting of the wide range of implementations as are possible. In addition, it is noted that while some elements are in FIG. 6-5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 6-5, a service provider 6-36 (such as, for example, may comprise a specialized provider of the authentication services of the present invention; a provider of other products or services having need of authentication services, such as, for example, a credit card processor or financial institution or an alarm monitoring company; or the like) is shown for purposes of this exemplary discussion to have associated therewith one or more application servers 6-50 or database servers 6-98 upon which may be hosted software functionality necessary to operation within the framework of the present invention. In particular, an application server 6-50 may host a request handler software component 6-51 adapted to receive, process and/or otherwise handle request messages 6-84 from end users 6-34 and submissions from end users 6-34 or service clients 6-33 as well as to produce output for end users 6-34 and/or service clients 6-33 as may be necessary in the operation of the present invention. Additionally, the application server 6-50 may host an authenticator 6-52 adapted to handle or otherwise control all aspects of the authentication process within the realm of responsibility of the service provider 6-36, including receiving authentication requests, storing and/or retrieving data pertinent to the processing of such requests, directing the generation and sending of key strings 6-94, and directing the validation of credentials submitted for authentication and actions taken based upon the results of such validations. In order to improve efficiency, the authenticator component 6-52 may comprise one or more further specialized components such as, for example, a random sequence generator 6-54 as may be useful in the highly specialized task of creating random sequences which, as will be better understood further herein are an integral feature of the present invention, and a validation tool 6-55 adapted to conduct the specialized task of comparing received credentials with known key strings. Still further, the application server 6-50 may also host an administration tool 6-56 through which various aspects of the setup, maintenance and operation of the hardware and software systems of the service provider 6-36 may be managed.

In order to efficiently manage and handle the large quantity of data that may typically be stored in connection with an implementation of the present invention, one or more dedicated database servers 6-98 hosting database management systems 6-57 are generally desired. As shown in FIG. 6-5, a typical database management system 6-57 may include a user database 6-58 for storing a wide variety of generally user centric data as may be required in the operation of the present invention and a transaction database 6-59 for storing data generally associated with the conduct of individual transactions. Although those of ordinary skill in the art will recognize that virtually unlimited alternatives are possible, FIG. 6-7 shows a very high level but generally representative schema for a user database 6-58 and FIG. 6-8 shows a very high level but also generally representative schema for a transaction database 6-59, each of which will be described in greater detail further herein in connection with an exemplary description of the conduct of a typical transaction.

Additionally, a preferably unified messaging gateway 6-60 is provided for use in receiving request messages 6-84 from and issuing key strings 6-94 to end users 6-34 through various communication channels. As will be appreciated by those of ordinary skill in the art, such a unified messaging gateway 6-60 may be utilized to receive a request message 6-84 or transmit a generated key string 6-94 in any of a plurality of message formats (such as, for example, as a SMS message, a standard text message, an e-mail message, a synthesized voice message, an alphanumeric page or the like) over any of a plurality of communication channels (such as, for example, an SMS or other text channel, a SMTP channel, a POTS channel, a paging network or private broadcast channel or the like) to be received by any of a plurality of user devices (such as, for example, a mobile or landline telephone, a smart phone, an e-mail client, a PDA, a numeric or digital pager or the like). Still further, a service user interface 6-61 is provided and adapted to provide input from all manner of users 6-62, including administrative users, end users 6-34 and service client users 6-33, to the hardware and/or software systems of the service provider 6-36 and to provide output from these systems to the various users 6-62. Although the service user interface 6-61 may take a wide variety of forms depending upon the circumstances of any particular implementation, a typical user interface may be implemented as a web interface 6-63, as shown in FIG. 6-6, wherein there may be provided a page processor 6-64 hosted on an appropriate execution environment 6-65 installed on a dedicated web server 6-66 in Internet communication 6-67 with a user device 6-68, such as, for example, a personal computer, smart phone 6-78 or the like, and on which is installed and/or hosted a web browser 6-69 running in a provided execution environment 6-70. In any case, as will be appreciated by those of ordinary skill in the art, the provision of a service user interface 6-61, which of course should be secured, enables the various users 6-62 to maintain and/or otherwise manage the data stored in the user database 6-58 as may be appropriate as well as to generally manage and maintain the implemented authentication system 6-30. Finally, one or more resource communication gateways (not shown) may be provided in order to establish preferably secure communication between the systems of the service provider 6-36 and outside resource providers 6-43.

Continuing then with the example generally described with respect to FIG. 6-5, further details of the implementation are now described by way of the following detailed description of a possible use of the implementation for conducting a retail purchase transaction, which, for purposes of the example, shall be taken as completion of a purchase at an automobile fueling station, a restaurant or an on-line retailer (the service client 6-33) by a consumer (the end user 6-34) having available for payment a credit card and a checking account (secured resources). To complete the transaction, the consumer will indicate a desire to make a payment to the automobile fueling station, restaurant or on-line retailer by submitting to a service provider 6-36 a request for payment to the service client 6-33 and for authentication of the consumer's right of access to an identified secured payment resource, whereafter the service provider 6-36 will establish for the consumer an authentication credential to be provided to the service client 6-33. The service client 6-33 will then forward the authentication credential to the service provider 6-36 for validation in order to obtain payment from the identified secured payment resource as requested by the consumer. In accordance with a critical aspect of the present invention, however, the automobile fueling station, restaurant or on-line retailer cannot be provided with or otherwise be made aware of either the consumer's credit card or checking account number and also must not be given any information that would allow the automobile fueling station, restaurant or on-line retailer to repeat the transaction without again obtaining authorization from the consumer.

As previously discussed, the authentication method 6-46 of the present invention generally begins with an end user 6-34 obtaining from a service client 6-33 data or other information necessary for the end user 6-34 to request that a service provider 6-36 provide for the service client 6-33 access to a secured resource. As also previously discussed, this data or other information will generally comprise the identification of the service client 6-33. Referring then to FIG. 6-9 through FIG. 6-11 in particular, representative means 6-35 for identifying a service client 6-33 are shown to comprise an alphabetic and/or numeric identification code 6-71 and a machine readable identification code 6-72 such as, for example, a barcode or like representation. As particularly shown in FIG. 6-9, one or more such means 6-35 may be affixed by printing, placard or other labeling or electronically displayed on a screen, monitor or the like of a POS, fueling station, ATM or like terminal device 6-73. As particularly shown in FIG. 6-10, one or more such means 6-35 may be printed on a guest check 6-74, sales slip, invoice or the like prepared in anticipation of the completion of a financial transaction or on a similarly formatted request document such as, for example, a consent form for access to medical records, credit records or the like. As particularly shown in FIG. 6-11, one or more such means 6-35 may be displayed on a webpage 6-75, as part of a computer or like application program such as, for example, may be generated or otherwise provided in connection with an on-line financial transaction, activation or deactivation of an alarm system, access to of control of a computer or other machine, control of a door lock or a like application.

As also previously discussed, the data or other information obtained from a service client may additionally comprise any other data or information as may be helpful for the conduct of a particular transaction such as, for example, a purchase amount 6-76, a client reference, detailed or itemized transaction data or the like. To this end it is noted that in most cases a means 6-35 for identifying a service client 6-33 may be dynamically generated on a transaction-by-transaction basis. For example, in the case of FIG. 6-9 representing a fueling station terminal device, the numeric identifier and/or barcode could be generated by the fueling station controller and displayed on the depicted screen, whereby the information collected by the end user 6-34 for use in submitting a request message 6-84 to the service provider 6-36 may include, for example, a transaction number or the like. Similarly, in the case of FIG. 6-9 representing an ATM terminal device, the numeric identifier 6-71 and/or barcode 6-72 could be generated by the ATM controller in at least partial reliance on user submitted information and, thereafter, displayed on the depicted screen 6-77, whereby the information collected by the end user 6-34 for use in submitting a request message 6-84 to the service provider 6-36 may include, for example, the amount of a withdrawal or other transaction, the types of accounts to use in completing the desired transaction or the like. In the case of FIG. 6-10 representing a document created for a particular transaction or in the case of FIG. 6-11 representing a computer or other dynamically created display, those of ordinary skill in the art will recognize that virtually any type of data or other information may be included for use by the end user 6-34 in submitting a request message 6-84 to the service provider 6-36.

Still further, however, the data or other information may for enhanced security include, in addition to the identification of the service client 6-33, a dynamically generated value that must be included as part of the identification of the service client 6-33 in order for a request message 6-84 submitted by an end user 6-34 to be accepted by a service provider 6-36. In implementation of such a feature, the end user 6-34 will generally provide some input to the service client 6-33 indicating that the end user 6-34 wants to make use of the service 6-30. At this point, the service client 6-33 will, preferably through a secured communication channel, request and obtain from the service provider 6-36 a uniquely formulated identification for use only in connection with the present transaction. The obtained unique identification is then used by the service client 6-33 and the end user 6-34 in the same manner as otherwise would be used a static identification. As will be appreciated by those of ordinary skill in the art, this feature is particularly useful in the detection and/or prevention of man-in-the-middle or other spoofing type deceptions.

In any case, as also previously discussed, the service client provided information is then utilized by the end user 6-34 to submit a request message 6-84 to the service provider 6-36 for requesting that the service provider 6-36 provide for the service client 6-33 access to a secured resource. To this end, the end user 6-34 will require a means 6-38 for communicating the request message 6-84 to the service provider 6-36. As shown in FIG. 6-12, a mobile device 6-78, such as a cellular telephone, smart phone or the like, may be utilized to send an SMS or standard text message 6-79 over any available SMS or standard text capable communication channel to the messaging gateway 6-60 implemented for the service provider 6-36. Similarly, as shown in FIG. 6-14, an electronic mail client 6-80 may be utilized to send an electronic mail message 6-81 over any electronic mail capable communication channel to the messaging gateway 6-60 implemented for the service provider 6-36. Additionally, a web interface 6-63, which may be implemented as or in connection with the service user interface 6-61, may be utilized to enable the end user 6-34 to interactively communicate the request message 6-84 to the service provider 6-36. While implementation of the web interface 6-63 will generally dictate establishing at least some login functionality, which minimally would include requiring the provision of a user name or the like by which the service provider 6-36 can identify the particular end user 6-34 making a submission, those of ordinary skill in the art will recognize that such an implementation also has the advantage of providing the end user 6-34 with broad flexibility in tailoring of the request message 6-84 to any particular transaction. Still further, as shown in FIG. 6-16, a user application 6-82, which may be adapted for use on or in connection with a mobile device 6-78, a personal computer or any other appropriate hardware, may also be provided. As will be appreciated by those of ordinary skill in the art, implementation of such a user application 6-82 will not only provide generally the same advantageous flexibility as a web interface 6-63, but also may be provided with means for securely identifying the end user 6-34 to the service provider 6-36. For example, such a user application 6-82 may have embedded therein a token or other identifier, which may be encrypted if desired, for passage to the service provider 6-36 to identify the end user 6-34. In any case, it is also noted that because any desired formatting may generally be effected by a user application 6-82 such a user application 6-82 may also be adapted to communicate with the messaging gateway 6-60 or other user interface 6-61 implemented for the service provider 6-36 over virtually any communication channel including, for example and without limitation, an SMS or standard text capable communication channel, an SMTP capable communication channel, a POTS communication channel, a HTTP, HTTPS, FTP or other Internet or like network transfer protocol communication channel. Finally, it is noted that other devices and communication channels may also be utilized for submission by an end user 6-34 of a request message 6-84 to the service provider 6-36 as well as for communication by the service provider 6-36 to the end user 6-34 of a key string 6-94. For example, and without limitation, the means 6-38 for communicating a request message 6-84 to a service provider 6-36 and/or means 6-39 for communicating a key string 6-94 to an end user 6-34 may also comprise a telephone auto attendant, which may implement a DTMF decoder, speech recognition engine, TDD/TTY decoder or the like, or virtually any other combination of input modalities (including barcode readers or scanners, keyboards, keypads, pointing devices, microphones and the like) and output modalities (including visual displays such as computer or other device monitors or screens, audio output devices such as headphones or other speakers, tactile output devices such as may be adapted for the visually impaired and the like).

As particularly shown in FIG. 6-12 and FIG. 6-14, a typical request message 6-84 may simply comprise information 6-83 identifying the service client 6-33 (such as, for example, a credit card program merchant identification number, a service provider issued or registered identification number or other identifier or the like) and, if necessary for the particular transaction, one or more additional parameters (such as, for example, a purchase amount 6-76 or the like). As exemplified by the depicted examples, the request message 6-84 may be formatted according to a predetermined pattern or other scheme, which, as will be appreciated by those of ordinary skill in the art, is particularly advantageous in implementations wherein the end user 34 may be required to submit the request message 6-84 by text message 6-79, inasmuch as such a formatted input will generally require a bare minimum of data entry by the end user 6-34. In any case, it is noted that in the examples of FIG. 6-12 and FIG. 6-14 the request message 6-84 does not include identifying information for the end user 6-34. As will be appreciated by those of ordinary skill in the art, however, such information may be obtained by the service provider 6-36 by examining the telephone number from which the text message 6-79 was sent, in the case of FIG. 6-12, or by examining the "reply to" electronic mail address from which the electronic mail message 6-81 was sent, in the case of FIG. 6-14.

As particularly shown in FIG. 6-15 and FIG. 6-16, the request message 6-84 may be formatted for transmission by the implemented website page processor 6-64 and/or user application 6-82, the details of which formatting will generally not need to be known by the end user 6-34. Additionally, it is noted that the information provided in either depicted implementation may be manually entered by the end user 6-34, automatically entered through a barcode reader (which, in the case of a mobile application 6-82 may be provided in connection with the camera application of a mobile device 6-78), or through a combination of manual and automatic entry. Additionally, these implementations are readily adapted to include any number of convenience features. For example, the screen as depicted in FIG. 6-16 may be produced as a result of scanning the barcode provided on the guest check 6-74 depicted in FIG. 6-10, but prior to submitting the request to the service provider 6-36 the end user 6-34 may change the amount 6-76 from "27.99"

to "33.99," which may, under the circumstances of the transaction (including, for example, the knowledge that the service client 6-33 is a restaurant), be automatically interpreted by the service provider 6-36 as an indication that the end user 6-34 wishes to add a tip in the amount of $6.00 to the purchase price 6-76. In any case, once the request message 6-84 is assembled and/or formatted, if required, by the end user 6-34, the request message 6-84 is submitted to the service provider 6-36.

Once the request message 6-84 is received by the implemented messaging gateway 6-60 or, if appropriate, service user interface 6-61, the nature of the request will be identified and the request message 6-84 will then be routed to the request handler 6-51 hosted on the service provider's application server 6-50. Upon receipt of the consumer's request message 6-84, the request handler 6-51 will generally first undertake to determine whether the purported end user 6-34 is recognized at the service provider 6-36. To this end, the request handler 6-51 may access the user database 6-58, as generally shown in FIG. 6-7, to determine whether the provided or inferred end user 6-34 identification can be located in the user table 6-85. If not, the authentication process 6-46 will generally terminate. If, on the other hand, the provided or inferred end user 6-34 identification is recognized the request handler 6-51 will proceed to establish a new transaction record in the transaction table 6-86 of the transaction database 6-59, as generally shown in FIG. 6-8, and at this time should also store in the transaction record the unique USER_ID by which the automobile fueling station, restaurant or on-line retailer is known in the user database 6-58. Additionally, any other pertinent provided information such as, for example, the client reference, purchase amount 6-76 or the like, may be stored in the transaction parameter records 6-87, which will be created as required.

With the new transaction record established and known pertinent information appropriately stored, the request handler 6-51 then undertakes to identify a particular secured resource for fulfillment of the consumer's request. As previously noted in the setup to the present example, however, the consumer wishing to make payment to the automobile fueling station, restaurant or on-line retailer has more than one secured payment resource available for use, which information will become known to the request handler 6-51 upon searching the resource table 6-88 of the user database 6-58 for secured resources associated with the USER_ID by which the tentatively identified consumer is known.

As shown in the exemplary user database 6-58 of FIG. 6-7, the resource table 6-88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system of the present invention is preferably provided with means for determining a particular resource for access on the authority of the end user 6-34.

In a first example of such a means a priority may be assigned by each user 6-34 of a resource to the particular resource, whereby resources of a particular class or, if the service client 6-33 accepts only a certain subclass, on the basis of a particular class and subclass the available resources meeting the selection criteria may be sorted to determine the appropriate resource for use. Such priority values may, for example, be stored in the resource user table 6-99 of the user database 6-58 as depicted in FIG. 6-7.

In a second example of such a means each resource may be assigned a pseudonym 6-90 comprising generally non-identifying information but nonetheless information which is unique among the class of resource for any particular user, which pseudonyms may be stored in the resource attribute table 6-89 of the user database 6-58. Making use of the stored pseudonym 6-90, this means for determining a particular resource for access by the end user 6-34 comprises generating an inquiry message 6-91 for transmission to the end user 6-34 whereby the service provider 6-36 requests that the end user 6-34 select one resource based on the assigned pseudonym. As particularly shown in FIG. 6-13, such an inquiry message 6-91 may be sent by generally any means available for communication with the end user 6-34, including any means appropriate for submitting request messages 6-84 or issuing challenge messages 6-94, and is preferably formatted for simple reply.

In the example implementation (assuming that no priority information was stored), upon determining that the tentatively identified end user 6-34 has more than one secured payment resource, but that each available resource has associated therewith a pseudonym 6-90, the service provider 6-36 would generate an inquiry message 6-91 for transmission to the end user 6-34, which inquiry message 6-91 may request that the consumer enter a simple response indicating whether he or she wishes to proceed using his or her "Credit Card 9876" or using his or her "Checking 1234." Once generated, the request handler 6-51 will generally queue the inquiry message 6-91 at the service provider's messaging gateway device 6-60 for transmission to the consumer. The consumer may then select the desired payment option and respond, causing an updated request message 6-84 to be routed to the request handler 6-51. At this point the request handler 6-51 will again undertake to identify a particular secured resource for fulfillment of the consumer's request.

Finally, in a third example means for determining a particular resource for access by the end user 6-34, the determination is deferred and made in connection with issuing 6-39 a key string 6-94 to the end user 6-34. This means will be described in greater detail further herein.

In any case, once an appropriate particular secured resource is identified for access, any remaining transaction parameters, including the unique RESOURCE_ID by which the identified resource is known in the user database 6-58, is preferably stored in the transaction database 6-59 as shown in FIG. 6-8. With the end user 6-34 and the resource for which the end user 6-34 requests access both identified and logged to the transaction database 6-59, the authenticator 6-52 hosted on the service provider's application server 6-50 takes control from the request handler 6-51 and undertakes to direct the generation of an appropriate key string 6-94 for use in positively authenticating the identity of the presently tentatively identified end user 6-34.

In accordance then with the authentication system 6-30 and method 6-46 of the present invention, the key string 6-94 is generated as a random string comprising a plurality of symbols.

Returning then to the example use of the authentication system 6-30 of the present invention it is noted that in the most preferred embodiment of the present invention prior to directing the generation of a key string 6-94 the authenticator 6-52 evaluates all available information that may impact the ability of an end user 6-34 to readily receive a particular key string 94 and/or to readily submit a received key string 6-94 to the service client 6-33 and, additionally, determines whether any special security requirements may exist for access to the particular resource. In particular, the authenticator 6-52 will preferably obtain from channel table 6-111 of the user database 6-58 channel data indicating the type of communication channel that will be utilized to transmit the key string 6-94. Additionally, the user attribute table 6-92 of the user database 6-58 may indicate whether the end user 6-34 suffers any disability that would impact the manner of receipt and/or handling by the end user 6-34 of the key string 6-94 and/or may contain data associated with the service client 6-33 that may indicate special security requirements, such as a minimum length for the key string 6-94, or capabilities or limitations of the service client user interface 6-73, such as being limited to entry of numeric characters only. Still further, the resource attribute table 6-89 of the user database 6-58 may also indicate special resource dictated security requirements, such as minimum length or desired complexity for the key string 6-94. In any case, the authenticator 6-52 will determine the characteristics that should be exhibited by the key string 6-94, including the manner of issuance, and will then instruct the random sequence generator 6-54 to generate a key string 6-94 meeting the established requirements.

The authenticator 6-52 will then obtain from the random sequence generator 6-54 a key string 94 meeting the requirements established as directed by the authenticator 6-52. With the key string 6-94 generated, the authenticator 6-52 will proceed to construct the key string message 6-49 which will at least comprise the key string 6-94, but, as will be better understood further herein, may also include additional information in support of the transaction in progress. In any case, with the key string message 6-49 assembled the authenticator 6-52 queues the key string message 6-49 by providing the messaging gateway 60 with the key string message 6-49, the type of communication channel to be utilized and the CHANNEL_ID for the channel. For example, if the key string message 6-49 is to be sent by text message 6-79, the authenticator 6-52 will inform the messaging gateway 6-60 that the key string message 6-49 is to be transmitted by text message 6-79 and will provide the messaging gateway 6-60 with a telephone number for a text capable user device 6-78.

Referring then to FIG. 6-17 in particular, there is shown a typical simple key string message 6-49 as may be transmitted to an end user 6-34 through a text enable smart phone or like mobile device 6-78. Following with the presented example, it is noted that in an optional but useful feature of the present invention the key string message 6-49 may also include information helpful to the consumer in continuing the transaction in progress. For example, the key string message 6-49 depicted in FIG. 6-17 includes the name of the restaurant for which the consumer made the access request and the purchase amount 6-76 for which the consumer requests access to his or her secured resource.

Substantially contemporaneously with transmission of the key string message 6-49, the authenticator 6-52 will store the key string 6-94 in the key string table 6-97 of the transaction database 6-59. At this time, a timestamp may also be entered into the transaction table 6-86 in order to provide a reference by which may be calculated a timeout event for the validity of the key string 6-94.

Turning the example now to detailed discussion of the steps 6-48 implicated in validating the purported access right of the user requesting access to the secured resource, the validation steps 6-48 begin with the consumer providing to the service client 6-33 for which access to a secured resource has been requested, as an authentication credential, the key string 6-94 as provided to the end user 6-34 by the service provider 6-36 for use in connection with the transaction in progress. While the authentication credential (key string 6-94) may generally be provided to a service client 6-33 in any conceivable manner, including verbally, in writing, by electronic transmission or the like, at least some implementations may require that the end user 6-34 provide the key string 6-94 in a particular manner. For example, a self-service type transaction at a POS, ATM or fueling station terminal device 6-73 will generally dictate that the end user 6-34 provide the authentication credential through the service client provided input modality 6-95. In an example of how the authenticator 6-52 may be adapted to address circumstances that may affect the ability of an end user to receive and/or handle a key string 6-94 and/or the ease of so doing, the authenticator 6-52, given the knowledge that the consumer will be forced to enter the key string 6-94 through a limited input modality such as, for example, the simple keypad 6-95 depicted in FIG. 6-9, which of course will commonly be encountered at a POS, ATM or fueling station terminal device 6-73, may instruct the random sequence generator 6-54 to generate a key string 6-94 comprising only numbers.

In any case, with the authentication credential provided, the fueling station, restaurant or on-line retailer submits in an authentication message the end user provided authentication credential to the service provider 6-36 along with the service client's identifying information 6-71 for validation and, assuming validation passes, access to the end user's authorized secured resource—in this case payment.

Once the authentication credential is received by the service provider 6-36, it is routed by the messaging gateway 6-60 or service user interface 6-61 to the authenticator 6-52 hosted on the service provider's application server 6-50. The authenticator 6-52 will then direct the validation tool 6-55 to evaluate the submitted authentication credential based upon the client identity and/or client reference for the authentication message. The validation tool 6-55 will access the transaction database 6-59 to retrieve the key string 6-94 or key strings 6-94 associated with the particular client identity and/or client reference and will evaluate the submitted credential against each (taking into account, if appropriate for the particular implementation, the passage of time) and will then report the result of the evaluation to the authenticator 6-52. If the evaluation fails, the process 48 will terminate and the failure will be reported by the request handler 6-51 to the service client 6-33. If, on the other hand, the evaluation passes the request handler 6-51 will determine whether a resource need be accessed on behalf of the fueling station, restaurant or on-line retailer.

If the request handler 6-51 determines that a resource should be accessed, a resource request is formulated using the transaction parameters stored in the transaction database 6-59 and any additional information as may be necessary that is stored in the user database 6-58. For example, in the case of processing a credit card transaction, the request handler 6-51 will retrieve the transaction amount from the transaction database 6-59 and will retrieve the full credit card number, expiration date, billing address, CV number or other necessary information pertaining to the credit card account from the resource attribute table 6-89 of the user database 6-58 and may also retrieve from the user attribute table 6-92 of the user database 6-58 necessary information concerning the fueling station, restaurant or on-line retailer such as, for example, banking information for deposit of obtained funds. In any case, the complete resource request is by the request handler 6-51 queued to a resource communication gateway and processed whereafter the result of the transaction is reported to the fueling station, restaurant or on-line retailer and also, preferably, to the consumer.

As previously mentioned, however, a third example means for determining a particular resource for access by the end user 6-34 may be implemented in connection with the issuing of a key string message 6-49 to the consumer. In particular, as shown in FIG. 6-18, two or more key strings 6-94 may be presented in a key string message 6-49 to an end user 6-34, each key string 6-94 being identified by additional content provided in the key string message 6-49 (preferably using pseudonyms if available) as corresponding to a particular one available resource for use in completing the transaction in progress. As is apparent from the schema of FIG. 6-8, the preferred embodiment of the present invention contemplates generation of any number of key strings 6-94 for any one transaction. Additionally, it should be noted that for each key string 6-94 logged in the key string table 6-97 of the transaction database 6-59, there is in the same record associated one secured resource identified by RESOURCE_ID. In use, the resource will be identified based upon which of multiple possible correct key strings 6-94 the consumer provides to the service client 6-33 for submission by the service client 6-33 for authentication by the service provider 6-36.

In a particularly efficient feature of the present invention, the service provider 6-36 may provide for the consumer an electronically generated receipt for the conducted transaction, which may be transmitted by e-mail or otherwise. In a case where the fueling station, restaurant, on-line retailer or other service client 6-33 provides itemized or otherwise detailed purchase data, such data may be included as part of the receipt. This, of course, completely relieves the service client 6-33 of having to generate a receipt. Additionally, combined transaction data may be assembled by the service provider 6-36 for periodic bulk reporting to the service client 6-33. Still further, the service provider 6-36 may, if desired, implement a budgeting service for the end user 6-34, wherein at the end user's behest financial transactions over budgeted limits or over budgeted limits for particular service clients 6-33 or types of service clients 6-33 will be deemed to fail validation in order to force compliance with the terms of a budget.

While the foregoing description is exemplary of various embodiments of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 6-34 that system, facility or the like for which the end user 6-34 desires access has implemented the teachings of the present invention. In any case, because the scope of the present invention is much broader than any particular embodiment, the foregoing detailed description should not be construed as a limitation of the scope of the present invention, which is limited only by the claims appended hereto.

I claim:

1. A computer-implemented method for a credit or debit card account holder to authorize a resource provider to use a credit or debit card account number to pay a specific merchant for a specific transaction without transmitting or otherwise providing the credit or debit card account number to the merchant, the computer-implemented method comprising the steps of:
   providing at least one interface adapted to receive and transmit data in communication with a credit or debit card account holder's mobile device, a merchant's payment application, or both;
   receiving registration information received from the credit or debit card account holder through the at least one interface, the registration information comprising a credit or debit card account holder identifier and at least one credit or debit card account number having an associated unique account identifier wherein the credit or debit card account number and unique account identifier are not the same;
   receiving an authorization request message to pay the specific merchant for the specific transaction from a given debit or credit card account, the authorization request message having been received through the at least one interface and originating from the credit or debit card account holder's mobile device and comprising:
      a first merchant identifier;
      a first transaction specific information selected from the group consisting of a first transaction amount and first client reference identifier;
      the credit or debit card account holder identifier; and
      a designated unique account identifier selected from the at least one unique account identifiers; and
   generating a first transaction specific authentication credential associated with the authorization request, whereby the first transaction specific authentication credential comprises a key string wherein the key string is not a temporary credit or debit card account number and does not include or reveal the credit or debit card account number associated with the designated unique account identifier;
   receiving a payment request message from the merchant's payment application through the at least one interface, the payment request message comprising:
      a second merchant identifier;
      a second transaction specific information selected from the group consisting of a second transaction amount and second client reference identifier; and
      a second transaction specific authentication credential whereby the second authentication credential was received by the merchant application from the credit or debit card account holder's mobile device; and
   validating the credit or debit card account holder's request to use the credit or debit card account number associated with the designated unique account identifier for payment to the specific merchant for the specific transaction and authorizing the resource provider to use the credit or debit card account number associated with the designated unique account identifier to pay a specific merchant for a specific transaction without transmitting or otherwise providing the credit or bank account number to the specific merchant by determining that:
      the first merchant identifier matches the second merchant identifier;
      the first transaction specific information matches the second transaction specific information; and
      the first transaction specific authentication credential matches the second transaction specific authentication credential.

2. The computer-implemented authentication method of claim 1 wherein the first transaction specific authentication credential is generated before receipt of the payment request message.

3. The computer-implemented authentication method of claim 1 further comprising the steps of storing the first transaction specific authentication credential for the authorization request message.

4. The computer-implemented authentication method of claim 1 further comprising the steps of transmitting the transaction specific authentication credential to the credit or debit card account holder's mobile device through the at least one interface.

5. The computer-implemented authentication method of claim 1 further comprising the steps of completing the payment process using the credit or debit card account number for the designated unique account identifier without transmitting or otherwise providing the credit or debit card account number to the merchant.

6. The computer-implemented authentication method of claim 1 wherein the validation step must take place within a given time period.

7. The computer-implemented authentication method of claim 1 further comprising the step of determining whether the second authentication credential should be deemed invalid based upon passage of time.

8. The computer-implemented authentication method of claim 1 wherein the credit or debit card account number comprises an issuer identifier portion and the first transaction specific authentication credential value includes the issuer identifier portion of the account number associated with the designated account identifier.

9. A computer-implemented system for a credit or debit card account holder to authorize a resource provider to use a credit or debit card account number to pay a specific merchant for a specific transaction without transmitting or otherwise providing the credit or debit card account number to the merchant, the computer-implemented system comprising:
at least one interface adapted to receive and transmit data in communication with a credit or debit card account holder's mobile device, a merchant's payment application, or both;
one or more servers in secure communication with the at least one interface, the one or more servers having:
a first instruction embodied in a computer readable medium, the first instruction operable to receive registration information received from the credit or debit card account holder through the at least one interface, the registration information comprising a credit or debit card account holder identifier and at least one credit or debit card account number having an associated unique account identifier wherein the credit or debit card account number and unique account identifier are not the same;
a second instruction embodied in a computer readable medium, the second instruction operable to receive an authorization request message to pay the specific merchant for the specific transaction from a given debit or credit card account, the authorization request message having been received through the at least one interface and originating from the credit or debit card account holder's mobile device and comprising:
a first merchant identifier;
a first transaction specific information selected from the group consisting of a first transaction amount and first client reference identifier;
the credit or debit card account holder identifier; and
a designated unique account identifier selected from the at least one unique account identifiers; and
a third instruction embodied in a computer readable medium, the third instruction operable to:
generate a first transaction specific authentication credential associated with the authorization request, whereby the first transaction specific authentication credential comprises a key string wherein the key string is not a temporary credit or debit card account number and does not include or reveal the credit or debit card account number associated with the designated unique account identifier;
receive a payment request message from the merchant's payment application through the at least one interface, the payment request message comprising:
a second merchant identifier;
a second transaction specific information selected from the group consisting of a second transaction amount and second client reference identifier; and
a second transaction specific authentication credential whereby the second authentication credential was received by the merchant application from the credit or debit card account holder's mobile device; and
validate the credit or debit card account holder's request to use the credit or debit card account number associated with the designated unique account identifier for payment to the specific merchant for the specific transaction and authorize the resource provider to use the credit or debit card account number associated with the designated unique account identifier to pay a specific merchant for a specific transaction without transmitting or otherwise providing the credit or bank account number to the specific merchant by determining if:
the first merchant identifier matches the second merchant identifier;
the first transaction specific information matches the second transaction specific information; and
the first transaction specific authentication credential matches the second transaction specific authentication credential.

10. The computer-implemented authentication system of claim 9 wherein the first transaction specific authentication credential is generated before receipt of the payment request message.

11. The computer-implemented authentication system of claim 9 wherein the third instruction is further operable to store the first transaction specific authentication credential for the authorization request message.

12. The computer-implemented authentication system of claim 9 wherein the third instruction is further operable to transmit the transaction specific authentication credential to the credit or debit card account holder's mobile device through the at least one interface.

13. The computer-implemented authentication system of claim 9 wherein the third instruction is further operable to complete the payment process using the credit or debit card account number for the designated unique account identifier without transmitting or otherwise providing the credit or debit card account number to the merchant.

14. The computer-implemented authentication system of claim 9 wherein the validation step must take place within a given time period.

15. The computer-implemented authentication system of claim 9 wherein the third instruction is further operable to determine whether the second authentication credential should be deemed invalid based upon passage of time.

16. The computer-implemented authentication system of claim 9 wherein the credit or debit card account number comprises an issuer identifier portion and the first transaction specific authentication credential value includes the issuer identifier portion of the account number associated with the designated account identifier.

* * * * *

UNITED STATES PATENT AND TRADEMARK OFFICE
CERTIFICATE OF CORRECTION

PATENT NO. : 10,148,659 B2
APPLICATION NO. : 15/444564
DATED : December 4, 2018
INVENTOR(S) : Gopal Nandakumar Page 1 of 1

It is certified that error appears in the above-identified patent and that said Letters Patent is hereby corrected as shown below:

In the Claims

Column 110, Lines 47-50 should be amended as follows:
"a second transaction specific authentication credential whereby the second transaction specific authentication credential was received by the merchant application from the credit or debit card account holder's mobile device; and"

Column 111, Lines 23-26 should be amended as follows:
"The computer-implemented authentication method of claim 1 further comprising the step of determining whether the second transaction specific authentication credential should be deemed invalid based upon passage of time."

Column 112, Lines 25-29 should be amended as follows:
"a second transaction specific authentication credential whereby the second transaction specific authentication credential was received by the merchant application from the credit or debit card account holder's mobile device; and"

Column 113, Lines 4-7 should be amended as follows:
"The computer-implemented authentication system of claim 9 wherein the third instruction is further operable to determine whether the second transaction specific authentication credential should be deemed invalid based upon passage of time."

Signed and Sealed this
Thirtieth Day of April, 2019

Andrei Iancu
*Director of the United States Patent and Trademark Office*